United States Patent
Zhang et al.

(10) Patent No.: US 8,255,353 B2
(45) Date of Patent: Aug. 28, 2012

(54) METHOD FOR CONSTRUCTING AN INTELLIGENT SYSTEM PROCESSING UNCERTAIN CAUSAL RELATIONSHIP INFORMATION

(75) Inventors: Qin Zhang, Beijing (CN); Zhan Zhang, Beijing (CN)

(73) Assignees: Zhan Zhang, Beijing (CN); Beijing Tsingneng Chuangxin Science and Technology Co., Ltd., Beijing (CN)

( * ) Notice: Subject to any disclaimer, the term of this patent is extended or adjusted under 35 U.S.C. 154(b) by 613 days.

(21) Appl. No.: 12/377,489

(22) PCT Filed: Aug. 15, 2006

(86) PCT No.: PCT/CN2006/002070
§ 371 (c)(1),
(2), (4) Date: Feb. 13, 2009

(87) PCT Pub. No.: WO2007/134495
PCT Pub. Date: Nov. 29, 2007

(65) Prior Publication Data
US 2010/0205138 A1 Aug. 12, 2010

(51) Int. Cl.
G06F 9/44 (2006.01)
G06F 17/00 (2006.01)
(52) U.S. Cl. ............................... 706/52; 706/62; 706/60
(58) Field of Classification Search ........................ None
See application file for complete search history.

(56) References Cited

U.S. PATENT DOCUMENTS
2004/0153429 A1 8/2004 Horn et al.
2005/0246682 A1 11/2005 Hines FOREIGN PATENT DOCUMENTS
| CA | 2016451 C | 10/2001 |
|---|---|---|
| CN | 1048460 A | 1/1991 |
| CN | 1349198 A | 5/2002 |
| CN | 1404012 A | 3/2003 |
| CN | 1457021 A | 11/2003 |

OTHER PUBLICATIONS
CIMS, 2001, vol. 7, No. 12, pp. 65-68.
ACTA Mathematicae Applicatae Sinica, 2000, vol. 23, No. 2, pp. 299-310.

*Primary Examiner* — Alan Chen
*Assistant Examiner* — Adrian Kennedy
(74) *Attorney, Agent, or Firm* — Connolly Bove Lodge & Hutz LLP

(57) ABSTRACT

The present invention disclosed a method constructing an intelligent system processing uncertain causal relationship information. It can express, monitor and analyze the causal logic relationship among the different variables in complex systems directly, implicitly or in both way of them under the circumstance of unsure, dynamic, having a logic loop, lacking of statistical data, unclear evidence, mixture of discrete and continuous variables, incomplete knowledge, multi-resource of knowledge. It gave effective bases to solve the problems in the domain of production, monitoring, detection, diagnosis, prediction, et al.

50 Claims, 19 Drawing Sheets

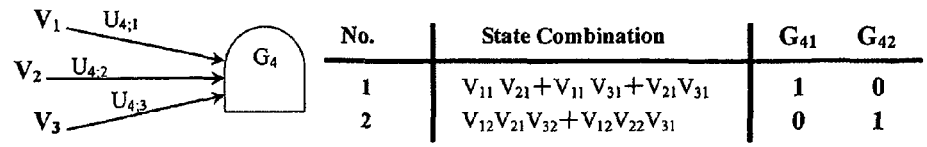
Fig. 4
| No. | State Combination | $G_{41}$ | $G_{42}$ | $G_{43}$ (Remnant State) |
|---|---|---|---|---|
| 1 | $V_{11}V_{21}+V_{11}V_{31}+V_{21}V_{31}$ | 1 | 0 | 0 |
| 2 | $V_{12}V_{21}V_{32}+V_{12}V_{22}V_{31}$ | 0 | 1 | 0 |
| 3 | $V_{22}V_{32}$ (Remnant) | 0 | 0 | 1 |
Fig. 5
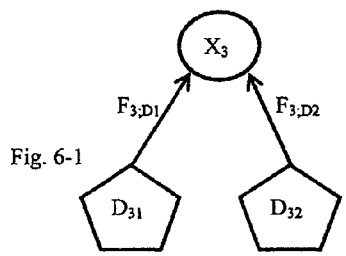
Fig. 6-1
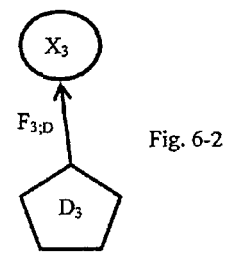
Fig. 6-2
Fig. 6
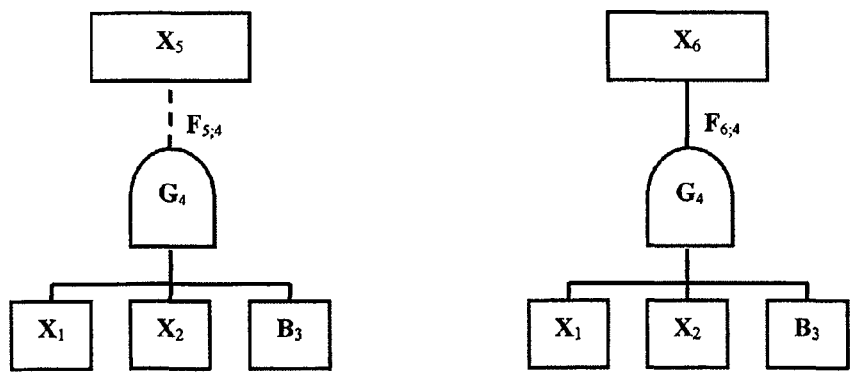
Fig. 7

| No. | State Combination | $G_{41}$ |
|---|---|---|
| 1 | $V_{21}V_{31}$ | 1 |

| No. | State Combination | $G_{41}$ | $G_{42}$ (Remnant State) |
|---|---|---|---|
| 1 | $V_{21}V_{31}$ | 1 | 0 |
| 2 | $V_{22}+V_{21}V_{32}$ (Remnant) | 0 | 1 |

| No. | Exclusive State Combination | $G_{41}$ | $G_{42}$ |
|---|---|---|---|
| 1 | $V_{11}V_{21}V_{31}+V_{11}V_{21}V_{32}+V_{11}V_{22}V_{31}+V_{11}V_{22}V_{32}$ | 1 | 0 |
| 2 | $V_{12}V_{21}V_{32}+V_{12}V_{22}V_{31}$ | 0 | 1 |

| No. | Exclusive State Combination | $G_{41}$ | $G_{42}$ | $G_{43}$ (Remnant) |
|---|---|---|---|---|
| 1 | $V_{11}V_{21}V_{31}+V_{11}V_{21}V_{32}+V_{11}V_{22}V_{31}+V_{11}V_{22}V_{32}$ | 1 | 0 | 0 |
| 2 | $V_{12}V_{21}V_{32}+V_{12}V_{22}V_{31}$ | 0 | 1 | 0 |
| 3 | $V_{22}V_{32}$ (Remnant) | 0 | 0 | 1 |

| No. | Exclusive State Combination | $G_{41}$ | $G_{42}$ (Remnant) |
|---|---|---|---|
| 1 | $V_{21}V_{31}$ | 1 | 0 |
| 2 | $V_{22}+V_{21}V_{32}$ (Remnant) | 0 | 1 |

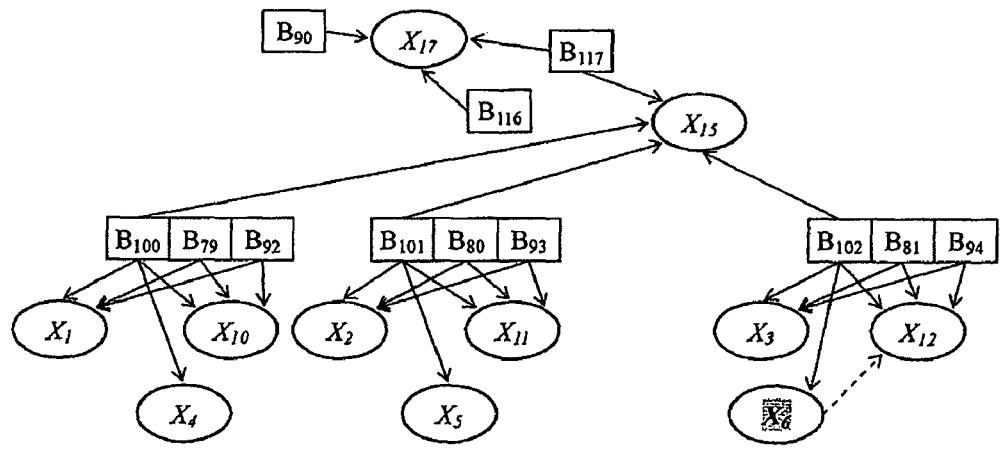
Fig. 23
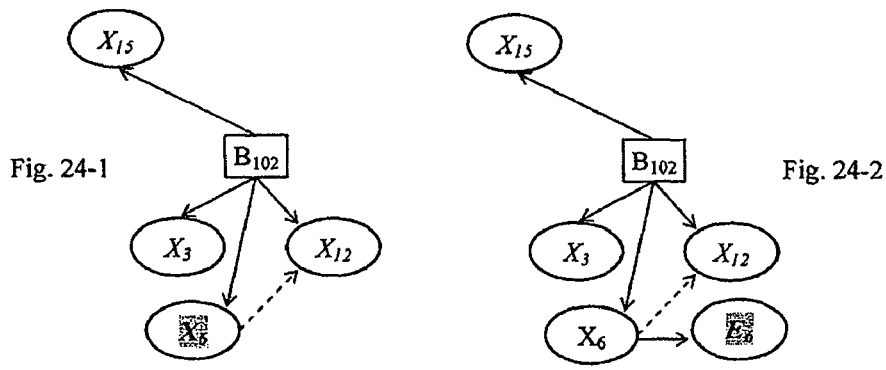
Fig. 24-1    Fig. 24-2
Fig. 24
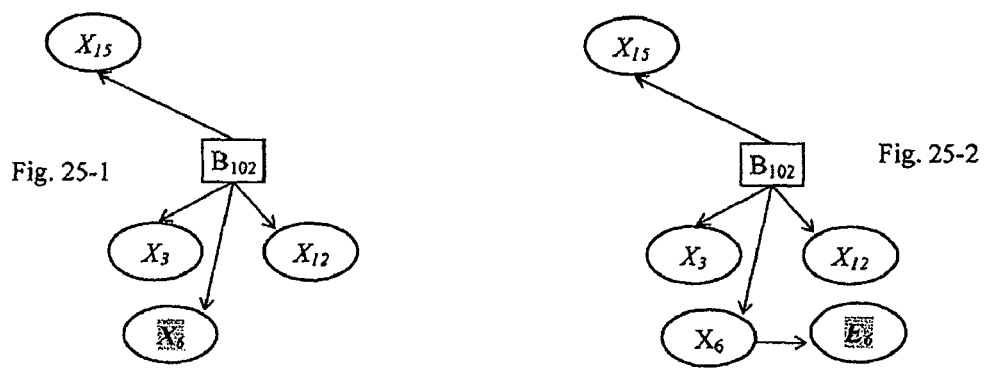
Fig. 25-1    Fig. 25-2
Fig. 25

$B_1$: transportation condition
$B_2$: weather condition
$X_3$: storage condition
$X_4$: consumption amount
$X_5$: production condition
$X_6$: supply amount
$X_7$: market price
$X_8$: consumption demand
$X_9$: production investment
$X_{10}$: demand on production capability
$B_{11}$: price control policies

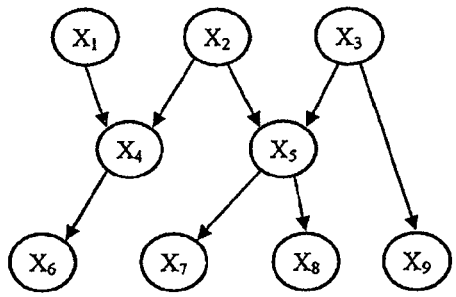
Fig. 41-1
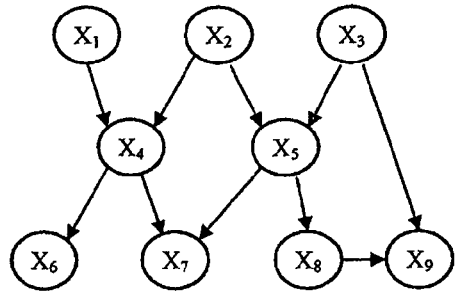
Fig. 41-2
Fig. 41
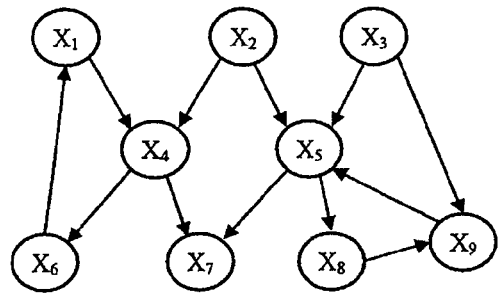
Fig. 42
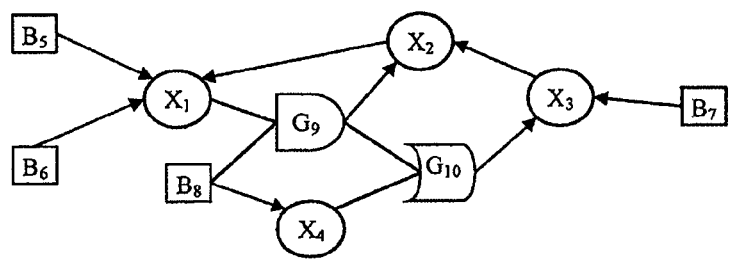
Fig. 43

METHOD FOR CONSTRUCTING AN INTELLIGENT SYSTEM PROCESSING UNCERTAIN CAUSAL RELATIONSHIP INFORMATION

RELATED APPLICATIONS

This application is a national stage application (under 35 U.S.C. §371) of PCT/CN2006/002070, filed Aug. 15, 2006.

FIELD OF THE INVENTION

This invention involves the intelligence technology processing information, in particular a method for processing the uncertain causality type information to help people make decisions through the computation of computers by means of the technology of knowledge representation and inference of intelligent system, i.e. a method for constructing an intelligent system for processing the uncertain causality information.

BACKGROUND OF THE INVENTION

The so called intelligent system in the modern artificial intelligence technology includes at least two necessary factors: one is the knowledge representation model; another is the inference method based on this knowledge representation model. The two factors are necessary for constructing an intelligent system, because the inference method is directly based on the knowledge representation model. Different knowledge representation model decides different inference method. Vice versa, choosing which knowledge representation model must consider not only the capability of the representation, the flexibility of using this representation model, and the difficulty of obtaining or learning the related data, but also how to build the reasonable and effective inference method based on the knowledge representation model. Such inference method must satisfy the natural law (in this invention, it is the basic law of probability theory), and have the capability and efficiency of dealing with various problems in real applications. In other words, the knowledge representation model and the inference method is an organic whole body. They together compose an intelligent system. Therefore, to construct an intelligent system must include a knowledge representation model and an inference method in accordance with this knowledge representation model.

According to the knowledge representation model and the inference method included in the intelligent system, the ordinary software engineers can develop the specific intelligent system software products by using various software development tools. By installing such a software product in a computer, this computer becomes a specific intelligent system device. As users, the domain engineers can input the data or information related to their problems to be solved by means of the functions provided by this device. In cope with the obtained information online, this device can perform the specific inference computation and provide the useful information to help solve the problems. If this intelligent system device including the knowledge of the specific application is installed as a component in the control system with closed loop, the intelligent automatic control can be realized.

The engineers in different domains may input different knowledge/information by means of the same functions provided by the same intelligent system device and use it in different domains. Therefore, the intelligent system can usually be used in many areas and have great commercial values.

Uncertain causality information is a particularly important type of information of various types of knowledge information to be dealt with by intelligent systems. This makes the research and development of the intelligent systems dealing with the uncertain causality information be an important development direction of the intelligent system technology, because such intelligent systems can be widely applied in the fault diagnosis of industrial systems, the prediction of disasters, the analyses of economy or finance, the risk prediction, the detection, the decision consultation, etc. So far, a lot of resources have been invested in this area by many countries in the world. For example, the relative program in the National Natural Science Foundation of China is named as "intelligent system and knowledge engineering".

The online fault diagnosis of nuclear power plants is one of the examples of applying such intelligent systems dealing with the uncertain causality information. The main parameters and the component states related to the plant operation are collected in the control room through the data collection system, and are displayed in various instrument meters. The task of the operators is to check these data periodically, judge whether or not they are normal; when abnormal case or alarm appears, diagnose the root cause and take measures in time, so as to remove or control the fault. Usually, however, the number of important parameters is in the scale of a few hundreds, the amount of data is huge, the situations are complex, and the burden of the operators in the control room is heavy. These factors cause the nervous moods of the operators, leading to the difficulty of correctly diagnosing the root cause of the abnormal state and of taking the correct measures in time. This may result in a big loss.

The Three Mile Island accident of the US in 1979 is such a typical example. This accident is caused by an ordinary component failure. But the operators made an incorrect judgment to the abnormal signals and took an incorrect measure. Not only the fault was not removed or controlled, but the fault was enlarged, resulting in a serious accident, while the root cause is just a small failure. The core of the reactor was burned. The whole nuclear power plant was ruined down.

The astounding Chernobyl nuclear power plant accident happened during the post Soviet Union is also caused by the incorrect judgment of operators and incorrect measures. It causes a lot of death, wounded persons and a big loss of property. So far, the serious result has not disappeared yet.

The prediction to the flood is also an important engineering and technical problem related to intelligent systems. This problem usually deals with the comprehensive analysis and prediction to the possibility of the dangerous down river water level in the following days, the judgment to the degree of danger, and then providing the gist for decisions such as remove people, reinforce the bank, or even bomb the bank somewhere for flood discharge, etc., so as to reduce the loss of flood. It is a realistic technical scheme to apply the intelligent system to solve this problem, based on which the uncertain inference prediction can be made according to the uncertain parameters such as the water levels at different places of the valley, the weather forecast, etc., and the uncertain causalities among them.

The traditional method to deal with the causality information is the rule-based expert system. This methodology takes the rules in the type of IF-THEN to represent the causalities among the real things. For example, the Chinese patent (ZL90103328.6) named as "computer aided decision method" by TIC of the US is such a rule-based expert system. The rule-based expert systems are good in the cases without uncertainty. Its technical scheme involves mainly how to represent and organize the rules and facts, as well as how to invoke, match and eliminate these rules and facts in the inference. When uncertainties exist, the technologies dealing with uncertainties have to be applied.

The uncertainty (including dynamical cases) is currently the important research area in this field. This is because the uncertainty exists universally and is the most difficult technical problem. For this, the international academic community establishes the association of uncertainty in artificial intelligence (AUAI) and holds international conferences every year. So far, such conferences have been held more than 20 times (www.auai.org).

The certainty factor method presented by Shortliffe, the evidence reasoning method presented by Dempster-Shafer, the fuzzy logic method presented by Zahdy, etc., take the non-probabilistic parameters to measure the uncertainty. Although they have unique features, their applications are limited due to the limitations of the non-probabilistic parameters themselves and other causes.

Of the intelligent systems dealing with uncertainty, the intelligent systems that take graphs instead of only languages in dealing with the uncertain causality information are more and more welcome by users. This is because the graphs are intuitive to be understood, convenient in representation, etc., in which the neural network (NN) was and is still one of such methods. For example, the recent granted Chinese invention patents No. 01139043.3 named as "the structure based method for the construction and optimization of NN", No. 03137640.1 named as "the NN based processing method for information pattern recognition" and No. 02139414.8 named as "the recognition method for the chaos signals and general noise", etc., are such methods. NN imitates brain's neural network, adjusts the network structure and parameters by learning from a large amount of data, so as to obtain and represent the knowledge. After this, the states of the things in concern can be inferred according to the observed information. However, due to the lack of the enough research to the neural network of brain and the limitations of NN such as the black or gray box representation model that does not correspondingly and clearly reflect the logics among the things in concern, and the lack of the data to learn from, its applications mainly focused on the pattern recognition and some other areas. There are less applications dealing with uncertain causality information.

The Bayesian/Bayes/Belief Network (BN) presented by Judea Pearl, al. has been so far another good method to deal with the uncertain causality problems. Its feature is to use the direct acyclic graph (DAG) to represent the causalities among the things and use the conditional probability table (CPT) to represent the degree of the causality uncertainty. Then, based an the observed evidence E, the forward, backward or bidirectional probabilistic inference can be made. FIG. 40 shows two examples of BN, in which FIG. 40-1 is singly connected and FIG. 40-2 is multiply connected. The directed arcs represent the causalities. The static logic cycles (e.g. FIG. 41) are prohibited in BN, because otherwise, there is no solution. In general, BN is graphically intuitive, has clear physical meaning, based on the probability theory strictly, easy to utilize the statistical data, localized in the computation steps, self-consistent as a whole theory framework, etc. But, although its every computation step is localized, the probability distributions of the nodes in concern can only be obtained by the computation of bidirectional information propagation throughout the whole network. This increases the computation amount significantly. Moreover, it is difficult for BN to deal with the static logic cycles, the dynamical change of data and logic structures, and the lack, imprecision and incompleteness of data, etc. In spite of this, BN is still applied widely.

Because of the success of BN, Judea Pearl won the excellent research award issued once per two years by IJCAI in 1999, as well as many other awards (http://bayes.cs.ucla.edu/). So far, BN has become one of the popular intelligent systems.

Based on the advantages of BN such as the graphical representation and strictly based on probability theory, etc., a method named as the single-valued Dynamical Causality Diagram (DCD) was developed in 1994. FIG. 42 is an example of the single-valued DCD. This single-valued DCD includes AND gate, OR gate and the logical cycle. But every variable can only has one state for which the causalities can be represented, and another state for which no causality can be represented. Otherwise, the case becomes multi-valued. The DCD solves, in the single-valued cases, the problems of logic cycles, dynamics, representing the causalities with linkage intensities instead of CPTs so that the statistic dada can be less relied on, etc. The single-valued DCD method involves the disjoint operation of logic expressions, which is an NP hard difficulty. That is to say, as the scale of cases becomes large, there will be the combination explosion in the disjoint operation.

In 2001, a further method (briefly called the multi-valued DCD) was developed, which transfers the multi-valued cases into the single-valued cases. This method treats all the abnormal states of a variable as a polymeric state besides a normal state whose causalities are not represented, so as to transfer the multi-valued cases as the single-valued cases for computation. After this, the probability of the polymeric state is allocated among the abnormal states according to some proportion. However, the theory of computing the proportion is not well founded. It does not really solve the conflict between the independence of representing knowledge and the correlation resulted from the exclusion among the different states of a variable in a multi-valued DCD. Furthermore, it requires that every variable has a special normal state for which no causality should be represented. Therefore, it is not sound and cannot be widely applied. Moreover, the free mixture and transformation from each other between the explicit representation of the multi-valued DCD and the implicit CPT representation of BN, the fuzzy evidence, the free mixture and unified treatment of the discrete and continuous variables, the complex logic combinations, the lack or incompleteness of data, the dynamics, etc., have not been solved yet.

SUMMARY OF THE INVENTION

To solve the problems existing in the present intelligent systems, this invention presents a new technical scheme. That is the method to construct the intelligent system named as the Dynamical Uncertain Causality Graph (DUCG). The intelligent system presented in this invention provides not only the new model to represent the uncertain causality knowledge or information (mainly see sections §1-10), but also the inference method based on this new representation model (mainly see sections §11-22). By applying this intelligent system, people can easily represent various causality information among the real things encountered in practice, which is complex, multi-valued, uncertain and dynamical. According to the online received various data or information, the dynamical intelligent analysis for prediction, diagnosis, or both can be made, so as to provide people with the valuable information for the fault diagnoses of industrial systems, disaster prediction, financial/economical analyses, risk assessment, detection, decision consultation, etc.

In what follows, the technical terminology used in this invention specification is explained.

In this invention, the so called causality means the logic relations between any causes and consequences/effects, or the relations that can be formally represented as the causal logic relations. For example, in the weather forecast, the converging of cool air and the warm air may result in rain. The converging of cool air and warm air is the cause. The rain is the consequence. For another example, the leakage of a steam pipe will result in the low pressure in this steam pipe. The leakage is the cause. The low pressure is the consequence. For further example, the increase of bank interest rate will restrain the product price. The increase of bank interest rate is the cause. The reduction of product price is the effect. All these are the causalities.

The so called multi-valued means that the thing in concern may have more than one effective discrete value (e.g. no rain, small rain and large rain) or continuous value (e.g. the temperature of a stove). It corresponds to the single-valued causality case in which only true (e.g. rain) or false (e.g. no rain) are the two states that one thing can be in, and only the true state is in concern. Therefore, only the logic relations among the true states are represented (single-valued). DUCG does not have this single-valued limitation. Except being specially specified, the DUCG in this document is always multi-valued.

The so called uncertain means that there is uncertainty in the logic relations among things. In the above example, whether or not is the converging of the cool air and the warm air the cause of the rain? If yes, whether or not does it rain? Is the rain the large rain or small rain? What is the large rain or small rain? What is cool or warm? All of these are uncertain. In this invention, these uncertainties are represented by the parameters such as the functional intensity, the state membership, the probability or belief of event occurrence, the relationship and the conditional probability, etc.

The so called dynamical means that the constructed logic relations and data can be dynamically changed according to the observed information including the occurrence order of events, the known states of some event variables, the start time of some process. The parameters can be the functions of time. The computation process can also reflect the dynamical change of things, by combining the dynamical information.

The so called inference means to reason the states of the things in concern by the intelligent system according to the above described relations among things, based on the observed and dynamically changed evidence E (i.e. to compute the probabilities of the events in concern, conditioned on the known evidence E). This computation can be either forward (prediction), or backward (diagnosis), or the mixture of both, e.g. to find the cause or consequence of the abnormal power plant state when the plant parameters or signals are partially abnormal and partially normal.

The so called domain engineers are those who are rich of the domain knowledge, familiar with the situations of the applications, and then can provide the professional knowledge or information required for this intelligent system to solve the problems in concern. These personal are also the direct users of this intelligent system.

The so called belief is one of the two type probabilities. One is frequency-based. For example, in 100 experiments, 30 show success. Then, the probability of success is 0.3. The other one is belief-based, which is based on the belief of domain engineers. This belief comes from the accumulation of the past statistic data and knowledge in the mind of the domain engineers. For the example of an experiment never being done, there is no data available. But the domain engineers may did similar experiments somewhere else, or the parts of this experiment. Then the domain engineers may judge the success probability of this experiment as 0.3, i.e. Belief=0.3, by their subjective synthesis and analogy.

To solve the problems mentioned above, this invention provides the technical scheme as follows:

§1. A method for constructing an intelligent system for processing the uncertain causality information. This method represents the causalities among the things in the explicit representation mode, which includes the following steps:

(1) Establish a representation system about the various cause variables $V_i$ and consequence variables $X_n$ in concern with the problem to be solved. The features of this representation system are the follows: ① Let V represent two type variables B and X, i.e. V∈{B,X}, in which B is the basic variable that is only the cause variable and X is the consequence variable that can be also the cause variable of the other consequence variable; ② No matter the states of the variable are discrete or not, represent them all as the discrete or fuzzy discrete states, so as to be dealt with by using the same manner, that is, represent the different states of $V_i$ and $X_n$ as $V_{ij}$ and $X_{nk}$ respectively, where i and n index variables while j and k index the discrete or fuzzy discrete states of the variables; ③ When $V_i$ or $X_n$ is continuous, the membership of an arbitrary value $e_i$ of $V_i$ or $e_n$ of $X_n$, belonging to $V_{ij}$ or $X_{nk}$ respectively, is $m_{ij}(e_i)$ or $m_{nk}(e_n)$ respectively, and they satisfy $$\sum_j m_{ij}(e_i) = 1 \text{ and } \sum_j m_{ij}(e_i) = 1;$$

④ $V_{ij}$ and $X_{nk}$ are treated as events, i.e., $V_{ij}$ represents the event that $V_i$ is in its state j and $X_{nk}$ represents the event that $X_n$ is in its state k; meanwhile, if j≠j' and k≠k', $V_{ij}$ is exclusive with $V_{ij'}$ and $X_{nk}$ is exclusive with $X_{nk'}$; ⑤ If i≠i', $B_{ij}$ and $B_{ij'}$ are independent events, and their occurrence probabilities $b_{ij}$ are known and satisfy $$\sum_j b_{ij} \le 1;$$

(2) For the consequence variable $X_n$, determine its direct cause variables $V_i$, i∈$S_{EXn}$, $S_{EXn}$ is the index set of the {B,X} type direct variables of $X_n$ in the explicit representation mode;

(3) The functional variable $F_{n;i}$ is used to represent the causality between $V_i$, i∈$S_{EXn}$, and $X_n$. $V_i$ is the input or cause variable of $F_{n;i}$ and $X_n$ is the output or consequence variable of $F_{n;i}$, the features of $F_{n;i}$ are follows: ① The causality uncertainty between $V_i$ and $X_n$ is represented by the occurrence probability $f_{nk;ij}$ of the specific value $F_{nk;ij}$ of $F_{n;i}$. $F_{nk;ij}$ is a random event representing the uncertain functional mechanism of $V_{ij}$ causing $X_{nk}$. $f_{nk;ij}$ is the probability contribution of $V_{ij}$ to $X_{nk}$; ② $f_{nk;ij}=(r_{n;i}/r_n)a_{nk;ij}$, where $r_{n;i}$ is called the relationship between $V_i$ and $X_n$, $r_n$ is the normalization factor and $$r_n = \sum_i r_{n;i},$$

$a_{nk;ij}$ is the probability of the event that $V_{ij}$ causes $X_{nk}$ regardless of any other cause variables and $a_{nk;ij}$ and $r_{n;i}$ can be the function of time. ③ $a_{nk;ij}$ satisfies $$\sum_k a_{nk;ij} \leq 1; \textcircled{4} Pr\{X_{nk}\} = \sum_{ij} f_{nk;ij} Pr\{V_{ij}\}.$$

§2. The functional variable $F_{n;i}$ described in §1 can be the conditional functional variable, and the conditional functional variable is used to represent the functional relation between the cause variable $V_i$ and the consequence variable $X_n$ conditioned on $C_{n;i}$, where the condition $C_{n;i}$ has the following features:

(1) $C_{n;i}$ has only two states: true or false, and its state can be found according to the observed information or the computation results;

(2) When $C_{n;i}$ is true, the conditional functional variable becomes the functional variable;

(3) When $C_{n;i}$ is false, the conditional functional variable is eliminated.

§3. The explicit representation mode in §1 includes also to extend $V \in \{B,X\}$ to $V \in \{B,X,G\}$, where G is the logic gate variable, i.e. the cause variable to influence the consequence variable by the state logic combinations of a group of cause variables; suppose the input variables of logic gate variable $G_i$ are $V_h$, then the logic gate $G_i$ is constructed as follows:

(1) The logic combinations between the input variables $V_h$, $V \in \{B,X,G\}$, are represented by the truth value table of $G_i$ in which each input row is a logic expression composed of the input variable states and corresponds to a unique state of $G_i$; different rows of the logic expressions are exclusive with each other, wherein if a logic expression is true, the corresponding state of $G_i$ is true;

(2) The set of the states of $G_i$ is equal to or less than the set of all state combinations of the input variables;

(3) When the set of the states of $G_i$ is less than the set of all state combinations of the input variables, there is a remnant state of $G_i$, which corresponds uniquely to the remnant state combinations of the input variables, so that all the states of $G_i$ including the remnant state are exclusive with each other and just cover all the state combinations of the input variables;

(4) When $G_i$ is the direct cause variable of $X_n$, $G_i$ functions to $X_n$ through the functional or conditional functional variable $F_{n;i}$;

(5) If a logic gate has only one input variable, this logic gate can be ignored, i.e. the input variable of the logic gate can be taken as the input variable of the functional variable or conditional functional variable $F_{n;i}$ with this logic gate as its input variable;

(6) When $G_i$ is the direct cause variable of $X_n$, the relationship between $G_i$ and $X_n$ is $r_{n;i}$; when calculating $f_{nk;ij}$, the calculation to $r_n$ includes the relationship between $G_i$ and $X_n$; when calculating $Pr\{X_{nk}\}$, the $f_{nk;ij}$ between $G_i$ and $X_n$ is included.

§4. The explicit mode in §1 or §3 includes also the following contents:

(1) Extend $V \in \{B,X\}$ as $V \in \{B,X,D\}$, or extend $V \in \{B,X,G\}$ as $V \in \{B,X,G,D\}$, in which D is the default event or variable, $D_n$ can appear only with $X_n$ and is an independent cause variable that has only one inevitable state;

(2) $D_n$ becomes a direct cause variable of $X_n$ through $F_{n;D}$, where $F_{n;D}$ is the functional variable between $D_n$ and $X_n$;

(3) The causality uncertainty between $D_n$ and $X_n$ is represented by the occurrence probability $f_{nk;D}$ of the specific value $F_{nk;D}$ of $F_{n;D}$, where $F_{nk;D}$ is a random event representing the functional mechanism of $D_n$ to $X_n$, and $f_{nk;D}$ is the probability contribution of $D_n$ to $X_{nk}$;

(4) $f_{nk;D} = (r_{n;D}/r_n)a_{nk;D}$, where $a_{nk;D}$ is the probability of the event that $D_n$ causes $X_n$ regardless of the other cause variables of $X_n$, and satisfies $$\sum_k a_{nk;D} \leq 1,$$

$r_{n;D}$ is the relationship between $D_n$ and $X_n$. After adding $D_n$, $$r_n = \sum_i r_{n;i} + r_{n;D} \cdot a_{nk;D}$$

and $r_{n;D}$ can be the function of time;

(5) The original $$Pr\{X_{nk}\} = \sum_{ij} f_{nk;ij} Pr\{V_{ij}\}$$

is replaced as $$Pr\{X_{nk}\} = \sum_{i,j} f_{nk;ij} Pr\{V_{ij}\} + f_{nk;D}.$$

§5. The explicit representation mode in §4 includes also the following contents: When the default variable of $X_n$ is more than one, they can be combined as one default variable $D_n$. Let g be the index distinguishing two or more default variables. Corresponding to the case of only one default variable, the variable $D_n$ and the parameter $r_{n;D}$, $a_{nk;D}$ are represented as $D_{ng}$, $r_{n;Dg}$, $a_{nk;Dg}$ respectively; after combining $D_{ng}$ as $D_n$, the parameters of $D_n$ are calculated according to $$r_{n;D} = \sum_g r_{n;Dg} \text{ and } a_{nk;D} = \sum_g a_{nk;Dg}.$$

§6. A method for constructing the intelligent system for processing the uncertain causality information. This method uses the implicit mode to represent the uncertain causalities among things, which includes the following steps:

(1) Establish a representation system about the various cause variables and the consequence variables in concern with the problem to be solved according to the method described in §1 (1);

(2) For the consequence variable $X_n$, determine its direct cause variables $V_i$, $i \in S_{IXn}$. $S_{IXn}$ is the index set of the direct cause variables of $X_n$ in the implicit representation mode;

(3) The conditional probability table (CPT) is used to represent the causality between the consequence variable $X_n$ and its direct cause variables $V_i$, $i \in S_{IXn}$, the features include: ① When no cause variable will be eliminated, CPT is composed of only the conditional probabilities $p_{nk;ij}$, where $p_{nk;ij} = Pr\{X_{nk}|j\}$ and j indexes the state combination of the cause variables $V_i$, $i \in S_{IXn}$; ② When part or even all cause variables may be eliminated, CPT is composed of three parameters: $p_{nk;ij}$, $q_{nk;ij}$ and $d_{n;j}$, satisfying $p_{nk;ij} = q_{nk;ij}/d_{n;j}$, so that CPT can be reconstructed when some of its cause variables are eliminated, where $q_{nk;ij}$ and $d_{n;j}$ are the sample number and occurrence number of $X_{nk}$ respectively, conditioned on the state combination indexed by j of the cause variables.

§7. The implicit representation mode in §6 includes also the following contents:

(1) In the implicit representation mode, the cause variables $V_i$, $i \in S_{IXn}$, can be separated as several groups, every group uses the implicit representation mode to represent the uncertain causality to $X_n$ according to §6;

(2) Give the relationship $r_{Xn}$ between every group of direct cause variables to the consequence variable $X_n$;

(3) If some cause variables in the group are eliminated for any reason, the CPT of this group can be reconstructed as follows: Suppose the variable to be eliminated is $V_i$, before the elimination, there are several subgroups of the state combinations of the input variables indexed by j'; in subgroup j', the states of all the variables are same except the states of $V_i$; denote the index set of the state combination j in subgroup j' as $S_{ij'}$. Then $$q_{nk;j'} = \sum_{j \in Sij'} q_{nk;j}, \; d_{nj'} = \sum_{j \in Sij'} d_{nj}, \; p_{nk;j'} = q_{nk;j'}/d_{n;j'}$$

In which j' is the new index of the remnant state combinations after the elimination of $V_i$;

(4) Repeat (3) to deal with the case in which more than one cause variable is eliminated.

§8. A method for constructing the intelligent system for processing the uncertain causality information. This method uses the hybrid representation mode to represent the uncertain causality among things, which includes the following steps:

(1) Establish the representation system about the various cause variables $V_i$ and the consequence variables $X_n$ in concern with the problem to be solved according to the method in §1 (1).

(2) For consequence variable $X_n$, determine its direct cause variables $V_i$, $i \in S_{EXn}$, $V \in \{B,X,D,G\}$, and the direct cause variables $V_{i'}$, $i' \in S_{IXn}$, $V \in \{B,X\}$, $S_{IXn}$ may have many, i.e. there may be more than one group of direct cause variables in the implicit representation mode;

(3) Represent the causalities between the cause variables included in $S_{EXn}$ and $X_n$ according to the explicit representation mode, and represent the causalities between the cause variables included in $S_{IXng}$ and $X_n$ according to the implicit representation mode;

(4) For a group of cause variables $V_{i'}$, $i' \in S_{IXn}$, in the implicit representation mode, give the corresponding relationship $r_{Xn}$, while in the explicit representation mode, $r_n$ is renewed as $r_n = r_n + r_{Xn}$, in which the right side $r_n$ is before the renewing;

(5) If the implicit representation mode has more than one group, they can be indexed by g and every group relationship can be denoted as $r_{Xng}$; then the calculation equation in above (4) becomes $$r_n = r_n + \sum_h r_{Xng}.$$

§9. A method for constructing the intelligent system for processing the uncertain causality information. It takes the following steps to synthetically represent the uncertain causality among the things in concern with the problem to be solved:

(1) Establish the representation system about the various cause variables $V_i$ and consequence variables $X_n$ in concern with the problem to be solved according to the method described in §1 (1);

(2) According to the specific cases of every consequence variable $X_n$, represent the uncertain causalities between $X_n$ and its direct cause variables in either explicit mode, implicit mode or hybrid mode respectively; the representations above for all the consequence variables compose the original DUCG;

(3) The evidence E in concern with the original DUCG is received during the online application and is expressed as $$E = E^* \prod_h E_h,$$

where $E_h$ is the evidence indicating the state of the $\{B,X\}$ type variable, $E^*$ represents the other evidence; if $E_h$ is a fuzzy state evidence, i.e. the state of the variable $V_h$ in the original DUCG is known in a state probability distribution, or if $E_h$ is a fuzzy continuous evidence, i.e. the specific value $e_h$ of the continuous variable $V_h$ is known in the fuzzy area of different fuzzy states of $V_h$, $V \in \{B,X\}$, then add $E_h$ as a virtual evidence variable into the original DUCG and represent the causality between $V_h$ and $E_h$ according to the explicit mode so that $E_h$ becomes the consequence variable of the cause variable $V_h$; after finishing these steps, the original DUCG becomes the E conditional original DUCG.

§10. In step (3) of the method described in §9, the step of adding $E_h$ as a virtual evidence variable into the original DUCG and representing the causality between $V_h$ and $E_h$ according to the explicit mode so that $E_h$ becomes the consequence variable of the cause variable $V_h$ includes the following features: Suppose $m_{hj} = m_{hj}(e_h)$ is the membership of $E_h$ belonging to the fuzzy state j, or $m_{hj}$ is the probability of $X_{hj}$ indicated by the fuzzy state evidence $E_h$, i.e., $m_{hj} = \Pr\{V_{hj}|E_h\}$, $j \in S_{Eh}$, $S_{Eh}$ is the index set of state j in which $m_{hj} \neq 0$ and includes at least two different indexes, while satisfying $$\sum_{j \in S_{Eh}} m_{hj} = 1;$$

(1) As the virtual consequence variable of $V_h$, $E_h$ has only one inevitable state, has only one direct cause variable $V_h$, and is not the cause variable of any other variable;

(2) The virtual functional variable from $V_{hj}$ to $E_h$ is $F_{E;h}$ and its specific value $F_{E;hj}$ is the virtual random event that $V_{hj}$ causes $E_h$; the functional intensity parameter $f_{E;hj}$ of $F_{E;hj}$ may be given by domain engineers;

(3) If the domain engineers cannot give $f_{E;hj}$, it can be calculated from $$f_{E;hj} = \frac{m_{hj}v_{hk}}{m_{hk}v_{hj}} f_{E;hk},$$

where $j \neq k$, $j \in S_{Eh}$, $k \in S_{Eh}$, $v_{hj} = \Pr\{V_{hj}\}$, $v_{hk} = \Pr\{V_{hk}\}$. Given $f_{E;hk} > 0$, $f_{E;hj}$ can be calculated.

§11. Based on the E conditional original DUCG described in §9, the following steps are taken to perform the inference, so as to provide the effective gist for solving the problems in concern:

(1) According to E, simplify the E conditional original DUCG to get the simplified DCUG;

(2) Transform the simplified DUCG to EDUCG or IDUCG, where if there is any logic cycle, transfer to only EDUCG;

(3) If transform to IDUCG, the BN method can be used to calculate the state probability distribution of the variables in concern conditioned on E;

(4) If transform to EDUCG, outspread the evidence events $E_h$ included in E, which determine the states of the {B,X} type variables, and the events $H_{kj}$ in concern. In the process of outspread, break the logic cycles;

(5) In the case of transforming to EDUCG, based on the outspreaded logic expressions of $E_h$ and $H_{kj}$, further outspread $$\prod_h E_h \text{ and } H_{kj} \prod_h E_h;$$

(6) In the case of transforming to EDUCG, calculate the state probability and the rank probability of the concerned event $H_{kj}$ conditioned on E according to the following equations:

The state probability:

$$h_{kj}^s = \frac{P_r\{H_{kj}E\}}{Pr\{E\}}.$$

The rank probability:

$$h_{kj}^r = \frac{h_{kj}^s}{\sum_{H_{kj} \in S} h_{kj}^s} = \frac{P_r\{H_{kj}E\}}{\sum_{H_{kj} \in S} Pr\{H_{kj}E\}}$$

Where S is the set of all the events in concern.

§12. In the inference computation steps described in §11, if the problem to be dealt with is about the process system, the following steps can be further applied in (5) and (6) in §11:

(1) Express the evidence set $$\prod_h E_h$$

indicating the states of the {B,X} type variables as E'E", in which $$E' = \prod_i E_i'$$

is the evidence set composed of the evidence events indicating the abnormal states of variables, and $$E'' = \prod_{i'} E_{i'}''$$

is the evidence set composed of the evidence events indicating the normal states of variables;

(2) Outspread $$E' = \prod_i E_i'$$

and determine the possible solution set S conditioned on E, where every possible solution $H_{kj}$ is an event in concern for the problem to be solved;

(3) Calculate two types of the state probability and rank probability of $H_{kj}$ conditioned on E:

The state probability with incomplete information:

$$h_{kj}^s = \frac{P_r\{H_{kj}E'\}}{Pr\{E'\}};$$

The state probability with complete information:

$$h_{kj}^s = h_{kj}^{s'} \frac{Pr\{E'' | H_{kj}E'\}}{Pr\{E'' | E'\}} = \frac{h_{kj}^{s'} Pr\{E'' | H_{kj}E'\}}{\sum_j h_{kj}^{s'} Pr\{E'' | H_{kj}E'\}};$$

The rank probability with incomplete information:

$$h_{kj}^r = \frac{h_{kj}^{s'}}{\sum_{H_{kj} \in S} h_{kj}^{s'}} = \frac{Pr\{H_{kj}E'\}}{\sum_{H_{kj} \in S} Pr\{H_{kj}E'\}};$$

The rank probability with complete information:

$$h_{kj}^r = \frac{h_{kj}^s}{\sum_{H_{kj} \in S} h_{kj}^s} = \frac{h_{kj}^{s'} Pr\{E'' | H_{kj}E'\}}{\sum_j h_{kj}^{s'} Pr\{E'' | H_{kj}E'\}}.$$

In which, if $H_{kj}E'$ is null, $Pr\{E''|H_{kj}E'\} \equiv 0$.

§13. In the inference computation method described in step (1) of §11, the step to simplify the E conditional original DUCG includes the following contents: suppose $V_i$ is the direct cause variable of $X_n$, V∈{B,X,G,D}, then (1) According to E, determine whether or not the condition $C_{n;i}$ of the conditional functional variable $F_{n;i}$ is valid: ① if yes, change the conditional functional variable as the functional variable; ② if not, eliminate this conditional functional variable; ③ If cannot determine whether or not $C_{n;i}$ is valid, keep the conditional functional variable until $C_{n;i}$ can be determined;

(2) According to E, if $V_{ih}$ is not the cause of any state of $X_n$, when E shows that $V_{ih}$ is true, eliminate the functional or conditional functional variable $F_{n;i}$ that is from $V_i$ to $X_n$;

(3) According to E, if $X_{nk}$ cannot be caused by any state of $V_i$, when E shows that $X_{nk}$ is true, eliminate the functional or conditional functional variable from $V_i$ to $X_n$;

(4) In the explicit mode of representation, if the X or G type variable without any cause or input appears, eliminate this variable along with the F type variables starting from this variable;

(5) If there is any group of isolated variables without any logic connection to the variables related to E, eliminate this group variables;

(6) If E shows that $X_{nk}$ is true, while $X_{nk}$ is not the cause of any other variable and $X_n$ has no connection with the other variables related to E, denote the index set of the index n of such $X_n$ as $S_{Enk}$; When $V_i$ and its logic connection variables $F_{n;i}$ have no logic connection with the variables related to E except the variables indexed in $S_{Enk}$, eliminate $X_n$, $V_i$ and the functional or conditional functional variables $F_{n;i}$ along with all other variables logically connected with $V_i$;

(7) If E shows that $X_{nk}$ appears earlier than $V_{ij}$, so that for sure $V_{ij}$ is not the cause of $X_{nk}$, eliminate the functional or conditional functional variables that are in the causality chains from $V_i$ to $X_n$ but are not related to the influence of other variables to $X_n$;

(8) Upon demand, the above steps can be in any order and can be repeated.

§14. In step (2) of the inference method described in §11, the step to transform the DUCG with implicit or hybrid representation mode conditioned on E as all in the explicit mode, i.e. EDUCG, includes the following steps:

(1) For the consequence variable $X_n$ in the implicit or hybrid mode, for every group of $S_{IXn}$ type cause variables, introduce a default variable $D_n$ and a default functional variable $F_{n;D}$. $D_n$ becomes the cause variable of $X_n$ by $F_{n;D}$;

(2) The calculation method for the parameters of $F_{n;D}$ is: for every k, find the smallest $p_{nk;j}$ in the CPT composed of the variables whose subscripts belong to $S_{IXn}$; the smallest $p_{nk;j}$ is denoted as $p_{nk}$, i.e.

$$p_{nk} = \min_j \{p_{nk;j}\}; \text{ if } \sum_k p_{nk} = 0,$$

$D_n$ and $F_{n;D}$ are not existing; if $$\sum_k p_{nk} \neq 0,$$

calculate $$a_{nk;D} = p_{nk} \bigg/ \sum_k p_{nk}$$

and the relationship of $F_{n;D}$:

$$r_{n;D} = r_{Xn} \sum_k p_{nk};$$

(3) Introduce a virtual logic gate variable $G_i$, in which the cause variables of $S_{IXn}$ are the input variables of $G_i$, and the number of the states of $G_i$ and the input rows of the truth value table of $G_i$ equal to the number of the state combinations of the cause variables in $S_{IXn}$, while each of the state combination of the input variables is an input row of the truth value table of $G_i$ and also a state of the virtual logic gate;

(4) Introduce the virtual functional variable $F_{n;i}$, in which $G_i$ is the input variable and $X_n$ is the output variable, so that $G_i$ becomes the direct cause variable of $X_n$;

(5) In the CPT of the cause variables in $S_{IXn}$, if $$1 - \sum_k p_{nk} \neq 0,$$

there is $$p_{nk;j} = (p_{nk;j} - p_{nk}) \bigg/ \left(1 - \sum_k p_{nk}\right),$$

in which the $p_{nk;j}$ on the right side are the values before the calculation and that on the left side are the values after the calculation. $d_{n;j}$ can remains and $q_{nk;j} = p_{nk} d_{n;j}$, $a_{nk;ij} = p_{nk;j}$, where the $p_{nk;j}$ in the two equations are all values after the calculation; the relationship of $F_{n;i}$ is $$r_{n;i} = r_{Xn} \left(1 - \sum_k p_{nk}\right);$$

(6) In the original CPT of the cause variables in $S_{IXn}$, if $$1 - \sum_k p_{nk} = 0,$$

the variables in $S_{IXn}$ are fused as $D_n$, $a_{nk;D} = p_{nk}$ and $r_{n;D} = r_{Xn}$; there is no need to introduce the virtual logic gate $G_i$ and its functional variable;

(7) When there is only one input variable in $G_i$, such $G_i$ can be ignored, i.e. the virtual functional variable takes the input variable of $G_i$ as its input variable directly;

(8) When the groups of the $S_{IXn}$ type variables are more than one group, repeat the above steps for every groups, and then combine the default variables resulted according to the method described in §5.

§15. In step (2) of §11, the following steps are involved to transform the DUCG conditioned on E in the explicit representation mode or in the more than one group implicit representation mode as the IDUCG in which all representations are in the implicit representation mode with only one group direct cause variables:

(1) If $C_{n;i}$ is valid, change the conditional functional variable as the functional variable; if $C_{n;i}$ is invalid, eliminate the conditional functional variable;

(2) For any representation of the uncertain causality between the consequence variable $X_n$ and its direct cause variables, if it is in the hybrid or more than one group implicit representation mode, transform the representation mode for $X_n$ to the explicit mode according to the method described in §14;

(3) After the above steps, take the state combinations of the $\{B,X\}$ type cause variables of the consequence variable $X_n$ as the conditions indexed by j, calculate the conditional probability of $X_{nk}$ $\Pr\{X_{nk}|j\}$ according to the explicit mode, where the connections between the $\{B,X\}$ type cause variables and $X_n$ may be or may not be through logic gates; in the calculation, all contributions from different types of direct cause variables should be considered, i.e. when the direct cause variables are $\{X,B,G\}$ types, $$Pr\{X_{nk} \mid j\} = \sum_i f_{nk;ih};$$

when the direct cause variables are {X,B,G,D} types, $$Pr\{X_{nk} \mid j\} = \sum_i f_{nk;ih} + f_{nk;D};$$

(4) The case of $a_{nk;ih}=1$ can be understood as that $X_{nk}$ is true for sure, i.e. when the input variable i is in its state h, all the states, except k, of $X_n$ cannot be true; if this applies, when $a_{nk;ih}=1$, $Pr\{X_{nk}\mid j\}=1$, meanwhile $Pr\{X_{nk'}\mid j\}=0$, where $k\neq k'$;

(5) If $a_{nk;ih}=1$, $k\in S_m$, $S_m$ is the index set of such states of $X_n$ that $a_{nk;ih}=1$ and the number of such states is m, then $Pr\{X_{nk}\mid j\}=1/m$ and $Pr\{X_{nk'}\mid j\}=0$, where $k'\notin S_m$;

(6) If such calculated $$\sum_k Pr\{X_{nk} \mid j\} < 1, \text{ let } Pr\{X_{n\eta} \mid j\} = 1 - \sum_{k\neq\eta} Pr\{X_{nk} \mid j\},$$

where η indexes the default state of $X_n$;

(7) If there is no default state η in (6), follow the normalization method below:

$$Pr\{X_{nk} \mid j\} = Pr\{X_{nk} \mid j\} / \sum_k Pr\{X_{nk} \mid j\},$$

where the $Pr\{X_{nk}\mid j\}$ on the right side are the values before the normalization;

(8) After satisfying the normalization, $Pr\{X_{nk}\mid j\}$ becomes the conditional probability $p_{nk;nj}$ in the standard implicit representation mode;

(9) Connect the {X,B} type direct cause variables of $X_n$ through or not through logic gates with $X_n$ according to the implicit representation mode, the DUCG conditioned on E is transformed as the IDUCG.

§16. According to the inference method described in §11 or §12, in order to outspread E, E', $H_{kj}E$ or $H_{kj}E'$, such method is involved that outspreads the evidence $E_h$ indicating the states of the {B,X} type variables and the X type variables included in $H_{kj}$, and breaks the logic cycles during the outspread, which has the following features:

(1) When $E_h$ indicates that $X_n$ is in its state k, then $E_h=X_{nk}$; if $E_h$ is the virtual consequence variable of $X_n$, $$E_h = \sum_k F_{E;nk} X_{nk};$$

when $E_h$ indicates that $B_i$ is in its state j, then $E_h=B_{ij}$. If $E_h$ is the virtual consequence variable of $B_i$, $$E_h = \sum_j F_{E;ij} B_{ij};$$

(2) Outspread $X_{nk}$ according to $$X_{nk} = \sum_i F_{nk;i} V_i,$$

where $V_i$ are the direct cause variables of $X_n$, $i\in S_{EXn}$, $V\in\{X, B,G,D\}$;

(3) When $V_i$ is a logic gate, the input variables of $V_i$ are outspreaded according to the truth value table of this logic gate; if the input variables are logic gates again, outspread these input variables in the same way;

(4) Consider every non-F type variable in the logic expression outspreaded from (2) and (3): ① If it is such an X type variable that has not appeared in the causality chain, repeat the logic outspread process described in (2) and (3); ② If it is a {B,D} type variable or such an X type variable that has appeared in the causality chain, no further outspread is needed;

(5) In (4) ② above, the X type variable that has appeared in the causality chain is called the repeated variable; in the dynamical case, the repeated variable is the same variable but is in the earlier moment; the probability distribution of this variable is known according to the computation or the observed evidence in the earlier moment; in the static case, the repeated variable as cause is treated as null, i.e. ① if the repeated variable as cause is connected to the consequence variable by only an F type variable without any logic gate, this F type variable is eliminated, meanwhile the relationship corresponding to this F type variable is eliminated from $r_n$; ② if the repeated variable as cause is connected with the consequence variable by being an input variable of a logic gate in which the repeated variable is logically combined with other input variables, this repeated variable is eliminated from the input variables of the logic gate.

§17. In step (5) ② in §16, the following steps to eliminate an input variable of a logic gate is involved; suppose the variable to be eliminated from the logic gate is $V_i$, then, (1) When the logic gate is a virtual logic gate, eliminate the direct cause variable $V_i$ in the corresponding implicit mode first, reconstruct the conditional probability table according to the method described in §7 (3), and then transform the new implicit mode case to a new virtual logic gate and a new virtual functional variable according to the method described in §14; correspondingly, some new default variable, the virtual functional variable from the new logic gate and the default functional variable of the new default event may be introduced;

(2) When the logic gate is not a virtual logic gate, make the logic gate as the most simplified logic gate first; based on the most simplified logic gate, calculate the logic expression in every input row in the truth value table by treating any state of $V_i$ as null, eliminate the input row along with the corresponding logic gate state when this row is calculated as null; the functional or conditional functional events with this logic gate state as their input events are also eliminated;

(3) If all the input variables of a non-virtual logic gate are eliminated, or all the input rows of the truth value table are eliminated, this logic gate becomes null;

(4) Repeat the above steps to treat the case when more than one input variables are eliminated.

§18. In §16, for outspreading E, $E'H_{kj}E$ or $H_{kj}E'$, the following steps are involved.

(1) According to the steps to simplify DUCG, which is described in §13, and the method to outspread the X type variables and breaking logic cycles, which is described in §16, the input variables and the truth value table of the logic gate in EDUCG may change; after the change, make the expression in the truth value table of the logic gate as the exclusive expression; then, the logic gate is outspread according to the exclusive expressions of the input rows in the truth value table;

(2) In the logic AND operation of the same logic gate but with different input variables in different cases, along with the logic AND operation of the F type variables with such logic gate as input, let $G_i^k$ denote the $k^{th}$ case of variable elimination of the logic gate $G_i$, $S_i^k$ denote the index set of the input variables of $G_i^k$, $F_{n;i}^k$ denote the functional variable from $G_i^k$ to $X_n$, where if $k=0$, $G_i^k=G_i$, $F_{n;i}^k=F_{n;i}$ and $S_i^k=S_i^0$. $S_i^0$ is the index set including all input variables of $G_i$; thus, ① $G_i^k G_i^{k'}=G_i^h$, $F_{n;i}^k F_{n;i}^{k'}=F_{n;i}^h$, in which $S_i^h=S_i^k S_i^{k'}$, $S_i^h$ is the index set including those variables that are not only the input variables of $G_i^k$, but also the input variables of $G_i^{k'}$; ② when $S_i^h=S_i^0$, $G_i^h=G_i$; when $S_i^h \neq S_i^0$, the truth value table of $G_i^h$ is formed according to the change from $G_i$ to $G_i^h$; ③ when $S_i^h \neq S_i^0$, $F_{n;i}^h$ is the remnant part of the $F_{n;i}$ in which $F_{nk;ij}$ are eliminated, where $j \in S_{ih}$, $S_{ih}$ is the index set of the eliminated states of $G_i$ compared with $G_i^h$;

(3) The result of the AND operation of different initiating events is null "0";

(4) Given $j \neq j'$, $k \neq k'$, then $F_{nk;ij}F_{nk';ij}=0$, $F_{nk;ij}F_{nk;ij'}=0$, $F_{nk;ij}F_{nk';ij'}=0$ and $V_{ij}V_{i'j'}=0$, where $V \in \{B,X,G\}$;

(5) If the logical outspread to the default state $X_{n\eta}$ of $X_n$ is necessary, while the direct cause variables of $X_{n\eta}$ are not represented, outspread $X_{n\eta}$ according to $$X_{n\eta} = \prod_{k \neq \eta} \overline{X}_{nk};$$

(6) If $X_{nk}$, $k \neq \eta$, does not have input or the input is null, $X_{nk}=0$;

(7) When the condition $C_{n;i}$ of the conditional functional variable $F_{n;i}$ becomes invalid during the outspread, $F_{n;i}$ is eliminated.

§19. In §12 (2), to find the possible solution set S, the following steps are involved.

(1) Outspread $$E' = \prod_i E_i'$$

according to the steps described in §16, §17 and §18, so as to obtain the sum-of-product type logic expression composed of only the {B,D,F} type events, where "product" indicates the logic AND, "sum" indicates the logic OR, and a group of events ANDed together is an "item";

(2) After Eliminating the {F;D} type events and other inevitable events in all items, further simplify the outspreaded expression by logically absorbing or combining the physically same items;

(3) After finishing the above steps, every item in the final outspreaded expression is composed of only the B type events and every item is a possible solution event; all these items compose the possible solution set S conditioned on E, in which the item with same B type variables is denoted as $H_k$, and the item with same B type variables but in different states is denoted as $H_{kj}$. $H_{kj}$ is a possible solution.

§20. The method described in §11 can be extended to the dynamical case involving more than one time point, that is, transform the case that the process system dynamically changes according to time as the static cases at sequential discrete time points, and perform the computation for each time point; then, combine all the static computation results at different time points together so as to correspond the dynamical change of the process system, including the following steps.

(1) Classify the time as discrete time points $t_1, t_2, \ldots, t_n$; for each time point $t_i$, collect the static evidence $E(t_i)$ at that time point; find all the possible solutions $H_{kj}$ conditioned on $E(t_i)$, these possible solutions compose the static possible solution set $S(t_i)$ at time $t_i$; more specifically, treat $E(t_i)$ as E, ① Construct the $E(t_i)$ conditional original DUCG according to the methods described in §9 (3) and §10; ② Simplify the $E(t_i)$ conditional original DUCG according to the method described in §13; ③ transform the simplified DUCG as EDUCG according to the methods described in §14; ④ Outspread $$E(t_i) = \prod_k E_k(t_i)$$

according to the method described in §16-19, then obtain the possible solution set $S_i$ at time $t_i$;

(2) Calculate $$S(t_n) = \prod_{i=1}^n S_i,$$

$S(t_n)$ is called the dynamical possible solution at time $t_n$.

(3) Eliminate the other possible solutions included in EDUCG but not included in $S(t_n)$, further simplify the EDUCG according to the method described in §13;

(4) Based on the above simplified EDUCG, according to the method described in §12, calculate the static state probabilities with incomplete and complete information $h_{kj}^{s'}(t_i)$ and $h_{kj}^s(t_i)$ respectively, the static rank probabilities with incomplete and complete information $h_{kj}^{r'}(t_i)$ and $h_{kj}^r(t_i)$ respectively, of $H_{kj}$ in $S(t_n)$, as well as the unconditional probability $h_{kj}(t_0)=Pr\{H_{kj}\}$;

(5) Calculate the dynamical state and rank probabilities with incomplete and complete information of $H_{kj}$ included in $S(t_n)$ as follows: ① The dynamical state probabilities with incomplete and complete information:

$$h_{kj}^{s'}(t) = \frac{\prod_{i=1}^n h_{kj}^{s'}(t_i)/(h_{kj}(t_0))^{n-1}}{\sum_j \prod_{i=1}^n h_{kj}^{s'}(t_i)/(h_{kj}(t_0))^{n-1}}$$

$$h_{kj}^s(t) = \frac{\prod_{i=1}^n h_{kj}^s(t_i)/(h_{kj}(t_0))^{n-1}}{\sum_j \prod_{i=1}^n h_{kj}^s(t_i)/(h_{kj}(t_0))^{n-1}}$$

In which, when $h_{kj}(t_0)=0$, $h_{kj}^{s'}(t_i)/(h_{kj}(t_0))^{n-1}=0$ and $h_{kj}^s(t_i)/(h_{kj}(t_0))^{n-1}=0$; ② The dynamical rank probabilities with incomplete and complete information:

$$h_{kj}^{\prime}(t) = \frac{\prod_{i=1}^{n} h_{kj}^{\prime}(t_i) / (h_{kj}(t_0))^{n-1}}{\sum_{H_{kj} \in S(t_n)} \prod_{i=1}^{n} h_{kj}^{\prime}(t_i) / (h_{kj}(t_0))^{n-1}}$$

$$h_{kj}^{r}(t) = \frac{\prod_{i=1}^{n} h_{kj}^{r}(t_i) / (h_{kj}(t_0))^{n-1}}{\sum_{H_{kj} \in S(t_n)} \prod_{i=1}^{n} h_{kj}^{r}(t_i) / (h_{kj}(t_0))^{n-1}}$$

In which, when $h_{kj}(t_0)=0$, $h_{kj}^{r\prime}(t_i)/(h_{kj}(t_0))^{n-1}=0$ and $h_{kj}^{r}(t_i)/(h_{kj}(t_0))^{n-1}=0$.

§21. In step (3) of §11, when IDUCG includes the virtual consequence variable $E_h$, to solve the problem by treating IDUCG as BN includes the following steps:

(1) Introduce another event $\bar{E}_h$, where $Pr\{E_h\}\equiv 1$ and $Pr\{\bar{E}_h\}\equiv 0$;

(2) The CPT between the virtual consequence variable $E_h$ and its only cause variable $V_h$ is constructed as follows: ① When $$\max_j \{f_{Ehj}\} \leq 1, Pr\{E_h \mid V_{hj}\} = f_{Ehj},$$

and $$Pr\{\bar{E}_h \mid V_{hj}\} \equiv 1 - Pr\{E_h \mid V_{hj}\};$$

② When $$\max_j \{f_{Ehj}\} > 1, Pr\{E_h \mid V_{hj}\} = f_{Ehj} / \max_j \{f_{Ehj}\} \text{ and}$$

$$Pr\{\bar{E}_h \mid V_{hj}\} = 1 - Pr\{E_h \mid V_{hj}\}.$$

§22. The case that there is spurious evidence or part of the DUCG is incorrect can be dealt with as follows:

When the possible solution set conditioned on E is null or all the members in this set is excluded so that it becomes null, there must be spurious evidence or the part of the DUCG is incorrect (imperfect). As to which evidence or part is wrong is unknown. In this case, we can eliminate $E_i$ from E one by one, and perform the computation for each case of the elimination. The collection of all the computation results corresponding to the eliminations is then the computation result in the imperfect case. If such elimination of one by one cannot solve the problem, eliminate the evidence one group by one group, so as to obtain the result. But this means the increase of computation due to the combination explosion.

BRIEF DESCRIPTIONS OF THE DRAWINGS

FIG. 4 is the example of the truth value table of a logic gate.

FIG. 5 is the truth value table of the logic gate in FIG. 4, which includes the remnant state.

FIG. 6 is the illustration of combining the default variables.

FIG. 7 is an example of transforming the explicit representation mode to the equivalent causality trees or forest.

FIG. 23 is the DUCG after eliminating the part without any connection with the abnormal state variables in FIG. 22.

FIG. 24 is the DUCG after eliminating the part connected with only the variables in normal state in FIG. 23.

FIG. 25 is the DUCG after eliminating the invalid conditional functional variables in FIG. 24.

FIG. 41 is the illustration of a present technology, i.e. the singly and multiply connected BNs.

FIG. 42 is an example of the BN that has logic cycles and cannot be solved by the present technology.

FIG. 43 is an example of the single-valued DCD as a present technology.

THE DETAILED DESCRIPTION OF EMBODIMENTS OF THE INVENTION

In what follows, the methods in this invention will be explained in details. Examples 1-21 explain the methods in §1-21. Examples 22-24 are the real examples of synthetically applying this invention. These examples provide not only the detailed explanation to the methods included in the claims, but also other new contents.

Example 1

Figure 1:
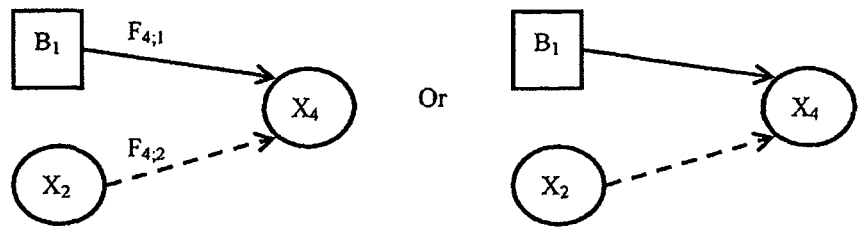
FIG. 1 is the example of a simple explicit representation mode.
Figure 2:
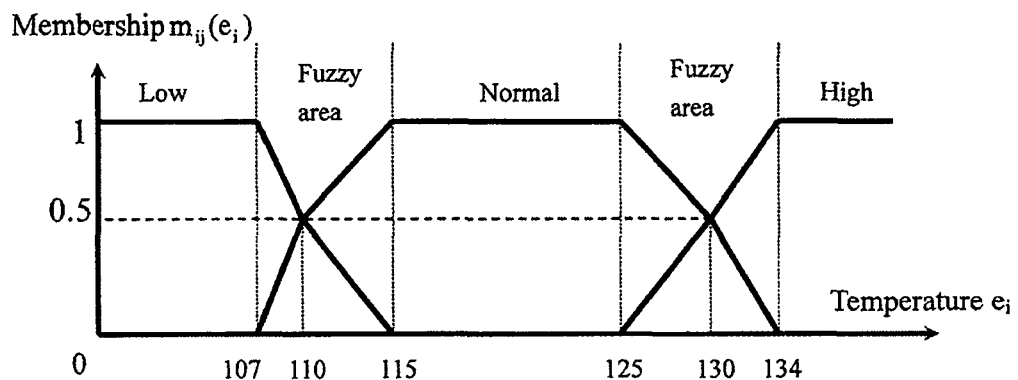
FIG. 2 is the example of the fuzzy discretization for the continuous variables.

FIGS. 1 and 2 are idiographic examples about the method mentioned in §1, which is explained below.

§1.1. The consequence variable $X_n$ can be drawn as $\boxed{X_n}$, which indicates the consequence variable indexed by n (in this example, n=2,4), e.g. the temperature of a stove. $X_n$ is a brief notation of the consequence variable (consequence/effect event variable). It can have either discrete or continuous state value. For example, the stove temperature is abnormally high, normal, abnormally low, or the stove temperature is 1800 C°, 2000 C°, etc. $X_n$ may have more than one input or cause variable (in this example, the input or cause variables of $X_4$ are $B_1$ and $X_2$) and more than one output variable (i.e. the direct downstream consequence variables). The continuous variable can be fuzzily discretized (see §1.8 for details). The discrete or fuzzy discrete state of $X_n$ is denoted as $X_{nk}$ that is a specific event (e.g. the stove temperature is abnormally high), i.e. the consequence variable indexed by n is in its state k. $x_{nk} \equiv Pr\{X_{nk}\}$, which can be the function of time and satisfies $$\sum_k x_{nk} = 1.$$

$X_{nk}$ can be expressed in terms of matrix:

$$X_n = \begin{pmatrix} X_{n1} \\ X_{n2} \\ \vdots \\ X_{nk} \\ \vdots \\ X_{nK} \end{pmatrix} = (X_{n1} \ X_{n2} \ \ldots \ X_{nk} \ \ldots \ X_{nK})^T$$

Or $$x_n = \begin{pmatrix} x_{n1} \\ x_{n2} \\ \vdots \\ x_{nk} \\ \vdots \\ x_{nK} \end{pmatrix} = (x_{n1} \ x_{n2} \ \ldots \ x_{nk} \ \ldots \ x_{nK})^T$$

In which, K is the upper bound of k. It is seen that $X_n$ represents not only the event matrix, but also the data matrix. Moreover, $X_n$ can be expressed in the form of function:

$$X_n = X_n\{V_1, V_2, \ldots, V_N\}$$

In which, $X_n\{\ \}$ is the operator of $X_n$ about its cause variables, $V_1, V_2, \ldots, V_N$ are the direct cause or input variables, N is the number of input variables.

§1.2. The basic variable $B_i$ can be drawn as $\boxed{B_i}$, i.e. the basic variable indexed by i (in this example, i=1), e.g. the state of an electromagnetic valve. $B_i$ is the brief notation of the basic event variable and can have several discrete or continuous state values. For example, the electromagnetic valve is blocked, leaking, closed, or the open degree is 70%, 80%, etc. $B_i$ does not have any input, but has at least one output. The so called basic variable means such variables whose causes do not need be found and whose states are random independently or given online. The continuous basic variable can be fuzzily discretized (see §11.8 for details). The discrete or fuzzy discrete state of $B_i$ is denoted as $B_{ij}$ that is a specific event (e.g. the electromagnetic valve is closed or the open degree is middle), i.e. the basic variable indexed by i is in its state j. The occurrence probability of this event $b_{ij} \equiv Pr\{B_{ij}\}$ is given by the domain engineers when they construct the representation model of the consequence variable $X_n$ as well as its various cause variables $V_i$ involved in the problem to be solved, and can be the function of time while satisfies $$\sum_j b_{ij} \le 1.$$

This invention does not require the data normalization or completeness, i.e. the case $$\sum_j b_{ij} < 1$$

is allowed. This is for the convenience of users. For example, when the domain engineers give the probability parameters $b_{ij}$ of the states of $B_i$, they need give only the abnormal state parameters, but not the normal state parameters.

$b_{ij}$ can be replaced in some cases by the frequency (i.e. $b_{ij} = \lambda_{ij}$ occurrence times of $B_{ij}$ in the unit time interval. See §11.2 for details).

$B_i$ can be expressed in terms of matrix:

$$B_i = (B_{i1} \ B_{i2} \ldots B_{ij} \ldots B_{iJ})^T$$

Or $$B_i = (b_{i1} \ b_{i2} \ldots b_{ij} \ldots b_{iJ})^T$$

In which, J is the upper bound of j. It is seen that $B_i$ can represent both the event matrix and the data matrix.

§1.3. The cause variable $V_i$ is used to generally denote the variables as causes. $V \in \{B, X\}$ means that the cause variable can be either the B type variable or the X type variable. When $V=X$, the consequence variable $X_i$ is also the cause variable of another consequence variable $X_n$. Moreover, V can also represent G and D type cause variables (see examples 3 and 4 for details).

§1.4. When the problem to be solved is about the continuously operating process system (e.g. the power plant, chemical system, etc), the basic variable can be further classified as the initiating event variable and the non-initiating event variable, and can be distinguished by different drawings or colors. For example, the initiating event variable can be drawn as

 and the non-initiating event variable can be drawn as

. The so called initiating event variable means that all the abnormal states of the variable are initiating events. The non-initiating event variable means that all the abnormal states of the variable are non-initiating events. The division between the initiating event and non-initiating event is the further information representation, which will make the computation process be simplified significantly. If the abnormal states of a variable are partially the initiating events and partially the non-initiating events, this variable is a hybrid variable that can be represented by another drawing and cannot be simply treated as the initiating variable or the non-initiating variable. Instead, it must be treated at the event level.

The so called non-initiating event indicates that the event itself cannot directly function and cannot affect the operation state of the system. Only when the other initiating event occurs, will it possibly function. For example, the event that the depressurizing valve of a power plant cannot open to depressurize the pressure when the abnormal high pressure appears is a non-initiating event. Here, if the abnormal high pressure does no appear, the non-initiating event will not function. While its function does not mean that it appears just at this moment. Instead, it may have being existed for a long time, e.g. the mistake of design or installation, the incorrect reinstallation after maintenance, the circuit short of the valve electromotor due to the damp in some moment before, etc. In general, the occurrence time may be much earlier than the function time.

In other words, the occurrence of the initiating event can be viewed as in the meantime (i.e., within a vary small time interval $\Delta t$) of the operation state change of the process system, while the occurrence of the non-initiating event can be viewed as within a relatively long time interval T ($\Delta t \ll T$) before the operation state change of the process system. Based on this, it can be concluded that the probability of the simultaneous occurrence of two or more independent initiating events is a high order small value compared with the occurrence probability of one initiating event plus some (including none) non-initiating events. When the occurrence probability of the basic event is much less than 1, the simultaneous occurrence of two or more independent initiating events can be viewed as impossible. But the simultaneous occurrence of one initiating event ANDed with some non-initiating events is possible. For example, the failure rate $\lambda$ of many types of equipments or components is usually ranging from $10^{-2}$-$10^{-5}$/year, while the time interval $\Delta t$ is usually measured in minutes or seconds. In comparison, T is usually counted in months. Thus, the probability of the initiating event that the equipment or component fails during $\Delta t$ is $b \approx \lambda \Delta t \ll 1$, and $(\lambda \Delta t)^n \ll \lambda \Delta t (\lambda T)^m$, where $n>1$ and $m \geq 0$. It is seen that the probability of the simultaneous occurrence of two or more initiating events is a high order small value, and can be ignored. In other words, when two or more different initiating events are ANDed together, the result will be a null set.

§1.5. The functional variable as the brief name of the functional event variable can be represented with the directed arc $\rightarrow$. The conditional functional variable as the brief name of the conditional functional event variable can be represented with the dashed directed arc $--\rightarrow$. They start from the cause or input variable $V_i$ (in this example, $V_1=B_1$ and $V_2=X_2$) and stop at the consequence or output variable $X_n$ ($X_4$ in this example), and are denoted as $F_{n;i}$ (in this example, $F_{4;1}$ is a functional variable and $F_{4;2}$ is a conditional functional variable). The specific value of $F_{n;i}$ is $F_{nk;ij}$ that is a weighted random event indicating that the state j of the variable indexed by i causes the state k of the consequence variable indexed by n. The occurrence probability of $F_{nk;ij}$ quantifies the uncertainty and the uncertain degree of the event that the cause event causes the consequence event. The difference between the conditional functional variable and the functional variable is only at that the former is conditionally valid (see §2.1 for details). Therefore, they can be generally called the functional variable.

The significance of introducing the functional event $F_{nk;ij}$ is that in the real world, there must be a functional mechanism to realize that the cause event makes the consequence event occur. The detailed functional mechanism is usually unclear or very complicated. Meanwhile, what time the functional mechanism is realized is usually uncertain. That is, the causalities in the real world appear uncertain. In this invention, the introduction of the functional event is to represent this uncertain functional mechanism. It not only avoids the detailed explanation of the functional mechanism, but also fully represents the functional effect of this uncertain causal functional mechanism. With this representation, the functional mechanism does function means that the functional event does occur; the functional mechanism does not function means that the functional event does not occur. The probability of the functional event is the probability of the event that the functional mechanism does function.

When the cause variable and the consequence variable are all discrete or fuzzy discrete variables, the functional variable is corresponding to a matrix:

$$F_{n;i} = \begin{pmatrix} F_{n1;i1} & F_{n1;i2} & \cdots & F_{n1;ij} & \cdots & F_{n1;iJ} \\ F_{n2;i1} & F_{n2;i2} & \cdots & F_{n2;ij} & \cdots & F_{n2;iJ} \\ \vdots & & & & & \\ F_{nk;i1} & F_{nk;i2} & \cdots & F_{nk;ij} & \cdots & F_{nk;iJ} \\ \vdots & & & & & \\ F_{nK;i1} & F_{nK;i2} & \cdots & F_{nK;ij} & \cdots & F_{nK;iJ} \end{pmatrix} = \begin{pmatrix} F_{n1;i} \\ F_{n2;i} \\ \vdots \\ F_{nk;i} \\ \vdots \\ F_{nK;i} \end{pmatrix}$$

In which, K is the upper bound of k, J is the upper bound of j, and $$F_{nk;i} = (F_{nk;i1} \; F_{nk;i2} \ldots F_{nk;ij} \ldots F_{nk;iJ})$$

The rows of the matrix $F_{n;i}$ correspond to the states of the consequence variable, while the columns correspond to the states of the cause variable. The element $F_{nk;ij}$ of the matrix is the functional event that the state j of the cause variable i causes the state k of the consequence variable n. Define $f_{nk;ij} = \Pr\{F_{nk;ij}\}$. $f_{nk;ij}$ is called the functional intensity, i.e. the probability contribution of $V_{ij}$ to $X_{nk}$ by $F_{nk;ij}$.

For domain engineers, when they give the occurrence probability of $V_{ij}$ causing $X_{nk}$ by $F_{nk;ij}$, they usually do not consider or are in difficulty to consider the functions of other cause variables influencing $X_{nk}$. In the case of not considering the other cause variables, the occurrence probability value of $X_{nk}$ by $F_{nk;ij}$ given by the domain engineers is called the original functional intensity and is expressed as $a_{nk;ij}$. In terms of matrix, $$A_{n;i} \equiv \begin{pmatrix} a_{n1;i1} & a_{n1;i2} & \cdots & a_{n1;ij} & \cdots & a_{n1;iJ} \\ a_{n2;i1} & a_{n2;i2} & \cdots & a_{n2;i1j} & \cdots & a_{n2;iJ} \\ \vdots \\ a_{nk;i1} & a_{nk;i2} & \cdots & a_{nk;ij} & \cdots & a_{nk;iJ} \\ \vdots \\ a_{nK;i1} & a_{nK;i2} & \cdots & a_{nK;ij} & \cdots & a_{nK;iJ} \end{pmatrix}$$

In which, $a_{nk;ij}$ are given by domain engineers and can be the functions of time.

In this invention, $a_{nk;ij}$ satisfy $$\sum_k a_{nk;ij} \leq 1.$$

Usually, $$\sum_k a_{nk;ij}$$

equals to 1, i.e. the sum of data in any column of the matrix $A_{n;i}$ sum up to 1. But in this invention, only $\leq 1$ is required, i.e. the data completeness is not required. This is for the consideration that the domain engineers may not concern the occurrence probabilities of all the states of $X_n$ caused by $V_{ij}$, but only the occurrence probabilities of partial states of $X_n$. In this case, the domain engineers need only give the probabilities of the states in concern of $X_n$, but not all. Moreover, for some $V_{ij}$, the domain engineers may not concern the causalities between $V_{ij}$ and $X_n$, and therefore do not need give the original functional intensity starting from $V_{ij}$ for any state of $X_n$. In other words, in this invention, the data and causalities can be incomplete, thus to provide grate convenience for domain engineers to freely and explicitly represent the causalities in the real world.

The above original functional intensity $a_{nk;ij}$ is given without considering the other cause variables. But in the real world, the cause variables are not unrelated. For the example 1, when $B_1$ causes $X_{41}$ occur, it is impossible for $X_2$ to cause $X_{42}$, because $X_{41}$ and $X_{42}$ are exclusive. To solve the conflict between the independency of giving the original functional intensity $a_{nk;ij}$ and the mutual exclusion (correlation) of different states of $X_n$, this invention defines that the probability or functional intensity of the event that every cause variable causes some state of the consequence variable is only a contribution to the state probability distribution of the consequence variable. As to in which state the consequence variable will be is decided randomly according to the probability distribution.

It is obvious that as the different states of a cause or consequence variable are exclusive, the corresponding functional events are exclusive. Moreover, since the probability contributions from different cause variables to a same state of a consequence variable are simply in the summation relation, the functional events from different cause variables to a same state of a consequence variable are exclusive with each, other in the sense of effect. In other words, all the functional events as the outputs to the states of a same consequence variable are exclusive with each other, while the logic AND of the functional events from different cause variables to a same state of a consequence variable are mutually independent.

Considering that the state probability distribution of the consequence variable should satisfy the normalization. This invention defines the functional intensity $f_{nk;ij}=(r_{n;i}/r_n)a_{nk;ij}$, where $$r_n = \sum_i r_{n;i}$$

is the normalization factor and $r_{n;i}$ is the relationship of $F_{n;i}$. Thus, $$F_{n;i} = (r_{n;i}/r_n)A_{n;i} = \begin{pmatrix} f_{n1;i1} & f_{n1;i2} & \cdots & f_{n1;ij} & \cdots & f_{n1;iJ} \\ f_{n2;i1} & f_{n2;i2} & \cdots & f_{n2;ij} & \cdots & f_{n2;iJ} \\ \vdots \\ f_{nk;i1} & f_{nk;i2} & \cdots & f_{nk;ij} & \cdots & f_{nk;iJ} \\ \vdots \\ f_{nK;i1} & f_{nK;i2} & \cdots & f_{nK;ij} & \cdots & f_{nK;iJ} \end{pmatrix}$$

That is to say, $F_{n;i}$ represents not only the event matrix, but also the data matrix.

§1.6. Every functional variable $F_{n;i}$ is associated with a factor $r_{n;i}$ (briefly called the relationship) representing the causal relation degree between the input variable $V_i$ and the output variable $X_n$. In general, $0 < r_{n;i} \leq 1$. When people are not sure for weather or not there exists causality between the cause variable and the consequence variable, the relationship can be used to represent the uncertain degree. Usually, when $r_{n;i}=1$, the causality exists with 100% confidence; when $r_{n;i}=0$, the causality does not exist, but in this case, the functional variable should not exist too. Therefore, $r_{n;i} \neq 0$. The middle case can be represented by a number between 0 and 1. As the default case, the causality can be viewed as 100%, i.e. $r_{n;i}=1$. $r_{n;i}$ can be the function of time.

In nature, the relationship represents the influence weight of the cause variable to the consequence variable, because $r_{n;i}$ appears always in the form of $(r_{n;i}/r_n)$ in the computation process, where $$r_n = \sum_i r_{n;i}.$$

That is, $r_{n;i}$ always satisfy the normalization. Therefore, $r_{n;i} \leq 1$ is no long the restriction must be satisfied. In fact, the method presented in this invention allows the case $r_{n;i} > 1$. Even more, it can be all $r_{n;i} < 1$, because in $(r_{n;i}/r_n)$, no matter $r_{n;i}$ is positive or negative, the result is same.

The difference between the relationship and the functional intensity is: The relationship represents the direct causality correlation degree between the cause variable and the consequence variable or the weighing degree among the cause variables to influence the consequence variable in the sense of causality. It has nothing to do with the states of the cause variables and consequence variable. The functional intensity represents the probability distribution contribution over the different states of a consequence variable from the different states of a cause variable, in the precondition that the direct causality already exists.

§1.7. Given $r_{n;i}$, the state probabilities of the consequence variable are calculated according to the following equations.

$$Pr\{X_{nk}\} = \sum_i \left((r_{n;i}/r_n)\sum_j a_{nk;ij}Pr\{V_{ij}\}\right) = \sum_{i,j} f_{nk;ij}Pr\{V_{ij}\}$$

It can be proved that the sum of the probabilities of all the states of $X_n$ are normalized conditioned on $$\sum_j a_{nk;ij} = 1 \text{ and } \sum_j Pr\{V_{ij}\} = 1.$$

Proof:

$$\sum_k Pr\{X_{nk}\} = \sum_k \sum_i \left((r_{n;i}/r_n)\sum_j Pr\{V_{ij}\}a_{nk;ij}\right)$$

$$= \sum_i \left((r_{n;i}/r_n)\sum_j Pr\{V_{ij}\}a_{nk;ij}\right)$$

$$= \sum_i (r_{n;i}/r_n) = \sum_i r_{n;i}/r_n = 1$$

∎

But, as this invention does not require the completeness, there may be $$\sum_k a_{nk;ij} < 1 \text{ or } \sum_j Pr\{V_{ij}\} < 1, \text{ so that } \sum_k Pr\{X_{nk}\} < 1.$$

Usually, there is a default state $\eta$ of $X_n$, which represents such a state of $X_n$ that its probability is not in concern. To satisfy the state probability normalization of $X_n$, there is $$Pr\{X_{n\eta}\} \equiv Pr\left\{\prod_{k \neq \eta} \overline{X}_{nk}\right\} = 1 - \sum_{k \neq \eta} Pr\{X_{nk}\}, \sum_k Pr\{X_{nk}\} = 1$$

so that can be satisfied. The default state is usually the normal state of the variable, e.g. the stove temperature is normal, etc. Since people do not concern the probability of this state, people usually do not give the cause of this state (the cause is absent), nor give it as the cause of other variables. In the explicit representation mode, the inference computation process is usually not related to the calculation of the default state probability, and therefore the incompleteness does not usually influence the computation result. If the completeness is not met and the default state is not given, the sum of the calculated probabilities of different states may not be normalized (less than 1). In this case, the following normalization method can be applied (only when necessary).

$$Pr\{V_{ij}\} = Pr\{V_{ij}\} \bigg/ \sum_j Pr\{V_{ij}\}$$

Although this compulsory normalization is not strict enough in theory, it reflects the limitation for people to know the real world, but not the limitation of the method itself. In contrast, it is because this method allows the limitation of people in knowing the real world, that this method has more advantages than the other methods.

§1.8. When the cause or the consequence variable is the continuous variable, the fuzzy method can be used to make it discrete. For example, suppose a variable represents the continuous value of a temperature. It can be discretized as three discrete states: low (e.g. lower than) 115° C.), normal (e.g. 107-134° C.) and high (e.g. more than 125° C.). There may be fuzzy area between states. The degree of a given temperature $e_i$ belonging to state j is quantified by the membership $m_{ij}(e_i)$. For any value $e_i$ of a given continuous variable, $$\sum_j m_{ij}(e_i) = 1.$$

FIG. 2 provides an example. $m_{ij}(e_i)$ can be briefly written as $m_{ij}$.

After the discretization of the continuous variables, the original functional intensities $a_{nk;ki}$ between the cause variables and the consequence variable are the same as for the discrete variables, and can be given by domain engineers. When the continuous functional intensity is given by the functional intensity density function $\phi_{n;i}$, $\phi_{n;j}$ can be transformed as $\phi_{nk;ij}$:

① When the cause variable and the consequence variable are all continuous, $\phi_{n;i}(e_i,e_n)$. The meaning of $\phi_{n;i}(e_i,e_n)de_n$ is the probability that $V_i$ causes the value $e_n$ of $X_n$ within a very small interval $de_n$, given the value of $V_i$ is $e_i$. Since the incompleteness is allowed, for any $e_i$, $$\int_{e_n} \varphi_{n;i}(e_i, e_n) de_n \leq 1$$

$$a_{nk;i}(e_i) = \int_{e_n} m_{nk}(e_n)\varphi_{n;i}(e_i, e_n) de_n$$

In which, $a_{nk;i}(e_i)$ is the occurrence probability that $V_i$ causes $X_{nk}$, given the value of $V_i$ is $e_i$. $a_{nk;i}(e_i)$ is the function of $e_i$. What people want to know is the probability of $X_n$ being in its fuzzy discrete state k in average when $V_i$ is in the fuzzy discrete state j after the fuzzy discretization. Therefore, the average for $a_{nk;i}(e_i)$ weighted by $m_{ij}(e_i)$ should be done:

$$a_{nk;ij} = \frac{\int_{e_i} m_{ij}(e_i) a_{nk;i}(e_i) de_i}{\int_{e_i} m_{ij}(e_i) de_i}$$

$$= \frac{\int_{e_i} \int_{e_n} m_{ij}(e_i) m_{nk}(e_n) \varphi_{n;i}(e_i, e_n) de_n de_i}{\int_{e_i} m_{ij}(e_i) de_i}$$

As the same as the discrete variable, we have $$\sum_k a_{nk;ij} = \frac{\sum_k \int_{e_i} \int_{e_n} m_{ij}(e_i) m_{nk}(e_n) \varphi_{n;i}(e_i, e_n) de_n de_i}{\int_{e_i} m_{ij}(e_i) de_i}$$

$$= \frac{\int_{e_i} m_{ij}(e_i) \int_{e_n} \varphi_{n;i}(e_i, e_n) \sum_k m_{nk}(e_n) de_n de_i}{\int_{e_i} m_{ij}(e_i) de_i}$$

$$= \frac{\int_{e_i} m_{ij}(e_i) \int_{e_n} \varphi_{n;i}(e_i, e_n) de_n de_i}{\int_{e_i} m_{ij}(e_i) de_i} \le \frac{\int_{e_i} m_{ij}(e_i) de_i}{\int_{e_i} m_{ij}(e_i) de_i}$$

$$= 1$$

② When the cause variable $V_i$ is continuous but the consequence variable $X_n$ is discrete, $\phi_{n;i} = \phi_{n;i}(e_i, X_{nk})$, and $$a_{nk;ij} = \frac{\int_{e_i} m_{ij}(e_i) \varphi_{n;i}(e_i, X_{nk}) de_i}{\int_{e_i} m_{ij}(e_i) de_i}$$

In which, $\phi_{n;i}(e_i, X_{nk})$ is the functional intensity density function between the continuous cause variable $V_i$ and the discrete state k of the consequence variable $X_n$. For any $e_j$, $$\sum_k \varphi_{n;i}(e_i, X_{nk}) \le 1$$

Thus we have $$\sum_k a_{nk;ij} = \frac{\sum_k \int_{e_i} m_{ij}(e_i) \varphi_{n;i}(e_i, X_{nk}) de_i}{\int_{e_i} m_{ij}(e_i) de_i}$$

$$= \frac{\int_{e_i} m_{ij}(e_i) \sum_k \varphi_{n;i}(e_i, X_{nk}) de_i}{\int_{e_i} m_{ij}(e_i) de_i} \le \frac{\int_{e_i} m_{ij}(e_i) de_i}{\int_{e_i} m_{ij}(e_i) de_i}$$

$$= 1$$

③ When the cause variable $V_i$ is discrete and the consequence variable $X_n$ is continuous, $\phi_{n;i} = \phi_{n;i}(V_{ij}, e_n)$, $$a_{nk;ij} = \int_{e_n} m_{nk}(e_n) \varphi_{n;i}(V_{ij}, e_n) de_n$$

In which, $\phi_{n;i}(V_{ij}, e_n)$ is the functional intensity density function between the discrete cause variable $V_i$ and the continuous consequence variable $X_n$. For any $V_{ij}$, $$\int_{e_n} \varphi_{n;i}(V_{ij}, e_n) de_n \le 1$$

Then we have $$\sum_k a_{nk;ij} = \sum_k \int_{e_n} m_{nk}(e_n) \varphi_{n;i}(V_{ij}, e_n) de_n$$

$$= \int_{e_n} \sum_k m_{nk}(e_n) \varphi_{n;i}(V_{ij}, e_n) de_n$$

$$= \int_{e_n} \varphi_{n;i}(V_{ij}, e_n) de_n \le 1$$

Example 2

Still as shown in FIG. 1, the meaning of the conditional functional variable is as follows.

§2.1. The only difference between the functional variable ($F_{4;1}$ in this example) and the conditional functional variable ($F_{4;2}$ in this example) is that the conditional functional variable is added an validation condition $C_{n,i}$ ($C_{4;2}$ in this example), while the others remain same. The meaning of $C_{n,i}$ is: when $C_{n,i}$ is valid, $F_{n,i}$ is valid; otherwise, $F_{n,i}$ is eliminated. The function of the conditional functional variable is that when the condition $C_{n,i}$ is not valid, break the causality between the input variable and the output variable. In FIG. 1, it appears as that the directed arc representing the functional variable is eliminated. Vise versa, if the condition is valid, the conditional functional variable becomes the functional variable. In FIG. 1, the dashed directed arc becomes the solid directed arc.

The reason of introducing the conditional functional variable is because the causalities between things are not always determinable in advance. Some of them have to be determined according to the online received evidence or the middle computation results. For example, suppose $B_{12}$ represents the rupture of the U type pipes in a steam generator of a nuclear power plant, $X_2$ represents the feed water flow rate of the steam generator, and $X_4$ represents the water level of the steam generator. Only when $B_{12}$ does not occur, will $X_2$ become the cause of $X_4$, i.e. $C_{4;2} = \overline{B}_{12}$. But in advance, people do not know whether or not $B_{12}$ occurs. Thus $F_{4;2}$ is a conditional functional variable. When the online evidence or the computation process shows that $C_{4;2}$ is valid, $F_{4;2}$ becomes a functional variable. In accordance, the dashed directed arc becomes a solid directed arc; When the online evidence or the computation process shows that $C_{4;2}$ is invalid, $F_{4;2}$ is eliminated.

Example 3

Figure 3:
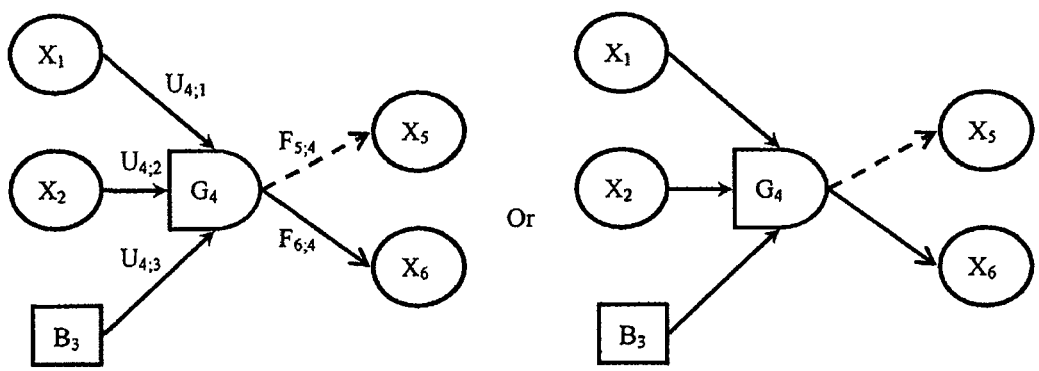
FIG. 3 is the example of the explicit representation mode including a logic gate.

FIGS. 3-5 are the examples about the logic gate, and are explained below.

§3.1. As shown in FIG. 3, a logic gate is drawn as $\boxed{G_i}$, i.e. the logic gate indexed by i (in this example, i=4), which is used to represent any state logical combination of input variables. $G_i$ has at least one input (three inputs $X_1$, $X_2$ and $B_3$ in this example) and at least one output (two outputs $X_5$ and $X_6$ in this example). The input variables are connected with the logic gate by the directed arc→that is different from the functional variable→and the conditional functional variable - - -➤,and are denoted as $U_{i;h}$ ($U_{4;1}$, $U_{4;2}$ and $U_{4;3}$ in this example), in which h is the input variable index (h=1,2,3 in this example). The elements of $U_{i;h}$ are denoted as $U_{ik;hj}$ representing that the state j of the input variable h participates in the logic operation and results in the occurrence of the state k of the logic gate i. $U_{ik;hj}$ is either an inevitable event whose probability is always 1, or an impossible event whose probability is always 0 (i.e. the state j of the input variable h has nothing to do with the state k of the logic gate i). However, at least one element of $U_{n;i}$ is the inevitable event, otherwise $V_h$ is not the input of logic gate $G_i$. The logic gate can also be written as in the form of function:

$$G_i = G_i\{U_{i;1}V_1, U_{i;2}V_2, \ldots, U_{i;N}V_N\}$$

Or simply written as $$G_i = G_i\{V_1, V_2, \ldots, V_N\} = \begin{pmatrix} G_{i1} \\ G_{i2} \\ \vdots \\ G_{iK} \end{pmatrix}$$

Where $G_i\{\ \}$ is the operator of the logic gate, $V_1, V_2, \ldots, V_N$ are the input variables of $G_i$, $G_{ij}$ denotes the state j of $G_i$, and K is the number of the states of the logic gate. A variable $U_{i;h}$ can be added in front of every corresponding input variable, so as to ease the investigation of the causality chain according to the subscripts. It can also be ignored. $V \in \{B,X,G\}$ indicates that the logic gate can also be the input variable of another logic gate. Of course, usually the multiple logic gate representation is not necessary, because the multiple logic combination can be fully represented in one logic gate. Therefore, for simplicity, only the case of the single logic gate will be discussed below.

The states of the logic gate are discrete. The different states of the logic gate reflect the different effects of the state combinations of the input variables. Every logic gate has a corresponding truth value table specifying the corresponding relation between the different state combinations of the input variables and the states of the logic gate, i.e. specifying the specific meaning of the operator $G_i\{\ \}$. For the example shown in FIG. 4, suppose the input variables of $G_4$ are $V_1$, $V_2$ and $V_3$, and they have two states each. The graphical illustration and the truth value table are given in FIG. 4. In the table, the second subscript indexes the different state of the variable. The serial number of the input row is to distinguish the logic expressions of the state combinations of input variables. The logic expressions indexed by the different serial numbers correspond to different states of the logic gate, and therefore are exclusive with each other. $G_{ij}$ denotes the state j of the logic gate i. The value "1" in the truth value table indicates that this state of the logic gate is true. The value "0" in the truth value table indicates not true. "+" denotes the logic OR (may not be exclusive). The conjunctive two sides of "+" are different logic items. The truth of any one of the items can result in the truth of the same state of the logic gate. The events in every logic item are in the AND relation. For the example above, the logic expression indexed by the serial number 1 is composed of three items. The truth of any one of the items can result in the truth of $G_{41}$. The logic expression indexed by the serial number 2 is composed of two items. The truth of any one of the items can result in the truth of $G_{42}$.

The state combination expressions of the input variables in the truth value table do not have to cover all the state combinations of the input variables. As shown in FIG. 4, $V_{22}V_{32}$ is not covered by the two expressions in the truth value table. That is, the domain engineers need only consider the state combinations of the input variables in concern, but not have to be all, i.e. the incomplete representation is allowed.

§3.2. To satisfy the normalization of the logic gate, all the uncovered state combinations of input variables can be treated as a new added expression that is called the remnant expression into the truth value table, and correspondingly a new state of the logic gate is added. For the example shown in FIG. 4, the truth value table of the logic gate covering all the state combinations is shown in FIG. 5.

It can be proved that the sum of all the states including the remnant state of the logic gate is normalized.

Proof:

$$\sum_j Pr\{G_{ij}\} = \sum_j Pr\{\text{the logic expression corresponding to } G_{ij}\}$$

$$= Pr\left\{\sum_j \text{the logic expression corresponding to } G_{ij}\right\}$$

$$= Pr\{\text{all the state combinations of the input variables}\}$$

$$= 1$$

∎

When the logic relation of $G_i$ is the complete combination of all the states of input variables, $$G_i = G_i\{V_1, V_2, \ldots, V_N\} = \begin{pmatrix} G_{i1} \\ G_{i2} \\ \vdots \\ G_{iK} \end{pmatrix} = \begin{pmatrix} V_{11} & V_{21} & \ldots & V_{N1} \\ V_{11} & V_{21} & \ldots & V_{N2} \\ & & \vdots & \\ V_{1A} & V_{2B} & \ldots & V_{NZ} \end{pmatrix}$$

The index A is the state number of $V_1$, the index B is the state number of $V_2$, ..., the index Z is the state number of $V_N$. This type logic gate is called the complete combination logic gate. For the example shown in FIG. 4, the complete combination logic gate is $$G_4 = G_4\{V_1, V_2, V_3\} = \begin{pmatrix} G_{41} \\ G_{42} \\ G_{43} \\ G_{44} \\ G_{45} \\ G_{46} \\ G_{47} \\ G_{48} \end{pmatrix} = \begin{pmatrix} V_{11} & V_{21} & V_{31} \\ V_{11} & V_{21} & V_{32} \\ V_{11} & V_{22} & V_{31} \\ V_{11} & V_{22} & V_{32} \\ V_{12} & V_{21} & V_{31} \\ V_{12} & V_{21} & V_{32} \\ V_{12} & V_{22} & V_{31} \\ V_{12} & V_{22} & V_{32} \end{pmatrix}$$

In fact, any logic gate can be transformed from the complete combination logic gate. For the example above, logic gate $G_4$ can be expressed as $$G_4 = \begin{pmatrix} V_{11}V_{21} + V_{11}V_{31} + V_{21}V_{31} \\ V_{12}V_{21}V_{32} + V_{12}V_{22}V_{31} \end{pmatrix}$$

$$= \begin{pmatrix} 1 & 1 & 1 & 0 & 0 & 0 & 0 & 0 \\ 0 & 0 & 0 & 0 & 1 & 1 & 1 & 0 \end{pmatrix} \begin{pmatrix} V_{11} & V_{21} & V_{31} \\ V_{11} & V_{21} & V_{32} \\ V_{11} & V_{22} & V_{31} \\ V_{11} & V_{22} & V_{32} \\ V_{12} & V_{21} & V_{31} \\ V_{12} & V_{21} & V_{32} \\ V_{12} & V_{22} & V_{31} \\ V_{12} & V_{22} & V_{32} \end{pmatrix}$$

In the matrix, "1" denotes the complete set and "0" denotes the null set.

If considering the remnant state of the logic gate, there is $$G_4 = \begin{pmatrix} V_{11}V_{21} + V_{11}V_{31} + V_{21}V_{31} \\ V_{12}V_{21}V_{32} + V_{12}V_{22}V_{31} \\ \text{the remnant expression} \end{pmatrix}$$

$$= \begin{pmatrix} 1 & 1 & 1 & 0 & 0 & 0 & 0 & 0 \\ 0 & 0 & 0 & 0 & 1 & 1 & 1 & 0 \\ 0 & 0 & 0 & 1 & 0 & 0 & 0 & 1 \end{pmatrix} \begin{pmatrix} V_{11}V_{21}V_{31} \\ V_{11}V_{21}V_{32} \\ V_{11}V_{22}V_{31} \\ V_{11}V_{22}V_{32} \\ V_{12}V_{21}V_{31} \\ V_{12}V_{21}V_{32} \\ V_{12}V_{22}V_{31} \\ V_{12}V_{22}V_{32} \end{pmatrix}$$

Example 4

FIG. 6-2 is an example about the default variable that is explained below.

§4.1. The default event can be drawn as , i.e. the default event or the default basic event indexed by n (n=3 in this example). It does not have any cause variable, has only one output variable, and has only one state. Therefore, it is an inevitable event. Although the default event does not have more than one state, for convenience, the default event is also called the default variable or the default basic variable. One default event corresponds to one and only one consequence variable. For example, $D_n$ corresponds to only $X_n$, i.e. $D_n$ is the default event of $X_n$. The meaning is: $D_n$ is a self-independent cause of the states of $X_n$. This cause functions with other causes to decide the state probability distribution of $X_n$. The difference between D and B is that D has only one state and the occurrence probability is always 1, while B has at least two states and the occurrence of each state depends on the state probability distribution of B.

§4.2. The functional variable with $D_n$ as the direct cause variable of $X_n$ is denoted as $F_{n;D}$ ($F_{3;D}$ in FIG. 6-2). Its specific value is denoted as $F_{nk;D}$. The corresponding parameters are denoted as $f_{nk;D}$, $a_{nk;D}$ and $r_{n;D}$ respectively. The meanings and the conditions to be satisfied are the same as for $f_{nk;ij}$, $a_{nk;ij}$ and $r_{n;j}$. In terms of matrix, $$F_{n;D} = \begin{pmatrix} F_{n1;D} \\ F_{n2;D} \\ \vdots \\ F_{nk;D} \\ \vdots \\ F_{nK;D} \end{pmatrix}, A_{n;D} = \begin{pmatrix} a_{n1;D} \\ a_{n2;D} \\ \vdots \\ a_{nk;D} \\ \vdots \\ a_{nK;D} \end{pmatrix}, F_{n;D} = (r_{n;D}/r_n)A_{n;D} = \begin{pmatrix} f_{n1;D} \\ f_{n2;D} \\ \vdots \\ f_{nk;D} \\ \vdots \\ f_{nK;D} \end{pmatrix}$$

In which, K is the upper bound of k and $$r_n = \sum_i r_{n;i} + r_{n;D}.$$

Correspondingly, because of adding the direct cause variable $D_n$, $$Pr\{X_{nk}\} = \sum_{i,j} f_{nk;ij} + f_{nk;D}.$$

§4.3. In many cases, the default event D of the consequence variable corresponds to only one state of the consequence variable, or is only one of the causes of this default state of the consequence variable. The default state is given by the domain engineers in the process of constructing DUCG, and is a specific state of the various states of the consequence variable. Usually, it is the normal state. The so called normal state is the state that the variable is normally in. When people represent the causalities among things, they usually concern the abnormal states, but not the normal state. This results in that the domain engineers usually cannot give all the causes for all the states of the consequence variable. For the example of the secondary loop system of a nuclear power plant, the normal water pressure, the normal water temperature, etc, are the normal states of these variables. When the domain engineers represent the causalities among the states of various variables, they mainly concern the relations among the abnormal states, e.g. the influence of the high water temperature to the water pressure, etc, but not the causes of the normal states. Therefore, the normal states are usually the default states of the consequence variables. The default state is a special state and is indexed by η. For the default states without clearly describing the causes, the causes are or partially are the default events. The default events can be denoted clearly in DUCG, or be ignored because the default event $D_n$ belongs always to $X_n$.

In general, DUCG allows represent only part of the causal relations among variables, but not necessarily all. Usually, the correctness of the computation based on the represented part of a DUCG is not influenced by the incompleteness of the representation, because in the explicit representation mode, the representation and computation of various variable states are independent. For the example of $X_3=F_{31}B_1+F_{32}B_2$, suppose $B_1$, $B_2$ and $X_3$ have only two states each. When the domain engineers give just $a_{32;11}$, $a_{32;12}$ and $a_{32;22}$, but not $a_{31;11}$, $a_{31;12}$, $a_{31;21}$, $a_{31;22}$ and $a_{32;21}$, this means that the domain engineers concern only $X_{32}$, and $X_{32}$ is only related to $B_{11}$, $B_{12}$ and $B_{22}$. This does not influence the calculation to $Pr\{X_{32}\}$, because $X_{32}=F_{32;11}B_{11}+F_{32;12}B_{12}+F_{32;22}B_{22}$, i.e., $Pr\{X_{32}\}=f_{32;11}b_{11}+f_{32;12}b_{12}+f_{32;22}b_{22}$.

Since DUCG allows $$\sum_k a_{nk;ij} < 1 \text{ and } \sum_j Pr\{V_{ij}\} < 1,$$

there must be $$\sum_k Pr\{X_{nk}\} < 1.$$

In this case, to satisfy the normalization, define $$Pr\{X_{n\eta}\} \equiv Pr\left\{\prod_{k \neq \eta} \overline{X}_{nk}\right\} = 1 - \sum_{k \neq \eta} Pr\{X_{nk}\}.$$

Then we have $$\sum_k Pr\{X_{nk}\} = 1,$$

in which η indexes the default state. If there is not the default state, it denotes the state without input. In the example above, η=1, $Pr\{X_{31}\}=1-Pr\{X_{32}\}$. However, usually people do not need know the probability of the default state or the state without input.

Example 5

FIG. 6 is an example combining two default variables as one default variable, which is explained below.

§5.1. As shown in FIG. 6-1, the case with more than one default variable can appear when constructing the original DUCG and transforming the multiple groups in the implicit representation mode to the explicit representation mode (see §14 for details). For $X_n$ (n=3 in this example), all default variables $D_{nh}$ ($D_{31}$ and $D_{32}$ in this example) are inevitable events. What influences the state probability distribution of $X_n$ are only the functional variables $F_{n;Dh}$ ($F_{3;D1}$ and $F_{3;D2}$ in this example) along with the parameters $f_{hk;Dh}$, $a_{nk;Dh}$ and $r_{n;Dh}$. The same type parameters of different default variables are always in the summation relation during the computation. Therefore, it is not necessary for the different default variables to exist respectively. They can be combined as one default variable $D_n$ in advance. FIG. 6-2 shows the result after the combination.

Additional specification: Beside the graphical representation shown in above figures, the explicit representation mode of DUCG can also be drawn graphically as in causality trees and causality forest.

The so called causality tree means to draw the cause variables and the functional variables of an event or event variable graphically, beginning with the consequence variable. On demand, the cause variable can be taken as the beginning point of drawing upstream cause variables and functional variables. This process can continue until all the leaves are basic variables. Such constructed tree type logical diagram is called the causality tree. For example, the explicit mode representation shown in FIG. 3 can be represented in terms of causality trees shown in FIG. 7, in which the meanings of $X_1$, $X_2$, $B_3$, $G_4$, $X_5$ and $X_6$ can be described in text.

Usually, multiple consequence variables should be represented by multiple causality trees, in which some variables may be repeated. The collection of all the related causality trees can be called the causality forest. The causality forest is fully equal to the corresponding DUCG in the explicit representation mode. They can be transformed from each other. Therefore, the causality forest is a transfiguration of the DUCG in the explicit representation mode. Different from the ordinary logic trees (e.g. the fault tree, event tree and decision tree, etc), there exists uncertainties in the causality trees, which are represented by the functional variables $F_{n;i}$ and have multiple states.

Example 6

Figure 8:
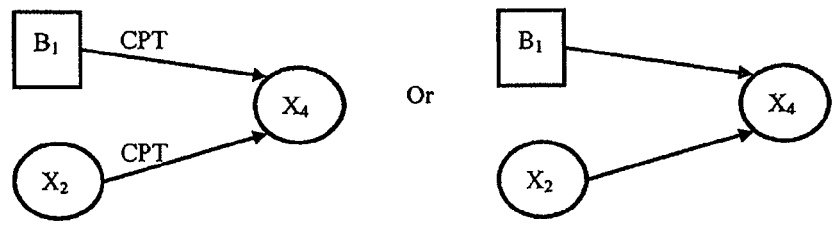
FIG. 8 is an example of the standard implicit representation mode.

FIG. 8 is an example of the standard implicit representation mode described in §6, which is explained below.

§6.1. In the implicit representation mode, connect the consequence variable $X_n$ (n=4 in this example) with its direct cause variables $V_i$ ($B_1$ and $X_2$), i∈$S_{IXn}$ (i=1,2 in this example, i.e. $S_{IXn}=\{1,2\}$), by the directed arc→pointing to $X_n$, which is different from the functional variable→, the conditional functional variable - - -> ,and the connection variable→that connects the logic gate and its input variables. Different from the explicit representation mode, the direct cause variables in the implicit representation mode are only the {B,X} type variables, but not the {G,D} type variables. The implicit representation mode takes the conditional probability table (CPT) to represent the uncertain causalities between the cause variables and the consequence variable. The so called conditional probability here is the probability of a state of $X_n$ conditioned on the state combination j of its direct cause variables $V_i$, i∈$S_{IXn}$, i.e. $p_{nkj}=Pr\{X_{nk}|j\}$. For the example shown in FIG. 8, suppose $B_1$ has three states, $X_2$ and $X_4$ have two states each. Then there are 6 state combinations of $B_1$ and $X_2$, in which the occurrence probability of the state k of $X_n$ conditioned on the $j^{th}$ state combination (j=4 in this example) is denoted as $p_{nk;j}$, where $$\sum_k p_{nk;j} = 1.$$

All the conditional probabilities are included in the conditional probability table. Thus, the causalities in FIG. 8 can be implicitly represented as shown in the following table:

| j | State Combination | Conditional Probabilities corresponding to $X_{41}$ | Conditional Probabilities corresponding to $X_{42}$ |
|---|---|---|---|
| 1 | $B_{11}X_{21}$ | $p_{41;1} = q_{41;1}/d_{4;1}$ | $p_{42;1} = q_{42;1}/d_{4;1}$ |
| 2 | $B_{11}X_{22}$ | $p_{41;2} = q_{41;2}/d_{4;2}$ | $p_{42;2} = q_{42;2}/d_{4;2}$ |
| 3 | $B_{12}X_{21}$ | $p_{41;3} = q_{41;3}/d_{4;3}$ | $p_{42;3} = q_{42;3}/d_{4;3}$ |
| 4 | $B_{12}X_{22}$ | $p_{41;4} = q_{41;4}/d_{4;4}$ | $p_{42;4} = q_{42;4}/d_{4;4}$ |
| 5 | $B_{13}X_{21}$ | $p_{41;5} = q_{41;5}/d_{4;5}$ | $p_{42;5} = q_{42;5}/d_{4;5}$ |
| 6 | $B_{13}X_{22}$ | $p_{41;6} = q_{41;6}/d_{4;6}$ | $p_{42;6} = q_{42;6}/d_{4;6}$ |

In which, the meanings of q and d will be explained later.

The reason why this mode is called the implicit representation mode is because the logic combination relation among the cause variables and between the cause and consequence variables is not explicitly represented in the conditional probability table. Even more, some variables really having the causality with the consequence variable may not appear in the cause variables, while other variables not having causalities with the consequence variable may appear in the cause variables, although they do not have any function. All these are implicitly included in the conditional probability table.

§6.2. The conditional probabilities can be obtained from the statistic data. For the example above, suppose the number of samples of the state combination 5 is $d_{4;5}$ ($d_{n;j}$ is called the number of samples), in which the number of samples including $X_{41}$ is $q_{41;5}$ ($q_{nk;j}$ is called the number of occurrence) and the number of samples including $X_{42}$ is $q_{42;5}$. Then the conditional probabilities $p_{41;5}=q_{41;5}/d_{4;5}$ and $p_{42;5}=q_{42;5}/d_{4;5}$. Obviously, $p_{41;5}+p_{42;5}=1$, because $q_{41;5}+q_{42;5}=d_{4;5}$. Suppose the number of samples of the state combination 6 is $d_{4;6}$, in which the number of samples including $X_{41}$ is $q_{41;6}$ and the number of samples including $X_{42}$ is $q_{42;5}$. Then the conditional probabilities $p_{41;6}=q_{41;6}/d_{14;6}$ and $p_{42;6}=q_{42;6}/d_{4;6}$. Similarly, $p_{41;6}+p_{42;6}=1$, because $q_{41;6}+q_{42;6}=d_{4;6}$.

In the case that the direct cause variables will never be reduced, the conditional probability $p_{nk;j}$ can be given directly in the form of the calculation result of $q_{nk;j}/d_{n;j}$. If there is the case that the direct cause variables may be reduced, the conditional probability $p_{nk;j}$ should be given in the form of two parameters $q_{nk;j}$ and $d_{n;j}$. This is because in this way, the new conditional probability table after one or more cause variables are eliminated can be calculated from the above calculation method.

Example 7

Figure 9:
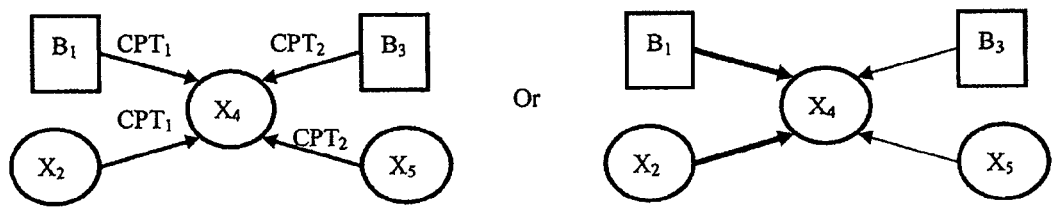
FIG. 9 is an example of the non-standard implicit representation mode.
Figure 10:
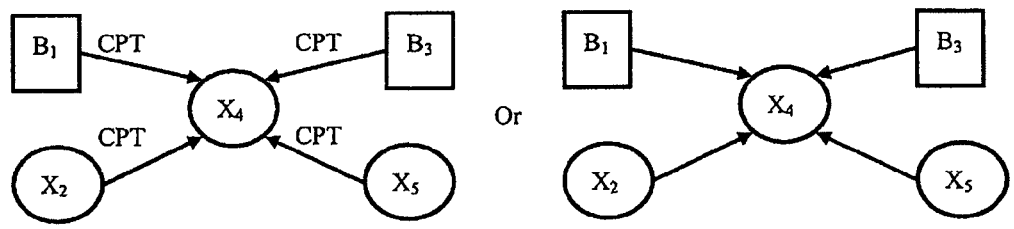
FIG. 10 is the example of transforming the non-standard implicit representation mode in FIG. 9 to the standard implicit representation mode.

FIGS. 8-10 are the further examples of the implicit representation mode described in §7, which are explained below.

§7.1. In the case that the CPT is only composed of $p_{nk;j}$, if the direct cause variable in the implicit representation mode is single-valued, this implicit representation mode is BN. As described in §6, the CPT can also be extended as being represented with $p_{nk;j}$, $q_{nk;j}$ and $d_{n;j}$ satisfying $p_{nk;j}=q_{nk;j}/d_{n;j}$. The purpose of this representation is that the CPT can be reconstructed dynamically in the case of dynamically eliminating the direct cause variables. Moreover, this invention allows more than one group of direct cause variables in the implicit representation mode, where every group has its own independent CPT. As shown in FIG. 9, the direct cause variables of $X_4$ in the implicit representation mode are divided into two groups: $\{B_1,X_2\}$ and $\{B_3,X_5\}$. The conditional probability table of the first group is $CPT_1$. The conditional probability table of the second group is $CPT_2$. $CPT_1$ and $CPT_2$ are composed independently. This case can be that the different engineers collect different data and form different CPT based on their different views and concerns. This is allowed in this invention.

In the case of more than one group, the relationship or the influence weight of every group to the consequence variable may be different. This needs be represented by a relationship parameter $r_{Xn;g}$. In FIG. 9, the relationship of the first group is $r_{X4,1}$ and the relationship of the second group is $r_{X4,2}$.

§7.2. No matter it is the standard or non-standard implicit representation mode, the direct cause variables may be dynamically reduced because of the following dynamical logic simplification or the operation to break the logic cycles during the computation, such that the CPT needs be reconstructed dynamically. As shown in FIG. 8, suppose $X_2$ is no longer the cause of $X_4$. Then the cause state combinations of $X_4$ become three: $B_{11}$, $B_{12}$ and $B_{13}$. The new conditional probability table corresponding to the original conditional probability table becomes $$p_{41;1}=q_{41;1}/d_{4;1}=(q_{41;1}+q_{41;2})/(d_{4;1}+d_{4;2}), p_{42;1}=q_{42;1}/d_{4;1}=(q_{42;1}+q_{42;2})/(d_{4;1}+d_{4;2})$$

$$p_{41;2}=q_{41;2}/d_{4;2}=(q_{41;3}+q_{41;4})/(d_{4;3}+d_{4;4}), p_{42;2}=q_{42;2}/d_{4;2}=(q_{42;3}+q_{42;4})/(d_{4;3}+d_{4;4})$$

$$p_{41;3}=q_{41;3}/d_{4;3}=(q_{41;5}+q_{41;6})/(d_{4;5}+d_{4;6}), p_{42;3}=q_{42;3}/d_{4;3}=(q_{42;5}+q_{42;6})/(d_{4;5}+d_{4;6})$$

In which, the right side on every second equator is the values before eliminating $X_2$ and the left side on every second equator is the values after eliminating $X_2$. Moreover, the numerators on the two sides of this equator are equal, and the denominators on the two sides of this equator are equal. The state combination index of the cause variable after eliminating $X_2$ is denoted as j'. Obviously, the new $p_{nk;j'}$, j'=1,2,3, are different from the original $p_{nk;j}$, j=1,2,3,4,5,6.

§7.3. In the case of more than one group, the method of reconstructing CPT is same as for the single group case, because this reconstruction is only within the group.

The case of more than one group direct cause variables in the implicit representation mode can be transformed as the single group case by twice transformations. For the example, transform the case shown in FIG. 9 to the case shown in FIG. 10. The first transformation is to transform the case of more than one group in the implicit representation mode as the explicit representation mode (see example 14 for details). The second transformation is to transform the explicit representation mode to the single group implicit representation mode (see example 15 for details).

Example 8

Figure 11:
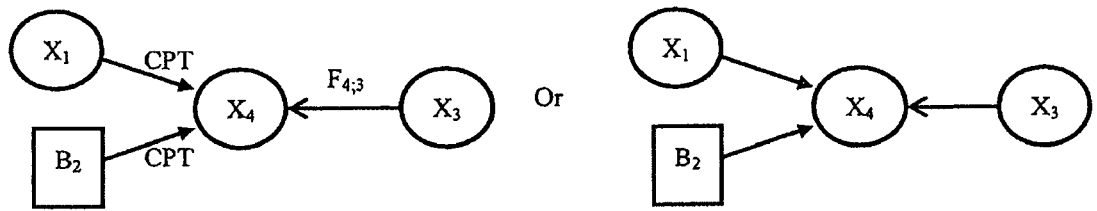
FIG. 11 is an example of the hybrid representation mode.
Figure 12:
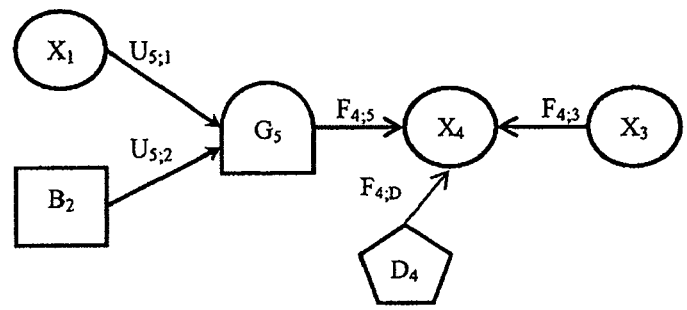
FIG. 12 is the explanation in terms of the explicit representation mode to the hybrid representation mode.

FIGS. 11 and 12 are the examples of the hybrid representation mode described in §8, which are explained below.

§8.1. In this invention, the causalities between the same consequence variable and its direct cause variables can be represented partially by the implicit representation mode and partially by the explicit representation mode. That is the hybrid representation mode.

As shown in FIG. 11, $X_1$ and $B_2$ are involved in the standard implicit representation mode by using the conditional probability table to represent their functions to $X_4$. $X_3$ is in the explicit representation mode to function to $X_4$, which may be added after collecting the statistic data of the conditional probabilities about $X_4$ conditioned on $X_1$ and $B_2$. For example, suppose $X_1$, $B_2$ and $X_4$ are same economic variables. The conditional probability table among them is obtained according to the past statistic data. $X_3$ is a variable of the economic policies to be taken by the government, and is a newly added influence factor or cause variable to $X_4$, which does not have any available statistic data except the belief of domain engineers. Then, the causality of $X_3$ to $X_4$ should be in the explicit representation mode. The real influence relation of the two representation modes to the consequence variable is as shown in FIG. 12. In which, $G_5$ is a virtual logic gate, $U_{5;1}$ and $U_{5;2}$ are respectively the connection variables between $G_5$ and $\{X_1, B_2\}$ respectively, and are the inevitable event variables. To be distinguished from the ordinary logic gate, the virtual logic gate $G_5$ is drawn in the dashed line.

The explicit functional relations represented in FIG. 12 among the various variables are actually the result of transforming the part in the implicit representation mode to be in the explicit representation mode. The explicit representation mode involves the relationship. Therefore, the relationship related to the implicit representation mode part in the hybrid representation mode needs also be given. As in this example, the domain engineers need give not only the conditional probability table about $X_1$, $B_2$ and $X_4$, but also the whole relationship $r_{X4}$ between $X_4$ and $\{X_1, B_2\}$. In default, it can be defined that $r_{X4}=2$ (i.e. the number of the cause variables in the implicit representation mode). Since the relationship is actually a relative weighing factor, the value can be larger than 1. If the case is in the non-standard implicit representation mode, then the relationship of the $h^{th}$ group is $r_{n;h}$. All these relationships must be counted in the calculation of $r_n$, i.e.

$$r_n = r_n + \sum_h r_{Xn;h},$$

in which $r_n$ on the right side is only the sum of the relationships in the explicit representation mode.

The calculation method of the truth value table and the functional intensity ($f_{4k;5j}$ in the above example) of a virtual logic gate ($G_5$ in the above example) is presented in §14.

Example 9

Figure 32:
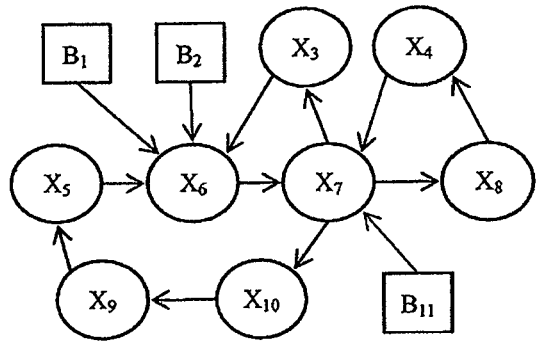
FIG. 32 is the simplified DUCG about the price influence of the agricultural products.

FIG. 32 is an example of the comprehensive representation escribed in §9, which is explained below.

§9.1. As shown in FIG. 32, represent all the X type variables ($X_3, X_4, X_5, X_6, X_7, X_8, X_9$ and $X_{10}$ in this example) and their corresponding direct cause variables (also called the input variables) in the corresponding representation mode independently and respectively. For the X type variable, do not concern the output and represent only the input. Moreover, the representation reaches only the other X type variables or the {B,D} type variables. In this way, the representation is limited in a very small scale (e.g., the input variables of $X_6$ are $B_1, B_2, X_3$ and $X_5$; the input variables of $X_7$ are $X_4$, $X_6$ and $B_{11}$; the input variable of $X_8$ is $X_7$). Every X type variable can be the input of other X type variables (e.g. $X_7$ is the input variable of $X_8$ in this example). Different X type variable may take the explicit, implicit or hybrid representation mode independently (For $X_6$ and its input variables, the explicit representation mode is taken; for $X_7$, $X_4$ and $X_6$, the standard implicit representation mode is taken; for $X_7$ and $B_{11}$, the explicit representation mode is taken, i.e. the hybrid representation mode is taken for $X_7$; for $X_8$ and its input variable, the standard implicit mode is taken). Then, simply connect all the X type variables represented in various representation modes together, the whole DUCG is obtained. In other words, no matter whether the explicit representation mode, the implicit representation mode or the hybrid representation mode is taken, the synthesis of all these representations is called the dynamical uncertain causality graph (DUCG). DUCG allows the logic cycles.

In summary, the construction steps of DUCG are: ① Initially decide the X type variables and the {B,D} type variables; ② Determine the modules according to the X type variables. Every module includes one X type variable. For every X type variable, decide its {X,B,D} type direct cause variables; ③ According to the logic relation between the X type variable and its {X,B,D} type direct cause variables and the situation of the known data, represent the uncertain causalities among them by using either explicit, implicit or hybrid representation mode respectively; ④ If it is necessary to increase, reduce or revise the X type variables or the {B,D} type variables, every module should use the new defined variables; ⑤ Connect all the modules together to synthesize the whole original DUCG (e.g. $X_7$ is the direct cause variable of $X_8$, $X_4$, $X_6$ and $B_{11}$ are the direct cause variables of $X_7$. Then $X_4$, $X_6$ and $B_{11}$ are indirectly the cause variables of $X_8$). It is seen that the feature of constructing DUCG is to decompose the task of constructing a large DUCG as many small modules first, construct these modules respectively, and the whole DUCG can be synthesized by computer automatically by connecting them together. This feature reduces the difficulty of constructing DUCG greatly.

§9.2. When all the DUCG is fully or transformed as fully represented in the single group implicit representation mode (see §15) without logic cycle, this specific DUCG is the implicit dynamical uncertain causality graph (IDUCG). IDUCG can be transformed as BN according to the method described in §21, and be solved by the method of BN. If the DUCG is all represented in the implicit representation mode, but the logic cycles and more than one group are allowed, this IDUCG is called the general BN. Correspondingly, the DUCG without logic cycle and with only one group can be called the narrow BN. If the DUCG is transformed as all in the explicit representation mode (see §14 for details), this special DUCG is called the Explicit Dynamical Causality Graph (EDUCG). Obviously, the narrow BN or IDUCG is a special case of DUCG, and EDUCG is also a special case of DUCG. But any DUCG can be transformed as EDUCG and be dealt with, because EDCUG is always an applicable representation and computation method.

§9.3. It is not hard to see that in any conditional probability table in an implicit mode representation, the number of the conditional probabilities $N=J_1J_2 \ldots J_1K$, in which $J_i$ is the number of the states of the input variable i, I is the number of the {B,X} type direct cause variables, and K is the number of the states of the consequence variable. If this group cause variables are represented with the explicit mode, the related data become the functional intensities and relationships, and the number of the data is $N'=(J_1+J_2+\ldots+J_1)K+1$. Obviously, in many cases, N>>N'. That is, the explicit representation mode is usually more convenient than the implicit representation mode. In fact, in many cases, the conditional probabilities are difficult to be obtained from the statistics due to the lack of data. In this case, the uncertainty of the logical relations among things can only be represented by the belief of the domain engineers. If still use the implicit representation mode, it may be difficult to be implemented because of too many data to be given. For example, suppose $J_i$=5 (i=1, 2, ..., 1), I=5, K=5. Then $N=5^6=15625$. If the conditional probabilities are given by $q_{nk;j}$ and $d_{n;j}$, then $N=5^6 \times 2=31250$. Obviously, even for such a small case, the data are too many to be given by people, needless to say that these data are not explicit and are hard to be given by the domain engineers. If use the explicit representation mode, $N'=5^3+5=130$ that is much less than N. It is seen that the explicit representation mode is more suitable for the belief representation of the domain engineers. However, the conditional probabilities are obtained from the statistic data and are objective and reliable. Moreover, they do not need know the logic relations among the cause variables. On the other side, the functional intensities and the causal relationships are usually given by the domain engineers and are less objective. Moreover, they need know the logic relations among the cause variables. Therefore, the two representation modes have their own advantages and disadvantages, and are all necessary to be used independently or synthetically according to the specific situation.

§9.4. Add the fuzzy evidence $E_h$ into the original DUCG as a virtual evidence variable. Let it be the consequence variable of $V_h$ in the explicit representation mode. The method will be explained in example 10 in details.

§9.5. In the specific case of the process system, as the supplement to the original DUCG, a new type representation of the logic relations among things can be added, which is the relationship table of the B type basic events and the X type consequence events. This table is defined as below.

For every basic event or the state of the basic event variable, and for every consequence event or the state of the consequence variable, give the relationship $\Psi_{nk;ij}$ such as that the former must cause the latter or must not, etc. For example, according to the knowledge of the domain engineers, given $B_{ij}$, the relation between $B_{ij}$ and $X_{nk}$ may be represented as: when $\Psi_{nk;ij}=1$, $X_{nk}$ must be true; when $\Psi_{nk;ij}=1$, $X_{nk}$ must not be true; when $\Psi_{nk;ij}=0$, whether or not $X_{nk}$ is true is unknown. Etc.

Example 10

Figure 13:
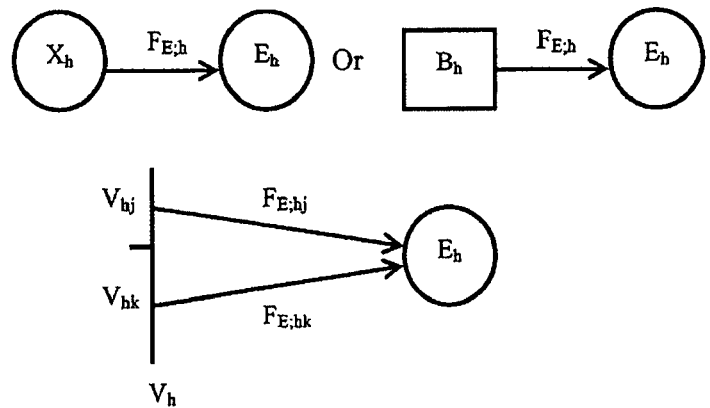
FIG. 13 is an example to treat the evidence event $E_i$ as the virtual consequence event of $V_i$.

FIG. 13 is an illustration in which the evidence event $E_h$ is taken as the virtual consequence event variable, which is explained below.

§10.1. All the online obtained evidence is expressed as E. E is composed of two type events: One is the group of evidence events with each being denoted as $E_h$, h is the index of such evidence events. They determine the states of the {B,X} type variables. Every $E_h$ represents a specific evidence event such as "the flow rate is too high", "the temperature is 185 C°", "the pressure is normal", "the alarm is on", "the probabilities of the valve being blocked or not are 70% and 30% respectively", etc. In this invention, this type events $E_h$ can be classified as three types:

(1) The ordinary evidence: i.e. the evidence indicating the state of variable $V_h$ certainly, where $V \in \{B,X\}$. For example, the temperature variable $V_h$ is observed as 185 C°, while 185 C° is certainly in the high temperature area.

(2) The fuzzy continuous evidence: i.e. the evidence certainly indicating the value of the continuous variable $V_h$, and this value is just within the fuzzy area. For example, the observed temperature $V_h$ is 185 C°, while 185 C° is just within the fuzzy area between the two fuzzily discretized states "normal" and "high" (see FIG. 2).

(3) The fuzzy state evidence: i.e. the evidence just indicating the state probability distribution of variable $V_h$, but not which state that $V_h$ is really in. For example, suppose variable $V_h$ represents the valve state (blocked or not). Before receiving any evidence, the probability distribution of whether or not the valve is blocked is given by the earlier statistic data. After receiving the evidence $E_h$, due to that the evidence is unclear or other reason, $E_h$ does not indicate whether or not the valve is blocked, but indicates only that the probabilities of the two states of the valve are 70% and 30% respectively. Moreover, this probability distribution is usually not the same as the statistic data. Such evidence is the fuzzy state evidence.

The fuzzy continuous evidence and the fuzzy state evidence are all called the fuzzy evidence briefly. This invention treats the fuzzy evidence as the ordinary evidence by transforming the fuzzy evidence as the ordinary evidence. That is, treat $E_h$ as the virtual consequence variable of $V_h$, while $E_h$ has only one certainly true state. In this way, the case of the fuzzy evidence is transformed as the case of the ordinary evidence, and the method to deal with such case becomes the same as for the ordinary case.

The other evidence of E may not deal with the states of the $\{B,X\}$ type variables, but include other useful information, such as the occurrence order of events, etc. This type evidence is denoted as $E^*$. Its function is to simplify DUCG (see example 13 for details). Therefore, $$E = E^* \prod_h E_h.$$

§10.2. The method to transform the fuzzy evidence as the ordinary evidence is as follows.

As shown in FIG. 13, treat $E_h$ as the virtual consequence variable of $V_h$. $E_h$ has only one inevitable state and has only one input $V_h$. $V_h$ and $E_h$ are connected by the virtual functional variable $F_{E;h}$. Its virtual functional intensity $f_{E;hj}=Pr\{F_{E;hj}\}$ can be given by the domain engineers. But usually, $f_{E;hj}$ is hard to be given by the experiment or the domain engineers. In this case, the following calculation method can be applied.

Suppose the fuzzy continuous evidence $E_h$ shows that the state membership of $V_{hj}$ is $m_{hj}$ and the fuzzy state evidence $E_h$, shows that the state probability distribution of $V_h$ is $Pr\{V_{hj}|E_h\}=m_{hj}$. The fuzzy area related to $E_h$ or the known state probability distribution deals with at least two states of $V_h$. The memberships of $E_h$ belonging to these states are all larger than 0. Meanwhile, the other states cannot be true. Denote $S_m$ as the index set of those states of $V_h$ for which $m_{hj}>0$. Then, $$\sum_{j \in S_{Eh}} m_{hj} = 1 \text{ and } \sum_{j \in S_{Eh}} V_{hj} = \Omega$$

(the complete set). It can be proved that $f_{E;hj}$ can be calculated from the following equation.

$$f_{E;hj} = \frac{m_{hj} v_{hk}}{m_{hk} v_{hj}} f_{E;hk}$$

In which, $j \neq k$, $j \in S_{Eh}$, $k \in S_{Eh}$, $V_{hj} \equiv Pr\{V_{hj}\}$ and $V_{hk} \equiv Pr\{V_{hk}\}$. Given $f_{E;hk}$, $f_{E;hj}$ can be calculated. For example, let $f_{E;hj}=1$, $$f_{E;hj} = \frac{m_{hj} v_{hk}}{m_{hk} v_{hj}}.$$

Proof:

(1) For the fuzzy state evidence, since Eh indicates the known probability distribution of a variable, we have $$m_{hj} = Pr\{V_{hj} | E_h\} = \frac{Pr\{V_{hj}E_h\}}{Pr\{E_h\}} = \frac{Pr\left\{V_{hj}\sum_{k \bar{i} S_{Eh}} F_{Ehk} V_{hk}\right\}}{Pr\left\{\sum_{k \bar{i} S_{Ehi}} F_{Ehk} V_{Ehk}\right\}}$$

$$= \frac{Pr\{F_{Ehj} V_{hj}\}}{\sum_{k \in S_{Eh}} Pr\{F_{Ehk} V_{hk}\}} = \frac{Pr\{F_{Ehj}\}Pr\{V_{hj}\}}{\sum_{k \in S_{Eh}} Pr\{F_{Ehk}\}Pr\{V_{hk}\}}$$

$$= \frac{f_{Ehj} v_{hj}}{\sum_{k \in S_{Eh}} f_{Ehk} v_{hk}}$$

In which, $v_{hj} \equiv Pr\{V_{hj}\}$ and $v_{hk} \equiv Pr\{V_{hk}\}$. The calculation method of $v_{hj}$ and $v_{hk}$ is: Transform the original DUCG as EDUCQ, outspread $v_{hj}$ as the logic expression composed of the $\{B,D,F\}$ type events (see §16.1 for details), then take the values of the corresponding probability, frequency or the probability density into the expression, so as to get $v_{hj}$ and $v_{hk}$. If there is not logic cycle, the original DUCG can also be transformed as IDCUG (see example 15 for details). In the case without evidence, IDUCG=BN (see §21) and the calculation method of BN can be used to calculate $v_{hj}$ and $v_{hk}$.

(2) For the fuzzy continuous evidence, define $\Delta E_h$ as the small interval including the value $e_h$. The meaning of the operator $\Delta$ means: take the small interval including the value of the variable being operated. $\Delta \to 0$ indicates the interval tends to be infinite small. According to the meaning of the fuzzy state membership of the continuous variable, we have $$m_{hj} = Pr\{V_{hj} | E_h\} = \lim_{\Delta \to 0} Pr\{V_{hj} | \Delta E_h\}$$

$$= \lim_{\Delta \to 0} \frac{Pr\{V_{hj} \Delta E_h\}}{Pr\{\Delta E_h\}}$$

$$= \lim_{\Delta \to 0} \frac{Pr\left\{V_{hj} \sum_{h \in S_{Ei}} V_{hk} \Delta F_{Ehk}\right\}}{Pr\left\{\sum_{k \in S_{Ehj}} V_{hk} \Delta F_{Ehk}\right\}}$$

-continued $$= \lim_{\Delta \to 0} \frac{Pr\{V_{hj}\Delta F_{Ehj}\}}{Pr\left\{\sum_{k \in S_{Eh}} V_{hk}\Delta F_{Ehk}\right\}}$$

$$= \lim_{\Delta \to 0} \frac{Pr\{V_{hj}\}Pr\{\Delta F_{Ehj}\}}{\sum_{k \in S_{Eh}} Pr\{V_{hk}\}Pr\{\Delta F_{Ehk}\}}$$

$$= \lim_{\Delta \to 0} \frac{v_{hj} f_{Ehj}(e_h)\Delta e_h}{\sum_{k \in S_{Eh}} v_{hk} f_{Ehk}(e_h)\Delta e_h}$$

$$= \frac{v_{hj} f_{Ehj}}{\sum_{k \in S_{Eh}} v_{hk} f_{Ehk}}$$

It is seen that the results of the fuzzy state evidence and the fuzzy continuous evidence are same, in which $j \in S_{Eh}$, $m_{hj}$, and $v_{hj}$ are known. Thus we have $$\frac{v_{hj}}{m_{hj}} f_{Ehj} = \sum_{k \in S_{Eh}} v_{hk} f_{Ehk}.$$

The right side of the equator is a constant independent of the left side. Therefore, $$\frac{v_{hj}}{m_{hj}} f_{Ehj} = \frac{v_{hk}}{m_{hk}} f_{Ehk},$$

$\neq k$, and $j,k \in S_{EH}$.
That is, $$f_{Ehj} = \frac{m_{hj} v_{hk}}{m_{hk} v_{hj}} f_{Ehk}$$

∎

The functional intensity $f_{E;hj}$ calculated from the above method may be greater than 1, because it is actually the probability density. The functional intensity in the form of the probability density is the same for the calculation as in the form of probability, i.e. the probability density can be treated as the probability, because their significance is the relative magnitude. Whether or not the numerical value is greater than 1 as well as the dimension of the density does not affect the calculation result (see §11.2).

Example 11

This example illustrates the method presented in §11, which is explained below.

§11.1. The method to logically simplify the DUCG given E can be seen in details in example 13. The method to transform the simplified DUCG as EDUCG can be seen in details in example 14. The method to transform the simplified DUCG as IDUCG can be seen in details in example 15, in which the transformation is made only when the DUCG does not have any logic cycle. This is because in the case of logic cycle, there is no effective computation method at the present time. Therefore, when there is logic cycle in the simplified DUCG, it can only be transformed as EDUCG.

§11.2. The purpose of applying the intelligent system is to calculate the new probability distribution of the event in concern conditioned on E. Suppose the event in concern is $H_{kj}$. Usually, $H_{kj}$ is composed of the {B,X,D} type events in the simplified DUCG. In which, $H_k$ is the combination of the variables in concern, e.g. $B_i$, $X_n$, $B_i$, $B_1'$, etc. They are distinguished by the index k. $H_{kj}$ is the state j of $H_k$, e.g. $B_{ij}$, $X_{nk}$, $B_{ij}B_{i'j'}$, etc. In other words, $H_{kj}$ is the state combination indexed by j of the variables included in $H_k$. Since D is the inevitable event, $H_{kj}$ is in fact composed by only the {B,X} type events. The so called intelligent inference in the intelligent system is actually to calculate $Pr\{H_{jk}\|E\}$. In this invention, they are calculated according to the following equation.

$$Pr\{H_{kj} \mid E\} = \frac{Pr\{H_{kj}E\}}{Pr\{E\}}$$

This calculation result is called the state probability, because it is normalized according to the states of $H_k$.
Proof:

$$\sum_j Pr\{H_{kj} \mid E\} = \frac{\sum_j Pr\{H_{kj}E\}}{Pr\{E\}}$$

$$= \frac{\sum_j Pr\{H_{kj}E\}}{Pr\{E\sum_j H_{kj}\}}$$

$$= \frac{\sum_j Pr\{H_{kj}E\}}{\sum_j Pr\{H_{kj}E\}}$$

$$= 1$$

∎

The probability normalized according to the states is denoted as $h_{kj}^s$, i.e.

$$h_{kj}^s = \frac{Pr\{H_{kj}E\}}{Pr\{E\}} = \frac{Pr\{H_{kj}E\}}{\sum_j Pr\{H_{kj}E\}}$$

The normalization can also be based on the possible solution set S. In this case, the calculation result is called the rank probability denoted as $h_{kj}^r$. S is the set composed of all the possible solutions for the problem to be solved conditioned on E. These solutions are different events $H_{kj}$. Physically, they are exclusive with each other. For example, suppose $H_{kj}=B_{1,2}$ and $H_{k'j'}=B_{1,2}B_{2,3}$. If just look the sets themselves, $H_{kj}$ must be true given $H_{k'j'}$, although the occurrence probabilities of them may be different. But physically, $B_{1,2}$ and $B_{1,2}B_{2,3}$ may be totally different events. In this case, $H_{kj}$ and $H_{k'j'}$ should be treated as two exclusive events (otherwise $H_{k'j'}$ should be absorbed by HO. After understanding the nature of the exclusion of the elements included in S, we have the following calculation equation.

$$h_{kj}^r = \frac{h_{kj}^s}{\sum_{H_{kj} \in S} h_{kj}^s} = \frac{Pr\{H_{kj}E\}}{Pr\{E\}} \Big/ \sum_{H_{kj} \in S} \frac{Pr\{H_{kj}E\}}{Pr\{E\}} = \frac{Pr\{H_{kj}E\}}{\sum_{H_{kj} \in S} Pr\{H_{kj}E\}}$$

According to the above equation, it can be known that it does not matter what dimension of the parameters included in E is used, because the dimensions in both the nominator and denominator are the same. Thus the calculation result is always the number without dimension, i.e. the probability. In other words, the unconditional occurrence probability $b_{ij}$ of $B_{ij}$ can be replaced by its occurrence rate $\lambda_{ij}$. Meanwhile, the occurrence probability $f_{nk;ij}$ of $F_{nk;ij}$ can be replaced by the probability density.

§11.3. To do the above calculation, E must be outspreaded. The events included in E can be classified as two types: One is the evidence event $E_h$ determining the state of the $\{B,X\}$ type variable. For example, suppose $X_h$ is the temperature variable. If $E_h$ shows that the temperature value is $e_h$, then $E_h$ is the evidence determining the state of the $\{B,X\}$ type variable. The collection of this type evidence events is $$\prod_h E_h.$$

Another type includes the other evidence events, e.g. the occurrence order of events (e.g. $X_{nk}$ occurs earlier than $X_{n'k'}$), etc. The set of these events is denoted as E*. Thus E is classified as $$E = E^* \prod_h E_h.$$

The function of E* is to simplify the E conditional original DUCG (see example 13 for details). In the probability calculation based on the simplified DUCG, $$Pr\{H_{kj} | E\} = Pr\left\{H_{kj} \middle| E^* \prod_h E_h\right\} = Pr\left\{H_{kj} \middle| \prod_h E_h\right\}$$

This is because the information of E* has been used out in the simplified DUCG and is no longer related to $H_{kj}$ and $$\prod_h E_h.$$

Therefore, to calculate $h_{kj}^s$ and $h_{kj}^r$, we need only logically outspread and simplify $$\prod_h E_h \text{ and } H_{kj} \prod_h E_h,$$

until the logic expression is compound of only the $\{B,X\}$ type basic events and the F type functional events. The detailed method of the outspread and simplification is explained in example 16.

§11.4. As described above, the outspreaded and simplified expression of $$\prod_h E_h \text{ and } H_{kj} \prod_h E_h$$

are composed of only the $\{B,D\}$ type basic events and the F type functional events.

These basic events and functional events are independent of each other. Moreover, the different items (i.e. the logic AND of the basic events and functional events) are exclusive with each other (this is because the direct cause variables in the explicit representation mode are in the simple probability summation relation, while the input logic expressions in the truth value table of a logic gate are also exclusive (see §18.1 for details)). Therefore, the parameters $b_{ij}$, $f_{nk;ij}$ and $f_{nk;D}$ of the basic events and the functional events can directly replace the corresponding events in the logic expression for the numerical calculation.

§11.5. It should be pointed out that the normalization factor $r_n$ used in $f_{nk;ij}$ and $f_{nk;D}$ should be calculated according to the actual direct cause variables of $X_n$ in the dynamically outspreaded expression, but not the direct cause variables of $X_n$ in the original DUCG. This is because the direct cause variables of $X_n$ may change during the dynamical outspread. This principle applies in all numerical probability calculations of this invention.

Example 12

This example is about the method described in §12 and is explained below.

§12.1. As shown in §11.3, in the probability calculation, E is equivalent to $$\prod_h E_h,$$

in which $E_h$ is the evidence event indicating the state of the $\{B,X\}$ type variable. In the specific case of process system, $$\prod_h E_h = E'E'',$$

in which $$E' = \prod_i E'_i$$

that is composed of the evidence $E'_h$ indicating the changed state of the $\{B,X\}$ type variable, e.g. the temperature is high, etc;

$$E'' = \prod_{i'} E''_{i'}$$

is composed of the evidence $E'_h$ indicating the unchanged state of the $\{B,X\}$ type variable, e.g. the pressure $X'_h$, is normal, etc. Logically outspread and simplify E', until the expression is composed of only the $\{B,D,F\}$ type events. The method of the outspread and simplification is described in §16. Moreover, according to the method described in §19, the possible solution set S conditioned on E may be further obtained. S is composed of the possible solution events $H_{kj}$ conditioned on E. §12.2. According to the outspread expressions of E' and $H_{kj}E'$, calculate $Pr\{E'\}$ and $Pr\{H_{kj}E'\}$. Then, calculate the state probability $h_{kj}^{s'}$ of $H_{kj}$ with incomplete information according to the following equation:

$$h_{kj}^{s'} = Pr\{H_{kj} \mid E'\} = \frac{Pr\{H_{kj}E'\}}{Pr\{E'\}}$$

This is the probability normalized according to the states of $H_{kj}$ with incomplete information, and is the probability distribution of $H_k$. It can be used to predict system faults. For example, when $h_{kj}^{s'}=0.001 \approx Pr\{H_{kj}\}$, the occurrence possibility of the fault $H_{kj}$ is small. But when $h_{kj}^{s'}=0.4 >> Pr\{H_{kj}\}$, the occurrence possibility of the fault $H_{kj}$ is significantly increased, so that people should take measures to prevent or avoid this fault in time.

§12.3. According to $$h_{kj}^{r'} = \frac{h_{kj}^{s'}}{\sum_{H_{kj} \in S} h_{kj}^{s'}} = \frac{Pr\{H_{kj}E'\}}{\sum_{H_{kj} \in S} Pr\{H_{kj}E'\}}$$

the rank probability $h_{kj}^{r'}$ of $H_{kj}$ with incomplete information can be calculated. This probability of $H_{kj}$ is conditioned on the incomplete information and normalized according to the possible solution set S. It is the rank of $H_{hk}$ in S, and can be used to determine which is more possible when there is more than one possible solution. As the rank probability does not require the calculation to all states of $H_{kj}$, the default state of $H_k$ is usually not involved. Moreover, since $Pr\{E'\}$ is the same for all $H_{kj}$, it is possible to calculate only $Pr\{H_{kj}E'\}$. In the case of the process system, the calculation to $Pr\{H_{kj}E'\}$ is usually simpler than $Pr\{E'\}$, because $H_{kj}$ usually involves an initiating event and therefore the logic outspread can be simplified greatly, while E' usually involves a lot of initiating events. This is because the result of the logic AND operation between different initiating events is null "0" (see §1.4).

The so called "incomplete information" means that the numerical calculation does not include E". However, when simplify IYUCG, the partial information of E" has been used, but not all. In the case without high requirement to the accuracy of calculation but with high requirement to the calculation speed, the calculation result with incomplete information can usually meet the requirement.

§12.4. The following method is usually applied in this invention to calculate the probability with the complete information.

$$h_{kj}^{s} = Pr\{H_{kj} \mid E\}$$
$$= Pr\{H_{kj} \mid E^* \prod_h E_h\}$$
$$= Pr\{H_{kj} \mid \prod_h E_h\}$$
$$= Pr\{H_{kj} \mid E'E''\}$$
$$= \frac{Pr\{H_{kj}E'E''\}}{Pr\{E'E''\}}$$
$$= \frac{Pr\{H_{kj}E'\}Pr\{E'' \mid H_{kj}E'\}}{\sum_j Pr\{H_{kj}E'\}Pr\{E'' \mid H_{kj}E'\}}$$
$$= \frac{Pr\{E'\}Pr\{H_{kj} \mid E'\}Pr\{E'' \mid H_{kj}E'\}}{Pr\{E'\}\sum_j Pr\{H_{kj}E'\}Pr\{E'' \mid H_{kj}E'\}}$$

-continued
$$= \frac{h_{kj}^{s'} Pr\{E'' \mid H_{kj}E'\}}{\sum_j h_{kj}^{s'} Pr\{E'' \mid H_{kj}E'\}}$$

In which, if $H_{kj}E'=0$, $Pr\{E'' \mid H_{kj}E'\} \equiv 0$. In this case, there must be $h_{kj}^{s}=0$.

Similar to the above, this invention calculates the rank probability of $H_{kj}$ with the complete information according to the following calculation method.

$$h_{kj}^{r} = \frac{h_{kj}^{s'} Pr\{E'' \mid H_{kj}E'\}}{\sum_{H_{kj} \in S} h_{kj}^{s'} Pr\{E'' \mid H_{kj}E'\}}$$

similarly, if $H_{kj}E''0$, $Pr\{E'' \mid H_{kj}E'\} \equiv 0$. In this case, there must be $h_{kj}^{r}=0$.

The calculation method of $Pr\{E'' \mid H_{kj}E'\}$ is as follows: The first is to logically outspread E". The outspread continues until the events included in $H_{kj}$ or E' and the {B,D} type events. If the event appearing in the outspread is exclusive with or $H_{kj}$ or E', this event is null "0". If the event appearing in the outspread is included in $H_{kj}$ or E', this event is the complete set "1". Finally, the logic expression of E" will include only the {B,D,F} type events. $H_{kj}E'$ can also be outspreaded as composed of the {B,D,F} type events, and thus be calculated according to the ordinary conditional probability calculation equation through the outspread of $E''H_{kj}E'$ and $H_{kj}E'$ as the {B,D,F} type events. Thus, $$Pr\{E'' \mid H_{kj}E'\} = \frac{Pr\{E'' H_{kj}E'\}}{Pr\{H_{kj}E'\}}$$

In general, the events in E" are the default events. Since DUCG allows the incomplete representation, the causes of the default events may not be represented in DUCG. In this case, the default events can be outspreaded according to the operation of AND after NOT of the non-default events (see example 22 for details).

From the above, the state and rank probabilities of $H_{kj}$ with complete information can be calculated respectively.

Example 13

This Example is about the method presented in §13, which is explained below.

§13.1. The simplification of the original DUCG is based on the observed evidence E. First, E includes the observed information about the {X,B} type variables in the original DUCG, in which, some of them are the ordinary evidence and some of them are fuzzy evidence (see §10.1 for details). They are represented as $$\prod_h E_h.$$

More generally, E may include the other non-$E_h$ type evidence E*. By means of the general E, the original DUCG can be simplified greatly, so that the subsequent computation can be reduced greatly.

§13.2. The detailed simplification method is explained below.

(1) By utilizing the relationship table between the basic events and the consequence events described in §12.1, some states of the B type basic event variables can be excluded (i.e. let them be null sets). If all the concerned states of a basic event variable are excluded, this variable is eliminated from the E conditional original DUCG. For example, when E includes $X_{nk}$, if the relationship between $B_{ij}$ and $X_{nk}$ is then $\Psi_{nk;ij}=-1$, then $B_{ij}=0$. When E does not include $X_{nk}$ but includes $X_{nh}$ (h≠k), while the relationship between $B_{ij}$ and $X_{nk}$ is $\Psi_{nk;ij}=1$, then $Br_{ij}=0$. If all meaningful states of $B_i$ are null 0, $B_i$ is eliminated, and the functional variable and the conditional functional variable with $B_i$ as the input are also eliminated.

(2) According to E, determine whether or not the condition $C_{n;i}$ of the conditional functional variable is valid, thus to determine whether the conditional variable becomes the functional variable or is eliminated. When only E cannot determine whether $C_{n;i}$ is valid or not, keep it until the other information appears so that the validation can be determined. Since $C_{n;i}$ is given in advance, the evidence determining whether or not $C_{n;i}$ is valid should be collected consciously according to the need.

(3) Since DUCG does not require the completeness, there may be the case in which the partial states of some variables are the causes of a consequence variable, while the other states are not the causes. Suppose the partial states of $V_2$ are the causes of $X_5$. Then there must be some functional or conditional functional variables between $V_2$ and $X_5$ in the DUCG (for simplicity, except being specified specially, these functional and conditional functional variables are all called the directed arcs briefly). Suppose state $V_{22}$ is not the cause of $X_5$. When E shows that $V_2$ is in its state $V_{22}$, the directed arc from $V_2$ to $X_5$ can be eliminated.

(4) Suppose $X_{53}$ cannot be caused by any state of $V_2$. When E shows that $X_{53}$ is true, the directed arc from $V_2$ to $X_5$ can be eliminated.

(5) If the consequence variable or the logic gate without input is generated, the consequence variable or the logic gate, as well as the corresponding directed arc starting from them (as causes) should be eliminated (the virtual logic gate is an exception, because once all the input variables of the virtual logic gate are eliminated, this virtual logic gate becomes a default variable).

(6) If there is any isolated part without any connection with the part related to E in the DUCG, this isolated part can be eliminated, because this part is useless for the computation of the new probability distributions of the variables remaining in DUCG conditioned on E.

(7) If E shows that $X_{51}$ and $X_{61}$ are true (η=1), while DUCG shows that $X_{51}$ and $X_{61}$ are not the causes of any other variable, $X_5$ and $X_6$ are also not the direct or indirect consequence variables of other variables related to E, meanwhile $V_2$ along with its logic connection variables are not connected in any way with any variables related to E, then $X_5$, $X_6$, $V_2$, the directed arcs $F_{5;2}$ and $F_{6;2}$ between $V_2$ and $X_5$ and $X_6$, along with the variables connected with $V_2$, can all be eliminated. This is because the eliminated part is not related to the part related to E and becomes an isolated part that is not related to the new probability distributions of the variables in DUCG conditioned on E.

(8) When $X_{nk}$ is caused by $V_{ij}$, $X_{nk}$ can not appear earlier than $V_{ij}$. Therefore, if E shows that $X_{nk}$ appears earlier than $V_{ij}$, which determines that $V_{ij}$ is impossible to be the cause of $X_{nk}$, the functional and conditional functional variables between $V_i$ and $X_n$ but not related to the influence of other variables to $X_n$ are eliminated. The reason why without influence of other variables to $X_n$ is required is because the states of other variables may appear earlier than the state of $X_B$. For example, suppose $X_2$ and $X_5$ in DUCG are causes of each other. But E shows that the state of $X_5$ appears earlier than the state of $X_2$, then $X_2$ cannot be the cause of $X_5$. Therefore, the directed arc from $X_2$ to $X_5$ but not related to other causalities is eliminated.

(9) The above procedures can be implemented in any order on demand, and can be repeated at any time, so that the DUCG can be simplified greatly.

§13.3. It should be pointed out that as the time goes on, E may change dynamically. For the E at every time point, the simplification should be based on the original DUCG, so that the result of the simplification is consistent with the situation reflected by the E at that time point.

Example 14

FIGS. 11 and 12 are the illustration about the method described in §14, which is explained elow.

§14.1. The implicit representation mode or the hybrid representation mode includes at least one group direct cause variables in the implicit representation mode. Therefore, the transformation from the single group implicit representation mode to the explicit representation mode is the key to transform any implicit or hybrid representation mode to the explicit representation mode.

The single group implicit representation mode can be transformed to the explicit representation mode by adding a virtual logic gate. As shown in FIG. 11, the direct cause variables in the same group of implicit representation mode are $B_1$ and $X_2$. It can be transformed to the explicit representation mode as shown in FIG. 12. The default event $D_n$ that is implicated in the CPT can be abstracted as an independent variable first (in FIG. 11, n=4). The calculation method of $f_{nk;D}$ is: for every k, seek the minimal $p_{nk}$, denoted as $p_{nk}$, i.e.

$$p_{nk} = \min_{j}\{p_{nk;j}\}.$$

If $p_{nk}=0$ for all k, $D_n$ does not exist, because the state of $X_n$ is completely related to the state combinations of the input variables, which means that there is no cause variable independent of the original input variables according to the CPT. The abstracted $p_{nk}$ can be viewed as the independent contribution of $D_n$ to $X_n$, but cannot be treated as $a_{nk;D}$ directly, because $p_{nk}$ is not normalized so far. After the normalization, we have $$a_{nk;D} = p_{nk} \bigg/ \sum_k p_{nk}.$$

Meanwhile, the relationship of $F_{n;D}$ is $$r_{n;D} = r_{Xn} \sum_k p_{nk},$$

in which $r_{Xn}$ is the whole relationship between the input variables and $X_n$ in the implicit representation mode.

$$\sum_k p_{nk}$$

is the proportion of $D_n$ should have. If it is transformed as all in the single group implicit representation mode, $r_{Xn}$ can be any value great than 0.

After the abstraction of $D_n$, the original CPT should be reconstructed: i.e. eliminate the part form the abstracted $D_n$ and then perform the normalization:

$$p_{nk;j} = (p_{nk;j} - p_{nk}) \bigg/ \sum_k (p_{nk;j} - p_{nk})$$

$$= (p_{nk;j} - p_{nk}) \bigg/ \left(1 - \sum_k p_{nk}\right)$$

In which, the right $p_{nk;j}$ is the value before the reconstruction and the left is the value after the reconstruction. The sample number $d_{n;j}$ remains same, while the occurrence number $q_{nk;j} = p_{nk;j}{}^d{}_{nj}$ ($p_{nk;j}$ is the value after the reconstruction).

If $1 - \sum_k p_{nk} = 0$, then the state combination of the cause variables in the implicit representation mode are not related to the state of $X_n$ and depends only the influence of $D_n$. In this case, the cause variables in the implicit representation mode are not the cause of $X_n$, but only $D_n$ is. Meanwhile, $a_{nk;D} = P_{nk}$ and $R_{n;D} = r_{Xn}$.

After the above reconstruction, this group of cause variables in the implicit representation mode are taken as the input of a virtual logic gate ($G_5$ in FIG. 12), and this logic gate is taken as the cause variable of the consequence variable ($X_4$ in FIG. 12). They are connected through a virtual functional variable ($F_{4;5}$ in FIG. 12). The states of the virtual logic gate are the state combinations of the cause variables. The virtual functional intensities are the reconstructed conditional probabilities, i.e. $a_{nk;ij} = p_{nk;j}$, in which i indexes the virtual lgic gate (i=5 in example 12), j indexes the states of the virtual logic gate (j=1,2, . . . , 6 in example 12) and also indexes the state combinations of the cause variables, k indexes the state of the consequence variable (k=1,2 in example 12).

The relationship $r_{n;j}$ of $F_{n;j}$ ($F_{4;5}$ in example 12) is $$r_{n;i} = r_{Xn}\left(1 - \sum_k p_{nk}\right),$$

in which i indexes the virtual logic gate (i=5 in example 12). As mentioned earlier, $r_{Xn}$ is the whole relationship between the direct cause variables and the consequence variable in the implicit representation mode.

When there is only one input variable of the virtual logic gate, this virtual logic gate can be ignored, i.e. take the input variable of the virtual logic gate directly as the input of the functional variable output from the virtual logic gate. The functional intensities are the new conditional probabilities after the reconstruction directly.

If the implicit representation mode involves more than one group, more than one default variable $D_{nh}$ will be produced after transforming every group into the explicit representation mode. These default variables should be combined as one default variable $D_n$. The method is as described in §5.

Example 15

The example about the method described in §15, which is explained below.

§15.1. For every state combination of the direct cause variables, calculate the corresponding probabilities of the consequence variable according to the logic gates, functional intensities and relationships given in the explicit representation mode. The sum of these probabilities may be less than or equal to 1. If less than 1, the gap can be given to the default state, so that the sum is 1. This is the meaning of step (6) of §15. If there is no default state, there should be $$\sum_k a_{nk;ij} = 1,$$

because usually, in the case without default state, the complete probability data for every state combination between the consequence variable and the direct cause variables should be given, so that $$\sum_k Pr\{X_{nk}\} = 1.$$

This is because after giving the state combination j of the direct cause variables, $$\sum_k Pr\{X_{nk}\} = \sum_i \left((r_{n;i}/r_n)\sum_k a_{nk;ij}\right) = \sum_i r_{n;i}/r_n = 1.$$

If there is no default state, nor $$\sum_k a_{nk;ij} = 1,$$

these probabilities must be normalized, i.e. these probabilities are divided by the sum of them. This case is coming from the incompleteness of the representation, which is allowed in the explicit representation mode. But for the implicit representation mode, the conditional probability table must satisfy the normalization. Therefore, in the case of being transformed to the implicit representation mode, the normalization should be done. This is the meaning of step (7) of §15. Finally, the probabilities satisfying the normalization are then the conditional probabilities in the implicit representation mode.

§15.2. The probability contributions to the state probability of the consequence variable from the direct cause variables are in the simple summation relation, i.e. when there is more than one direct cause variable, it is impossible to define that a state of a direct cause variable certainly causes a state of a consequence variable. But when transforming it to the implicit representation mode, this limitation can be removed: The case that the functional intensity in the explicit representation mode $a_{nk;ij} = 1$ is viewed as that the state k of the consequence variable n is certainly true, i.e. when the direct cause variable $V_i$ is in its state j, the states except state k of the consequence variable n cannot be true. If this definition is chosen, when being transformed to the standard implicit representation mode, the state of the consequence variable corresponding to this functional intensity can be treated as certainly true (i.e. the conditional probability equals to 1), while the other states cannot be true. This is the content described in step (4). If there are m cases in which the functional intensity equals to 1 indicating that m different states of the consequence variable are certainly true, the m conditional probabilities equal to 1 should be normalized and the result is 1/m, while before the normalization these conditional probabilities equal to 1. This is because the different states of $X_n$ cannot appear simultaneously, and therefore the compromise has to be made. Obviously, if we want to have the explicit representation mode and while choose to understand $a_{nj;ij}=1$ as that the state k of the consequence variable n must be true (this can be viewed as the non-standard explicit representation mode), we can transform this non-standard explicit representation mode as the single group implicit representation mode first, and then transform it back to the explicit representation mode as described in §1.

§15.3. With the method of transforming the explicit representation mode as the implicit representation mode, the correctness of the mutual transformations between the implicit representation mode and the explicit representation mode can be proved, i.e. transform the implicit representation mode to the explicit representation mode first, and then transform it back to the implicit representation mode. The proof is below:

For simplicity, consider only the case of single group implicit representation mode. Given the state combination j of the direct cause variables in the implicit representation mode, according to the calculation based on the transformed explicit representation mode, the probability contributions to $X_{nk}$ come from two parts: the default variable $D_n$ and the state j of the virtual logic gate $G_i$ in the transformed explicit representation mode, i.e., $$Pr\{X_{nk} \mid j\} = f_{nk;D} + f_{nk;ij}$$

$$= (r_{n;D}/r_n)a_{nk;D} + (r_{n;i}/r_n)a_{nk;ij}$$

$$= \left(r_{Xn}\sum_k p_{nk}/r_n\right)\frac{p_{nk}}{\sum_k p_{nk}} +$$

$$\left(r_{Xn}\left(1-\sum_k p_{nk}\right)/r_n\right)\frac{p_{nk;j} - p_{nk}}{1 - \sum_k p_{nk}}$$

$$= (r_{Xn}/r_n)(p_{nk} + p_{nk;j} - p_{nk})$$

$$= \frac{r_{Xn}p_{nk;j}}{r_{n;D} + r_{n;i}}$$

$$= \frac{r_{Xn}p_{nk;j}}{r_{Xn}\sum_k p_{nk} + r_{Xn}\left(1-\sum_k p_{nk}\right)}$$

$$= p_{nk;j}$$

It is seen that the result is the conditional probability in the implicit representation mode.

According to the above transformation method, the DUCG in any representation mode can be transformed as all in the explicit representation mode (EDUCG), or transformed as all in the single group implicit representation mode (IDUCG). In which, when part of the DUCG is in the more than one group implicit representation mode, transform it as the explicit representation mode first according to the method described in §14, and then transform it as the single group implicit representation mode according to the method described in §15.

Figure 33:
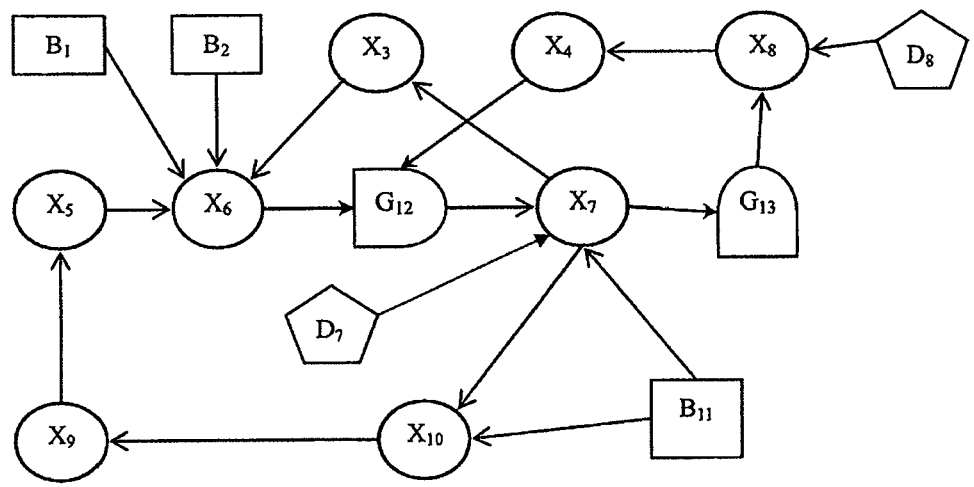
FIG. 33 is the transformed EDUCG from FIG. 32.

FIG. 33 is a specific example of transforming the DUCG in FIG. 32 as EDUCG.

Example 16

The illustration about the method presented in §16, which is explained below.

§16.1. As shown in §11.3, based on the simplified DUCG, $$Pr\{H_{kj} \mid E\} = Pr\left\{H_{kj} \mid E^*\prod_h E_h\right\} = Pr\left\{H_{kj} \mid \prod_h E_h\right\}$$

For the process system, there is (see §12)

$$Pr\{H_{kj} \mid E\} = Pr\left\{H_{kj} \mid \prod_h E_h\right\}$$

$$= Pr\{H_{kj} \mid E'E''\}$$

$$= Pr\left\{H_{kj} \mid \prod_i E'_i \prod_{i'} E''_{i'}\right\}$$

In which, $$E' = \prod_i E'_i \text{ and } E'' = \prod_{i'} E''_{i'};$$

$E'_i$ and $E''_{i'}$ are all the $E_h$ type evidence events indicating the states of the {B,X} type variables.

If $E_h$ is the ordinary evidence, $E_h$ is a {B,X} type event. The B type events do not need the outspread. Only the X type events need the outspread. If $E_h$ is the fuzzy evidence of $X_n$, as shown in §10, $E_h=F_{E;n}X_n$, where $F_{E;n}$ is the virtual functional variable from $X_n$ to $E_h$. It is seen that $E_h$ still come down to the outspread of $X_n$.

Moreover, $H_{kj}$ is composed of the {B,X,D} type events, for which the {B,D} type events do not need the outspread. The only events needing the outspread are still the X type events.

According to the explicit representation mode, $$X_{nk} = \sum_i F_{nk;i}V_i,$$

or more generally $$X_n = \sum_i F_{n;i}V_i,$$

where V∈{X,B,G,D}.

It is obvious that when V=X, the outspread involves the further X type variables. During the outspread process, once there is logic cycle, the repeated variable on the cause or upstream side in the causality chain must be in the earlier moment, and its probability distribution must be known according to the earlier moment calculation. If the time is not involved, i.e. the system is viewed as in the same time slice, which is called the static case, the following principle is applied to break the logic cycle: the consequence cannot be the cause of itself in the same time slice. In other words, in the static outspread process, once a variable in the same causality chain is encountered repeatedly, this repeated variable is viewed as null. When all the input variables of a logic gate are eliminated, this logic gate and its output functional variables are all viewed as null.

The static case is the most common case for the intelligent system, because the dynamical case is usually simplified as the static case or is approximated by the static cases at a sequential time points. Then, the static case with logic cycle becomes normal. In the static case, the influence or the function of the cause variable to the consequence variable is immediate. In other words, the functional time is 0. This is not conflict with that the functional intensity is changeable dynamically with time (i.e. the probability value of $F_{nk;ij}$ can dynamically change), because the different functional intensities at different time are all propagated to the consequence variable immediately. As the function is immediately done, when there is logic cycle, there must be the case that the same consequence is simultaneously the cause of itself. This is obviously inconsistent. Therefore, in the outspread process, once the repeated variable appears, this repeated variable (including the related functional or conditional functional variables) must be eliminated, i.e. be viewed as null. For example, suppose $X_1$ is the cause of $X_2$, the functional variable is $F_{1;3}$; $X_2$ is the cause of $X_3$, the functional variable is $F_{3;2}$; and $X_3$ is the cause of $X_1$, the functional variable is $F_{3;1}$. Then, $X_3=F_{3;2}X_2\{F_{2;1}X_1\{F_{1;3}X_3\}\}$. It can also be expressed directly with the variable, instead of with the function: $X_3=F_{3;2}F_{2;1}F_{1;3}X_3$. The above is outspreaded with variables. The outspread can also be with events. In this example, suppose every variable has two states each. Then $$X_{31}=F_{31;21}X_{21}\{F_{21;11}X_{11}\{F_{11;31}X_{31}+F_{11;32}\}+$$
$$F_{21;12}X_{12}\{F_{12;31}X_{31}+F_{12;32}X_{32}\}\}+F_{31;22}X_{22}$$
$$\{F_{22;11}X_{11}\{F_{11;31}X_{31}+F_{11;32}X_{32}\}+F_{22;12}X_{12}$$
$$\{F_{11;31}X_{31}F_{11;32}X_{32}\}\}$$

Or be expressed with the event form instead of the function form:

$$X_{31}=F_{31;21}(F_{21;11}(F_{11;31}X_{31}+F_{11;32}X_{32})+F_{21;12}$$
$$(F_{12;31}X_{31}+F_{12;32}X_{32}))+F_{31;22}(F_{22;11}(F_{11;31}X_{31}+$$
$$F_{11;32}X_{32})+F_{22;12}(F_{11;31}X_{31}+F_{11;32}X_{32}))$$

The outspread for $X_{32}$ is similar.

In this case, no matter it is in the variable expression or in the event expression, the $X_3$, $X_{31}$ and $X_{32}$ on the right side of the equator are all making the logic cycle to the $X_3$ or $X_{31}$ on the left side of the equator, and should all be viewed as null. But in this example, if eliminate $X_3$ or $X_{31}$ and $X_{32}$, the right side of the equator becomes null. This means that the problem has no solution. Actually, besides that $X_1$, $X_2$ and $X_3$ are cause and consequence of each other, there should be other variables, otherwise the problem does not have any reasonable physical meaning. Suppose $B_4$ is the other cause of $X_2$ and $B_4$ has two states. Then $$X_3=F_{3;2}(F_{2;1}F_{1;3}X_3+F_{2;4}B_4)$$

Or $$X_{31}=F_{31;21}(F_{21;11}(F_{11;31}X_{31}+F_{11;32}X_{32})+F_{21;12}$$
$$(F_{12;31}X_{31}+F_{12;32})+F_{21;41}B_{41}+F_{21;42}B_{42})+$$
$$F_{31;22}(F_{22;11}(F_{11;31}X_{31}+F_{11;32}X_{32})+F_{22;12}$$
$$(F_{11;31}X_{31}+F_{11;32}X_{32})+F_{22;41}B_{41}+F_{22;42}B_{42})$$

Eliminating the repeated variables, $$X_3 = F_{3;2}F_{2;4}B_4$$

Or $$X_{31} = F_{31;21}(F_{21;41}B_{41} + F_{21;42}B_{42}) + F_{31;22}(F_{22;41}B_{41} + F_{22;42}B_{42})$$
$$= F_{31;21}F_{21;41}B_{41} + F_{31;21}F_{21;42}B_{42} + F_{31;22}F_{22;41}B_{41} +$$
$$F_{31;22}F_{22;42}B_{42}$$

This is the outspreaded logic expression of $X_3$ or $X_{31}$ in the form of "sum-of-products" composed of the {B,D,F} type variables or events without logic cycles.

The illustration involving breaking the logic cycles in the outspread expression is also shown in example 23.

§16.2. In the static cases, when there is the situation that the different input variables of a same logic gate are multiplied (the logic AND), there should be the fusion of the different input variables. This is because only in this way, can the logic gates multiplied be true simultaneously.

§16.3. Since there is the situation that the direct cause variables are reduced, in the numerical probability calculation, whether or not the direct cause variables in the exclusive logic outspread expression of the same consequence variable are reduced must be investigated. If yes, the calculation for the normalization factor $r_n$ included in the calculation for the functional intensity of the functional event $f_{nk;ij}$ or $f_{nk;D}$ should only be the sum of the really involved {B,X,D,G} type direct cause variable relationships, so as to ensure the normalization of the state probabilities of the consequence variable.

§16.4. When the causality expression between the consequence variable and its cause variables does not satisfy the normalization (i.e. incomplete), the default state is outspreaded according to the operation of AND after NOT of the non-default states; when the causes of the states of the non-default states are not given, these non-default states are treated as null; when the condition $C_{n;i}$ of the conditional functional variable $F_{n;i}$ appears invalid during the outspread process, $F_{n;i}=0$; otherwise $F_{n;i}$ is treated as that $C_{n;i}$ is valid.

The "AND after NOT" of the non-default states implies that all the non-default states are not true, where "not true" means "false" and "all" means "AND". Suppose $X_1$ has tree states, in which state 1 is the default state. Then $X_{11}=\overline{X}_{12}\overline{X}_{13}$. Suppose $X_{12}=F_{12;21}V_{21}+F_{12;32}V_{32}$, V□{X,B,G,D}, then $\overline{X}_{12}=(\overline{F}_{12;21}+\overline{V}_{21})(\overline{F}_{12;32}+\overline{V}_{32})$. Take $\overline{V}_{21}$ as the example. Suppose $V_2$ has three states. If $V_{21}$ is the default state, then $\overline{V}_{21}=V_{22}+V_{23}$; if $V_{21}$ is the non-default state, outspread it according to the cause variables shown in the EDUCG directly.

Example 17

Figures 14, 15, 16, 17, 18:
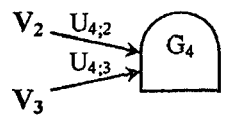
FIG. 14 is the new logic gate and new truth value table in the case after eliminating $V_i$ in FIG. 4.
FIG. 15 is the truth value table of the logic gate including the remnant state in FIG. 14.
FIG. 16 is the truth value table in FIG. 4 in which the expressions are exclusive.
FIG. 17 is the exclusive truth value table of the logic gate including the remnant state shown in FIG. 5.
FIG. 18 is the exclusive truth value table of the logic gate shown in FIG. 5.
Figure 19:
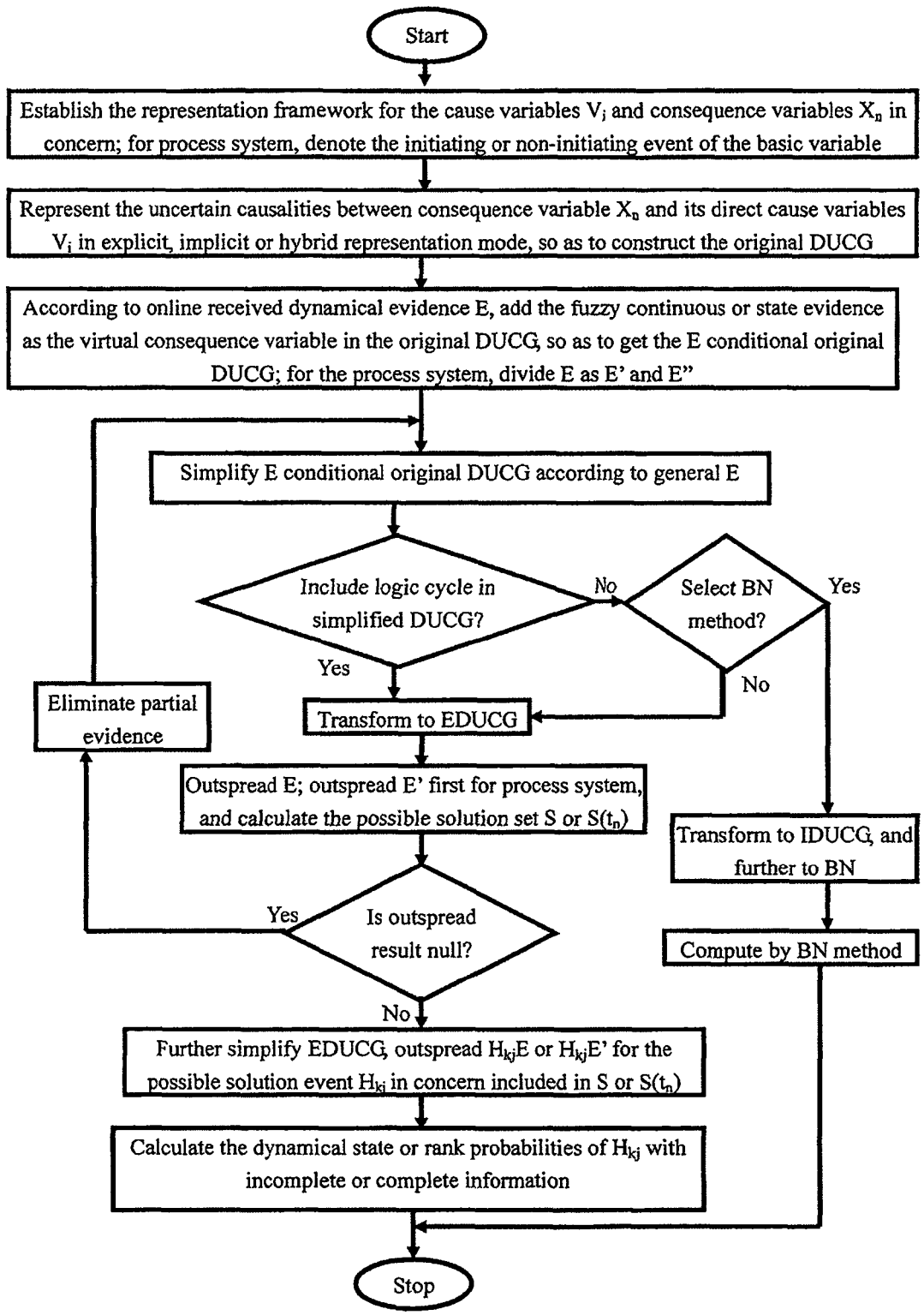
FIG. 19 is the brief flow chart of the DUCG intelligent system constructed based on this invention.

FIGS. 4, 14 and 15 are about the illustration for the method described in §17, which is explained below.

§17.1. The method to eliminate the input variables of the virtual logic gate is the same as to eliminate the direct cause variables in the single group implicit representation mode, i.e. eliminate the direct cause variables in the implicit representation mode corresponding to the virtual logic gate, and then reconstruct the CPT (see example 7 for details), and then transform the implicit representation mode after the elimination of input variables to the explicit representation mode according to the method described in §14, so as to produce new functional variables of the new logic gate and the new default event and its functional variable.

§17.2. In the situation of non-virtual logic gate, for the convenience of reconstruct the truth value table of the logic gate in the case of eliminating the input variables of the logic gate, the original logic gate or the original truth value table of the logic gate should be the most simplified. If the truth value table given by the domain engineers is not the most simplified, it should be transformed as the most simplified. The so called most simplified includes the row most simplified and the item most simplified. The so called row most simplified means that every row in the truth value table has specific different meaning; the so called item most simplified means that any variable in any item of every row cannot be eliminated, otherwise this item cannot result in the truth of the corresponding logic gate state.

To explain the row most simplified, suppose the logic expression of a row is $V_{11}V_{21}$. Moreover, suppose $V_{31}+V_{32}=1$ (the complete set). If divide $V_{11}V_{21}$ as two rows $V_{11}V_{21}V_{31}$ and $V_{11}V_{21}V_{32}$, which will add an extra logic gate state, whether or not these two rows or the two logic gate states have different meanings should be judged by the domain engineers. But it can also be judged and be most simplified just according to the expression. That is, consider the different groups of the functional variables and conditional functional variables as the output from the different logic gate states corresponding to the different rows. If these groups are exactly same, combine these different rows and the corresponding different logic gate states together (see §1.5 and §2). In this example, suppose $V_{11}V_{21}V_{31}$ and $V_{11}V_{21}V_{32}$ are two logic expressions of different rows. If the functional variables and the conditional functional variables as the output of the two logic gate states corresponding to the two rows are exactly the same, these two rows can be combined together as $V_{11}V_{21}V_{31}+V_{11}V_{21}V_{32}$, so as to satisfy the row most simplified.

To explain the item most simplified, consider the above example. Given $V_{31}+V_{32}=1$, eliminate $V_{31}$ from the item $V_{11}V_{21}V_{31}$ and eliminate $V_{32}$ from the item $V_{11}V_{21}V_{32}$ in the row $V_{11}V_{21}V_{31}+V_{11}V_{21}V_{32}$, there is no influence to the truth of the corresponding logic gate state, because $V_{11}V_{21}V_{31}+V_{11}V_{21}V_{32}=V_{11}V_{21}$. Therefore, once $V_{11}V_{21}$ is true. In general, to obtain the item most simplified, the twice complement operation can be applied to the logic expression: That is, when there is only one item in the input row, the engineers can judge whether or not the item is simplified and simplify it if not; when there are multiple items in one input raw of the logic expression, perform the twice complement operation, i.e. the logic expression in an input raw=the logic expression of this input raw. For the above example, according to the law of the complement operation and the rules of the absorption, exclusion and complete set operations, $$V_{11}V_{21}V_{31} + V_{11}V_{21}V_{32} = \overline{\overline{V_{11}V_{21}V_{31} + V_{11}V_{21}V_{32}}}$$
$$= \overline{(\overline{V_{11}}+\overline{V_{21}}+\overline{V_{31}})(\overline{V_{11}}+\overline{V_{21}}+\overline{V_{32}})}$$
$$= \overline{\overline{V_{11}}+\overline{V_{11}}\,\overline{V_{21}}+\overline{V_{11}}\,\overline{V_{32}}+\overline{V_{21}}\,\overline{V_{11}}+}$$
$$\overline{\overline{V_{21}}+\overline{V_{21}}\,\overline{V_{32}}+\overline{V_{31}}\,\overline{V_{11}}+\overline{V_{31}}\,\overline{V_{21}}+}$$
$$\overline{\overline{V_{31}}\,\overline{V_{32}}}$$
$$= \overline{\overline{V_{11}}+\overline{V_{21}}+\overline{V_{31}}\,\overline{V_{32}}}$$
$$= V_{11}V_{21}(V_{31}+V_{32})$$
$$= V_{11}V_{21}$$

So that the most simplified expression is obtained. If $V_{31}+V_{32}\neq 1$, there is $$V_{11}V_{21}V_{31} + V_{11}V_{21}V_{32} = \overline{\overline{V_{11}V_{21}V_{31} + V_{11}V_{21}V_{32}}}$$
$$= V_{11}V_{21}(V_{31}+V_{32})$$
$$= V_{11}V_{21}V_{31} + V_{11}V_{21}V_{32}$$

i.e. the original expression has already been the most simplified.

§17.3. If it appears the case in the online application that the input variable of a non-virtual logic gate no longer exists, let all state or related event of this input variable in the expressions composed of the states of the input variables in the most simplified truth value table become null 0, and then calculate these expressions in different rows. If the calculation result of the expression of a row becomes null, this raw is eliminated; if the calculation result is not null, this row remains and the calculated result becomes the new expression; if an input row becomes null after the calculation, the corresponding state of the logic gate is eliminated.

For the example shown in FIG. 4, according to the twice complement operation, it can be known that the expressions in rows no. 1 and no. 2 are the most simplified expressions. The proof is shown below:

For row no. 1:

$$V_{11}V_{21} + V_{11}V_{31} + V_{21}V_{31} = \overline{\overline{V_{11}V_{21}+V_{11}V_{31}+V_{21}V_{31}}}$$
$$= \overline{(\overline{V_{11}}+\overline{V_{21}})(\overline{V_{11}}+\overline{V_{31}})(\overline{V_{21}}+\overline{V_{31}})}$$
$$= \overline{\overline{V_{11}V_{21}+V_{11}V_{31}+V_{21}V_{31}}}$$
$$= (V_{11}+V_{21})(V_{11}+V_{31})(V_{21}+V_{31})$$
$$= V_{11}V_{21}+V_{11}V_{31}+V_{21}V_{31}$$

For row no. 2:

$$V_{12}V_{21}V_{32} + V_{12}V_{22}V_{31} = \overline{\overline{V_{12}V_{21}V_{32}+V_{12}V_{22}V_{31}}}$$
$$= \overline{(\overline{V_{12}}+\overline{V_{21}}+\overline{V_{32}})+(\overline{V_{12}}+\overline{V_{22}}+\overline{V_{31}})}$$
$$= \overline{\overline{V_{12}+V_{21}V_{22}+V_{21}V_{31}+V_{22}V_{32}+V_{31}V_{32}}}$$
$$= V_{12}(V_{21}+V_{22})(V_{21}+V_{31})(V_{22}+V_{32})(V_{31}+V_{32})$$
$$= V_{12}V_{21}V_{32}+V_{12}V_{22}V_{31}$$

Suppose that $V_1$ is no longer the input variable of $G_4$. Then $V_{1j}=0$, and the logic expression of the state combination in row no. 1 becomes $V_{11}V_{21}+V_{11}V_{31}+V_{21}V_{31}=V_{21}V_{31}$. The result is not null and should remain; the logic expression of the state combination in row no. 2 becomes $V_{12}V_{21}V_{32}+V_{12}V_{22}V_{31}=0$. The result is null and this row should be eliminated. Since the or row no. 2 is eliminated, the corresponding logic gate state $G_{42}$ is also eliminated. Finally, FIG. 4 is reconstructed as FIG. 14.

The above operation can be repeated so as to deal with the cases in which more than one input variable is eliminated. If all the input variables of a non-virtual logic gate are eliminated, this non-virtual logic gate along with its output variables is also eliminated.

The truth value table of FIG. 14 that includes the remnant state of the non-virtual logic gate is shown in FIG. 15.

Example 18

FIGS. 4, 5, 14, 16, 17 and 18 are about the illustration for the method described in §18, which is explained below.

§18.1. After determining the input variables and also the truth value table of a logic gate, if these are the non-exclusive items in a same expression, make them as the exclusive items, so that the probability calculation for the expression can be done directly.

For the example of the truth value table shown in FIG. 4, the corresponding exclusive result is shown in FIG. 16. If consider the remnant state, the truth value table shown in FIG. 5 is made exclusive as shown in FIG. 17. Similarly, the truth value table including the remnant state of the logic gate shown in FIG. 5 is made exclusive as shown in FIG. 18.

After the item exclusion, the outspread can be done according to the rules of the algebra calculation, and the probability values on the two sides of "+" can simply sum up. After considering the remnant state, the input and output states of the logic gate cover the whole set and the normalization of the logic gate is ensured. The adding of the remnant state is mainly for satisfying the state completeness of the system. In applications, it is usually not necessary.

§18.2. It should be pointed out that the notations $G_{ij}$ in both before and after eliminating $V_1$ from the truth value table (FIGS. 4 and 14) or the exclusive truth value table (FIGS. 16 and 18) have different meanings, although they look the same. If they are ANDed together, the logic fusion of the input variables must be done, i.e. the input variables are fused as the input variables only related to the AND operation. In such a way, the two truth value tables are fused as one truth value table. This truth value table is based on the most simplified truth value tables of the logic gates.

It must be emphasized that if the input variables are reduced, the new truth value table must be reconstructed based on the most simplified truth value table. Only after this can the exclusion of the expressions, adding the remnant expression and its corresponding logic gate state, as well as the transformation to the complete combined logic gate be done.

Example 19

The detailed explanation about the method described in §19 is below.

§19.1. As mentioned before, in the case of process system, E' is composed of the evidence indicating the state change of variables. E' can be logically outspreaded and simplified, until the expression is composed of only the {B,D,F} type variables. The outspread method is described in §16-18. It should be emphasized that during the outspread process, once more than one initiating event is ANDed together, the result is null. Therefore, in every item (the group of events occurring simultaneously) of the final expression, there is one and only one initiating event, with one or none or more non-initiating events. In addition, there are some functional events or conditional functional events. By eliminating all the functional events and conditional functional events (i.e. let them be the complete set 1), there may be some repeated items. The logical absorption operation is necessary so that the items with the same real effect are combined and minimized. Thus, in the final expression, the set of one initiating event and some non-initiating events and default events in one item is a possible solution $H_{kj}$, where k is the index of the variable combination, e.g. $H_k=B_n$, $H_k=X_n$, $H_k=B_nB_m$ or $H_k=B_nD_nB_m$, etc; j is the state index of the variable state combination, e.g. $H_{kj}=B_{nh}$, $H_{kj}X_{nh}$; $H_{kj}=B_{nh}B_{mg}$, $H_{kj}=B_{nh}D_nB_{mg}$, etc. In which, only one of $B_{nh}$ and $B_{mg}$ can be the initiating event, while the other one is the non-initiating event. The so called necessary absorption means the logic absorption of the items with same physical meaning. If the physical meanings of $B_{nh}$, $B_{nh}B_{mg}$ and $B_{nh}D_nB_{mg}$ are different, $B_{nh}$, $B_{nh}B_{mg}$ and $B_{nh}B_{mg}$ are the exclusive possible solutions. If the physical meanings of them are same, the later two are absorbed by $B_{nh}$. After the above operation, the items in the expression of E' are the members $H_{kj}$ of the possible solution set $S_H$, i.e. $S_H=\{H_{kj}\}$. Then, the selection of $H_{kj}$ will be limited in only these members. In other words, the cause of the system state change is limited only in these possible solutions.

Example 20

The illustration about the method described in §20, which is explained below.

§20.1. In the dynamical cases, when the new information is added ceaselessly during the diagnosis process, the known information $E(t_{i-1})$ at the earlier time point $t_{i-1}$ and the known information $E(t_i)$ at the later time point $t_i$ may be different. They need be treated as E based on the original DUCG respectively and repeat the computation described in §12-19 to obtain, based on the original DUCG, the E conditional original DUCGs. But, according to §12-19, the earlier computed possible solution set S may be different from the later computed possible solution set $S_i$. Only the intersection of them can satisfy both. Therefore, the intersection of all the possible solution sets before $t_n$ (including $t_n$) is the dynamical possible solution set $S(t_n)$. Correspondingly, the possible solution set $S_i$ at different time point is called the static possible solution set. Recursively computed according to the sequential time points, the intersection becomes smaller and smaller, while the diagnosis becomes more and more accurate, so as to perform the dynamical logic operation and then the dynamical probability calculation.

Specifically, suppose the time points are sequentially $t_1$, $t_2, \ldots, t_i, \ldots, t_n$. The known information or evidence corresponding to these time points are sequentially $E(t_i)$, $E(t_2), \ldots, E(t_i), \ldots, E(t_n)$. The static possible solution sets are sequentially $S_1, S_2, \ldots, S_i, \ldots, S_n$. The dynamical possible solution sets are sequentially $S(t_1), S(t_2), \ldots, S(t_i), \ldots, S(t_n)$. Then $$S(t_n) = \prod_{i=1}^{n} S_i$$

Usually, when the information is rich enough, the dynamical possible solution set $S(t_n)$ may have only one member, i.e. the diagnostic result is unique and the rank probability calculation is not necessary.

Actually, $S(t_n)$ excludes some other possible solutions in the EDUCG. For the EDUCG shown in FIG. 30 of example 22, the possible fault variables are $B_{79}, B_{80}, B_{81}, B_{100}, B_{101}, B_{102}$ and $B_{117}$. But $S(t_2)$ shows that only $B_{102,2}$ is the possible solution. Therefore, $B_{79}, B_{80}, B_{81}, B_{100}$ and $B_{101}$ are all eliminated from the EDUCG in FIG. 30. Furthermore, the so resulted isolated variables are also eliminated, which leads to the simplified EDUCG shown in FIG. 31.

§20.2. When it is required to calculate the dynamical state probability and the rank probability of $H_{kj}$ included in the dynamical possible solution set $S_H(t)$, the first is to calculate the static state probability conditioned on the incomplete information $H_{kj}^{s'}(t_i)$ and the static state probability conditioned on the complete information $h_{kj}^{s}(t_i)$, the static rank probability conditioned on the incomplete information $h_{kj}^{r'}(t_i)$ and the static rank probability conditioned on the complete information $h_{kj}^{r}(t_i)$, of $H_{kj}$ at different time points according to the method presented in §11. Moreover, the unconditional probability $Pr\{H_{kj}\}$ should also be calculated, which is briefly denoted as $h_{kj}(t_0)$ where $t_0$ represents the time without receiving any online information or evidence, i.e. $h_{kj}(t_0)=Pr\{H_{kj}\}$. Note that $h_{kj}(t_0)$ does not have the difference between incomplete information and complete information as well as the state probability and rank probability. When $H_{kj}$ is the basic event $B_{ig}$, $h_{kj}(t_0)=Pr\{H_{kj}\}=Pr\{B_{ig}\}=b_{ig}$.

$H_{kj}$ can be either the member of $S(t_n)$ or the member of $S_n$. If calculate only the static probabilities of $H_{kj}$, the probabilities of $H_{kj}$ calculated based on the members in $S(t_n)$ have include the partial dynamical information in fact, although they are still called the static values. The probabilities of $H_{kj}$ calculated based on the members in $S_n$ are according to only the information of that time point, and can be called the complete static values so as to be distinguished. To include all the dynamical information, the calculation should be done according to the method described in §20.3.

§20.3. In the dynamical case of more than one time point, the calculation method including all the information is as follows:

$$h_{kj}(t) \equiv \Pr\left\{H_{kj} \mid \prod_{i=1}^{n} E(t_i), t_n \leq t \leq t_{n+1}\right\}$$

$$= \Pr\left\{H_{kj} \mid \prod_{i=1}^{n} E(t_i)\right\}$$

$$= \frac{\Pr\left\{H_{kj} \prod_{i=1}^{n} E(t_i)\right\}}{\Pr\left\{\prod_{i=1}^{n} E(t_i)\right\}}$$

$$= \frac{\Pr\{H_{kj}\}\Pr\left\{\prod_{i=1}^{n} E(t_i) \mid H_{kj}\right\}}{\Pr\left\{\prod_{i=1}^{n} E(t_i)\right\}}$$

If $$\prod_{i=1}^{n} E(t_i)$$

is indeed caused by $H_{kj}$, then given $H_{kj}$, the static evidence $E(t_i)$ are exclusive with each other, and the above equation becomes $$h_{kj}(t) = \frac{\Pr\{H_{kj}\}\prod_{i=1}^{n} \Pr\{E(t_i) \mid H_{kj}\}}{\Pr\left\{\prod_{i=1}^{n} E(t_i)\right\}}$$

In which, if $h_{kj}(t_0) \equiv \Pr\{H_{kj}\} = 0$, there is $$\Pr\left\{H_{kj} \mid \prod_{i=1}^{n} E(t_i)\right\} = 0;$$

otherwise, $$\Pr\{E(t_i) \mid H_{kj}\} = \frac{\Pr\{E(t_i)H_{kj}\}}{\Pr\{H_{kj}\}}$$

$$= \frac{\Pr\{E(t_i)\}\Pr\{H_{kj} \mid E(t_i)\}}{\Pr\{H_{kj}\}}$$

$$= \frac{\Pr\{E(t_i)\}h_{kj}(t_i)}{h_{kj}(t_0)}$$

In which, $h_{kj}(t_i)$ is the static value of $H_{kj}$ at time $t_i$. The ignorance of the superscript of $h_{kj}(t_i)$ indicates that this value can be conditioned on either the incomplete information or the complete information, and can be either the state value or the rank value depending on the content of the conditioned evidence E (E' or E'E''). Therefore, $$h_{kj}(t) = \Pr\left\{H_{kj} \mid \prod_{i=1}^{n} E(t_i)\right\}$$

$$= \frac{\Pr\{H_{kj}\}\prod_{i=1}^{n} \Pr\{E(t_i) \mid H_{kj}\}}{\Pr\left\{\prod_{i=1}^{n} E(t_i)\right\}}$$

$$= \frac{h_{kj}(t_0)\prod_{i=1}^{n} h_{kj}(t_i)\prod_{i=1}^{n} \Pr\{E(t_i)\}}{\Pr\left\{\prod_{i=1}^{n} E(t_i)\right\}(h_{kj}(t_0))^n}$$

$$= \frac{\prod_{i=1}^{n} \Pr\{E(t_i)\}}{\Pr\left\{\prod_{i=1}^{n} E(t_i)\right\}} \cdot \frac{\prod_{i=1}^{n} h_{kj}(t_i)}{(h_{kj}(t_0))^{n-1}}$$

$$= \alpha \prod_{i=1}^{n} h_{kj}(t_i)/h_{kj}(t_0)^{n-1}$$

In which, $$\alpha = \frac{\prod_{i=1}^{n} \Pr\{E(t_i)\}}{\Pr\left\{\prod_{i=1}^{n} E(t_i)\right\}}$$

is a normalization constant independent of $H_{kj}$.

If when $h_{kj}(t_0) = 0$, define $h_{kj}(t_i)/(h_{kj}(t_0))^{n-1} \equiv 0$, then no matter $h_{kj}(t_0) = 0$ or not, we always have $$h_{kj}(t) = \frac{\prod_{i=1}^{n} h_{kj}(t_i)/(h_{kj}(t_0))^{n-1}}{\sum_{j} \prod_{i=1}^{n} h_{kj}(t_i)/(h_{kj}(t_0))^{n-1}}$$

In the real application, the normalization can be made according to the requirement of the incomplete information, the complete information, the state probability and the rank probability:

(1) The dynamical incomplete information state probability:

$$h_{kj}^{s'}(t) = \frac{\prod_{i=1}^{n} h_{kj}^{s'}(t_i)/(h_{kj}(t_0))^{n-1}}{\sum_{j} \prod_{i=1}^{n} h_{kj}^{s'}(t_i)/(h_{kj}(t_0))^{n-1}}$$

In which, when $h_{kj}(t_0) = 0$, $h_{kj}^{s'}(t_i)/(h_{kj}(t_0))^{n-1} \equiv 0$.

(2) The dynamical incomplete information rank probability:

$$h_{kj}^{r'}(t) = \frac{\prod_{i=1}^{n} h_{kj}^{r'}(t_i)/(h_{kj}(t_0))^{n-1}}{\sum_{H_{kj} \in S_H(t)} \prod_{i=1}^{n} h_{kj}^{r'}(t_i)/(h_{kj}(t_0))^{n-1}}$$

In which, when $h_{kj}(t_0)=0$, $h_{kj}^{r'}(t_i)/(h_{kj}(t_0))^{n-1} \equiv 0$.

(3) The dynamical complete information state probability:

$$h_{kj}^{s}(t) = \frac{\prod_{i=1}^{n} h_{kj}^{s}(t_i)/(h_{kj}(t_0))^{n-1}}{\sum_{j} \prod_{i=1}^{n} h_{kj}^{s}(t_i)/(h_{kj}(t_0))^{n-1}}$$

In which, when $h_{kj}(t_0)=0$, $h_{kj}^{s}(t_i)/(h_{kj}(t_0))^{n-1} \equiv 0$.

(4) The dynamical complete information rank probability:

$$h_{kj}^{r}(t) = \frac{\prod_{i=1}^{n} h_{kj}^{r}(t_i)/(h_{kj}(t_0))^{n-1}}{\sum_{H_{kj} \in S_H(t)} \prod_{i=1}^{n} h_{kj}^{r}(t_i)/(h_{kj}(t_0))^{n-1}}$$

In which, when $h_{kj}(t_0)=0$, $h_{kj}^{r}(t_i)/(h_{kj}(t_0))^{n-1} \equiv 0$.

The above equations are all come down to the static calculations to different time points. Obviously, there are other types of the state and rank probability calculations based on the situation what and how the evidence is conditioned on, e.g. the evidence at different time point is partially incomplete and partially complete, etc. They cannot be all listed here.

Example 21

The detailed explanation about the calculation method described in §21 is below.

§21.1. IDUCG is similar to BN. The only difference is that there may be the virtual consequence variable $E_h$ with only one state in IDUCG. To transform IDUCG as BN and use the method of BN to do the calculation, a new event $\bar{E}_h$ can be introduced in IDUCG, where $\Pr\{E_h\}=1$ and $\Pr\{\bar{E}_h\}\equiv 0$. Thus IDUCG becomes BN. The construction method of the CPT between $E_h$ and its only direct cause variable $V_h$ is: ① When $$\max_{j}\{f_{Eh;j}\} \le 1, \Pr\{E_h \mid V_{hj}\} = f_{Eh;j}$$

and $$\Pr\{\bar{E}_h \mid V_{hj}\} = 1 - \Pr\{E_h \mid V_{hj}\}.$$

② When $$\max_{j}\{f_{Eh;j}\} > 1, \Pr\{E_h \mid V_{vj}\} = f_{Eb;j} / \max_{j}\{f_{Eh;j}\}$$

and $$Pr\{\bar{E}_h \mid V_{hj}\} = 1 - Pr\{E_h \mid V_{hj}\}.$$

This is because the parameter $f_{Eh;j}$ of $F_{Eh;j}$ between $E_h$ and $V_h$ calculated according to the method described in §10 may be greater than 1 due to that the meaning of $f_{Eh;j}$ is the probability density. The conditional probability in BN does not include the probability density. Therefore, the probability density must be transformed as the probability distribution (i.e. CPT). Then the method of BN can be applied. This method is actually to compress the values of $f_{Eh;j}$ when they are greater than 1, while keeping their proportion, so as to satisfy the normalization. Since the values of $f_{Eh;j}$ have only the relative meaning, this transformation is reasonable.

Example 22

The comprehensive illustration with the fault diagnosis of the secondary loop system of a nuclear power plant.

Figure 20:
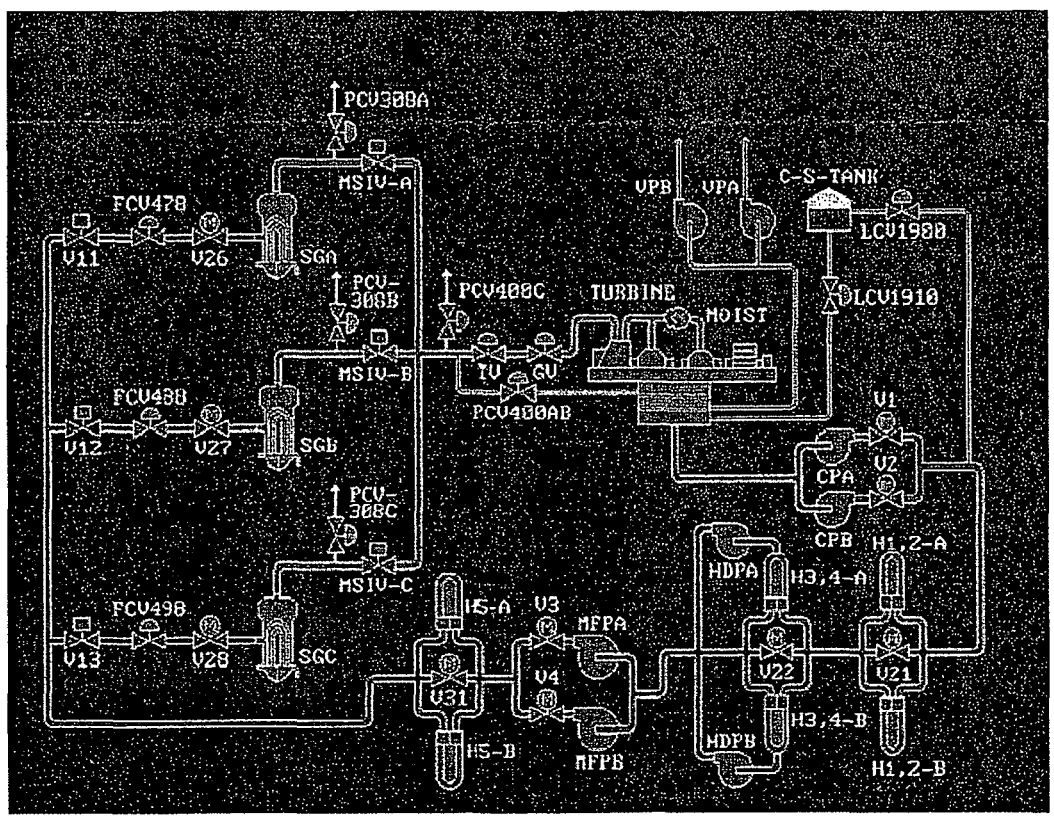
FIG. 20 is the brief figure showing the secondary loop system of a nuclear power plant.

FIG. 20 shows the secondary loop system of a nuclear power plant imitated by the imitator located at Tsinghua University for training the operators of a real nuclear power plant. The high temperature and pressure water heated by the nuclear reactor goes through three steam generators SGA, SGB and SGC to heat the water in the secondary loop system, so that it becomes the steam gathering at the steam header and going through the TV and the GV control valves to push the turbine to generate the electricity. The tired steam goes through the hot well to be cooled, the condensate pumps, the low temperature heaters, the high temperature heaters, the drain pumps, and the main feed water pumps, then feeds back to the steam generators, so as to form the circulation. The operation parameters and the states of the components are collected through the online data collection system and are shown in the control room. The task of the operators is to check periodically these data and judge the states. When the abnormal state or the alarm appears, diagnose the cause and take correct measures to remove or control the fault. But it is usually very hard for the operators to diagnose the cause of the abnormal system state and take the correct measures in time. This may cause big loss.

Currently, using the artificial intelligence technology to diagnose the fault online for large complex systems has become one of the important research issues in the international academic community. But as the systems like nuclear power plants and space equipment are so expensive and their failure statistic data are so rare, it is hard to construct the fault diagnosis model by data learning and mining. The main available data are the experience and belief of the domain engineers. Plus the significant large scale, complexity and dynamics of such systems, many techniques including the neural network and the BN are hard to be applied.

The DUCG intelligent system presented in this invention can better fulfill this task. The features of DUCG is at that it does not rely much on the completeness and accuracy of the statistic data, can utilize the belief of the domain engineers to describe flexibly the fault causal relations among the various parameters and states of components (without the requirement of the completeness and accuracy), and can perform the real time and online monitoring to the secondary loop according to the online collected information related to the loop state. Once the abnormal signals appear (the evidence E' is not null), the diagnosis process is started immediately to find the fault cause, so as to inform people to take correct control measures. Usually, the fault can be monitored even it is in the early stage and can be oriented rapidly, and furthermore the development state of the system can be predicted. Thus, the fault diagnosis and prediction of the system can be realized, so that people can take measures in advance to avoid the development of the fault and avoid the big economic loss.

Figure 21:
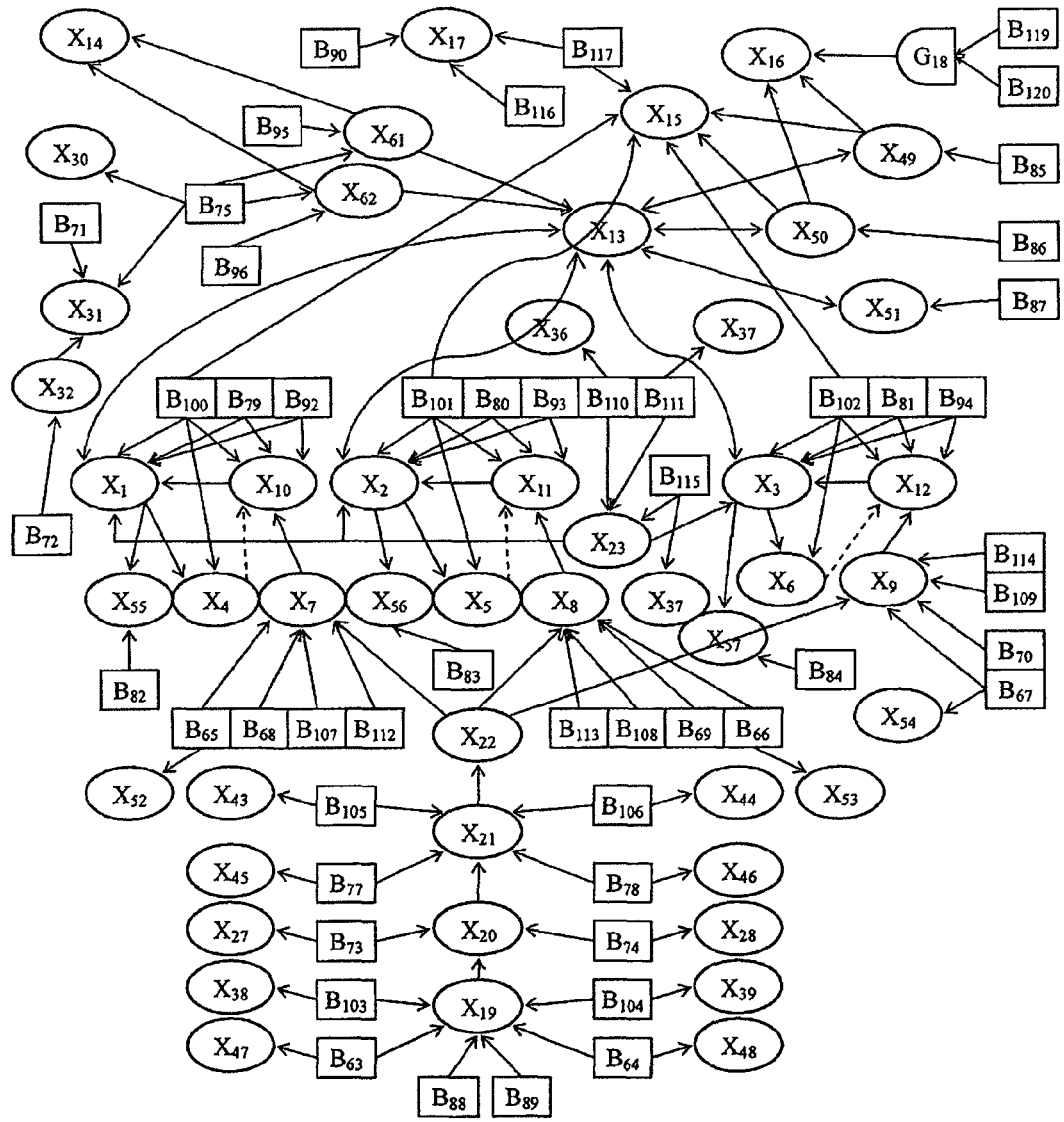
FIG. 21 is the brief figure of the fault influence DUCG of the secondary loop system of the nuclear power plant shown in FIG. 20.

The brief fault propagation DUCG of the secondary loop of a nuclear power plant is shown in FIG. 21. Since the faults of the nuclear power plant is very rare, there is no sufficient failure data available. The realistic way is to mainly rely on the belief of the domain engineers. Hence, this DUCG will use the explicit representation mode (see §1) only, i.e. EDUCG, so as to ease the belief representation of the domain engineers. In other words, FIG. 21 and all other figures of this example are actually EDUCGs. Therefore, the methods of §11 (4)-(6) and §12 can be applied. There is no need to transform the EDUCG.

The variables of the DUCG in FIG. 21 are shown in table 1 (the probability data are ignored). In which, the first state is the normal state, i.e. the default state. The other states are abnormal states. The abnormal state at time $t_1$ is written in bold italic, and at time $t_2$ is in bold only. The shading denotes the abnormally high. The underline denotes the abnormally low. The other state of the consequence variable is normal. All the states of the B type variables and the logic gates are unknown.

Moreover, the nuclear power plant is a typical process system. The B type variables in table 1 are all the initiating event variables, i.e. all the abnormal states of the B type variables are the initiating events. According to §1, the AND of more than one initiating event is null. In fact, if considering the details fully, this example should contain the non-initiating events, such as the depressurizing valve cannot restore after it opens for depressurizing, etc. But such cases are relatively rare and are hard to be dealt with. To save space, this case is not considered in this example.

As the purpose of this DUCG is the fault diagnosis, the DUCG in FIG. 21 needs only represent the causal relations of the fault influence. In other words, the normal state of any variable has no influence to other variables. Therefore, this DUCG is the DUCG without completeness. The property that DUCG does not require the completeness reduces the requirement to the domain engineers and the data, so that users can focus on the problems in concern only, without rigorous requirement to the completeness of data and model. This reduces the difficulty to construct DUCG greatly.

In more details, according to the steps described in §1, the various cause variables $V_j$, (B and X types) and the consequence variables $X_n$ (X type only) in concern related to the fault diagnosis of the secondary loop system of this nuclear power plant are determined. According to the real situation of this example, the important X and B type variables are determined as shown in table 1, in which the continuous variables have been discretized. For the example of variable $X_{23}$, the temperature in the feed water header is a continuous variable, which is discretized as three fuzzy discrete states: $X_{23;1}$ (between 107-134° C.), $X_{23;2}$ (>125 C°) and $X_{23;3}$ (<115 C°). Obviously, there are two fuzzy areas: (107-115 C°) and (125-134 C°). When the real temperature value $e_{23} \leq 107$ C°, $m_{23;1} = m_{23;2} = 0$ and $m_{23;3} = 1$; When $e_{23} = 110$ C°, $m_{23;1} = m_{23;3} = 0.5$ and $m_{23;2} = 0$; When $115$ C°$\leq e_{23} \leq 125$ C, $m_{23;1} = 1$ and $m_{23;2} = m_{23;3} = 0$; When $e_{23} \leq 130$ C°, $m_{23;1} = m_{23;2} = 0.5$ and $m_{23;3} = 0$; When $e_{23} \geq 134$ C°, $m_{23;1} = m_{23;3} = 0$ and $m_{23;2} = 1$. The membership $m_{ij}$ of other temperature can be obtained from FIG. 2 easily. The parameters $b_{ij}$ of the abnormal states of $B_i$ ($i \neq 1$) are replaced with $\lambda_{ij}$, and are given by the domain engineers according to the mean time between failures (MTBF) included in the component specifications along with other factors. For simplicity, these parameters are ignored in table 1. But the value ranges can be described as below: As the components of the nuclear power plant are all high reliable, the failure rates are generally in the range of $10^{-4}$-$10^{-6}$/year, which is much less than 1. Therefore, the simultaneously occurrence of more than one initiating event can be treated as impossible event. Thus, we establish the causality representation framework about the cause variables and the consequence variables of the secondary loop of the nuclear power plant for the fault diagnosis.

Moreover, according to the above causal relations among variables, for every X type variable, determine its direct cause variables so as to form a module. For example, the module for $X_{16}$ indicating the vacuum of the hot well and then representing the pressure of the hot well, has the direct cause variables $X_{49}$ representing the state of the depressurizing control valve PCV400A, $X_{50}$ representing the state of the depressurizing control valve PCV400AB, $B_{119}$ representing the state of the vacuum pump VPA, and $B_{120}$ representing the state of the vacuum pump VPB. As the influences of VPA and VPB to the pressure of the hot well are common and the influence extent depends on the state combination of both pumps, $B_{119}$ and $B_{120}$ function together to $X_{16}$ through logic gate $G_{18}$ (see §3). Based on the knowledge about this vacuum system, the truth value table of $G_{18}$ is constructed as shown below:

| No. | Expression of the state combination | $G_{18,1}$ | $G_{18,2}$ | $G_{18,3}$ |
|---|---|---|---|---|
| 1 | $B_{119,1}B_{120,1}$ | 1 | 0 | 0 |
| 2 | $B_{119,2}B_{120,1} + B_{119,1}B_{120,2}$ | 0 | 1 | 0 |

This is because when the two pumps operate normally ($G_{18,1}$), the vacuum cannot be low; when one of the two pumps stops ($G_{18,2}$), the pressure of the hot well may be high (i.e. the vacuum may be low); when two pumps stop simultaneously ($G_{18,3}$), the pressure of the hot well may be very high (the vacuum may be very low), where $G_{18,3}$ is the logic AND of two initiating events $B_{119,2}$ $B_{120,2}$ and should be null, which means that the state $G_{18,3}$ is an impossible state (null). But in practice, VPA and VPB may stop simultaneously due to some common causes (e.g. the common power failure, etc), therefore, $G_{18,3}$ is possible. In this case, $B_{119}$ and $B_{120}$ should be replaced with $X_{119}$ and $X_{120}$ that have their upstream cause variables including independent cause variables and the common cause variables. For simplicity, only the independent case will be considered in this example, and therefore $G_{18,3}$ is a null event.

Finally, connect the cause variables with the consequence variable $X_{16}$ through $F_{16;49}$, $F_{16;50}$ and $F_{16,18}$, and determine their causal relations, the module of $X_{16}$ with its direct cause variables being represented in the explicit representation mode is constructed. In which, $X_{16,1}$, $X_{49,1}$, $X_{50,1}$ and $G_{18,1}$ are the default states and are not in concern, because people concern only the fault causalities. Therefore, they are ignored in the representation of the functional variables $F_{n;i}$. In other words, people need only represent $F_{16j;49k}$, $F_{16j;50k}$ and $F_{16j;18k}$ (j=2,3 and k=2,3). Moreover, considering that the influence of $G_{18}$ to $X_{16}$ is relatively large, let $r_{16;18} = 1$; As the influence of $X_{49}$ and $X_{50}$ to $X_{16}$ is relatively small, let $r_{16;49} = r_{16;50} = 0.5$. Then, $r_{16} = r_{16;49} + r_{16;50} + r_{16;18} = 2$. The original functional intensity $a_{nk;ji}$ of $F_{nk;ij}$ is given by the domain engineers according to the statistic data or the beliefs. For example, $a_{16,2;18,2} = 0.8$; $a_{16,3;18,2} = 0.1$; $a_{16,2;18,3} = 0.3$; $a_{16,3;18,3} = 0.7$; etc. In which, $a_{16,2;18,2} + a_{16,3;18,2} \leq 0.9 < 1$. This is because whether or not the stop of any one of the two vacuum pumps results in the low vacuum is uncertain. Thus, $f_{16,2;18,2} = (\frac{1}{2})0.8 = 0.4$; $f_{16,3;18,2} = (\frac{1}{2})0.1 = 0.05$; $f_{16,3;18,2} = (\frac{1}{2})0.3 = 0.15$; $f_{16,3;18,3} = (\frac{1}{2})0.7 = 0.35$; and so on.

After all the X type variables in table 1 are represented in the explicit representation mode similar to that for $X_{16}$, put all these modules together according to the method described in §9 (2), the DUCG shown in FIG. 21 is constructed. In this example, the default state of the X type variable corresponds to a default variable D that is the direct cause of the default state. However, since people do not concern the default states, all the D type variables are ignored in FIG. 21.

Moreover, $F_{12;6}$ is a conditional functional variable (see §2). Its condition is $C_{12;6}=\overline{X}_{9,2}\overline{B}_{102,2}$ (the feed water flow rate in line C does not increase and there is no U type pipe rupture in the steam generator SGC), otherwise the steam flow rate $X_6$ in line C is not the cause of the abnormal water level $X_{12}$ in SGC.

For simplicity, the specific values of $A_{n;i}$ and $r_{n;i}$ in table 1 and FIG. 21 are ignored.

TABLE 1

The variable description for FIG. 21

| | | | | |
|---|---|---|---|---|
| $X_1$ | pressure of steam line A | normal | high | low |
| $X_2$ | pressure of steam line B | normal | high | low |
| $X_3$ | pressure of steam line C | normal | high | low |
| $X_4$ | flow rate of steam line A | normal | high | <u>low</u> |
| $X_5$ | flow rate of steam line B | normal | high | <u>low</u> |
| $X_6$ | flow rate of steam line C | normal | *high* | low |
| $X_7$ | flow rate of feed water line A | normal | high | low |
| $X_8$ | flow rate of feed water line B | normal | high | low |
| $X_9$ | flow rate of feed water line C | normal | high | low |
| $X_{10}$ | water level of steam generator A | normal | high | low |
| $X_{11}$ | water level of steam generator B | normal | high | low |
| $X_{12}$ | water level of steam generator C | normal | high | low |
| $X_{13}$ | pressure of main steam header | normal | high | low |
| $X_{14}$ | First stage pressure of turbine | normal | high | low |
| $X_{15}$ | water level of hot well | normal | high | low |
| $X_{16}$ | pressure of hot well | normal | high | very high |
| $X_{17}$ | level of water storage tank | normal | high | low |
| $G_{18}$ | state combination of vacuum pumps VPA and VPB | normal | one pump fail | all fail |
| $X_{19}$ | pressure of suction header of low pressure heater | normal | high | low |
| $X_{20}$ | pressure of main feed water pump suction header | normal | high | low |
| $X_{21}$ | discharging header pressure of main feed water pumps | normal | high | low |
| $X_{22}$ | pressure of feed water header | normal | high | low |
| $X_{23}$ | temperature of feed water header | normal | high | low |
| $X_{27}$ | pressure of low pressure heater drain pump HDPA | normal | high | low |
| $X_{28}$ | pressure of low pressure heater drain pump HDPB | normal | high | low |
| $X_{30}$ | load of turbine | normal | high | low |
| $X_{31}$ | speed of turbine | normal | high | low |
| $X_{32}$ | pressure of lubricating oil | normal | high | low |
| $X_{35}$ | state signal of bypass valve V21 | open | close | |
| $X_{36}$ | state signal of bypass valve V22 | open | close | |
| $X_{37}$ | state signal of bypass valve V31 | open | close | |
| $X_{38}$ | state signal of output valve V1 | open | close | |
| $X_{39}$ | state signal of output valve V2 | open | close | |
| $X_{40}$ | state signal of motor valve V26 | open | close | |
| $X_{41}$ | state signal of motor valve V27 | open | close | |
| $X_{42}$ | state signal of motor valve V28 | open | close | |
| $X_{43}$ | state signal of valve V3 | open | close | |
| $X_{44}$ | state signal of valve V4 | open | close | |
| $X_{45}$ | state signal of main feed water pump MFPA | normal | fail high | fail low |
| $X_{46}$ | state signal of main feed water pump MFPB | normal | fail high | fail low |
| $X_{47}$ | state signal of condensation pump CPA | normal | fail high | fail low |
| $X_{48}$ | state signal of condensation pump CPB | normal | fail high | fail low |
| $X_{49}$ | state signal of depressurizing valve PCV400A | close | open | |
| $X_{50}$ | state signal of depressurizing valve PCV400B | close | open | |
| $X_{51}$ | state signal of depressurizing valve PCV400C | close | open | |
| $X_{52}$ | state signal of feed water control valve FCV478 | normal | high | low |
| $X_{53}$ | state signal of feed water control valve FCV488 | normal | high | low |
| $X_{54}$ | state signal of feed water control valve FCV498 | normal | high | low |
| $X_{55}$ | state signal of depressurizing valve PCV308A | close | open | |
| $X_{56}$ | state signal of depressurizing valve PCV308B | close | open | |
| $X_{57}$ | state signal of depressurizing valve PCV308C | close | open | |
| $X_{58}$ | state signal of isolation valve V11 in steam line A | open | close | |
| $X_{59}$ | state signal of isolation valve V12 in steam line B | open | close | |
| $X_{60}$ | state signal of isolation valve V13 in steam line C | open | close | |
| $X_{61}$ | state signal of turbine main control valve TV | normal | high | low |
| $X_{62}$ | state signal of turbine main control valve GV | normal | high | low |
| $B_{63}$ | condensation pump CPA | normal | fail stop | |
| $B_{64}$ | condensation pump CPB | normal | fail stop | |
| $B_{65}$ | control valve FCV478 | normal | fail high | fail low |
| $B_{66}$ | control valve FCV488 | normal | fail high | fail low |
| $B_{67}$ | control valve FCV498 | normal | fail high | fail low |
| $B_{68}$ | feed water pipe line A | normal | leak | |
| $B_{69}$ | feed water pipe line B | normal | leak | |
| $B_{70}$ | feed water pipe line C | normal | leak | |
| $B_{71}$ | turbine | normal | fail | |
| $B_{72}$ | lubricating oil system | normal | fail | |
| $B_{73}$ | high pressure heat drain pump HDPA | normal | fail stop | |
| $B_{74}$ | low pressure heat drain pump HDPB | normal | fail stop | |

TABLE 1-continued

The variable description for FIG. 21

| | | | | |
|---|---|---|---|---|
| $B_{75}$ | load of turbine | normal | increase | decrease |
| $B_{77}$ | main feed water pump MFPA | normal | fail stop | |
| $B_{78}$ | main feed water pump MFPB | normal | fail stop | |
| $B_{79}$ | main steam isolation valve MSIV-A | normal | fail close | |
| $B_{80}$ | main steam isolation valve MSIV-B | normal | fail close | |
| $B_{81}$ | main steam isolation valve MSIV-C | normal | fail close | |
| $B_{82}$ | valve PCV308A | close | fail open | |
| $B_{83}$ | valve PCV308B | close | fail open | |
| $B_{84}$ | valve PCV308C | close | fail open | |
| $B_{85}$ | valve PCV400A | close | fail open | |
| $B_{86}$ | valve PCV400B | close | fail open | |
| $B_{87}$ | valve PCV400C | close | fail open | |
| $B_{88}$ | leakage between hot well and condensation pumps | no | yes | |
| $B_{89}$ | leakage in low pressure heaters | no | yes | |
| $B_{90}$ | leakage of water storage tank | no | yes | |
| $B_{91}$ | leakage of main steam header | no | yes | |
| $B_{92}$ | leakage of steam line A | no | yes | |
| $B_{93}$ | leakage of steam line B | no | yes | |
| $B_{94}$ | leakage of steam line C | no | yes | |
| $B_{95}$ | turbine valve TV | normal | fail high | fail low |
| $B_{96}$ | turbine valve GV | normal | fail high | fail low |
| $B_{100}$ | tubes in SGA | normal | leak | |
| $B_{101}$ | tubes in SGB | normal | leak | |
| $B_{102}$ | tubes in SGC | normal | leak | |
| $B_{103}$ | valve V1 | open | fail close | |
| $B_{104}$ | valve V2 | open | fail close | |
| $B_{105}$ | valve V3 | open | fail close | |
| $B_{106}$ | valve V4 | open | fail close | |
| $B_{107}$ | valve V11 | open | fail close | |
| $B_{108}$ | valve V12 | open | fail close | |
| $B_{109}$ | valve V13 | open | fail close | |
| $B_{110}$ | valve V21 | close | fail open | |
| $B_{111}$ | valve V22 | close | fail close | |
| $B_{112}$ | valve V26 | open | fail close | |
| $B_{113}$ | valve V27 | open | fail close | |
| $B_{114}$ | valve V28 | open | fail close | |
| $B_{115}$ | valve V31 | open | fail close | |
| $B_{116}$ | valve LCV1900 | normal | fail open | fail close |
| $B_{117}$ | valve LCV1910 | normal | fail open | fail close |
| $B_{119}$ | vacuum pump VPA | normal | fail stop | |
| $B_{120}$ | vacuum pump VPB | normal | fail stop | |

In the operation state of the nuclear power plant, this intelligent system monitors the states or the consequence variables online. These consequence variables are the system parameters of the nuclear power plant shown in the control room collected online and in time. Once the abnormal variable state appears (E' is not null), the fault diagnosis program of the DUCG is started. Suppose $t_1$ is the time that the first abnormal variable state appears. According to the experiment of the imitator of this nuclear power plant, the variable states are shown in table 1, in which the position of the italic letter indicates that only $X_6$ is in the abnormal state at this moment (E'($t_1$)=$X_{6,2}$: the steam flow rate in line C is high, which is marked by the italic and shading). The other consequence variables are in the normal states (these states compose E"($t_1$)). The states of the basic variables are unknown. In this example, all the evidence is certain instead of fuzzy. The case of fuzzy evidence will be discussed later.

Figure 22:
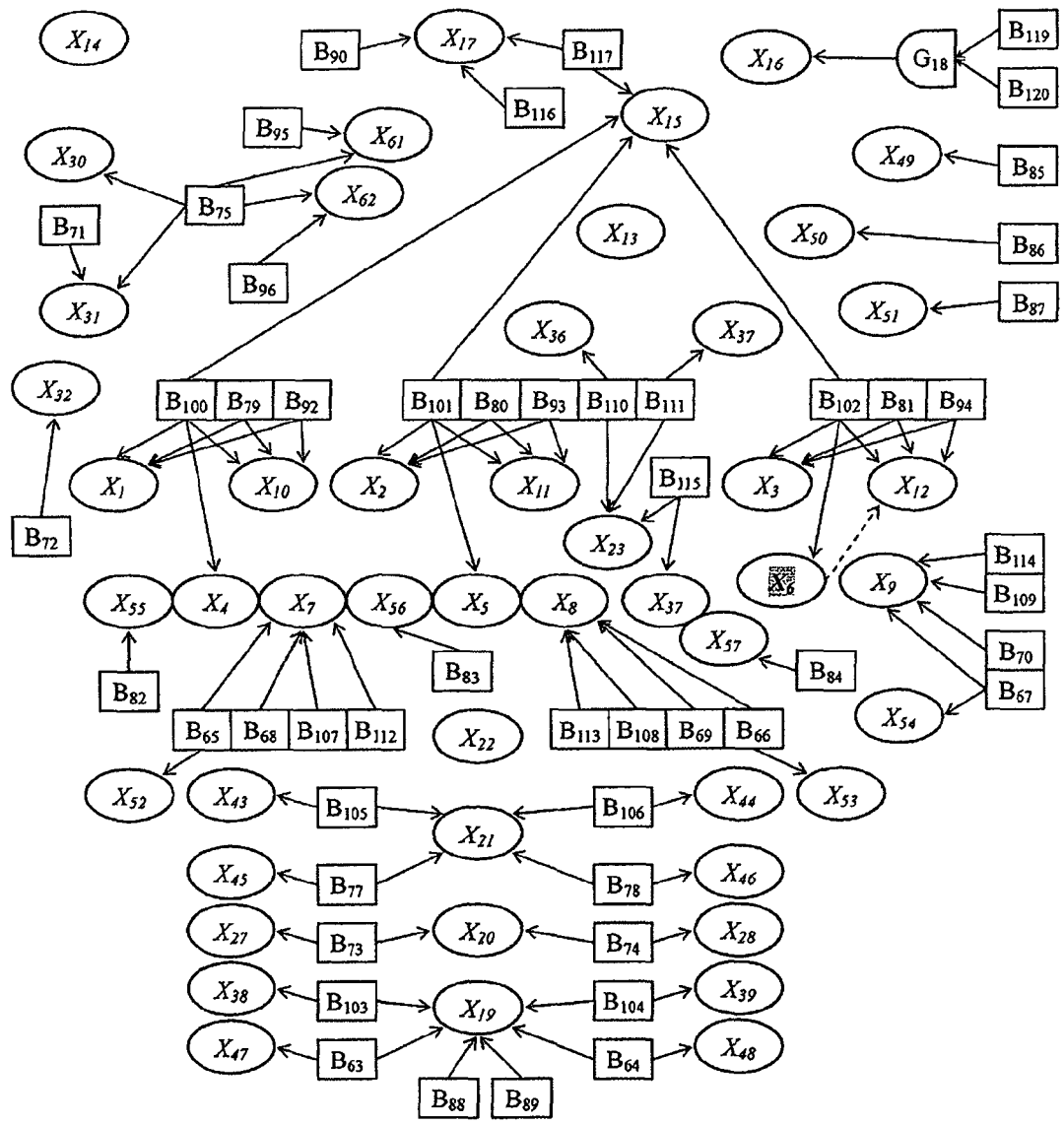
FIG. 22 is the DUCG resulted from FIG. 21, in which the output functional variables of the variables in normal state are eliminated.

Since the abnormal signal is monitored, the fault diagnosis program of DUCG is started as follows:

1. From the DUCG in FIG. 21, eliminate all the consequence variables with normal state and their output functional variables influencing the other variables, so as to obtain the DUCG shown in FIG. 22. This is because the DUCG represents only the influences of the abnormal states to other variables, which is based on the requirement of modeling, and therefore the normal states have no influence to other variables.

2. Eliminate the isolated part without any connection with the abnormal variables in FIG. 22, so as to obtain the DUCG shown in FIG. 23. This is because the isolated part without any connection with the abnormal variables does not include any information related to the abnormal variables and their causes, and therefore is not related to the fault diagnosis.

3. Eliminate the part in FIG. 23 which is connected directly with only the normal consequence variable ($X_{15}$ in this example), so as to obtain the DUCG shown in FIG. 24-1. This is because this part, blocked by the normal variables, does not have any information about the abnormal variables and their causes, and is therefore not related to the fault diagnosis.

4. The DUCG in FIG. 24-1 includes only one basic variable $B_{102}$ (the U type pipe rupture in the steam generator SGC). In addition, its normal state does not influence the other variables. Therefore, only its failure state (state 2) is the possible state. Then the static possible solution set in this moment is $S_H(t_1)=\{B_{102,2}\}$. Since there is only one possible solution in $S_H(t_3)$, we $h_{102,2}{}^{r'}(t_1)=h_{102,2}{}^{r}(t_1)=1$ without any calculation.

5. Since $B_{102,2}$ has been found certainly, the condition $C_{12;6}$ of $F_{12;6}$ in FIG. 24-1 is not valid, and therefore $F_{12;6}$ is eliminated so as to obtain FIG. 25-1.

6. To show the method, the static state probability of $B_{102,2}$ with incomplete information is calculated as follows:

$$h'_{102,2}(t_1) = Pr\{B_{102,2} \mid E'(t_1) = X_{6,2} = F_{6,2,102,2}B_{102,2}\}$$

$$= \frac{Pr\{B_{102,2}F_{6,2,102,2}B_{102,2}\}}{Pr\{F_{6,2,102,2}B_{102,2}\}}$$

-continued $$= \frac{Pr\{F_{6,2,102,2}B_{102,2}\}}{Pr\{F_{6,2,102,2}B_{102,2}\}}$$

$$= 1$$

In which, $B_{102,2}B_{102,2}=B_{102,2}$;

Similarly, the static state probability of $B_{102,1}$ with incomplete information can be calculated as follows:

$$h'_{102,1}(t_1) = Pr\{B_{102,1} \mid E'(t_1) = X_{6,2} = F_{6,2,102,2}B_{102,2}\}$$

$$= \frac{Pr\{B_{102,1}F_{6,2,102,2}B_{102,2}\}}{Pr\{F_{6,2,102,2}B_{102,2}\}}$$

$$= \frac{0}{Pr\{F_{6,2,102,2}B_{102,2}\}}$$

$$= 0$$

In which, $B_{102,1}B_{102,2}=0$.

Furthermore, by noting $h_{102,1}^{s'}(t_1)=0$, the static state probability with complete information of $B_{102,2}$ is:

$$h^s_{102,2}(t_1) = Pr\{B_{102,2} \mid E(t_1)\}$$

$$= \frac{h'_{102,2}(t_1)Pr\{E''(t_1) \mid B_{102,2}X_{6,2}\}}{\sum_{j=1}^{2} h'_{102,j}(t_1)Pr\{E''(t_1) \mid B_{102,j}X_{6,2}\}}$$

$$= \frac{Pr\{E''(t_1) \mid B_{102,2}X_{6,2}\}}{Pr\{E''(t_1) \mid B_{102,2}X_{6,2}\}}$$

$$= 1$$

In which, $E''(t_1)=X_{3,1}X_{12,1}X_{15,1}$. In the same way, the static state probability with complete information of $B_{102,1}$ is:

$$h^s_{102,1}(t_1) = Pr\{B_{102,1} \mid E(t_1)\}$$

$$= \frac{h'_{102,1}(t_1)Pr\{E''(t_1) \mid B_{102,1}X_{6,2}\}}{\sum_{j=1}^{2} h'_{102,j}(t_1)Pr\{E''(t_1) \mid B_{102,j}X_{6,2}\}}$$

$$= \frac{0}{Pr\{E''(t_1) \mid B_{102,2}X_{6,2}\}}$$

$$= 0$$

The reason why the result is obtained without calculating $Pr\{E''(t_1)|_{102,j}X_{6,2}\}$ is because $h_{102,1}^{s'}(t_1)=0$. But as an illustration of the method, suppose the condition $C_{12;6}$ of $F_{12;6}$ in FIG. 24-1 is valid. According to FIG. 24-1, $$Pr\{E''(t_1) \mid B_{102,2}X_{6,2}\} = Pr\{X_{3,1}X_{12,1}X_{15,1} \mid B_{102,2}X_{6,2}\}$$

$$= Pr\{\bar{X}_{3,2}\bar{X}_{3,3}\bar{X}_{12,2}\bar{X}_{12,3}\bar{X}_{15,2}\bar{X}_{15,3} \mid B_{102,2}X_{6,2}\}$$

$$= Pr\{\bar{F}_{3,2,102,2}\bar{0}(\bar{F}_{12,2,102,2}B_{102,2} + \bar{F}_{12,2,6,2}X_{6,2})\bar{0}\bar{F}_{15,2,102,2}B_{102,2}\bar{0} \mid B_{102,2}X_{6,2}\}$$

$$Pr\{(\bar{F}_{3,2,102,2} + \bar{B}_{102,2})(\bar{F}_{12,2,102,2} + \bar{B}_{102,2})(\bar{F}_{12,2,6,2} + \bar{X}_{6,2})(\bar{F}_{15,2,102,2} + \bar{B}_{102,2}) \mid B_{102,2}X_{6,2}\}$$

$$= Pr\{\bar{F}_{3,2,102,2}\bar{F}_{12,2,102,2}\bar{F}_{12,2,6,2}\bar{F}_{15,2,102,2} \mid B_{102,2}X_{6,2}\}$$

Based on FIG. 24-1, we have $$B_{102,2}X_{6,2} = B_{102,2}F_{6,2,102,2}B_{102,2} = F_{6,2,102,2}B_{102,2}$$

It is independent of $\bar{F}_{3,2,102,2}\bar{F}_{12,2,102,2}\bar{F}_{12,2,6,2}\bar{F}_{15,2,102,2}$. Then $$Pr\{E''(t_1)|B_{102,2}X_{6,2}\}=Pr\{\bar{F}_{3,2,102,2}\bar{F}_{12,2,102,2}\bar{F}_{12,2,6,2} \bar{F}_{15,2,102,2}\}=(1-f_{2,3,102,2})(1-f_{12,2,102,2})(1-f_{12,2,6,2})(1-f_{15,2,102,2})$$

Therefore, even if $h_{102,1}^{s'}(t_1)\neq 0$, $h_{102,2}^{s}(t_1)$ can also be calculated according to the method illustrated above, in which, conditioned on $B_{102,2}X_{6,2}$, both $\bar{B}_{102,2}$ and $\bar{X}_{6,2}$ are impossible and should be null 0, while conditioned on $B_{102,1}X_{6,2}$, $\bar{B}_{102,2}$ is certainly true and is therefore the complete set 1.

Moreover, since $B_{102,1}X_{6,2}=0$, $Pr\{E''(t_1)|B_{102,1}X_{6,2}\}=0$.

Of course, the calculation in this example should be based on FIG. 25-1, because when $B_{102,2}$ is found as the possible solution, $C_{12;6}$ is determined as invalid. The reason why based on FIG. 24-1 is only for using more complex example to illustrate the method.

So far, $B_{102,2}$ has been determined as the only fault. Its static state and rank probabilities with both incomplete and complete information at time $t_1$ are all equal to 1. In fact, $B_{102,2}$ is indeed the fault given in a training course at the nuclear power plant imitator for retraining the operators working in a nuclear power plant. In this experiment, it takes seven and half minutes for these operators to find this fault with the help of the teachers, while by DUCG, this fault can be certainly found at the first moment ($t_1$) when the abnormal signal just appears.

Moreover, the DUCG in FIG. 25-1 predicts that $X_3$, $X_{12}$ and $X_{15}$ will possibly be abnormal. By analyzing the data of $F_{nk;102,2}$ ($n\in\{3,12,15\}$, $k\in\{1,2,3\}$), which are not shown in the table but the qualitative analysis can be done, the possible abnormal states of the three consequence variables would be $X_{3,2}$, $X_{12,2}$ and $X_{15,2}$, because the contributions of $B_{102,2}$ to the other states of these variables are 0, i.e. $F_{nk;102,2}=0$ where $k\neq 2$.

To explain the fuzzy evidence case, suppose $E_6$ does not determine $X_{6,2}$, but only shows that the probability or the membership of $X_6$ being in its normal state is 0.3 and that in its abnormal high state is 0.7, i.e. $m_{6,1}=0.3$ and $m_{6,2}=0.7$. Then $E_6$ is the fuzzy evidence. According to §9 (3) and §10, $E_6$ is taken as the consequence variable of $X_6$ and is added into the original DUCG. Meanwhile, this DUCG is simplified conditioned on B according to the same method above, so as to obtain the final result shown in FIG. 24-1. The internal process is same as the certain evidence case, because $E_6$ excludes the influence of $X_{6,3}$ and $X_{6,1}$ does not have any influence to the process. The only difference is that between FIGS. 24-1 and 24-2. The others are the same. For saving space, the internal process is ignored. Because $m_{6,1}=0.3$, $m_{6,2}=0.7$ and $v_{6,1}=Pr\{X_{6,1}\}\approx 1$ (the unconditional probability of the normal state is usually very close to 1), $v_{6,2}=Pr\{X_{6,2}\}=Pr\{F_{6,2;102}B_{102}+F_{6,3}X_3\}\approx 0$ (The normal process should be outspread $X_3$ and break the cycle based on FIG. 21 first, and then perform the calculation. But it is too trivial and therefore is ignored. Compared with $v_{6,1}=1$, $v_{6,2}$ is the unconditional probability or frequency of the abnormal state and can be approximated as 0), according to §10, let $f_{E;6,2}=1$, we get $$f_{E;6,1} = \frac{m_{6,1}v_{6,2}}{m_{6,2}v_{6,1}} f_{E;6,2} \approx \frac{0.3 \times 0}{0.7 \times 1} = 0.$$

In this way, $E_6$ is added as a consequence variable of $X_6$ into the DUCG.

In FIG. 24-2, the only abnormal variable is $E_6$, i.e.

$$\begin{aligned}
E'(t_1) &= E_6 \\
&= F_{E;6}X_6 \\
&= F_{E;6,1}F_{6,1;D}D_6 + F_{E;6,2}F_{6,2;D}D_6 + F_{E;6,1}F_{6,1;102,1}B_{102,1} + \\
&\quad F_{E;6,1}F_{6,1;102,2}B_{102,2} + F_{E;6,2}F_{6,2;102,1}B_{102,1} + \\
&\quad F_{E;6,2}F_{6,1;102,2}B_{102,2} \\
&= F_{E;6,1}F_{6,1;D}D_6 + F_{E;6,1}F_{6,1;102,2}B_{102,2} + F_{E;6,2}F_{6,1;102,2}B_{102,2}
\end{aligned}$$

This is because $F_{6,2;D}=F_{6,1;102,1}=F_{6,2;102,1}=0$, i.e. $D_6$ does not have any contribution to the abnormal state of $X_6$, and the normal state of $B_{102}$ does not have any contribution to $X_6$, in which $D_6$ and $F_{E;6}$ is ignored in the figure. Moreover, since $f_{E;6,1}=0$ which means $F_{E;6,1}=0$. Then, $$E'(t_1) = F_{E;6,2}F_{6,1;102,2}B_{102,2}$$

Thus we know $S_H(t_1)=\{B_{102,2}\}$, which is the same as the case of the certain evidence. Then, given $B_{102,2}$, the condition $C_{12;6}$ of $F_{12;6}$ in FIG. 24-2 is invalid so that $F_{12;6}$ can be eliminated. That is the result shown in FIG. 25-2.

From the above discussion, in the case of the fuzzy evidence, the only difference from the certain evidence case is that there is an added event $F_{E;6,2}$ in the expression of $E'(t_1)$. Then, $$\begin{aligned}
h'_{102,2}(t_1) &= Pr\{B_{102,2} \mid E'(t_1) = F_{E;6}X_6 = F_{E;6,2}F_{6,2;102,2}B_{102,2}\} \\
&= \frac{Pr\{B_{102,2}F_{E;6,2}F_{6,2;102,2}B_{102,2}\}}{Pr\{F_{E;6,2}F_{6,2;102,2}B_{102,2}\}} \\
&= \frac{Pr\{F_{E;6,2}F_{6,2;102,2}B_{102,2}\}}{Pr\{F_{E;6,2}F_{6,2;102,2}B_{102,2}\}} \\
&= 1
\end{aligned}$$

$$\begin{aligned}
h'_{102,1}(t_1) &= Pr\{B_{102,1} \mid E'(t_1) = F_{E;6}X_6 = F_{E;6,2}F_{6,2;102,2}B_{102,2}\} \\
&= \frac{Pr\{B_{102,1}F_{E;6,2}F_{6,2;102,2}B_{102,2}\}}{Pr\{F_{E;6,2}F_{6,2;102,2}B_{102,2}\}} \\
&= \frac{0}{Pr\{F_{E;6,2}F_{6,2;102,2}B_{102,2}\}} \\
&= 0
\end{aligned}$$

$$\begin{aligned}
h^s_{102,2}(t_1) &= Pr\{B_{102,2} \mid E(t_1)\} \\
&= \frac{h'_{102,2}(t_1)Pr\{E''(t_1) \mid B_{102,2}X_6\}}{\sum_{j=1}^{2} h'_{102,j}(t_1)Pr\{E''(t_1) \mid B_{102,j}X_6\}} \\
&= \frac{Pr\{E''(t_1) \mid B_{102,2}X_6\}}{Pr\{E''(t_1) \mid B_{102,2}X_6\}} \\
&= 1
\end{aligned}$$

$$\begin{aligned}
h^s_{102,1}(t_1) &= Pr\{B_{102,1} \mid E(t_1)\} \\
&= \frac{h'_{102,1}(t_1)Pr\{E''(t_1) \mid B_{102,1}X_6\}}{\sum_{j=1}^{2} h'_{102,j}(t_1)Pr\{E''(t_1) \mid B_{102,1}X_6\}} \\
&= \frac{0}{Pr\{E''(t_1) \mid B_{102,2}X_6\}} \\
&= 0
\end{aligned}$$

Figure 26:
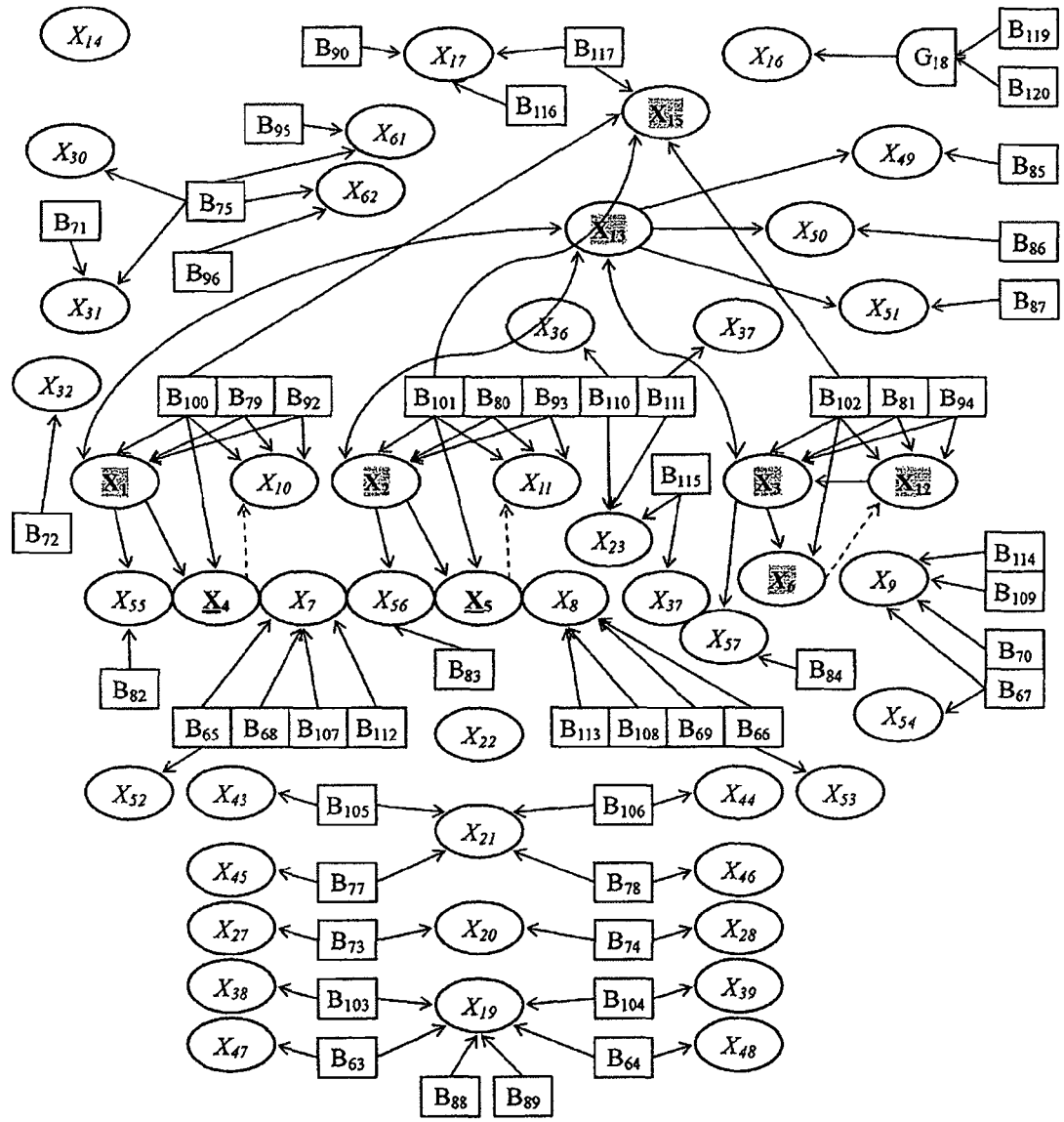
FIG. 26 is the DUCG after eliminating the output functional variables starting from the normal state variables in FIG. 21.

Since the secondary loop of the nuclear power plant is a dynamical system, although the fault has been found at time $t_1$, the consistence of the later diagnosis based on the new evidence with the earlier diagnosis is still important. Usually, after adding new evidence, the diagnosis should be more accurate. For this, we consider the signals monitored at time $t_2$. The states of the consequence variables at $t_2$ are still shown in table 1, in which the positions of the bold letters show that there are 9 abnormal variable states:

$X_{1,2}$ (the pressure in steam line A is high, shaded letter in the table), $X_{2,2}$ (the pressure in steam line B is high, shaded letter in the table), $X_{3,2}$ (the pressure in steam line C is high, shaded letter in the table), $X_{4,3}$ (the flow rate of steam line A is low, underline letter in the table), $X_{5,3}$ (the flow rate of steam line B is low, underline letter in the table), $X_{6,2}$ (the flow rate of steam line C is high, shaded letter in the table), $X_{12,2}$ (the water level in the steam generator C is high, shaded letter in the table), $X_{13,2}$ (the pressure in the main steam header is high, shaded letter in the table), $X_{15,2}$ (the water level of the hot well is high, shaded letter in the table);

i.e. $E'(t_2)=X_{1,2}X_{2,2}X_{3,2}X_{4,3}X_{5,3}X_{6,2}X_{12,2}X_{13,2}X_{15,2}$. The other variable states are normal (marked as the italic letters in the figures). Repeat the fault diagnosis steps similar to those for time $t_1$:

7. In FIG. 21, eliminate all the functional variables influencing the other variables from the consequence variables in the normal states, so as to obtain the DUCG shown in FIG. 26.

Figure 27:
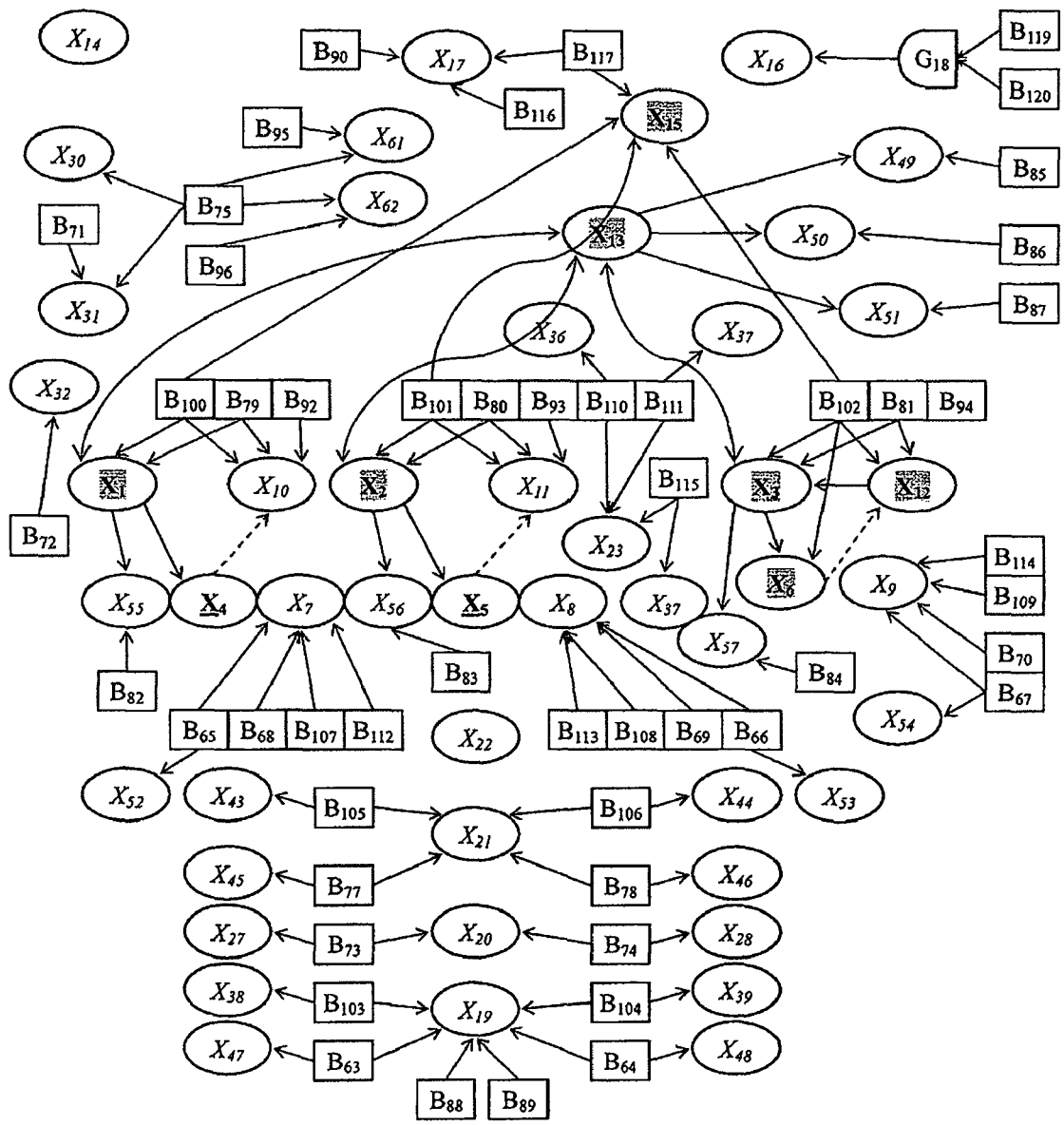
FIG. 27 is the DUCG after eliminating the functional variables that cannot cause the known states of the consequence variables in FIG. 26.

8. Consider the special functional variables in FIG. 26, i.e. the functional variables directly connecting the cause variables whose state is unknown with the consequence variables whose state is known. If no matter what state the cause variable is in, the contribution of this functional variable to the known states of the consequence variables is 0 or not given, this functional variable is eliminated, so as to obtain the DUCG shown in FIG. 27. For example, in the functional variable of $B_{100}$ to $X_{4,3}$, $F_{4,3;100j}=0$, and in the functional variable of $B_{101}$ to $X_{5,3}$, $F_{5,3;101j}=0$, eliminate $F_{4;100}$ and $F_{5;101}$. This is because the leakage of the U type pipes in the steam generator cannot cause the low steam flow rate, meanwhile the normal states (j=1) of the basic variables do not have any influence to the other variables. For another example, whether or not the steam pipe leaks cannot cause the high water level of the steam generator or the high pressure of the steam pipe. Therefore, $F_{12;94}$, $F_{3;94}$, $F_{1;92}$ and $F_{2;93}$ are eliminated.

Figure 28:
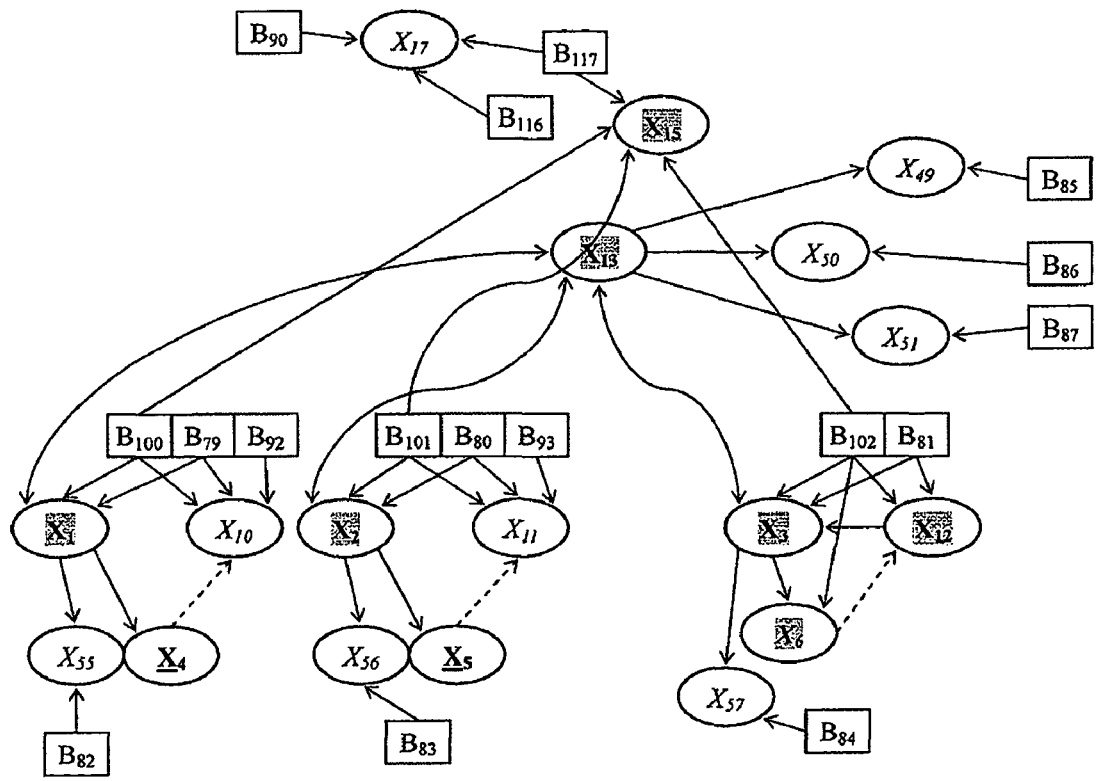
FIG. 28 is the DUCG after eliminating the part without any connection with the abnormal state variables in FIG. 27.

9. Eliminate the isolated part without connection with the consequence variables whose states are abnormal, so as to obtain the DUCG shown in FIG. 28.

10. Eliminate the part directly connected with only the state normal variables in FIG. 28, so as to obtain the DUCG shown in FIG. 29.

11. Eliminate the functional variables inconsistent with the time order. Because $X_{6,2}$ appeared at time $t_1$, $X_{3,2}$ appearing at time $t_2$ cannot be the cause of $X_{6,2}$. Therefore, $F_{6;3}$ is eliminate to obtain the DUCG shown in FIG. 30.

12. Outspread $E'(t_2)$ so as to obtain $S_H(t_2)$. Only for this, the functional variables, the conditional functional variables and the states of variables can be ignored. After the ignorance, the variables in the expression can be absorbed with other. The repeated variables on the cause side are treated as null. Then $$X_1 = B_{79} + B_{100} + X_{13} = B_{79} + B_{100} + B_{80} + B_{101} + B_{81} + B_{102}$$

$$X_2 = B_{80} + B_{101} + X_{13} = B_{80} + B_{101} + B_{79} + B_{100} + B_{81} + B_{102}$$

$$X_3 = B_{81} + B_{102} + X_{13} + X_{12} = B_{81} + B_{102} + B_{79} + B_{100} + B_{80} + B_{101}$$

$$X_4 = X_1 = B_{79} + B_{100} + B_{80} + B_{101} B_{81} + B_{102}$$

$$X_4 = X_2 = B_{80} + B_{101} + B_{79} + B_{100} + B_{81} + B_{102}$$

$$X_6 = B_{102}$$

$$X_{12} = B_{81} + X_6 = B_{81} + B_{102}$$

$$X_{13} = X_1 + X_2 + X_3 = B_{79} + B_{100} + B_{80} + B_{101} + B_{81} + B_{102}$$

$$X_{15} = B_{100} + B_{101} + B_{102} + B_{117}$$

Thus we know $E'(t_2) = X_1 X_2 X_3 X_4 X_5 X_6 X_{12} X_{13} X_{15} = B_{102}$. This is because $X_6$ includes only the initiating event variable $B_{102}$, meanwhile all the other consequence variables have the items including $B_{102}$. According to the rule that the AND of the different initiating events is null, only $B_{102}$ in the outspreaded expression of $E'(t_2)$ remains. Furthermore, because $B_{102,1}$ does not have any output, only $B_{102,2}$ can be true, i.e. $S_H(t_2) = \{B_{102,2}\}$. Conditioned on both $E(t_1)$ and $E(t_2)$, the dynamical possible solution set $S_H(t)$ should be the intersection of $S_H(t_1)$ and $S_H(t_2)$:

$$S_H(t) = S_H(t_1) S_H(t_2) = S_H(t_1) = S_H(t_2) = \{B_{102,2}\}$$

Figure 29:
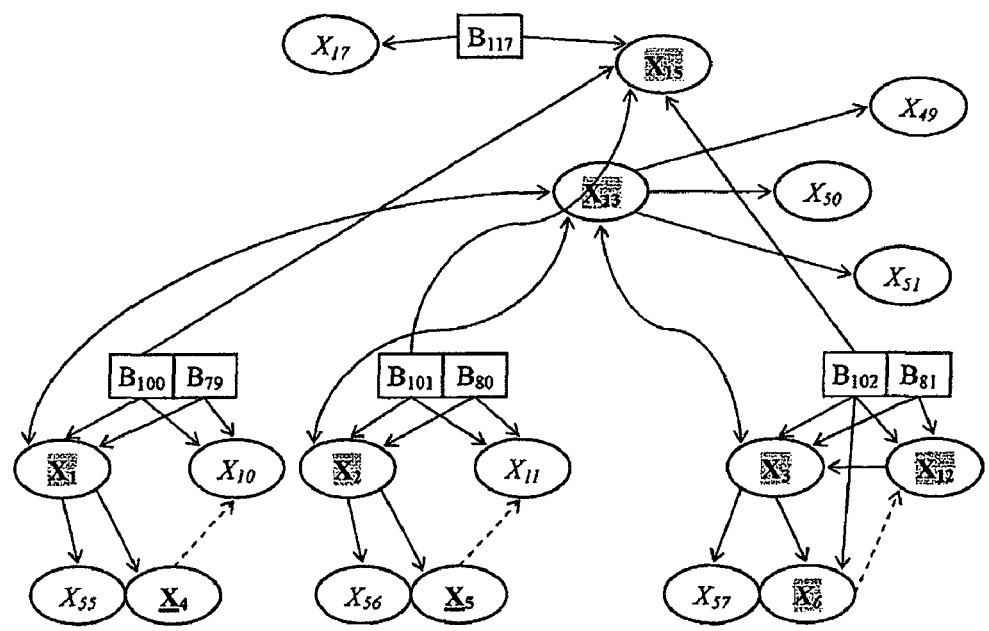
FIG. 29 is the DUCG after eliminating the part directly connected with only the normal state variables in FIG. 28.
Figure 30:
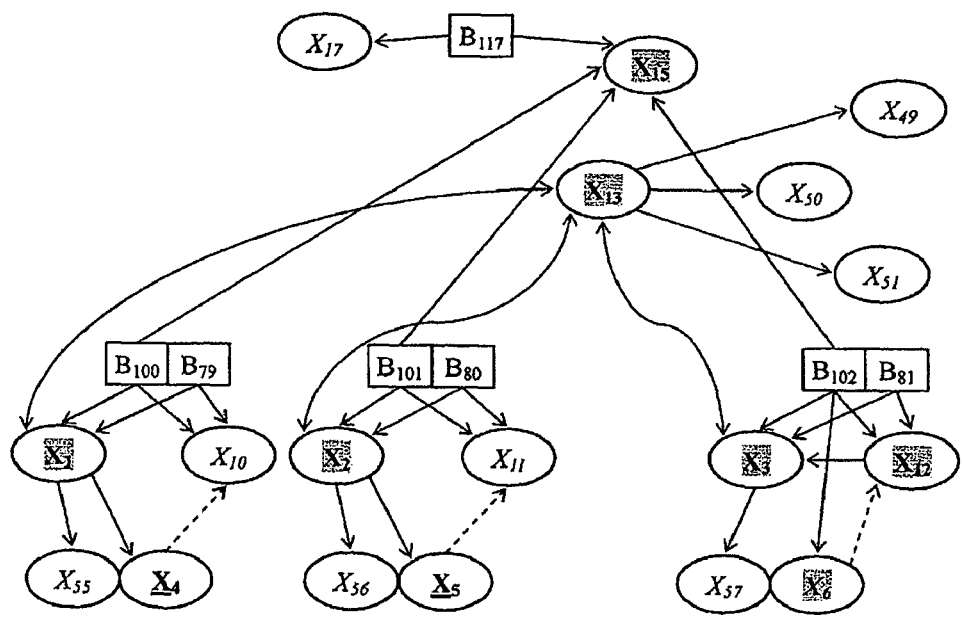
FIG. 30 is the DUCG after eliminating the functional variables inconsistent with the occurrence order of events in FIG. 29.
Figure 31:
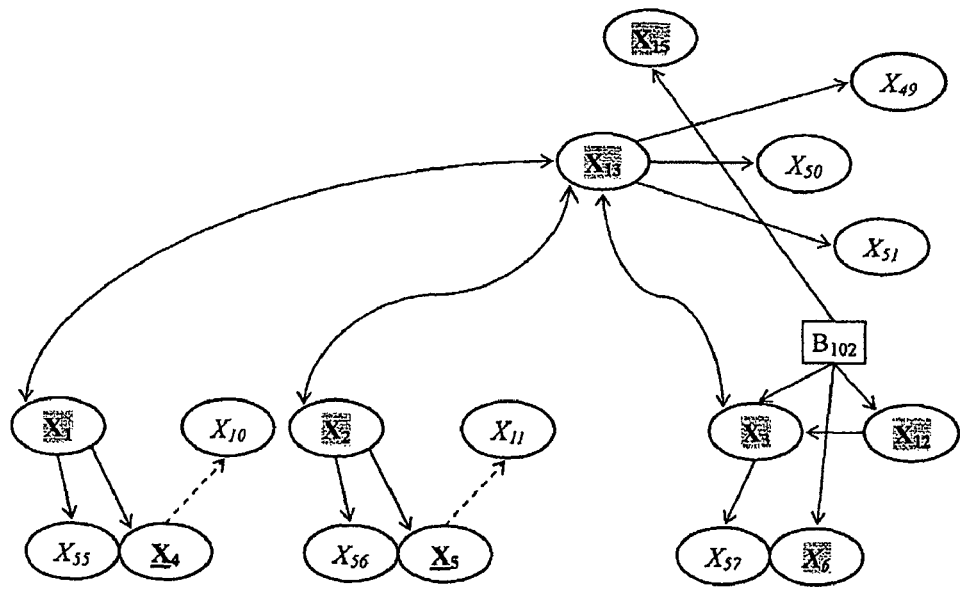
FIG. 31 is the DUCG after eliminating the exclusive or condition invalid variables and the isolated normal state variables in FIG. 30.

In fact, the DUCG of either FIG. 29 or FIG. 30 deals with only 7 basic variables. The normal states of these variables do not have any influence to other variables. Therefore, only their fault states can be the possible states, i.e. the most possible scope of $S_H(t_2)$ can only be:

$$S_H(t_2) + \{B_{100,2}, B_{101,2}, B_{79,2}, B_{80,2}, B_{81,2}, B_{117,2}, B_{117,3}\}$$

In this case, we still have $$S_H(t) = S_H(t_1) S_H(t_2) = \{B_{102,2}\} \cdot \{B_{100,2}, B_{101,2}, B_{102,2}, B_{79,2}, B_{80,2}, B_{81,2}, B_{117,2}, B_{117,3}\} = \{B_{102,2}\}$$

In which, the operator "·" denotes the logic AND.

Since both the static and dynamical possible solution sets $S_H(t_1)$ and $S_H(t_2)$ have only one possible solution, there is no need to calculate the rank probability, the fault cause $B_{102,2}$ is found accurately and the rank probability equals 1. In this example, as the fault has been found at time $t_1$ uniquely, the diagnosis accuracy cannot be increased by the new information at $t_2$. Suppose the elements in $S_H(t_1)$ are not only one, then the elements in $S_H(t)$, ($t \geqq t_2$), must be less than or equal to the elements in $S_H(t_1)$ (but should not be null, otherwise the DUCG has defects or spurious signals), i.e. as the amount of information increases, the accuracy of diagnosis increases gradually.

13. According to $$h_{kj}^{s'}(t) = \frac{\prod_{i=1}^{n} h_{kj}^{s'}(t_i)/(h_{kj}(t_0))^{n-1}}{\sum_j \prod_{i=1}^{n} h_{kj}^{s'}(t_i)/(h_{kj}(t_0))^{n-1}}$$

The dynamical state probability with incomplete information $B_{102,2}$ is $$h_{102,2}^{s'}(t) = Pr\{B_{102,2} | E'(t_1) E'(t_2)\}$$

$$= \frac{h_{102,2}^{s'}(t_1) h_{102,2}^{s'}(t_2)/b_{102,2}}{h_{102,1}^{s'}(t_1) h_{102,1}^{s'}(t_2)/b_{102,1} + h_{102,2}^{s'}(t_1) h_{102,2}^{s'}(t_2)/b_{102,2}}$$

$$= \frac{h_{102,2}^{s'}(t_1) h_{102,2}^{s'}(t_2)/b_{102,2}}{h_{102,2}^{s'}(t_1) h_{102,2}^{s'}(t_2)/b_{102,2}}$$

$$= 1$$

In which, $$h_{102,1}(t_0) = b_{102,1}$$

$$h_{102,2}(t_0) = b_{102,2}$$

$$h_{102,1}^{s'}(t_1) = 0$$

$$h_{102,2}^{s'}(t_1) = 1$$

In the same way, $$h_{102,1}^{s'}(t) = Pr\{B_{102,1} | E'(t_1) E'(t_2)\}$$

$$= \frac{h_{102,1}^{s'}(t_1) h_{102,1}^{s'}(t_2)/b_{102,1}}{h_{102,1}^{s'}(t_1) h_{102,1}^{s'}(t_2)/b_{102,1} + h_{102,2}^{s'}(t_1) h_{102,2}^{s'}(t_2)/b_{102,2}}$$

$$= \frac{0}{h_{102,2}^{s'}(t_1) h_{102,2}^{s'}(t_2)/b_{102,2}}$$

$$= 0$$

According to $$h_{kj}^{s}(t) = \frac{\prod_{i=1}^{n} h_{kj}^{s}(t_i)/(h_{kj}(t_0))^{n-1}}{\sum_j \prod_{i=1}^{n} h_{kj}^{s}(t_i)/(h_{kj}(t_0))^{n-1}}$$

The dynamical state probability with complete information of $B_{102,2}$ is $$h_{102,2}^{s}(t) = Pr\{B_{102,2} | E(t_1) E(t_2)\}$$

$$= \frac{h_{102,2}^{s}(t_1) h_{102,2}^{s}(t_2)/b_{102,2}}{h_{102,1}^{s}(t_1) h_{102,1}^{s}(t_2)/b_{102,1} + h_{102,2}^{s}(t_1) h_{102,2}^{s}(t_2)/b_{102,2}}$$

$$= \frac{h_{102,2}^{s}(t_1) h_{102,2}^{s}(t_2)/b_{102,2}}{h_{102,2}^{s}(t_1) h_{102,2}^{s}(t_2)/b_{102,2}}$$

$$= 1$$

Because in which, $$h_{102,1}^{s}(t_1) = h_{102,1}^{s}(t_2) = 0$$

In the same way, we can get $h_{102,1}^{s}(t) = 0$.

14. From FIG. 30, eliminate the basic variables and their functional variables that have been determined should not be included. As $X_{17}$ becomes an isolated normal variable due to the elimination of $B_{117}$ and is irrelevant to the fault diagnosis, it is also eliminated. Meanwhile, $C_{12;6}$ is invalid due to the determination of $B_{102,2}$, which results in the elimination of $F_{12,6}$. Then we get the DUCG shown in FIG. 31. This DUCG predicts that $X_{10}$, $X_{11}$, $X_{49}$, $X_{50}$, $X_{51}$, $X_{55}$, $X_{56}$ and $X_{57}$ might be abnormal. But, until the shut down of the reactor, these 8 variables do not appear abnormal. The reason is that the steam pressure increase resulted in by $B_{102,2}$ is not large enough to open the depressurizing valves represented by the later 6 variables and the decrease of the stream flow rates in lines A and B is very small, such that the ordinary automatic control of the feed water flow rate maintains the normal water levels of the steam generators. But the predicted $X_{3,2}$, $X_{12,2}$ and $X_{15,2}$ in step 4 at time $t_1$ do appear at time $t_2$, which proves the prediction accuracy of DUCG.

Example 23

The application illustration for predicting the effects of the economic policies.

A simple DUCG modeling the price influence of the agricultural products is as shown in FIG. 32. The construction method is similar to that for example 1: The first step is to determine the B and X type variables in the domain. These variables are described as shown in FIG. 32. In this example, all variables have three discrete or fuzzily discretized states indexed as "1, 2, 3" respectively. The method of fuzzy discretization is similar to that of fuzzily discretizing $X_{16}$ in example 1. For every X type variable, determine its direct cause variables. For example, the direct cause variables of $X_7$ are $X_4$, $X_6$ and $B_{11}$. In which, as there are historical statistic data available, the causal relations between $X_4$ and $X_6$ to $X_7$ are better to be represented in the implicit representation mode. $B_{11}$ represents the proposed economic policies and there is no historical data available. Only the belief of the domain engineers is available. Therefore, the explicit representation mode is suitable. In other words, the causal relations between $X_7$ and its direct cause variables are represented in the hybrid representation mode. The direct cause variable of $X_8$ is only $X_7$. Since there are the historical statistic data, the implicit representation mode can be used. The direct cause variables of $X_3$, $X_4$, $X_5$, $X_6$, $X_9$ and $X_{10}$ are also represented respectively as shown in FIG. 32, and are all in the explicit representation mode due to the data, etc. Put all the representations for the X type variables together, we get the DUCG as shown in FIG. 32. In which, the state probability parameters, the original functional intensities of the functional variables, the conditional probability tables involved in the implicit representation mode, the relationships, etc, are given by the domain engineers according to the statistic data or their belief. For example, $$B_1 = B_2 = \begin{pmatrix} 0.3 \\ 0.4 \\ 0.3 \end{pmatrix},$$

$$B_{11} = \begin{pmatrix} 1 \\ 0 \\ 0 \end{pmatrix}$$

In which, $b_{11,1}=1$ is because we want to predict the effect of the proposed economic policy 1. Similarly, we can predict the effects of the other proposed economic policies. Moreover, in addition to the implicit representation mode, $$\begin{pmatrix} a_{n1;ij} \\ a_{n2;ij} \\ a_{n3;ij} \end{pmatrix} = \begin{pmatrix} 0.2 \\ 0.3 \\ 0.5 \end{pmatrix}$$

Therefore, $$A_{3;7} = \begin{pmatrix} a_{3,1;7,1} & a_{3,1;7,2} & a_{3,1;7,3} \\ a_{3,2;7,1} & a_{3,2;7,2} & a_{3,2;7,3} \\ a_{3,3;7,1} & a_{3,3;72} & a_{3,3;7,3} \end{pmatrix} =$$

$$A_{7;11} \equiv \begin{pmatrix} a_{7,1;11,1} & a_{7,1;11,2} & a_{7,1;11,3} \\ a_{7,2;11,1} & a_{7,2;11,2} & a_{7,2;11,3} \\ a_{7,3;11,1} & a_{7,3;11,2} & a_{7,3;11,3} \end{pmatrix}$$

$$= \begin{pmatrix} 0.2 & 0.2 & 0.2 \\ 0.3 & 0.3 & 0.3 \\ 0.5 & 0.5 & 0.5 \end{pmatrix}$$

Etc. All the relationships of the functional intensities are the default value 1. The causal relations of $X_4$ and $X_6$ to $X_7$ are represented in the implicit representation mode. The conditional probability table CPT is:

TABLE 2

The conditional probability table of $X_4$ and $X_6$ to $X_7$

| No. j | Expression of state combination | $q_{71;j}/d_{7;j} = p_{71;j}$ | $q_{72;j}/d_{7;j} = p_{72;j}$ | $q_{73;j}/d_{7;j} = p_{73;j}$ |
|---|---|---|---|---|
| 1 | $X_{41}X_{61}$ | 50/100 = 0.5 | 50/100 = 0.5 | 0/100 = 0 |
| 2 | $X_{41}X_{62}$ | 40/100 = 0.4 | 40/100 = 0.4 | 20/100 = 0.2 |
| 3 | $X_{41}X_{63}$ | 100/200 = 0.5 | 50/200 = 0.25 | 50/200 = 0.25 |
| 4 | $X_{42}X_{61}$ | 150/250 = 0.6 | 0/250 = 0 | 100/250 = 0.4 |
| 5 | $X_{42}X_{62}$ | 0/100 = 0 | 40/100 = 0.4 | 60/100 = 0.6 |
| 6 | $X_{42}X_{63}$ | 20/200 = 0.1 | 100/200 = 0.5 | 80/200 = 0.4 |
| 7 | $X_{43}X_{61}$ | 40/100 = 0.4 | 40/100 = 0.4 | 20/100 = 0.2 |
| 8 | $X_{43}X_{62}$ | 10/50 = 0.2 | 20/50 = 0.4 | 20/50 = 0.4 |
| 9 | $X_{43}X_{63}$ | 20/80 = 0.25 | 40/80 = 0.5 | 20/80 = 0.25 |

The causal relation of $X_7$ to $X_8$ is also represented in the implicit representation mode. The conditional probability table is:

TABLE 3

The conditional probability table of $X_7$ to $X_8$

| No. j | Expression of state combination | $q_{81;j}/d_{8;j} = p_{81;j}$ | $q_{82;j}/d_{8;j} = p_{82;j}$ | $q_{83;j}/d_{8;j} = p_{83;j}$ |
|---|---|---|---|---|
| 1 | $X_{71}$ | 50/100 = 0.5 | 20/100 = 0.2 | 30/100 = 0.3 |
| 2 | $X_{72}$ | 60/80 = 0.75 | 8/80 = 0.1 | 12/80 = 0.15 |
| 3 | $X_{73}$ | 150/300 = 0.5 | 120/300 = 0.4 | 30/300 = 0.1 |

The DUCG in FIG. 32 is in the hybrid representation mode, and has the logic cycles. Therefore, it must be transformed as EDUCG for getting the solution, i.e. transform the hybrid representation mode of $X_7$ and the implicit representation mode of $X_8$ as the explicit representation mode. To do this, the logic gates $G_{12}$ and $G_{13}$ as well as the default events $D_7$ and $D_8$ are added. The transformed EDUCG is as shown in FIG. 33.

Since $$p_{7k} = \min_j \{p_{7k;j}\} = 0,$$

k=1,2,3, $D_7$ does not exist. Then $$A_{7,12} = \begin{pmatrix} 0.5 & 0.4 & 0.5 & 0.6 & 0 & 0.1 & 0.4 & 0.2 & 0.25 \\ 0.5 & 0.4 & 0.25 & 0 & 0.4 & 0.5 & 0.4 & 0.4 & 0.5 \\ 0 & 0.2 & 0.25 & 0.4 & 0.6 & 0.4 & 0.2 & 0.4 & 0.25 \end{pmatrix}$$

Figure 34:
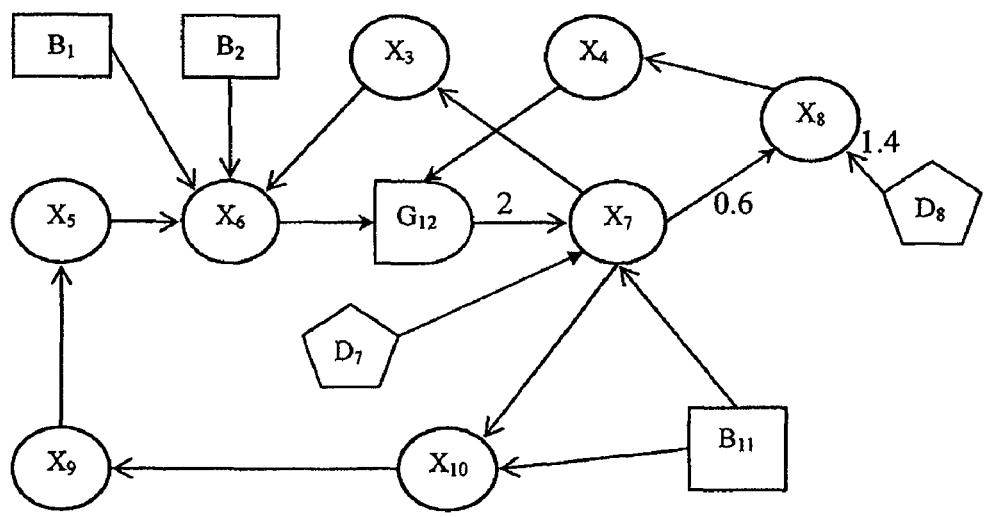
FIG. 34 is the simplified EDUCG based on FIG. 33.

Meanwhile, $G_{13}$ can be ignored because it has only one input variable. Then we have FIG. 34. The numbers with the directed arcs are the relationships (default case is 1), in which, according to $$a_{8k;D} = p_{8k} \bigg/ \sum_k p_{8k} \text{ and } p_{8k} = \min_j \{p_{8k;j}\},$$

the original functional intensities of $F_{8;D}$ are calculated as $a_{81;D}=5/7$, $a_{82;D}=1/7$ and $a_{83;D}=1/7$.

After the transformation, $r_{X8}=r_{8;7}+1=2$, where $r_{8;7}=1$ is given y domain engineers;

$$r_{8;D} = r_{X8} \sum_k p_{8k} = 2 \times 0.7 = 1.4,$$

$$r_{8;7} = r_{8;13} = r_{X8}\left(1 - \sum_k p_{8k}\right) = 2 \times 0.3 = 0.6,$$

where $r_{8;7}$ is produced after ignore $G_{13}$.

According to $$a_{8k;7j} = p_{8k;j}$$
$$= (p_{8k;j} - p_{8k}) \bigg/ \sum_k (p_{8k;j} - p_{8k})$$
$$= (p_{8k;j} - p_{8k}) \bigg/ \left(1 - \sum_k p_{8k}\right),$$

the values of $a_{8k;7j}$ after the reconstruction are calculated as shown in the following table:

TABLE 4

The new conditional probability table of $X_7$ to $X_8$

| j' | $q_{81;j'}/d_{8;j'} = p_{81;j'} = a_{81;7j'}$ | $q_{82;j'}/d_{8;j'} = p_{82;j'} = a_{82;7j'}$ | $q_{83;j'}/d_{8;j'} = p_{83;j'} = a_{83;7j'}$ |
|---|---|---|---|
| 1 | 0/100 = 0 | 33.33/100 = 0.3333 | 66.67/100 = 0.6667 |
| 2 | 66.67/80 = 0.8333 | 0/80 = 0 | 13.33/80 = 0.1667 |
| 3 | 0/300 = 0 | 300/300 = 1 | 0/300 = 0 |

Then we have $$A_{8;7} = \begin{pmatrix} 0 & 0.8333 & 0 \\ 0.3333 & 0 & 1. \\ 0.6667 & 0.1667 & 0 \end{pmatrix} \text{ and } A_{8;D} = \begin{pmatrix} \frac{5}{7} \\ \frac{1}{7} \\ \frac{1}{7} \end{pmatrix}$$

After the initial logic outspread of the consequence variables and logic gate in the above EDUCG, we have $X_3 = F_{3;7}X_7$ $X_4 = F_{4;8}X_8$ $X_5 = F_{5;9}X_9$ $X_6 = F_{6;1}B_1 + F_{6;2}B_2 + F_{6;3}X_3 + F_{6;5}X_5$ $X_7 = F_{7;11}B_{11} + F_{7;12}G_{12}$ $X_8 = F_{8;7}X_7 + F_{8;D}D_8$ $X_9 = F_{9;10}X_{10}$ $X_{10} = F_{10;7}X_7 + F_{10;11}B_{11}$ $G_{12} = G_{12}\{U_{12;4}X_4, U_{12;6}X_6\}$ \hfill (2.1)

After the further outspread to $X_3$, we have $$X_3 = F_{3;7}(F_{7;11}B_{11} + F_{7;12}G_{12} \tag{2.2}$$
$$\{U_{12;4}F_{4;8}(F_{8;7}X_7 + F_{8;D}D_8), U_{12;6}(F_{6;1}B_1 + F_{6;2}B_2 +$$
$$F_{6;3}X_3 + F_{6;5}F_{5;9}F_{9;10}(F_{10;11}B_{11} + F_{10;7}X_7))\}) =$$
$$F_{3;7}F_{7;11}B_{11} + F_{3;7}F_{7;12}G_{12}\{U_{12;4}F_{4;8}F_{8;7}X_7, U_{12;6}F_{6;1}B_1\} +$$
$$F_{3;7}F_{7;12}G_{12}\{U_{12;4}F_{4;8}F_{8;7}X_7, U_{12;6}F_{6;2}B_2\} +$$
$$F_{3;7}F_{7;12}G_{12}\{U_{12;4}F_{4;8}F_{8;7}X_7, U_{12;6}F_{6;3}X_3\} +$$
$$F_{3;7}F_{7;12}G_{12}\{U_{12;4}F_{4;8}F_{8;7}X_7, U_{12;6}F_{6;5}F_{5;9}F_{9;10}F_{10;11}B_{11}\} +$$
$$F_{3;7}F_{7;12}G_{12}\{U_{12;4}F_{4;8}(F_{8;7}X_7, U_{12;6}F_{6;5}F_{5;9}F_{9;10}F_{10;7}X_7\} +$$
$$F_{3;7}F_{7;12}G_{12}\{U_{12;4}F_{4;8}F_{8;D}D_8, U_{12;6}F_{6;1}B_1\} +$$
$$F_{3;7}F_{7;12}G_{12}\{U_{12;4}F_{4;8}F_{8;D}D_8, U_{12;6}F_{6;2}B_2\} +$$
$$F_{3;7}F_{7;12}G_{12}\{U_{12;4}F_{4;8}F_{8;D}D_8, U_{12;6}F_{6;3}X_3\} + F_{3;7}F_{7;12}$$
$$G_{12}\{U_{12;4}F_{4;8}F_{8;D}D_8, U_{12;6}F_{6;5}F_{5;9}F_{9;10}F_{10;11}B_{11}\} +$$
$$F_{3;7}F_{7;12}G_{12}\{U_{12;4}F_{4;8}F_{8;D}D_8, U_{12;6}F_{6;5}F_{5;9}F_{9;10}F_{10;7}X_7\}$$

In this equation, the outspread follows the sequence of consequence to cause from lett to right, in which $X_3$ and $X_7$ are compose the logic cycles. According to the rule to break the logic cycle, the consequence cannot be its own cause. Therefore, in the static case, the $X_3$ and $X_7$ on the right side of the above equation should be treated as null. In the dynamical case, the $X_3$ and $X_7$ must be the values in the earlier moment, Moreover, $D_8$ and $U_{n;i}$ are the inevitable events and can be ignored, so as to get the following equation:

$$X_3 = \tag{2.3}$$
$$F_{3;7}(F_{7;11}B_{11} + F_{7;12}G_{12}\{F_{4;8}(F_{8;7}X_7 + F_{8;D}), (F_{6;1}B_1 + F_{6;2}B_2 +$$
$$F_{6;3}X_3 + F_{6;5}F_{5;9}F_{9;10}(F_{10;11}B_{11} + F_{10;7}X_7))\}) =$$

-continued
$$F_{3;7}F_{7;11}B_{11} + F_{3;7}F_{7;12}G_{12}\{F_{4;8}F_{8;7}X_7, F_{6;1}B_1\} +$$
$$F_{3;7}F_{7;12}G_{12}\{F_{4;8}F_{8;7}X_7, F_{6;2}B_2\} +$$
$$F_{3;7}F_{7;12}G_{12}\{F_{4;8}F_{8;7}X_7, F_{6;3}X_3\} +$$
$$F_{3;7}F_{7;12}G_{12}\{F_{4;8}F_{8;7}X_7, F_{6;5}F_{5;9}F_{9;10}F_{10;11}B_{11}\} +$$
$$F_{3;7}F_{7;12}G_{12}\{F_{4;8}F_{8;7}X_7, F_{6;5}F_{5;9}F_{9;10}F_{10;7}X_7\} +$$
$$F_{3;7}F_{7;12}G_{12}\{F_{4;8}F_{8;D}, F_{6;1}B_1\} +$$
$$F_{3;7}F_{7;12}G_{12}\{F_{4;8}F_{8;D}, F_{6;2}B_2\} +$$
$$F_{3;7}F_{7;12}G_{12}\{F_{4;8}F_{8;D}, F_{6;3}X_3\} +$$
$$F_{3;7}F_{7;12}G_{12}\{F_{4;8}F_{8;D}, F_{6;5}F_{5;9}F_{9;10}F_{10;11}B_{11}\} +$$
$$F_{3;7}F_{7;12}G_{12}\{F_{4;8}F_{8;D}, F_{6;5}F_{5;9}F_{9;10}F_{10;7}X_7\}$$

In the above equation, the probabilities are in the summation relation. For every item, if all the variables are independent of each other (if the DUCG is singly connected, the variables in any item are independent of each other), then the data matrixes can be used to do the probability calculation. If there is repeated variable, e.g. the sixth item in the above equation, $$F_{3;7}F_{7;12}G_{12}\{F_{4;8}F_{8;7}X_7, F_{6;5}F_{5;9}F_{9;10}F_{10;7}X_7\}$$

the outspread should be based on the event level. After removing the repeated events, the probability calculation can be performed.

The data matrix calculation can also be applied. But the calculation rules are different from the ordinary matrix calculation, so as to combine the event matrix calculation and the data matrix calculation together. For this example, take $X_7$ out of { } in the above equation, we get $$G_{12}\{F_{4;8}F_{8;7}X_7, F_{6;5}F_{5;9}F_{9;10}F_{10;7}X_7\} = G_{12}\{(F_{4;8}F_{8;7}F_{6;5}F_{5;9}F_{9;10}F_{10;7})X_7\}$$

In which, if there is no change in the items in { }, the data matrix can be used to do the calculation. The result must be the data matrix with same number of rows but possible different number of columns, while the calculated matrixes are divided by ",". These matrixes are fused according to the complete combination mode. The fused matrix has the same columns, but the number of rows equal to the multiplication of the numbers of the rows of the matrixes before the fusion. The new matrix is then calculated with the data matrixes of the common taken out variables. The method of fusion is: the elements in the first row of the first matrix are multiplied with the corresponding elements of all the rows (suppose there are J rows) respectively of the second matrix, so as to get the first J rows of the resulted matrix; then the elements of the second row of the first matrix are multiplied with the corresponding elements of the J rows respectively of the second matrix, so as to get the second J rows of the resulted matrix; . . . ; the elements of the last row of the first matrix are multiplied with the corresponding elements of the J rows respectively of the J rows of the second matrix, so as to get the last J rows of the resulted matrix. Thus the first two matrixes are fused as one matrix. Taking this matrix as the first matrix, we can perform the same calculation to the following matrixes, until all matrixes are fused as one matrix. Then the resulted matrix can be calculated with the data matrixes of the common taken out variables.

Although this calculation method is a new invention, it is only a method of mathematics and therefore out of the claims, nor explained in details. However, it is easy for the professionals to see the general law related to this method.

At the event level, the outspread can be done. And then the numerical calculation can be performed after removing the repeated events:

$$x_{3k} = \sum_{j,i} f_{3k;7j} f_{7j;11i} b_{11i} + \qquad (2.4)$$
$$\sum_{j,i,n,m,h,y,g} f_{3k;7j} f_{7j;12i} (f_{4n;8m} f_{8m;7h} x_{7h} \cdot f_{6y;1g} b_{1g}) +$$
$$\sum_{j,i,n,m,h,y,g} f_{k3;7j} f_{7j;12i} (f_{4n;8m} f_{8m;7h} x_{7h} \cdot f_{6y;2g} b_{2g}) +$$
$$\sum_{j,i,n,m,h,y,g} f_{3k;7j} f_{7j;12i} (f_{4n;8m} f_{8m;7h} x_{7h} \cdot f_{6y;3g} x_{3g}) +$$
$$\sum_{j,i,n,m,h,y,g,z,\eta,\beta} f_{3k;7j}$$
$$f_{7j;12i}(f_{4n;8m}f_{8m;7h}x_{7h} \cdot f_{6y;5g}f_{5g;9z}f_{9z;10\eta}f_{10\eta;11\beta}b_{11\beta}) +$$
$$\sum_{j,i,n,m,h,y,g,z,n} f_{3k;7j} f_{7j;12i}(f_{4n;8m}f_{8m;7b} \cdot f_{6y;5g}f_{5g;9z}f_{9z;10\eta}f_{10\eta;7h})$$
$$x_{7h} + \sum_{j,i,n,m,h,y,g} f_{3k;7j} f_{7j;12i}(f_{4n;8m}f_{8;Dh} \cdot f_{6y;1g}b_{1g}) +$$
$$\sum_{j,i,n,m,h,y,g} f_{3k;7j} f_{7j;12i}(f_{4n;8m}f_{8;Dh} \cdot f_{6y;2g}b_{2g}) +$$
$$\sum_{j,i,n,m,h,y,g} f_{3k;7j} f_{7j;12i}(f_{4n;8m}f_{8;Dh} \cdot f_{6y;3g}x_{3g}) + \sum_{j,i,n,m,h,y,g,z,\eta,\beta} f_{3k;7j}$$
$$f_{7j;12i}(f_{4n;8m}f_{8;Dh} \cdot f_{6y;5g}f_{5g;9z}f_{9z;10\eta}f_{10\eta;11\beta}b_{11\beta}) +$$
$$\sum_{j,i,n,m,h,y,g,z,\eta,\beta} f_{3k;7j} f_{7j;12i}(f_{4n;8m}f_{8;Dh} \cdot f_{6y;5g}f_{5g;9z}f_{9z;10\eta}f_{10\eta;7\beta}x_{7\beta})$$

In which every row and every item in the row are simply in the probability summation relation. All variables in an item are independent of each other, and are simply in the probability multiplication relation. The variables $X_{3g}$ and $X_{7h}$ are the values of the earlier moment, and are therefore independent of the variables already appeared in the items. Moreover, the operator "·" indicates the numerical multiplication, and meanwhile indicates the parallel in terms of time and causality.

In the same way, $$X_8 = \qquad (2.5)$$
$$F_{8;D} + (F_{8;7}(F_{7;11}B_{11} + F_{7;12}G_{12}\{F_{4;8}X_8, (F_{6;1}B_1 + F_{6;2}B_2 + F_{6;3}$$
$$F_{3;7}X_7 + F_{6;5}F_{5;9}F_{9;10}(F_{10;7}X_7 + F_{10;11}B_{11}))\})) =$$
$$F_{8;D} + F_{8;7}F_{7;11}B_{11} + F_{8;7}F_{7;12}G_{12}\{F_{4;8}X_8, F_{6;1}B_1\} +$$
$$F_{8;7}F_{7;12}G_{12}\{F_{4;8}X_8, F_{6;2}B_2\} +$$
$$F_{8;7}F_{7;12}G_{12}\{F_{4;8}X_8, F_{6;3}F_{3;7}X_7\} +$$
$$F_{8;7}F_{7;12}G_{12}\{F_{4;8}X_8, F_{6;5}F_{5;9}F_{9;10}F_{10;7}X_7\} +$$
$$F_{8;7}F_{7;12}G_{12}\{F_{4;8}X_8, F_{6;5}F_{5;9}F_{9;10}F_{10;11}B_{11}\}$$

In which, $X_7$ and $X_8$ on the right side must be the values in the earlier moment.

1. The Static Case

In the static case, the cause cannot be the consequence. Therefore, $X_3$ and $X_7$ in equation (2.3) are all viewed as null. Then, equation (2.3) becomes $$X_3 = F_{3;7}F_{7;11}B_{11} + F_{3;7}F_{7;12}G_{12}\{F_{4;8}F_{8;D},F_{6;1}B_1\} + F_{3;7}F_{7;12}G_{12}\{F_{4;8}F_{8;D},F_{6;2}B_2\} + F_{3;7}F_{7;12}G_{12}\{F_{4;8}F_{8;D},F_{6;5}F_{5;9}F_{9;10}F_{10;11}B_{11}\} \qquad (2.6)$$

In which, all variables in any item are independent of each other, and therefore the data matrixes can be used in the calculation directly.

In the above equation, $X_3$ as one of the input variables of $X_6$ is eliminated due to breaking cycle, leading to $r_6=3$. $X_7$ as one of the input variables of $X_8$ is eliminated due to breaking cycle, leading to $r_8=1.4$. $X_7$ as one of the input variables of $X_{10}$ is eliminated due to breaking cycle, leading to $r_{10}=1$.

Since $r_{3;7}/r_3=1$ and $r_{10;11}/r_{10}=1$, we know $F_{3;7}=A_{3;7}$ and $F_{10;11}=A_{10;11}$. Moreover, since $r_{7;11}/r_7=\frac{1}{3}$, we have $$F_{7;11} = \frac{1}{3}A_{7;11}$$
$$= \frac{1}{3}\begin{pmatrix} 0.2 & 0.2 & 0.2 \\ 0.3 & 0.3 & 0.3 \\ 0.5 & 0.5 & 0.5 \end{pmatrix}$$

Furthermore, $$F_{3;7}F_{7;11}B_{11} = \begin{pmatrix} 0.2 & 0.2 & 0.2 \\ 0.3 & 0.3 & 0.3 \\ 0.5 & 0.5 & 0.5 \end{pmatrix}\frac{1}{3}\begin{pmatrix} 0.2 & 0.2 & 0.2 \\ 0.3 & 0.3 & 0.3 \\ 0.5 & 0.5 & 0.5 \end{pmatrix}\begin{pmatrix} 1 \\ 0 \\ 0 \end{pmatrix}$$
$$= \frac{1}{3}\begin{pmatrix} 0.2 \\ 0.3 \\ 0.5 \end{pmatrix}$$

$$F_{4;8}F_{8;D} = A_{4;8}(r_{8;D}/r_8)A_{8;D}$$
$$= \begin{pmatrix} 0.2 & 0.2 & 0.2 \\ 0.3 & 0.3 & 0.3 \\ 0.5 & 0.5 & 0.5 \end{pmatrix}\frac{1.4}{1.4}\begin{pmatrix} \frac{5}{7} \\ \frac{1}{7} \\ \frac{1}{7} \\ \frac{1}{7} \end{pmatrix}$$
$$= \begin{pmatrix} 0.2 \\ 0.3 \\ 0.5 \end{pmatrix}$$

$$F_{6;1}B_1 = F_{6;2}B_2$$
$$= (r_{6;2}/r_6)A_{6;2}B_2$$
$$= \frac{1}{3}\begin{pmatrix} 0.2 & 0.2 & 0.2 \\ 0.3 & 0.3 & 0.3 \\ 0.5 & 0.5 & 0.5 \end{pmatrix}\begin{pmatrix} 0.3 \\ 0.4 \\ 0.3 \end{pmatrix}$$
$$= \frac{1}{3}\begin{pmatrix} 0.2 \\ 0.3 \\ 0.5 \end{pmatrix}$$

$$G_{12}\{F_{4;8}F_{8;D}, F_{6;1}B_1\} = G_{12}\{F_{4;8}F_{8;D}, F_{6;2}B_2\}$$
$$= \begin{pmatrix} 0.2 \\ 0.3 \\ 0.5 \end{pmatrix} \cdot \frac{1}{3}\begin{pmatrix} 0.2 \\ 0.3 \\ 0.5 \end{pmatrix}$$
$$= \frac{1}{3}\begin{pmatrix} 0.04 \\ 0.06 \\ 0.1 \\ 0.06 \\ 0.09 \\ 0.15 \\ 0.1 \\ 0.15 \\ 0.25 \end{pmatrix}$$

$$F_{3;7}F_{7;12}G_{12}\{F_{4;8}F_{8;D},\ F_{6;1}B_1\} = F_{3;7}F_{7;12}G_{12}\{F_{4;8}F_{8;D},\ F_{6;2}B_2\}$$
$$= A_{3;7}(r_{7;12}/r_7)A_{7;12}G_{12}\{F_{4;8}F_{8;D},\ F_{6;2}B_2\}$$
$$= \begin{pmatrix} 0.2 & 0.2 & 0.2 \\ 0.3 & 0.3 & 0.3 \\ 0.5 & 0.5 & 0.5 \end{pmatrix} \frac{2}{3}$$

$$\begin{pmatrix} 0.5 & 0.4 & 0.5 & 0.6 & 0 & 0.1 & 0.4 & 0.2 & 0.25 \\ 0.5 & 0.4 & 0.25 & 0 & 0.4 & 0.5 & 0.4 & 0.4 & 0.5 \\ 0 & 0.2 & 0.25 & 0.4 & 0.6 & 0.4 & 0.2 & 0.4 & 0.25 \end{pmatrix} \frac{1}{3} \begin{pmatrix} 0.04 \\ 0.06 \\ 0.1 \\ 0.06 \\ 0.09 \\ 0.15 \\ 0.1 \\ 0.15 \\ 0.25 \end{pmatrix}$$

$$= \frac{2}{9} \begin{pmatrix} 0.2 \\ 0.3 \\ 0.5 \end{pmatrix}$$

$$F_{6;5}F_{5;9}F_{9;10}F_{10;11}B_{11} = (r_{6;5}/r_6)A_{6;5}A_{5;9}A_{9;10}A_{10;11}B_{11}$$
$$= \frac{1}{3}\begin{pmatrix} 0.2 & 0.2 & 0.2 \\ 0.3 & 0.3 & 0.3 \\ 0.5 & 0.5 & 0.5 \end{pmatrix}^4 \begin{pmatrix} 1 \\ 0 \\ 0 \end{pmatrix}$$
$$= \frac{1}{3}\begin{pmatrix} 0.2 \\ 0.3 \\ 0.5 \end{pmatrix}$$

$$G_{12}\{F_{4;8}F_{8;D},\ F_{6;5}F_{5;9}F_{9;10}F_{10;11}B_{11}\} = \begin{pmatrix} 0.2 \\ 0.3 \\ 0.5 \end{pmatrix} \cdot \frac{1}{3}\begin{pmatrix} 0.2 \\ 0.3 \\ 0.5 \end{pmatrix}$$
$$= \frac{1}{3}\begin{pmatrix} 0.04 \\ 0.06 \\ 0.1 \\ 0.06 \\ 0.09 \\ 0.15 \\ 0.1 \\ 0.15 \\ 0.25 \end{pmatrix}$$

$$F_{3;7}F_{7;12}G_{12}\{F_{4;8}F_{8;D},\ F_{6;5}F_{5;9}F_{9;10}F_{10;11}B_{11}\} = \begin{pmatrix} 0.2 & 0.2 & 0.2 \\ 0.3 & 0.3 & 0.3 \\ 0.5 & 0.5 & 0.5 \end{pmatrix}\frac{2}{3}$$

$$\begin{pmatrix} 0.5 & 0.4 & 0.5 & 0.6 & 0 & 0.1 & 0.4 & 0.2 & 0.25 \\ 0.5 & 0.4 & 0.25 & 0 & 0.4 & 0.5 & 0.4 & 0.4 & 0.5 \\ 0 & 0.2 & 0.25 & 0.4 & 0.6 & 0.4 & 0.2 & 0.4 & 0.25 \end{pmatrix}\frac{1}{3}\begin{pmatrix} 0.04 \\ 0.06 \\ 0.1 \\ 0.06 \\ 0.09 \\ 0.15 \\ 0.1 \\ 0.15 \\ 0.25 \end{pmatrix}$$

$$= \frac{2}{9}\begin{pmatrix} 0.2 \\ 0.3 \\ 0.5 \end{pmatrix}$$

Finally, $$X_3 = \frac{1}{3}\begin{pmatrix}0.2\\0.3\\0.5\end{pmatrix} + \frac{2}{9}\begin{pmatrix}0.2\\0.3\\0.5\end{pmatrix} + \frac{2}{9}\begin{pmatrix}0.2\\0.3\\0.5\end{pmatrix} + \frac{2}{9}\begin{pmatrix}0.2\\0.3\\0.5\end{pmatrix} = \begin{pmatrix}0.2\\0.3\\0.5\end{pmatrix}$$

In the same way, in equation (2.5), $X_7$ and $X_8$ are eliminated due to breaking cycles. Then $$X_8 = F_{8;D} + F_{8;7}F_{7;11}B_{11} + F_{8;7}F_{7;11}B_{11} + F_{8;7}F_{7;12} \quad (2.7)$$

$$\begin{pmatrix}G_{12}\{F_{6;1}B_1\} + G_{12}\{F_{6;2}B_2\} + \\ G_{12}\{F_{6;5}F_{5;9}F_{9;10}F_{10;11}B_{11}\}\end{pmatrix}$$

$$= F_{8;D} + F_{8;7}F_{7;11}B_{11} + F_{8;7}F_{7;12}$$

$$(F_{6;1}B_1 + F_{6;2}B_2 + F_{6;5}F_{5;9}F_{9;10}F_{10;11}B_{11})$$

In the above equation, $X_4$ as the input of the virtual logic gate $G_{12}$ is eliminated due to breaking the cycle. There is only $X_6$ as the input of $G_{12}$. Therefore, $G_{12}$ can be ignored, and correspondingly, $A_{7;12}$ should be recalculated according to $$a_{7k;12,1} = p_{7k;1} = (q_{7k;1} + q_{7k;4} + q_{7k;7})/(d_{7;1} + d_{7;4} + d_{7;7})$$

$$a_{7k;12,2} = p_{7k;2} = (q_{7k;2} + q_{7k;5} + q_{7k;8})/(d_{7;2} + d_{7;5} + d_{7;8})$$

$$a_{7k;12,3} = p_{7k;1} = (q_{7k;3} + q_{7k;6} + q_{7k;9})/(d_{7;3} + d_{7;6} + d_{7;9})$$

In which, the values on the right side of the equator are those in table 2. Thus, $$A_{7;12} = \begin{pmatrix} \frac{50+150+40}{100+250+100} & \frac{40+0+10}{100+100+50} & \frac{100+20+20}{200+200+80} \\ \frac{50+0+40}{100+250+100} & \frac{40+40+20}{100+100+50} & \frac{50+100+40}{200+200+80} \\ \frac{0+100+20}{100+250+100} & \frac{20+60+20}{100+100+50} & \frac{50+80+20}{200+200+80} \end{pmatrix}$$

$$= \begin{pmatrix} 0.53333 & 0.2 & 029167 \\ 0.2 & 0.4 & 0.39583 \\ 0.26667 & 0.4 & 0.3125 \end{pmatrix}$$

Moreover, $r_{7;12}=1$ and $r_7=2$. Therefore, $F_{7;12}=(r_{7;12}/r_7)$ $A_{7;12}=0.5A_{7;12}$.

$$X_8 = F_{8;D} + F_{8;7}F_{7;11}B_{11} +$$

$$F_{8;7}F_{7;12}(F_{6;1}B_1 + F_{6;2}B_2 + F_{6;5}F_{5;9}F_{9;10}F_{10;11}B_{11}) =$$

$$\frac{1.4}{2}\begin{pmatrix}\frac{5}{7}\\\frac{1}{7}\\\frac{1}{7}\end{pmatrix} + \frac{0.6}{2}\begin{pmatrix}0 & 0.8333 & 0\\0.333 & 0 & 1\\0.6667 & 0.1667 & 0\end{pmatrix}\frac{1}{2}\begin{pmatrix}0.2 & 0.2 & 0.2\\0.3 & 0.3 & 0.3\\0.5 & 0.5 & 0.5\end{pmatrix}\begin{pmatrix}1\\0\\0\end{pmatrix} +$$

$$0.6\begin{pmatrix}0 & 0.8333 & 0\\0.3333 & 0 & 1\\0.6667 & 0.1667 & 0\end{pmatrix}\frac{1}{2}\begin{pmatrix}0.53333 & 0.2 & 0.29167\\0.2 & 0.4 & 0.39583\\0.26667 & 0.4 & 0.3125\end{pmatrix}\times$$

$$\left\{\frac{1}{3}\begin{pmatrix}0.2 & 0.2 & 0.2\\0.3 & 0.3 & 0.3\\0.5 & 0.5 & 0.5\end{pmatrix}\begin{pmatrix}0.3\\0.4\\0.3\end{pmatrix} + \frac{1}{3}\begin{pmatrix}0.2 & 0.2 & 0.2\\0.3 & 0.3 & 0.3\\0.5 & 0.5 & 0.5\end{pmatrix}\begin{pmatrix}0.3\\0.4\\0.3\end{pmatrix} + \right.$$

$$\left.\frac{1}{3}\begin{pmatrix}0.2 & 0.2 & 0.2\\0.3 & 0.3 & 0.3\\0.5 & 0.5 & 0.5\end{pmatrix}^4\begin{pmatrix}1\\0\\0\end{pmatrix}\right\} = \begin{pmatrix}0.58223\\0.25\\0.16767\end{pmatrix}$$

Figure 35:
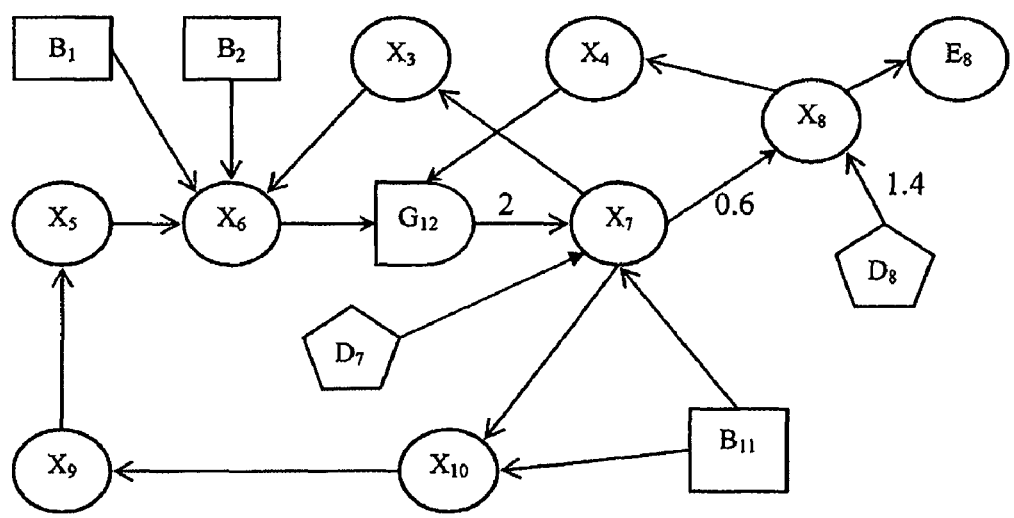
FIG. 35 is the EDUCG adding $E_8$ based on FIG. 34.

If the evidence $E_8=\{X_8=(0.6\ 0.4\ 0)^T\}$ is observed, i.e., the membership of $X_8$ being in $X_{8,1}$ is $m_{8;1}=0.6$, the membership of $X_8$ being in $X_{8,2}$ is $m_{8;2}=0.4$, the membership of $X_8$ being in $X_{8,3}$ is $m_{8;3}=0$, the EDUCG after adding the evidence $E_8$ becomes FIG. 35, in which $F_{8;E}$ is the functional event variable from $X_8$ to $E_8$.

According to the above calculation, $v_{81}=Pr\{X_{81}\}=0.58223$ and $v_{82}=Pr\{X_{82}\}=0.25$. Let $f_{8;2}=1$, we have $$f_{8;1} = \frac{m_{8;1}v_{82}}{m_{8;2}v_{81}}f_{8;2} = \frac{0.6\times 0.25}{0.4\times 0.58223} = 0.6441,$$

i.e. $F_{8;E}=(0.6441\ 1\ 0)$. Then, $Pr\{X_3|E_8\}=\alpha_3 Pr\{X_3E_8\}$, where $\alpha_3$ is the state normalization factor of $X_3$.

By treating $E_8$ as ordinary evidence, it can be outspreaded as $$E_8 = F_{8;E}X_8$$

$$= F_{8;E}(F_{8;D} + F_{8;7}F_{7;11}B_{11} + F_{8;7}F_{7;12}(G_{12}\{F_{6;1}B_1\} + G_{12}\{F_{6;2}B_2\} + G_{12}\{F_{6;5}F_{5;9}F_{9;10}F_{10;11}B_{11}\}))$$

Then, $$X_3E_8 = \begin{pmatrix} F_{3;7}F_{7;11}B_{11} \\ F_{3;7}F_{7;12}G_{12}\{F_{4;8}F_{8;D}, F_{6;1}B_1\} \\ F_{3;7}F_{7;12}G_{12}\{F_{4;8}F_{8;D}, F_{6;2}B_2\} \\ F_{3;7}F_{7;12}G_{12}\{F_{4;8}F_{8;D}, F_{6;5}F_{5;9}F_{9;10}F_{10;11}B_{11}\} \end{pmatrix} * \quad (2.8)$$

-continued $$\begin{pmatrix} F_{8;E}F_{8;D} \\ F_{8;E}F_{8;7}F_{7;11}B_{11} \\ F_{8;E}F_{8;7}F_{7;12}G_{12}\{F_{6;1}B_1\} \\ F_{8;B}F_{8;7}F_{7;12}G_{12}\{F_{6;2}B_2\} \\ F_{8;E}F_{8;7}F_{7;12}G_{12}\{F_{6;5}F_{5;9}F_{9;10}F_{10;11}B_{11}\} \end{pmatrix} \quad 5$$

The operator "*" means that all elements of the two matrixes are multiplied with each other crossly and then sum up.

In the event level of outspread, according to the rules of simplification: given j≠j', k≠k' and V∈{X,B}, there are $$V_{ij}V_{ij}=V_{ij}$$

$$V_{ij}V_{ij'}=0$$

$$F_{nk;ij}F_{nk';ij}=0$$

$$F_{nk;ij}F_{nk;ij'}=0$$

$$F_{nk;ij}F_{nk';ij'}=0$$

We can obtain the final vector matrix of equation (2.8), in which every element is a logic expression of the sum-of-products, where sum means exclusive and product means item. All the events in any item are independent of each other. Their probabilities can be used directly to calculate the expression.

Some calculation skill may be employed to perform the outspread of the data matrixes in equation (2.8):

$$\begin{aligned} X_3E_8 = &F_{3;7}F_{7;11}B_{11}F_{8;E}F_{8;D} + F_{3;7}(F_{8;E} \\ &F_{8;7} \otimes F_{7;11}B_{11}) + F_{3;7}F_{7;11}B_{11}F_{8;E}F_{8;7}F_{7;12} \\ &F_{6;1}B_1 + F_{3;7}F_{7;11}B_{11}F_{E;8}F_{8;7}F_{7;12}F_{6;2}B_2 + \\ &F_{3;7}F_{7;11}(F_{8;E}F_{8;7}F_{7;12}F_{6;5}F_{5;9}F_{9;10} \\ &F_{10;11} \otimes B_{11}) + F_{3;7}F_{7;12}G_{12}\{F_{4;8}F_{6;1}B_1\} \\ &(F_{8;E} \otimes F_{8;D}) + F_{3;7}F_{7;12}G_{12}\{F_{4;8}F_{8;D}F_{6;1}B_1\} \\ &F_{8;E}F_{8;7}F_{7;11}B_{11} + \ldots + F_{3;7}(F_{8;E}F_{8;7} \otimes F_{7;12} \\ &G_{12}\{F_{4;8}F_{8;D},F_{6;5}F_{5;9}F_{9;10}F_{10;11}B_{11}\}) \end{aligned} \quad (2.9)$$

There are 4×5=20 items in equation (2.9), in which the second item is resulted from the multiplication of $F_{3;7}F_{7;11}B_{11}$ and $F_{8;E}F_{8;7}F_{7;11}B_{11}$. Since $F_{7;11}B_{11}$ is the common item of both, it is taken out and put after the operator ⊗. The non-common items including $F_{8;E}$ are put before ⊗ The two sides before and after ⊗ are put in ( ). The two sides are calculated respectively. The result before ⊗ is a row vector. The result after ⊗ is a column vector. They have the same number of elements. However, ⊗ means only the multiplication of the corresponding elements but not the summation. Such multiplied items compose a new column vector. For example, suppose the vectors before and after ⊗ are respectively $$(\theta_1 \theta_2 \ldots \theta_n) \text{ and } (\pi_1 \pi_2 \ldots \pi_n)^T$$

Then, $$(\theta_1 \theta_2 \ldots \theta_n) \otimes (\pi_1 \pi_2 \ldots \pi_n)^T = (\theta_1\pi_1 \theta_2\pi_2 \ldots \theta_n\pi_n)^T$$

The sixth item $F_{3;7}F_{7;12}G_{12}\{F_{4;8},F_{6;1}B_1\}(F_{8;E} \otimes F_{8;D})$ in (2.9) is the multiplication of $F_{3;7}F_{7;12}G_{12}\{F_{4;8}F_{8;D},F_{6;1}B_1\}$ and $F_{8;E}F_{8;E}$. Since $F_{8;D}$ is the common item, it is taken out after ⊗ with $F_{8;E}$ in ( ). After $F_{8;D}$ is taken out, the left item before "," in "$F_{4;8},F_{6;1}B_1$" is not a column vector, but a matrix with multiple rows and columns. The calculation of every column vector and $F_{6;1}B_1$ is done according to the special operator "·". The result is a row vector. This operator is defined in the form of example as follow: suppose $$F = \begin{pmatrix} f_{11} & f_{12} \\ f_{21} & f_{22} \end{pmatrix} \text{ and } B = \begin{pmatrix} b_1 \\ b_2 \end{pmatrix}$$

then $$F \cdot B = \begin{pmatrix} f_{11} & f_{12} \\ f_{21} & f_{22} \end{pmatrix} \cdot \begin{pmatrix} b_1 \\ b_2 \end{pmatrix} = \begin{pmatrix} f_{11}b_1 & f_{12}b_1 \\ f_{11}b_2 & f_{12}b_2 \\ f_{21}b_1 & f_{22}b_1 \\ f_{21}b_2 & f_{22}b_2 \end{pmatrix}$$

The $20^{th}$ item in (2.9) is $F_{3;7}(F_{8;E}F_{8;7} \otimes F_{7;12}G_{12}\{F_{4;8}F_{8;D}, F_{6;5} F_{5;9}F_{9;10}F_{10;11}B_{11}\})$, which is the multiplication of the following two items:

$$F_{3;7}F_{7;12}G_{12}\{F_{4;8}F_{8;D},F_{6;5}F_{5;9}F_{9;10}F_{10;11}B_{11}\} \text{ and}$$
$$F_{8;E}F_{8;7}F_{7;12}G_{12}\{F_{6;5}F_{5;9}F_{9;10}F_{10;11}B_{11}\}$$

The common item $F_{7;12}G_{12}\{F_{4;8}F_{8;D},F_{6;5}F_{5;9}F_{9;10}F_{10;11}B_{11}\}$ of both is taken out and put after ⊗ in ( ), while before ⊗ is $F_{8;E}F_{8;7}$ (note that the intersection of $G_{12}\{F_{4;8}F_{8;E},F_{6;5}F_{5;9}F_{9;10}F_{10;11}B_{11}\}$ and $G_{12}\{F_{6;5}F_{5;9}F_{9;10}F_{10;11}B_{11}\}$ is former).

In this way, the value of $X_3E_8$ can be calculated. The result must be a column vector. Normalize this vector (i.e. every element is multiplied with the normalization factor α that is the reciprocal of the sum of all the elements in this vector), we have the result of $Pr\{X_3|E_8\}$.

As mentioned earlier, the calculation method that combines the event matrix operation and the data matrix together by outspreading equation (2.8) in terms of data matrix is also an innovation. However, since it is only a method of mathematics, it is not included in the claims in this invention.

2. The Dynamical Case

The problem in the dynamical case is: predict the probability distributions of the variables being in various possible states after a period of time T from taking some economic policy at time t=$t_1$. The purpose is to evaluate, according to these predictions, the effects of these different economic policies, so as to provide the gist for the economic policy decision. In this case, during the period of time 0≦t≦$t_1$, the states of all the variables are known, including the states in the fuzzy areas between two states. For example, the membership of the storage state variable being in state 1 is 0.4, while being in state 2 is 0.6, etc. After t>$t_1$, these variables influence each other, and there is some delay in these influences, while the basic event variables change dynamically and independently. All these changes affect each other and influence the dynamical changes of these variables synthetically. In which, the economic policy variable is controlled by people.

In the dynamical case, there is time delay in the F type variables, and the information can circulate in the same chain. Then the F, X and B type variables are all the functions of time. Within the period of time T, the cause variables will influence the consequence variables sustainably and changeably. Then, equation (1.1) can be briefly written as:

$$X_3(T) = \int_0^T W_{3;7}(T-t)F_{3;7}(T,t)X_7(t)dt \Big/ \int_0^T W_{3;7}(T-t)dt \quad (2.10)$$

$$X_4(T) = \int_0^T W_{4;8}(T-t)F_{4;8}(T,t)X_8(t)dt \Big/ \int_0^T W_{4;8}(T-t)dt$$

$$X_5(T) = \int_0^T W_{5;9}(T-t)F_{5;9}(T-t)X_9(t)dt \Big/ \int_0^T W_{5;9}(T-t)dt$$

$$X_6(T) = \int_0^T W_{6;1}(T-t)F_{6;1}(T,t)B_1(t)dt \Big/ \int_0^T W_{3;7}(T-t)dt +$$

-continued $$\int_0^T W_{6;2}(T-t)F_{6;2}(T,t)B_2(t)dt \Big/ \int_0^T W_{6;2}(T-t)dt +$$

$$\int_0^T W_{6;3}(T-t)F_{6;3}(T,t)X_3(t)dt \Big/ \int_0^T W_{6;3}(T-t)dt +$$

$$\int_0^T W_{6;5}(T-t)F_{6;5}(T,t)X_5(t)dt \Big/ \int_0^T W_{6;5}(T-t)dt$$

$$X_7(T) = \int_0^T W_{7;11}(T-t)F_{7;11}(T,t)B_{11}(t)dt \Big/ \int_0^T W_{7;11}(T-t)dt +$$

$$\int_0^T W_{7;12}(T-t)F_{7;12}(T,t)G_{12}$$

$$\{U_{12;4}X_4(t), U_{12;7}X_6(t)\}dt \Big/ \int_0^T W_{7;12}(T-t)dt$$

$$X_8(T) = \int_0^T W_{8;7}(T-t)F_{8;7}(T,t)X_7(t)dt \Big/ \int_0^T W_{8;7}(T-t)dt +$$

$$\int_0^T W_{8;D}(T-t)F_{8;D}(T,t)D_8 dt \Big/ \int_0^T W_{8;D}(T-t)dt$$

$$X_9(T) = \int_0^T W_{9;10}(T-t)F_{9;10}(T,t)X_{10}(t)dt \Big/ \int_0^T W_{9;10}(T-t)dt$$

$$X_{10}(T) = \int_0^T W_{10;7}(T-t)F_{10;7}(T,t)X_7(t)dt \Big/ \int_0^T W_{10;7}(T-t)dt +$$

$$\int_0^T W_{10;11}(T-t)F_{10;11}(T,t)B_{11}(t)dt \Big/ \int_0^T W_{10;11}(T-t)dt$$

In which, U and D are inevitable events and are independent of time, $w_{n;i}(T-t)$ is the weighing factor. Usually, as the time of the cause variable states is getting more and more close to the time T, the weight becomes larger. For example, $$\begin{cases} w_{n;i}(T-t) = \sqrt{\tau_{n;i}^2 - (T-t)^2}, & t \geq T - \tau_{n;i} \\ w_{n;i}(T-t) = 0, & t < T - \tau_{n;i} \end{cases} \quad (2.11)$$

Figure 36:
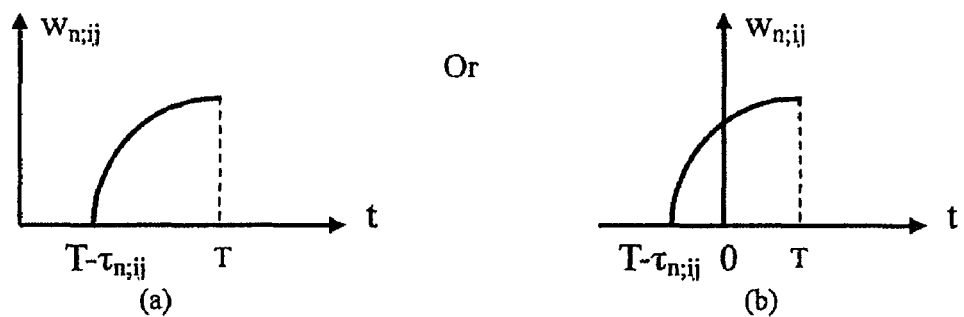
FIG. 36 is an illustration of the weighing factor function.

The curve of this factor is shown in FIG. 36, in which $\tau_{n;i}$ denotes the longest time for the cause variable to function and is usually given by the domain engineers. The meaning is: before $\tau_{n;i}$, the influence of the cause variable to the consequence variable is ignorable compared with the later influence. In the denominator, $$\int_0^T w_{n;i}(T-t)dt$$

is to satisfy the probability normalization.

$F_{n;i}(T,t)$ is given by the domain engineers according to the real situation and their domain knowledge. For example, $$\begin{cases} F_{n;i}(T,t) = (X_n(t)e^{-(T-t)\Gamma_{n;i}(t)} + X_n(\infty_{ij})(1 - e^{-(T-t)\Gamma_{n;i}(t)})) & (2.12) \\ \Gamma_{n;i}(t) = \Phi_{n;i}\{X_n(t), X_n(\infty_i), \ldots\} \end{cases}$$

In which, $X_n(t)$ is the state probability distribution of $X_n$ at time t, $X_n(\infty_i)$ is the functional intensity or probability contribution of $X_i$ to the state probability distribution of $X_n$, after an infinite long time (i.e., the influence of time delay has disappeared completely); $\Gamma_{n;i}(t) > 0$ is the time delay factor of $X_i$ functioning to influence the state probability distribution of $X_n$; $\Phi_{n;i}$ is given by the domain engineers. It determines what factors affect $\Gamma_{n;i}(t)$ and how. Usually, $\Gamma_{n;i}(t)$ depends on $X_n(t)$ and $X_n(\infty)$. For example, $$\Gamma_{n;i}(t) = \Phi_{n;i}\{X_n(t), X_n(\infty_i)\} = \Lambda_{n;i}\sum_k (X_n(t) - X_n(\infty_i))^2 \quad (2.13)$$

In which, $\Lambda_{n;i} > 0$ is a constant independent of time. The meaning of this equation is: $\Gamma_{n;i}(t)$ is proportional to the difference square between $X_n(t)$ and $X_n(\infty_i)$. The larger the difference is, the more rapid and obvious of the causality function appear.

In the example above, when T=t, the function of $X_i$ to $X_n$ has not appeared yet, and $F_{n;i}(t,t)=X_n(t)$. When the time is long enough, the function of $X_i$ to $X_n$ has appeared fully, and $F_{n;i}(\infty,t)=X_n(\infty_i)$.

Since the cause variable can also vary according to time, the final value of $X_n(T)$ should be the weighted average functional intensity as the contribution to the state probability distribution from the cause variable to the consequence variable at time T over the time interval [0,T].

Equations (2.10-2.13) are the brief expressions in terms of matrixes. The precise expressions should be:

$$x_{3k} = \frac{\int_0^T \sum_j w_{3;7j}(T-t)f_{3k;7j}(T,t)x_{7j}(t)dt}{\int_0^T w_{3;7j}(T-t)dt} \quad (2.14)$$

$$x_{4k}(T) = \frac{\int_0^T \sum_j w_{4;8j}(T-t)f_{4k;8j}(T,t)x_{8j}(t)dt}{\int_0^T w_{4;8j}(T-t)dt}$$

$$x_{5k}(T) = \frac{\int_0^T \sum_j w_{5;9j}(T-t)f_{5k;9j}(T,t)x_{9j}(t)dt}{\int_0^T w_{5;9j}(T-t)dt}$$

$$x_{6k}(T) = \frac{\int_0^T \sum_j w_{6;1j}(T-t)f_{6k;1j}(T,t)b_{1j}(t)dt}{\int_0^T w_{6;1j}(T-t)dt} +$$

$$\frac{\int_0^T \sum_j w_{6;2j}(T-t)f_{6k;2j}(T,t)b_{2j}(t)dt}{\int_0^T w_{6;2j}(T-t)dt} +$$

$$\frac{\int_0^T \sum_j w_{6;3j}(T-t)f_{6k;3j}(T,t)x_{3j}(t)dt}{\int_0^T w_{6;3j}(T-t)dt} +$$

$$\frac{\int_0^T \sum_j w_{6;5j}(T-t)f_{6k;5j}(T,t)x_{5j}(t)dt}{\int_0^T w_{6;5j}(T-t)dt}$$

$$x_{7k}(T) = \frac{\int_0^T \sum_j w_{7;11j}(T-t)f_{7k;11j}(T,t)b_{11j}(t)dt}{\int_0^T w_{7;11j}(T-t)dt} +$$

$$\frac{\int_0^T \sum_{(n,h) \to j} w_{7;12j}(T-t)f_{7k;12j}(T,t)Pr\{X_{4n}(t)X_{6h}(t)\}dt}{\int_0^T w_{7;12j}(T-t)dt}$$

$$x_{8k}(T) = \frac{\int_0^T \sum_j w_{8;7j}(T-t)f_{8k;7j}(T,t)x_{7j}(t)dt}{\int_0^T w_{8;7j}(T-t)dt} +$$

-continued $$x_{9k}(T) = \frac{\int_0^T w_{8;D}(T-t)f_{8k;D}(T,t)dt}{\int_0^T w_{8;D}(T-t)dt}$$

$$x_{9k}(T) = \frac{\int_0^T \sum_j w_{9;10j}(T-t)f_{9k;10j}(T,t)x_{10j}(t)dt}{\int_0^T w_{9;10j}(T-t)dt}$$

$$x_{10k}(T) = \frac{\int_0^T \sum_j w_{10;7j}(T-t)f_{10k;7j}(T,t)x_{7j}(t)dt}{\int_0^T w_{10;7j}(T-t)dt} +$$

$$\frac{\int_0^T \sum_j w_{10;11j}(T-t)f_{10k;11j}(T,t)b_{11j}(t)dt}{\int_0^T w_{10;11j}(T-t)dt}$$

In the above equations, the inevitable events of U and D have ignored. Moreover, $\{n,h\} \to j$ means that the state combination of n and h of the two variables corresponds to the state j of the logic gate. $W_{n;ij}$ is the element of $W_{n;i}$:

$$\begin{cases} w_{n;ij}(T-t) = \sqrt{\tau_{n;ij}^2 - (T-t)^2}, & t \geq T - \tau_{n;ij} \\ w_{n;ij}(T-t) = 0, & t < T - \tau_{n;ij} \end{cases} \quad (2.15)$$

Correspondingly, $$\begin{cases} f_{nk;ij}(T,t) = (r_{n;i}/r_n)a_{nk;ij}(T,t) \\ \quad = (r_{n;i}/r_n)(x_{nk}(t)e^{-(T-t)\omega_{n;ij}(t)} + x_{nk}(\infty_{ij})(1 - e^{-(T-t)\omega_{n;ij}(t)})) \\ \omega_{n;ij}(t) = \varphi_{n;ij}\{X_k(t), X_n(\infty_{ij}), \ldots\} \end{cases} \quad (2.16)$$

For example, $$\omega_{n;ij}(t) = \varphi_{n;ij}[X_n(t), X_n(\infty_{ij})] = \beta_{n;ij}\sum_k (x_{nk}(\infty_{ij}) - x_{nk}(t))^2 \quad (2.17)$$

In which, $\beta_{n;ij}>0$ is a number depending on the state of the cause variable $X_{ij}$ but not the state k of the consequence variable $X_n$ and the time, and is given by the domain engineers. The larger the $\beta_{n;ij}$ is, the less the time delay is. $x_{nk}(\infty_{ij})$ is the functional intensity or the probability contribution of $X_{ij}$ to $X_{nk}$ after passing the time delay or the influence has become stable. Obviously, the original functional intensity $a_{nk;ij}(T,t)$ satisfies the probability normalization.
Proof:
Since the state probability normalization of $X_n$, $$\sum_k x_{nk}(t) = 1 \text{ and } \sum_k x_{nk}(\infty_{ij}) = 1.$$

Therefore, $$\sum_k a_{nk;ij}(T,t) = \sum_k (x_{nk}(t)e^{-(T-t)\omega_{n;ij}(t)} + x_{nk}(\infty_{ij})(1 - e^{-(T-t)\omega_{n;ij}(t)}))$$

$$= e^{-(T-t)\omega_{n;ij}(t)}\sum_k x_{nk}(t) + (1 - e^{-(T-t)\omega_{n;ij}(t)})$$

$$\sum_k x_{nk}(\infty_{ij})$$

$$= e^{-(T-t)\omega_{n;ij}(t)} + (1 - e^{-(T-t)\omega_{n;ij}(t)}) = 1$$

That is, $a_{nk;ij}(T,t)$ satisfies the normalization at any time ■

Figure 37:
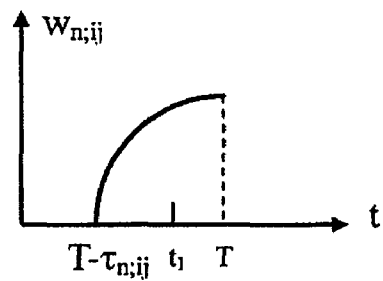
FIG. 37 is an illustration of the time distribution of the problem can be solved by this invention.

The problem to be solved in this example is: given the change of the state probability distribution according to the time during the time interval $[0,t_1]$ while $t_1 \geq \tau_{n;i}$, i.e. the influence of the cause variable to the consequence variable before t=0 can be ignored, calculate the state probability distributions of the variables at time T ($T>t_1$) (see FIG. 37).

Figure 38:
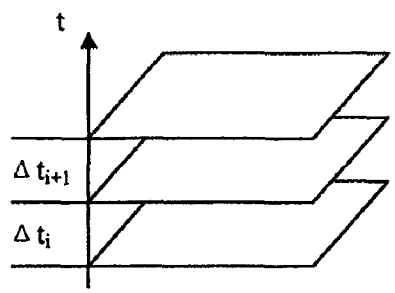
FIG. 38 is the illustration of the approximate calculation using the time differentiating method.

How to calculate equations (2.14) is a pure mathematical calculation problem. Many numerical calculation methods can be applied. For example, the differential method can be applied, which is to divide the time interval $[0,T]$ into many small time intervals $\Delta t_i$ (as shown in FIG. 38), then recursively perform the calculation one small interval after another small interval. The smaller the classification of $\Delta t_i$ is, the more accurate the calculation is.

It should be pointed out that equation (2.14 deals with the calculation of $\Pr\{X_{4;h_j}(t)X_{6;g_j}(t)\}$, where $X_{4h_j}$ and $X_{6g_j}$ may not be independent of each other. Therefore, $\Pr\{X_{4;h_j}(t)X_{6;g_j}(t)\}=x_{4h_j}(t)x_{6g_j}(t)$ may not be valid, but can be applied in the approximate calculation. If the accurate calculation is required, we must further outspread $X_{4n}X_{6h}$ as the consequence event according to the method shown in equation (1.2) (the detailed calculation is ignored here).

Example 24

The application example for predicting the flood level.
The present flood prediction method is mainly based on the dynamical mathematical-physical model composed of the water amount, the water quality, the shape of river bed, the weather, etc, in the valley, and then performing the determin"istic numerical calculation in the mainframe computers. But it has been proved by fact that the accurate and complete mathematical-physical model is hard to be constructed, nor the accurate and complete data to be obtained, while the result of calculation relies strongly on these accuracy and completeness of the mathematical-physical model and data. It is often that these conditions cannot be satisfied such that this method is hard to be applied in practice.

With DUCG, people can utilize the historical statistic data and the domain engineer's belief to represent the uncertain causalities of various variables and time, and then the dynamical calculation can be performed according to the collected various evidence, so as to predict by what time the biggest flood peek will appear and how large its degree will be, and in such a way to avoid the problem of relying too much on the accuracy and completeness of applying the mathematical-physical model and data.

Figure 39:
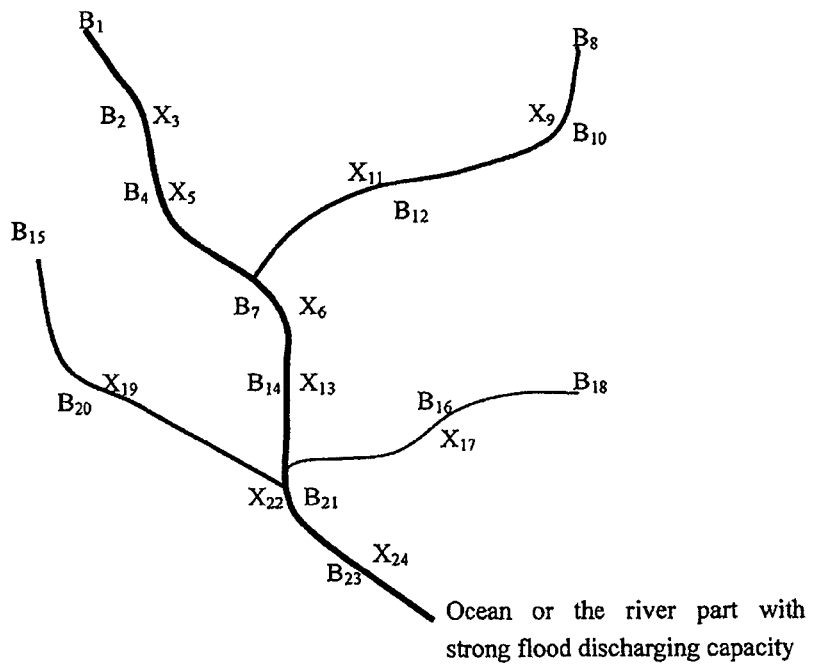
FIG. 39 is the illustration of the observation positions of the rain amount and the water level of a river.
Figure 40:
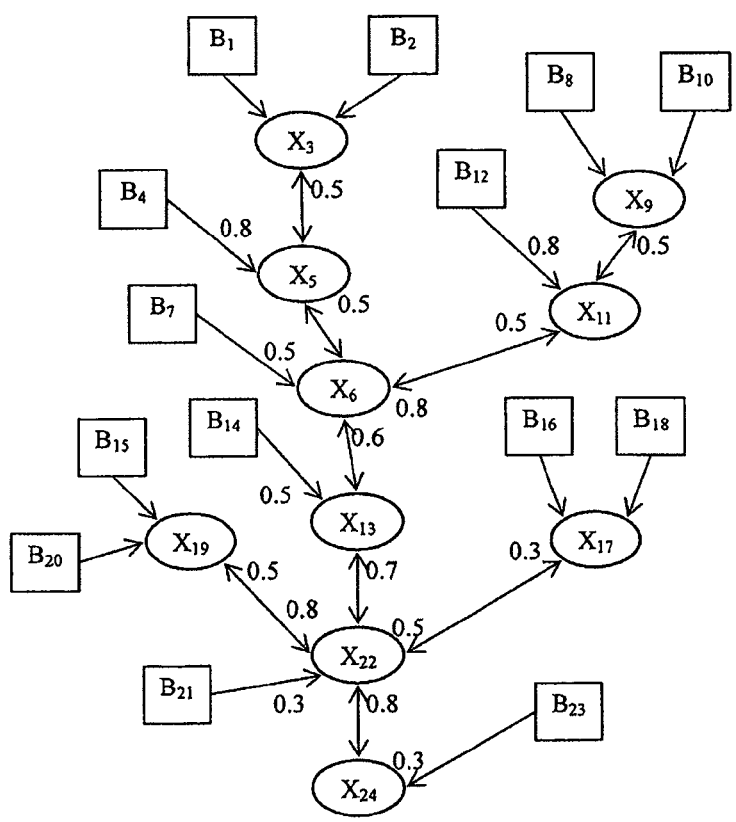
FIG. 40 is the DUCG for predicting the river flood of the river shown in FIG. 39.

Suppose a river along with its rain amount and water level monitor positions are as shown in FIG. 39. The positions of the B type variables representing the rain amount are the rain amount monitor positions, and the positions of the X type variables representing the water level are the water level monitor positions. According to the method described in §1, the first step is to determine the cause and consequence variables related to the problem to be solved about the flood water level prediction. Obviously, in FIG. 39, the $B_i$ and $X_n$ are the cause and consequence variables related to the problem to be solved, in which all variables are continuous and need be fuzzily discretized. The method to fuzzily discretizing the continuous variables is the same as for $X_{16}$ in example 1. According to the relations of the upriver and downriver of this river, it is easy to determine the direct cause variables of the X type variables. For example, $X_6$ represents the water level at the converging position of two sub-rivers of the upriver. Obviously, this water level is affected by the upriver water levels $X_5$ and $X_{11}$, the local rain amount $B_7$ and the downriver water level $X_{13}$. Therefore, these variables are the direct cause variables of $X_6$. As the problem to be solved is a dynamical prediction type problem, the explicit representation mode is more suitable. Thus, we connect the direct cause variables to $X_6$ by $F_{6;i}$, where i=5,11,7,13. Put all X type variables along with their direct cause variables modeled in the explicit representation mode together, we get the DUCG for predicting the flood of this river as shown in FIG. 40, in which the basic variables $B_i$ represent the predicted rain amount in a following few days in the corresponding areas, where $b_{ij}$ are functions dynamically changing with time. The consequence variables $X_n$ represent the water levels of the river flood at the corresponding positions in a following few days. The numbers are the relationships of the functional variables. The default values are 1. In this figure, the bidirectional arcs represent two functional variables in opposite directions. This is because the downriver water level affects the upriver flood speed. Therefore, the influences of the upriver and downriver are bidirectional.

DUCG is not like the mathematical-physical model to perform the deterministic calculation, the result is the accurate values, while affected strongly by the accuracy and completeness of the data, but performs the uncertain calculation according to the probability distribution type statistic data and belief, while the result is the probability distributions of various possible states. In this example, the problem to be solved by DUCG is: conditioned on the known information E such as the observed rain amount and water levels at different positions during the past period of time, according to the weather forecast, predict the flood water level $X_{22}$ at some city in the following few days, so as to decide whether or not to dynamite the bank somewhere to release the flood and remove people. Obviously, all the variables in the figure (including the functional variables) are the functions of time. According to E, the probability distributions $b_{ij}(t)$ of the basic variables about the weather changes varying according to time in a following few days are given by the domain engineers, meanwhile, the functional variables can also be given by the domain engineers according to the statistic data or belief, in which the probability parameters $a_{nk;ij}$ and $f_{nk;ij}$ of the elements $F_{nk;ij}$ of the functional variables are similar to the functions of time in equations (2.15-2.17). Of course, $r_{n;i}$ and $r_n$ can also be the functions of time. Then, people can calculate the probability distribution of the flood water level $X_{22}$ in a following few days according to the DWG. shown in FIG. 40 and conditioned on the known evidence E, so as to make decision.

As the calculation of this type is huge and complex, the calculation of this example is ignored and only the method is illustrated.

This invention is not limited to the specific ways and application examples described in the above specification.

INDUSTRIAL APPLICABILITY

This invention can be applied in industry.

The invention claimed is:

1. A method for constructing an intelligent system for processing the uncertain causality information, the method includes: representing the causalities among the things in the explicit representation mode, specifically including the following steps:

(1) Establish, by at least one processor, a representation system about the various cause variables $V_i$ and consequence variables $X_n$ in concern with the problem to be solved, wherein: ① Let V represent two type variables B and X, i.e. V∈{B,X}, in which B is the basic variable that is only the cause variable and X is the consequence variable that can be also the cause variable of the other consequence variables; ② No matter the states of the variable $V_i$ or $X_n$ are discrete or not, represent them all as the discrete or fuzzy discrete states, so as to be dealt with by using the same manner, that is, represent the different states of $V_i$ and $X_n$ as $V_{ij}$ and $X_{nk}$ respectively, where i and n index variables while j and k index the discrete or fuzzy discrete states of the variables; ③ When $V_i$ or $X_n$ is continuous, the membership of an arbitrary value $e_i$ of $V_i$ or $e_n$ of $X_n$, belonging to $V_{ij}$ or $X_{nk}$ respectively, is $m_{ij}(e_i)$ or $m_{nk}(e_n)$ respectively, and they satisfy $$\sum_j m_{ij}(e_i) = 1 \text{ and } \sum_j m_{ij}(e_i) = 1;$$

④ $V_{ij}$ and $X_{nk}$ are treated as events, i.e., $V_{ij}$ represents the event that $V_i$ is in its state j and $X_{nk}$ represents the event that $X_n$ is in its state k; meanwhile, if j≠j' and k≠k', $V_{ij}$ is exclusive with $V_{ij'}$ and $X_{nk}$ is exclusive with $X_{nk'}$; ⑤ If i≠i', $B_{ij}$ and $B_{ij'}$ are independent events, and their occurrence probabilities $b_{ij}$ satisfies $$\sum_j b_{ij} \leq 1;$$

(2) For the consequence variable $X_n$, determine, by the at least one processor, its direct cause variables $V_i$, i∈$S_{EXn}$, $S_{EXn}$ is the index set of the {B,X} type direct variables of $X_n$ in the explicit representation mode;

(3) The functional variable $F_{n;i}$ is used, by the at least one processor, to represent the causality between $V_i$, i∈$S_{EXn}$, and $X_n$. $V_i$ is the input or cause variable of $F_{n;i}$ and $X_n$ is the output or consequence variable of $F_{n;i}$, wherein: ① The causality uncertainty between $V_i$ and $X_n$ is represented by the occurrence probability $f_{nk;ij}$ of the specific value $F_{nk;ij}$ of $F_{n;i}$. $F_{nk;ij}$ is a random event representing the uncertain functional mechanism of $V_{ij}$ causing $X_{nk}$; $f_{nk;ij}$ is the probability contribution of $V_{ij}$ to $X_{nk}$; ② $f_{nk;ij}=(r_{n;i}/r_n)a_{nk;ij}$, where $r_{n;i}$ is called the relationship between $V_i$ and $X_n$, $r_n$ is the normalization factor and $$r_n = \sum_i r_{n;i} \cdot a_{nk;ij}$$

is the probability of the event that $V_{ij}$ causes $X_{nk}$ regardless of any other cause variables and $a_{nk;ij}$ and $r_n$ can be the function of time; ③ $a_{nk;ij}$ satisfies $$\sum_k a_{nk;ij} \le 1; \quad ④ \quad Pr\{X_{nk}\} = \sum_{i,j} f_{nk;ij} Pr\{V_{ij}\}.$$

2. The method according to claim 1, wherein the functional variable $F_{n;i}$ in the explicit representation mode can be the conditional functional variable, the conditional functional variable is used to represent the functional relation between the cause variable $V_i$ and the consequence variable $X_n$ conditioned on $C_{n;i}$, wherein:
 (1) $C_{n;i}$ has only two states: true or false, and its state can be found according to the observed information or the computation results;
 (2) When $C_{n;i}$ is true, the conditional functional variable becomes the functional variable;
 (3) When $C_{n;i}$ is false, the conditional functional variable is eliminated.

3. The method according to claim 1, wherein the explicit representation mode includes also extending $V \in \{B,X\}$ to $V \in \{B,X,G\}$ in the explicit representation mode, where G is the logic gate variable, i.e. the cause variable to influence the consequence variable by the state logic combinations of a group of cause variables, suppose the input variables of logic gate variable $G_i$ are $V_h$, then the logic gate $G_i$ is constructed, by the at least one processor, by the following steps:
 (31) The logic combinations between the input variables $V_h$, $V \in \{B,X,G\}$, are represented by the truth value table of $G_i$ in which each input row is a logic expression composed of the input variable states and corresponds to a unique state of $G_i$, different rows of the logic expressions are exclusive with each other, wherein if a logic expression is true, the corresponding state of $G_i$ is true;
 (32) The set of the states of $G_i$ is equal to or less than the set of all state combinations of the input variables;
 (33) When the set of the states of $G_i$ is less than the set of all state combinations of the input variables, there is a remnant state of $G_i$, which corresponds uniquely to the remnant state combinations of the input variables, so that all the states of $G_i$ including the remnant state are exclusive with each other and just cover all the state combinations of the input variables;
 (34) When $G_i$ is the direct cause variable of $X_n$, $G_i$ functions to $X_n$ through the functional or conditional functional variable $F_{n;i}$;
 (35) If a logic gate has only one input variable, this logic gate can be ignored, i.e. the input variable of the logic gate can be taken as the input variable of the functional variable or conditional functional variable $F_{n;i}$ with this logic gate as its input variable;
 (36) When $G_i$ is the direct cause variable of $X_n$, the relationship between $G_i$ and $X_n$ is $r_{n;i}$; when calculating $f_{nk;ij}$, the calculation to $r_n$ includes the relationship between $G_i$ and $X_n$; when calculating $Pr\{X_{nk}\}$, the $f_{nk;ij}$ between $G_i$ and $X_n$ is included.

4. The method according to claim 3, wherein further including:

(41) Extend, by at least one processor, $V \in \{B,X\}$ as $V \in \{B,X,D\}$, or extend $V \in \{B,X,G\}$ as $V \in \{B,X,G,D\}$, in which D is the default event or variable, $D_n$ can appear only with $X_n$ and is an independent cause variable that has only one inevitable state;

(42) $D_n$ becomes a direct cause variable of $X_n$ through $F_{n;D}$, where $F_{n;D}$ is the functional variable between $D_n$ and $X_n$;

(43) The causality uncertainty between $D_n$ and $X_n$ is represented by the occurrence probability $f_{nk;D}$ of the specific value $F_{nk;D}$ of $F_{n;D}$, where $F_{nk;D}$ is a random event representing the functional mechanism of $D_n$ to $X_n$, and $f_{nk;D}$ is the probability contribution of $D_n$ to $X_{nk}$;

(44) $f_{nk;D} = (r_{n;D}/r_n) a_{nk;D}$, where $a_{nk;D}$ is the probability of the event that $D_n$ causes $X_n$ regardless of the other cause variables of $X_n$, and satisfies $$\sum_k a_{nk;D} \le 1,$$

$r_{n;D}$ is the relationship between $D_n$ and $X_n$; after adding $D_n$, $$r_n = \sum_i r_{n;i} + r_{n;D}.$$

$a_{nk;D}$ and $r_{n;D}$ be the function of time;
(45) The original $$Pr\{X_{nk}\} = \sum_{i,j} f_{nk;ij} Pr\{V_{ij}\}$$

is replaced by $$Pr\{X_{nk}\} = \sum_{i,j} f_{nk;ij} Pr\{V_{ij}\} + f_{nk;D}.$$

5. The method according to claim 4, wherein, further including: when the default variable of $X_n$ is more than one, they can be combined as one default variable $D_n$; let g be the index distinguishing two or more default variables, Corresponding to the case of only one default variable, the variable $D_n$ and the parameters $r_{n;D}$, $a_{nk;D}$ are represented as $D_{ng}$, $r_{n;Dg}$, $a_{nk;Dg}$ respectively; after combining $D_{ng}$ as $D_n$, the parameters of $D_n$ are calculated according to $$r_{n;D} = \sum_g r_{n;Dg} \text{ and } a_{nk;D} = \sum_g a_{nk;Dg}.$$

6. The method according to claim 1, wherein the method further includes: using the implicit mode to represent the uncertain causalities among things, specifically including the following steps, performed by the at least one processor:
 (4) The conditional probability table (CPT) is used to represent the causality between the consequence variable $X_n$ and its direct cause variables $V_i$, $i \in S_{IXn}$, wherein: ①
 When no cause variable will be eliminated, CPT is composed of only the conditional probabilities $p_{nk;ij}$, where $p_{nk;ij} \equiv Pr\{X_{nk}|j\}$ and j indexes the state combination of the cause variables $V_i$, $i \in S_{IXn}$; ② When part or even all cause variables may be eliminated, CPT is composed of three parameters: $p_{nk;ij}$, $q_{nk;ij}$ and $d_{n;j}$, satisfying $p_{nk;ij} = q_{nk;ij}/d_{n;j}$, so that CPT can be reconstructed when some of its cause variables are eliminated, where $q_{nk;ij}$ and $q_{n;nj}$ are the sample number and occurrence number of $X_{nk}$ respectively, conditioned on the state combination indexed by j of the cause variables.

7. The method according to claim 6, wherein the said step (4) further including:
   (71) In the implicit representation mode, the cause variables $V_i$, $i \in S_{IXn}$, can be separated as several groups, every group uses the implicit representation mode to represent the uncertain causality to $X_n$;
   (72) Give the relationship $r_{Xn}$ between every group of direct cause variables to the consequence variable $X_n$;
   (73) If some cause variables in the group are eliminated for any reason, the CPT of this group can be reconstructed as follows: Suppose the variable to be eliminated is $V_i$, before the elimination, there are several subgroups of the state combinations of the input variables indexed by j'; in subgroup j', the states of all the variables are same except the states of $V_i$; denote the index set of the state combination j in subgroup j' as $S_{ij'}$, then $$q_{nk;j'} = \sum_{j \in S_{ij'}} q_{nk;j}, \ d_{nj'} = \sum_{j I S_{ij'}} d_{nj}, \ p_{nk;j'} = q_{nk;j'}/d_{n;j'}$$

In which j' is the new index of the remnant state combinations after the elimination of $V_i$;
   (74) Repeat (73) to deal with the case in which more than one cause variable is eliminated.

8. The method according to claim 6, wherein further including the following steps by the at least one processor:
   (5) For a group of cause variables $V_{i'}$, $i' \in S_{IXn}$, in the implicit representation mode, give the corresponding relationship $r_{Xn}$, while in the explicit representation mode, $r_n$ is renewed as $r_n = r_n + r_{Xn}$, in which the right side $r_n$ is before the renewing;
   (6) If the implicit representation mode has more than one group, they can be indexed by g and every group relationship can be denoted as $r_{Xng}$; then the calculation equation in above (5) becomes $$r_n = r_n + \sum_h r_{Xng}.$$

9. The method according to claim 8, further including:
   (10) According to the specific cases of every consequence variable $X_n$, the representations above for all the consequence variables compose the original DUCG;
   (11) The evidence E in concern with the original DUCG is received during the online application and is expressed as $$E = E^* \prod_h E_h,$$

where $E_h$ is the evidence indicating the state of the {B,X} type variable, E* represents the other evidence; if $E_h$ is a fuzzy state evidence, i.e. the state of the variable $V_h$ in the original DUCG is known in a state probability distribution, or if $E_h$ is a fuzzy continuous evidence, i.e. the specific value $e_h$, of the continuous variable $V_h$ is known in the fuzzy area of different fuzzy states of $V_h$, $V \in \{B,X\}$, then add $E_h$ as a virtual evidence variable into the original DUCG and represent the causality between $V_h$ and $E_h$ according to the explicit mode so that $E_h$ becomes the consequence variable of the cause variable $V_h$; after finishing these steps, the original DUCG becomes the E conditional original DUCG.

10. The method according to claim 9, wherein, the said step (11) including: adding $E_h$ as a virtual evidence variable into the original DUCG, and further including the following steps: Suppose $m_{hj} = m_{hj}(e_h)$ is the membership of $E_h$ belonging to the fuzzy state j, or $m_{hj}$ is the probability of $X_{hj}$ indicated by the fuzzy state evidence $E_h$, i.e., $m_{hj} = \Pr\{V_{hj}|E_h\}$, $j \in S_{Eh}$, $S_{Eh}$ is the index set of state j in which $m_{hj} \neq 0$ and includes at least two different indexes, while satisfying $$\sum_{j \in S_{Eh}} m_{hj} = 1:$$

(101) As the virtual consequence variable of $V_h$, $E_h$ has only one inevitable state, has only one direct cause variable $V_h$, and is not the cause variable of any other variable;
   (102) The virtual functional variable from $V_{hj}$ to $E_h$ is $F_{E;h}$ and its specific value $F_{E;hj}$ is the virtual random event that $V_{hj}$ causes $E_h$; the functional intensity parameter $f_{E;hj}$ of $F_{E;hj}$ may be given by domain engineers;
   (103) If the domain engineers cannot give $f_{E;hj}$, it can be calculated from $$f_{E;hj} = \frac{m_{hj} v_{hk}}{m_{hk} v_{hj}} f_{E;hk};$$

where $j \neq k'$, $j \in S_{Eh}$, $k \in S_{Eh}$, $v_{hj} = \Pr\{V_{hj}\}$, $v_{hk} = \Pr\{V_{hk}\}$ Given $f_{E;hk} > 0$, $f_{E;hj}$ can be calculated.

11. The method according to claim 10, wherein, further including the following steps performed by the at least one processor, to simplify the E conditional original DUCG: suppose $V_i$ is the direct cause variable of $X_n$, $V \in \{B,X,G,D\}$, then
   (111) According to E, determine whether or not the condition $C_{n;i}$ of the conditional functional variable $F_{n;i}$ is valid: ① if yes, change the conditional functional variable as the functional variable; ② if not, eliminate this conditional functional variable; ③ if cannot determine whether or not $C_{n;i}$ is valid, keep the conditional functional variable until $C_{n;i}$ can be determined;
   (112) According to E, if $V_{nk}$ is not the cause of any state of $X_n$ when E shows that $V_{ih}$ is true, eliminate the functional or conditional functional variable $F_{n;i}$ that is from $V_i$ to $X_n$;
   (113) According to E, if $X_{nk}$ cannot be caused by any state of $V_i$ when E shows that $X_{nk}$ is true, eliminate the functional or conditional functional variable from $V_i$ to $X_n$;
   (114) In the explicit mode of representation, if the X or G type variable without any cause or input appears, eliminate this variable along with the F type variables starting from this variable;
   (115) If there is any group of isolated variables without any logic connection to the variables related to E, eliminate this group variables;

(116) If E shows that $X_{nk}$ is true, while $X_{nk}$ is not the cause of any other variable and $X_n$ has no connection with the other variables related to E, denote the index set of the index n of such $X_n$ as $S_{Enk}$; When $V_i$ and its logic connection variables $F_{n;i}$ have no logic connection with the variables related to E except the variables indexed in $S_{Enk}$, eliminate $X_n$, $V_i$ and the functional or conditional functional variables $F_{n;i}$ along with all other variables logically connected with $V_i$;

(117) If E shows that $X_{nk}$ appears earlier than $V_{ij}$, so that for sure $V_{ij}$ is not the cause of $X_{nk}$, eliminate the functional or conditional functional variables that are in the causality chains from $V_i$ to $X_n$ but are not related to the influence of other variables to $X_n$;

(118) Upon demand, the above steps can be in any order and can be repeated.

12. The method according to claim 11, wherein, further including the following steps performed by the at least one processor, to transform the DUCG with implicit or hybrid representation mode conditioned on E as all in the explicit mode, i.e. EDUCG:

(123) For the consequence variable $X_n$ in the implicit or hybrid mode, for every group of $S_{IXn}$ type cause variables, introduce a virtual logic gate variable $G_i$, in which the cause variables of $S_{IXn}$ are the input variables of $G_i$, and the number of the states of $G_i$ and the input rows of the truth value table of $G_i$ equal to the number of the state combinations of the cause variables in $S_{IXn}$, while each of the state combination of the input variables is an input row of the truth value table of $G_i$ and also a state of the virtual logic gate;

(124) Introduce the virtual functional variable $F_{n;i}$, in which $G_i$ is the input variable and $X_n$ is the output variable, so that $G_i$ becomes the direct cause variable of $X_n$;

(125) In the CPT of the cause variables in $S_{IXn}$, $a_{nk;ij}=p_{nk;j}$; the relationship of $F_{n;i}$ is; $r_{ni}=r_{Xn}$;

(126) When there is only one input variable in $G_i$, such $G_i$ can be ignored, i.e. the virtual functional variable takes the input variable of $G_i$ as its input variable directly;

(127) When the groups of the $S_{IXn}$ type variables are more than one group, repeat the above steps for every groups.

13. The method according to claim 11, wherein, further including the following steps performed by the at least one processor, to transform the DUCG conditioned on E in the explicit representation mode or in the more than one group implicit representation mode as the IDUCG in which all representations are in the implicit representation mode with only one group direct cause variables:

(131) If $C_{n;i}$ is valid, change the conditional functional variable as the functional variable; If $C_{n;i}$ is invalid, eliminate the conditional functional variable;

(132) For any representation of the uncertain causality between the consequence variable $X_n$ and its direct cause variables, if it is in the hybrid or more than one group implicit representation mode, transform the representation mode for $X_n$ to the explicit mode;

(133) After the above steps, take the state combinations of the {B,X} type cause variables of the consequence variable $X_n$ as the conditions indexed by j, calculate the conditional probability of $X_{nk}$ $Pr\{X_{nk}|j\}$ according to the explicit mode, where the connections between the {B,X} type cause variables and $X_n$ may be or may not be through logic gates; in the calculation, all contributions from different types of direct cause variables should be considered, i.e. when the direct cause variables are {X,B,G} types, $$Pr\{X_{nk} \mid j\} = \sum_i f_{nk;ih};$$

when the direct cause variables are {X,B,G,D} types, $$Pr\{X_{nk} \mid j\} = \sum_i f_{nk;ih} + f_{nk;D};$$

(134) The case of $a_{nk;ih}=1$ can be understood as that $X_{nk}$ is true for sure, i.e. when the input variable i is in its state h, all the states, except k, of $X_n$ cannot be true; if this applies, when $a_{nk;ih}=1$, $Pr\{X_{nk}|j\}=1$, meanwhile $Pr\{X_{nk'}|j\}=0$, where $k \neq k'$;

(135) If $a_{nk;ih}=1$, $k \in S_m$, $S_m$ is the index set of such states of $X_n$ that $a_{nk;ih}=1$ and the number of such states is m, then $Pr\{X_{nk}|j\}=1/m$ and $Pr\{X_{nk'}|j\}=0$, where k' $S_m$;

(136) If such calculated $$\sum_k Pr\{X_{nk} \mid j\} < 1, \text{ let } Pr\{X_{n\eta} \mid j\} = 1 - \sum_{k \neq \eta} Pr\{X_{nk} \mid j\},$$

where η indexes the default state of $X_n$;

(137) If there is no default state η in said step (136), the normalization method is used as follows:

$$Pr\{X_{nk} \mid j\} = Pr\{X_{nk} \mid j\} \bigg/ \sum_k Pr\{X_{nk} \mid j\},$$

where the $Pr\{X_{nk}|j\}$ on the right side are the values before the normalization;

(138) After satisfying the normalization, $Pr\{X_{nk}|j\}$ becomes the conditional probability $p_{nk;nj}$ in the standard implicit representation mode;

(139) Connect the {X,B} type direct cause variables of $X_n$ through or not through logic gates with $X_n$ according to the implicit representation mode, the DUCG conditioned on E is transformed as the IDUCG.

14. The method according to claim 11, wherein, further including the following steps performed by the at least one processor:

(144) outspread the evidence events $E_h$, included in E, which determine the states of the {B,X} type variables, and the events $H_{kj}$ in concern, and in the process of outspread, break the logic cycles;

(145) based on the outspreaded logic expressions of $E_h$ and $H_{kj}$, further outspread $$\prod_h E_h \text{ and } H_{kj} \prod_h E_h;$$

(146) calculate the state probability and the rank probability of the concerned event $H_{kj}$ conditioned on E according to the following equations:

The state probability:

$$h_{kj}^s = \frac{Pr\{H_{kj}E\}}{Pr\{E\}};$$

The rank probability:

$$h_{kj}^r = \frac{h_{kj}^s}{\sum_{H_{kj} \in S} h_{kj}^s} = \frac{Pr\{H_{kj}E\}}{\sum_{H_{kj} \in S} Pr\{H_{kj}E\}}$$

Where S is the set of all the events in concern.

15. The method according to claim 14, wherein, the said step (145) including:
    (151) Express the evidence set $$\prod_h E_h$$

indicating the states of the {B,X} type variables as E'E", in which $$E' = \prod_i E_i'$$

is the evidence set composed of the evidence events indicating the abnormal states of variables, and $$E'' = \prod_{i'} E_{i'}''$$

is the evidence set composed of the evidence events indicating the normal states of variables;
    (152) Outspread $$E' = \prod_i E_i'$$

and determine the possible solution set S conditioned on E, where every possible solution $H_{kj}$ is an event in concern for the problem to be solved;
    And further the said step (146) including:
    (153) Calculate two types of the state probability and rank probability of $H_{kj}$ conditioned on E:
The state probability with incomplete information:

$$h_{kj}^{s'} = \frac{Pr\{H_{kj}E'\}}{Pr\{E'\}};$$

The state probability with complete information:

$$h_{kj}^s = h_{kj}^{s'} \frac{Pr\{E'' \mid H_{kj}E'\}}{Pr\{E'' \mid E'\}} = \frac{h_{kj}^{s'} Pr\{E'' \mid H_{kj}E'\}}{\sum_j h_{kj}^{s'} Pr\{E'' \mid H_{kj}E'\}};$$

The rank probability with incomplete information:

$$h_{kj}^{r'} = \frac{h_{kj}^{s'}}{\sum_{H_{kj} \in S} h_{kj}^{s'}} = \frac{Pr\{H_{kj}E'\}}{\sum_{H_{kj} \in S} Pr\{H_{kj}E'\}};$$

The rank probability with complete information:

$$h_{kj}^r = \frac{h_{kj}^{r'} Pr\{E'' \mid H_{kj}E'\}}{\sum_{H_{kj} \in S} h_{kj}^{r'} Pr\{E'' \mid H_{kj}E'\}}$$

In which, if $H_{kj}E'$ is null, $Pr\{E''|H_{kj}E'\} \equiv 0$.

16. The method according to claim 13, wherein, further including the following steps performed by the at least one processor,
    (140) use the BN method to calculate the state probability distribution of the variables in concern conditioned on E.

17. The method according to claim 15, wherein, further including the following steps performed by the at least one processor, to outspread E, E', $H_{kj}E$ or $H_{kj}E'$, and to outspread the evidence $E_h$ indicating the states of the {B,X} type variables and the X type variables included in $H_{kj}$, and breaks the logic cycles during the outspread:
    (171) When $E_h$ indicates that $X_n$ is in its state k, then $E_h = X_{nk}$; if $E_h$ is the virtual consequence variable of $X_n$, $$E_h = \sum_k F_{E;nk} X_{nk};$$

when $E_h$ indicates that $B_i$ is in its state j, then $E_h = B_{ij}$; if $E_h$ is the virtual consequence variable of $B_i$, $$E_h = \sum_j F_{E;ij} B_{ij};$$

(172) Outspread $X_{nk}$ according to $$X_{nk} = \sum_i F_{nk;i} V_i,$$

where $V_i$ are the direct cause variables of $X_n$, $i \in S_{EX_n}$, $V \in \{X, B, G, D\}$;
    (173) When $V_i$ is a logic gate, the input variables of $V_i$ are outspreaded according to the truth value table of this logic gate; if the input variables are logic gates again, outspread these input variables in the same way;
    (174) Consider every non-F type variable in the logic expression outspreaded from (172) and (173): ① If it is such an X type variable that has not appeared in the causality chain, repeat the logic outspread process described in (172) and (173);
    ② If it is a {B,D} type variable or such an X type variable that has appeared in the causality chain, no further outspread is needed;
    (175) In the said step (174), ② the X type variable that has appeared in the causality chain is called the repeated variable; in the dynamical case, the repeated variable is the same variable but is in the near earlier moment; the probability distribution of this variable is known according to the computation or the observed evidence in the earlier moment; in the static case, the repeated variable as cause is treated as null, i.e. ① if the repeated variable as cause is connected to the consequence variable by only an F type variable without any logic gate, this F type variable is eliminated, meanwhile the relationship corresponding to this F type variable is eliminated from $r_n$; ② if the repeated variable as cause is connected with the consequence variable by being an input variable of a logic gate in which the repeated variable is logically combined with other input variables, this repeated variable is eliminated from the input variables of the logic gate.

18. The method according to claim 17, wherein, the said step (175) ② including the following steps performed by the at least one processor, to eliminate an input variable of a logic gate is involved: suppose the variable to be eliminated from the logic gate is $V_i$, then,
   (181) When the logic gate is a virtual logic gate, eliminate the direct cause variable $V_i$ in the corresponding implicit mode first, reconstruct the conditional probability table and then transform the new implicit mode case to a new virtual logic gate and a new virtual functional variable; correspondingly, the new virtual functional variable may be introduced;
   (182) When the logic gate is not a virtual logic gate, make the logic gate as the most simplified logic gate first; based on the most simplified logic gate, calculate the logic expression in every input row in the truth value table by treating any state of $V_i$ as null, eliminate the input row along with the corresponding logic gate state when this row is calculated as null; the functional or conditional functional events with this logic gate state as their input events are also eliminated;
   (183) If all the input variables of a non-virtual logic gate are eliminated, or all the input rows of the truth value table are eliminated, this logic gate becomes null;
   (184) Repeat the above steps to treat the case when more than one input variables are eliminated.

19. The method according to claim 17, wherein further including the following steps performed by the at least one processor, to outspread E, E' $H_{kj}$E' or $H_{kj}$E':
   (191) to simplify DUCG and to outspread the X type variables for breaking logic cycles, it may change the input variables and the truth value table of the logic gate in EDUCG; after the change, make the expression in the truth value table of the logic gate as the exclusive expression; then, the logic gate is outspreaded according to the exclusive expressions of the input rows in the truth value table;
   (192) The result of the AND operation of different initiating events is null "0";
   (193) If the logical outspread to the default state $X_{n\eta}$ of $X_n$ is necessary, while the direct cause variables of $X_{n\eta}$ are not represented, outspread $X_{n\eta}$ according to $$X_{n\eta} = \prod_{k \neq \eta} \bar{X}_{nk};$$

(194) If $X_{nk}$, $k \neq \eta$, does not have input or the input is null, $X_{nk}$=0;

(195) When the condition $C_{n;i}$ of the conditional functional variable $F_{n;i}$ becomes invalid during the outspread, $F_{n;i}$ is eliminated.

20. The method according to claim 15, wherein, the said step (152) further including the following steps performed by the at least one processor, to find the possible solution set S:
   (201) Outspread $$E' = \prod_i E'_i$$

so as to obtain the sum-of-product type logic expression composed of only the {B,D,F} type events, where "product" indicates the logic AND, "sum" indicates the logic OR, and a group of events ANDed together is an "item";
   (202) After Eliminating the {F,D} type events and other inevitable events in all items, further simplify the outspreaded expression by logically absorbing or combining the physically same items;
   (203) After finishing the above steps, every item in the final outspreaded expression is composed of only the B type events and every item is a possible solution event; all these items compose the possible solution set S conditioned on E, in which the item with same B type variables is denoted as $H_k$, and the item with same B type variables but in different states is denoted as $H_{kj}$. $H_{kj}$ is a possible solution.

21. The method according to claim 15, wherein, further including the following steps performed by the at least one processor, to extend the method to include the dynamical case involving more than one time point, that is, transform the case that the process system dynamically changes according to time as the static cases at sequential discrete time points, and perform the computation for each time point; then combine all the static computation results at different time points together so as to correspond the dynamical change of the process system:
   (211) Classify the time as discrete time points $t_1, t_2, \ldots, t_n$ for each time point $t_i$, collect the static evidence $E(t_i)$ at that time point; find all the possible solutions $H_{kj}$ conditioned on $E(t_i)$, these possible solutions compose the static possible solution set $S(t_i)$ at time $t_i$; wherein: treat $E(t_i)$ as E, ① Construct the $E(t_i)$ conditional original DUCG; ② Simplify the $E(t_i)$ conditional original DUCG; ③ transform the simplified DUCG as EDUCG; ④ Outspread $$E(t_i) = \prod_k E_k(t_i),$$

then obtain the possible solution set $S_i$ at time $t_i$;
   (212) Calculate $$S(t_n) = \prod_{i=1}^n S_i,$$

$S(t_n)$ is called the dynamical possible solution at time $t_n$;
   (213) Eliminate the other possible solutions included in EDUCG but not included in $S(t_n)$, further simplify the EDUCG;

(214) Based on the above simplified EDUCG, calculate the static state probabilities with incomplete and complete information $h_{kj}^{s'}(t_i)$ and $h_{kj}^{s}(t_i)$ respectively, the static rank probabilities with incomplete and complete information $h_{kj}^{r'}(t_i)$ and $h_{kj}^{r}(t_i)$ respectively, of $H_{kj}$ in $S(t_n)$, as well as the unconditional probability $h_{kj}(t_0)=\Pr\{H_{kj}\}$;

(215) Calculate the dynamical state and rank probabilities with incomplete and complete information of $H_{kj}$ included in $S(t_n)$ as follows:

① The dynamical state probabilities with incomplete and complete information:

$$h_{kj}^{s'}(t) = \frac{\prod_{i=1}^{n} h_{kj}^{s'}(t_i)/(h_{kj}(t_0))^{n-1}}{\sum_j \prod_{i=1}^{n} h_{kj}^{s'}(t_i)/(h_{kj}(t_0))^{n-1}}$$

$$h_{kj}^{s}(t) = \frac{\prod_{i=1}^{n} h_{kj}^{s}(t_i)/(h_{kj}(t_0))^{n-1}}{\sum_j \prod_{i=1}^{n} h_{kj}^{s}(t_i)/(h_{kj}(t_0))^{n-1}}$$

In which, when $h_{kj}(t_0)=0$, $h_{kj}^{s'}(t_i)/(h_{kj}(t_0))^{n-1}=0$ and $h_{kj}^{s}(t_i)/(h_{kj}(t_0))^{n-1}=0$;

① The dynamical rank probabilities with incomplete and complete information:

$$h_{kj}^{r'}(t) = \frac{\prod_{i=1}^{n} h_{kj}^{r'}(t_i)/(h_{kj}(t_0))^{n-1}}{\sum_{H_{kj} \in S(t_n)} \prod_{i=1}^{n} h_{kj}^{r'}(t_i)/(h_{kj}(t_0))^{n-1}}$$

$$h_{kj}^{r}(t) = \frac{\prod_{i=1}^{n} h_{kj}^{r}(t_i)/(h_{kj}(t_0))^{n-1}}{\sum_{H_{kj} \in S(t_n)} \prod_{i=1}^{n} h_{kj}^{r}(t_i)/(h_{kj}(t_0))^{n-1}}$$

In which, when $h_{kj}(t_0)=0$, $h_{kj}^{r'}(t_0))^{n-1}=0$ and $h_{kj}^{r}(t_i)/(h_{kj}(t_0))^{n-1}=0$.

22. A method for constructing an intelligent system for processing the uncertain causality information, the method includes: representing the causalities among the things in the implicit representation mode, specifically including the following steps performed by the at least one processor:

(1) Establish a representation system about the various cause variables $V_i$ and consequence variables $X_n$ in concern with the problem to be solved, wherein: ① Let V represent two type variables B and X, i.e. $V \in \{B,X\}$, in which B is the basic variable that is only the cause variable and X is the consequence variable that can be also the cause variable of the other consequence variables; ② No matter the states of the variable $V_i$ or $X_n$, are discrete or not, represent them all as the discrete or fuzzy discrete states, so as to be dealt with by using the same manner, that is, represent the different states of $V_i$ and $X_n$ as $V_{ij}$ and $X_{nk}$ respectively, where i and n index variables while j and k index the discrete or fuzzy discrete states of the variables; ③ When $V_i$ or $X_n$ is continuous, the membership of an arbitrary value $e_i$ of $V_i$ or $e_n$ of $X_n$, belonging to $V_{ij}$ or $X_{nk}$ respectively, is $m_{ij}(e_i)$ or $m_{nk}(e_n)$ respectively, and they satisfy $$\sum_j m_{ij}(e_i) = 1 \text{ and } \sum_j m_{ij}(e_i) = 1;$$

④ $V_{ij}$ and $X_{nk}$ are treated as events, i.e., $V_{ij}$ represents the event that $V_i$ is in its state j and $X_{nk}$ represents the event that $X_n$ is in its state k; meanwhile, if $j \neq j'$ and $k \neq k'$, $V_{ij}$ is exclusive with $V_{ij'}$, and $X_{nk}$ is exclusive with $X_{nk'}$; ⑤ If $i \neq i'$, $B_{ij}$ and $B_{ij'}$ are independent events, and their occurrence probabilities $b_{ij}$ satisfies $$\sum_j b_{ij} \leq 1;$$

(2) For the consequence variable $X_n$, determine its direct cause variables $V_i$, $i \in S_{EXn}$, $S_{EXn}$ is the index set of the $\{B,X\}$ type direct variables of $X_n$ in the explicit representation mode;

(3) The conditional probability table (CPT) is used to represent the causality between the consequence variable $X_n$ and its direct cause variables $V_i$, $i \in S_{IXn}$, wherein: ① When no cause variable will be eliminated, CPT is composed of only the conditional probabilities $p_{nk;ij}$, where $p_{nk;ij} = \Pr\{X_{nk}|j\}$ and j indexes the state combination of the cause variables $V_i$, $i \in S_{IXn}$; ② When part or even all cause variables may be eliminated, CPT is composed of three parameters: $p_{nk;ij}$; $q_{nk;ij}$ and $d_{n;j}$, satisfying $p_{nk;ij} = q_{nk;ij}/d_{n;j}$, so that CPT can be reconstructed when some of its cause variables are eliminated, where $q_{nk;ij}$ and $q_{n;nj}$ are the sample number and occurrence number of $X_{nk}$ respectively, conditioned on the state combination indexed by j of the cause variables.

23. The method according to claim 22, wherein the said step (3) including the following steps performed by the at least one processor:

(231) In the implicit representation mode, the cause variables $V_i$, $i \in S_{IXn}$, can be separated as several groups, every group uses the implicit representation mode to represent the uncertain causality to $X_n$;

(232) Give the relationship $r_{Xn}$ between every group of direct cause variables to the consequence variable $X_n$;

(233) If some cause variables in the group are eliminated for any reason, the CPT of this group can be reconstructed as follows: Suppose the variable to be eliminated is $V_i$, before the elimination, there are several subgroups of the state combinations of the input variables indexed by j'; in subgroup j', the states of all the variables are same except the states of $V_i$; denote the index set of the state combination j in subgroup j' as $S_{ij'}$, then $$q_{nk;j'} = \sum_{j \in S_{ij'}} q_{nk;j}, \quad d_{n,j'} = \sum_{j|S_{ij'}} d_{n,j}, \quad p_{nk;j'} = q_{nk;j'}/d_{n;j'}$$

In which j' is the new index of the remnant state combinations after the elimination of $V_i$;

(234) Repeat (233) to deal with the case in which more than one cause variable is eliminated.

24. The method according to claim 22, wherein the method further includes: representing the causalities among the things in the explicit representation mode, specifically including the following steps performed by the at least one processor:

(4) The functional variable $F_{n;i}$ is used to represent the causality between $V_i$, $i \in S_{EXn}$, and $X_n$. $V_i$ is the input or cause variable of $F_{n;i}$ and $X_n$ is the output or consequence variable of $F_{n;i}$, wherein: ① The causality uncertainty between $V_i$ and $X_n$ is represented by the occurrence probability $f_{nk;ij}$ of the specific value $F_{nk;ij}$ of $F_{n;i}$; $F_{nk;ij}$ is a random event representing the uncertain functional mechanism of $V_{ij}$ causing $X_{nk}$. $f_{nk;ij}$ is the probability contribution of $V_{ij}$ to $X_{nk}$; ② $f_{nk;ij}=(r_{n;i}/r_n)a_{nk;ij}$, where $r_{n;i}$ is called the relationship between $V_i$ and $X_n$, $r_n$ is the normalization factor and $$r_n = \sum_i r_{n;i},$$

$a_{nk;ij}$ is the probability of the event that $V_{ij}$ causes $X_{nk}$ regardless of any other cause variables and $a_{nk;ij}$ and $r_n$ can be the function of time; ③ $a_{nk;ij}$ satisfies $$\sum_k a_{nk;ij} \leq 1; \text{④} \Pr\{X_{nk}\} = \sum_{i,j} f_{nk;ij}\Pr\{V_{ij}\}.$$

25. The method according to claim 24, wherein the functional variable $F_{n;i}$ in the explicit representation mode can be the conditional functional variable, the conditional functional variable is used to represent the functional relation between the cause variable $V_i$ and the consequence variable $X_n$ conditioned on $C_{n;i}$, wherein:
  (1) $C_{n;i}$ has only two states: true or false, and its state can be found according to the observed information or the computation results;
  (2) When $C_{n;i}$ is true, the conditional functional variable becomes the functional variable;
  (3) When $C_{n;i}$ is false, the conditional functional variable is eliminated.

26. A non-transitory computer-readable medium containing executable instructions that, when executed by a machine, cause the machine to implement a method for constructing an intelligent system for processing the uncertain causality information, the method includes: representing the causalities among the things in the explicit representation mode, specifically including the following steps;
  (1) Establish a representation system about the various cause variables $V_i$ and consequence variables $X_n$ in concern with the problem to be solved, wherein: ① Let V represent two type variables B and X, i.e. $V \in \{B,X\}$, in which B is the basic variable that is only the cause variable and X is the consequence variable that can be also the cause variable of the other consequence variables; ② No matter the states of the variable $V_i$ or $X_n$ are discrete or not, represent them all as the discrete or fuzzy discrete states, so as to be dealt with by using the same manner, that is, represent the different states of $V_i$ and $X_n$ as $V_{ij}$ and $X_{nk}$ respectively, where i and n index variables while j and k index the discrete or fuzzy discrete states of the variables; ③ When $V_i$ or $X_n$ is continuous, the membership of an arbitrary value $e_i$ of $V_i$ or $e_n$ of $X_n$, belonging to $V_{ij}$ or $X_{nk}$ respectively, is $m_{ij}(e_i)$ or $m_{nk}(e_n)$ respectively, and they satisfy $$\sum_j m_{ij}(e_i) = 1 \text{ and } \sum_j m_{ij}(e_i) = 1;$$

④ $V_{ij}$ and $X_{nk}$ are treated as events, i.e., represents the event that $V_i$ is in its state j and $X_{nk}$ represents the event that $X_n$ is in its state k; meanwhile, if $j \neq j'$ and $k \neq k'$, $V_{ij}$ is exclusive with $V_{ij'}$ and $X_{nk}$ is exclusive with $X_{nk'}$; ⑤ If $i \neq i'$ and $B_{jj'}$ are independent events, and their occurrence probabilities $b_{ij}$ satisfies $$\sum_j b_{ij} \leq 1;$$

(2) For the consequence variable $X_n$, determine its direct cause variables $V_i$, $i \in S_{EXn}$, $S_{EXn}$ is the index set of the $\{B,X\}$ type direct variables of $X_n$ in the explicit representation mode;
  (3) The functional variable $F_{n;i}$ is used to represent the causality between $V_i$, $i \in S_{EXn}$, and $X_n$. $V_i$ is the input or cause variable of $F_{n;i}$ and $X_n$ is the output or consequence variable of $F_{n;i}$, wherein: The causality uncertainty between $V_i$ and $X_n$ is represented by the occurrence probability $f_{nk;ij}$ of the specific value $F_{nk;ij}$ of $F_{n;i}$. $F_{nk;ij}$ is a random event representing the uncertain functional mechanism of $V_{ij}$ causing $X_{nk}$. $f_{nk;ij}$ is the probability contribution of $V_{ij}$ to $X_{nk}$; ② $f_{nk;ij}=(r_{n;i}/r_n)a_{nk;ij}$, where $r_{n;i}$ is called the relationship between $V_i$ and $X_n$, $r_n$ is the normalization factor and $$r_n = \sum_i r_{n;i},$$

$a_{nk;ij}$ is the probability of the event that $V_{ij}$ causes $X_{nk}$ regardless of any other cause variables and $a_{nk;ij}$ and $r_n$ can be the function of time; ③ $a_{nk;ij}$ satisfies $$\sum_k a_{nk;ij} \leq 1; \text{④} \Pr\{X_{nk}\} = \sum_{ij} f_{nk;ij}\Pr\{V_{ij}\}.$$

27. The medium according to claim 26, wherein the functional variable $F_{n;i}$ in the explicit representation mode can be the conditional functional variable, the conditional functional variable is used to represent the functional relation between the cause variable $V_i$ and the consequence variable $X_n$ conditioned on $C_{n;i}$, wherein:
  (1) $C_{n;i}$ has only two states: true or false, and its state can be found according to the observed information or the computation results;
  (2) When $C_{n;i}$ is true, the conditional functional variable becomes the functional variable;
  (3) When $C_{n;i}$ is false, the conditional functional variable is eliminated.

28. The medium according to claim 26, wherein the explicit representation mode includes also extending $V \in \{B,X\}$ to $V \in \{B,X,G\}$ in the explicit representation mode, where G is the logic gate variable, i.e. the cause variable to influence the consequence variable by the state logic combinations of a group of cause variables, suppose the input variables of logic gate variable $G_i$ are $V_h$, then the logic gate $G_i$ is constructed by the following steps:
  (31) The logic combinations between the input variables $V_h$, $V \in \{B,X,G\}$, are represented by the truth value table of $G_i$ in which each input row is a logic expression composed of the input variable states and corresponds to a unique state of $G_i$, different rows of the logic expressions are exclusive with each other, wherein if a logic expression is true, the corresponding state of $G_i$ is true;

(32) The set of the states of $G_i$ is equal to or less than the set of all state combinations of the input variables;

(33) When the set of $G_i$ the states of is less than the set of all state combinations of the input variables, there is a remnant state of $G_i$, which corresponds uniquely to the remnant state combinations of the input variables, so that all the states of $G_i$ including the remnant state are exclusive with each other and just cover all the state combinations of the input variables;

(34) When $G_i$ is the direct cause variable of $X_n$, $G_i$ functions to $X_n$ through the functional or conditional functional variable $F_{n;i}$;

(35) If a logic gate has only one input variable, this logic gate can be ignored, i.e. the input variable of the logic gate can be taken as the input variable of the functional variable or conditional functional variable $F_{n;i}$ with this logic gate as its input variable;

(36) When $G_i$ is the direct cause variable of $X_n$, the relationship between $G_i$ and $X_n$ is $r_{n;i}$; when calculating $f_{nk;ij}$, the calculation to $r_n$ includes the relationship between $G_i$ and $X_n$; when calculating $Pr\{X_{nk}\}$, the $f_{nk;ji}$ between $G_i$ and $X_n$ is included.

29. The medium according to claim 28, wherein further including:

(41) Extend $V \in \{B,X\}$ as $V \in \{B,X,D\}$, or extend $V \in \{B,X,G\}$ as $V \in \{B,X,G,D\}$, in which D is the default event or variable, $D_n$ can appear only with $X_n$ and is an independent cause variable that has only one inevitable state;

(42) $D_n$ becomes a direct cause variable of $X_n$ through $F_{n;D}$, where $F_{n;D}$ is the functional variable between $D_n$ and $X_n$;

(43) The causality uncertainty between $D_n$ and $X_n$ is represented by the occurrence probability $f_{nk;D}$ of the specific value $F_{nk;D}$ of $F_{n;D}$, where $F_{nk;D}$ is a random event representing the functional mechanism of $D_n$ to $X_n$, and $f_{nk;D}$ is the probability contribution of $D_n$ to $X_{nk}$;

(44) $f_{nk;D} = (r_{n;D}/r_n) a_{nk;D}$, where $a_{nk;D}$ is the probability of the event that $D_n$ causes $X_n$ regardless of the other cause variables of $X_n$, and satisfies $$\sum_k a_{nk;D} \leq 1, \ r_{n;D}$$

is the relationship between $D_n$ and $X_n$; after adding $D_n$, $$r_n = \sum_i r_{n;i} + r_{n;D}.$$

$a_{nk;D}$ and $r_{n;D}$ can be the function of time;

(45) The original $$Pr\{X_{nk}\} = \sum_{ij} f_{nk;ij} Pr\{V_{ij}\}$$

is replaced as $$Pr\{X_{nk}\} = \sum_{ij} f_{nk;ij} Pr\{V_{ij}\} + f_{nk;D}.$$

30. The medium according to claim 29, wherein, further including: when the default variable of $X_n$ is more than one, they can be combined as one default variable $D_n$; let g be the index distinguishing two or more default variables, Corresponding to the case of only one default variable, the variable $D_n$ and the parameters $r_{n;D}$, $a_{nk;D}$ are represented as $D_{ng}$, $r_{n;Dg}$, $a_{nk;Dg}$ respectively; after combining $D_{ng}$ as $D_n$, the parameters of $D_n$ are calculated according to $$r_{n;D} = \sum_g r_{n;Dg} \ \text{and} \ a_{nk;D} = \sum_g a_{nk;Dg}.$$

31. The medium according to claim 26, wherein the method further includes: using the implicit mode to represent the uncertain causalities among things, specifically including the following step:

(4) The conditional probability table (CPT) is used to represent the causality between the consequence variable $X_n$, and its direct cause variables $V_i$, $i \in S_{IXn}$, wherein: ① When no cause variable will be eliminated, CPT is composed of only the conditional probabilities $p_{nk;ij}$, where $p_{nk;ij} = Pr\{X_{nk}|j\}$ and j indexes the state combination of the cause variables $V_i$, $i \in S_{IXn}$; ② When part or even all cause variables may be eliminated, CPT is composed of three parameters: $p_{nk;ij}$, $q_{nk;ij}$ and $d_{n;j}$, satisfying $p_{nk;ij} = q_{nk;ij}/d_{n;j}$, so that CPT can be reconstructed when some of its cause variables are eliminated, where $q_{nk;ij}$ and $q_{n;nj}$ are the sample number and occurrence number of $X_{nk}$ respectively, conditioned on the state combination indexed by j of the cause variables.

32. The medium according to claim 31, wherein the said step (4) further including:

(71) In the implicit representation mode, the cause variables $V_i$, $i \in S_{IXn}$, can be separated as several groups, every group uses the implicit representation mode to represent the uncertain causality to $X_n$;

(72) Give the relationship $r_{Xn}$ between every group of direct cause variables to the consequence variable $X_n$;

(73) If some cause variables in the group are eliminated for any reason, the CPT of this group can be reconstructed as follows: Suppose the variable to be eliminated is $V_i$, before the elimination, there are several subgroups of the state combinations of the input variables indexed by j'; in subgroup j', the states of all the variables are same except the states of $V_i$; denote the index set of the state combination j in subgroup j' as $S_{ij'}$, then $$q_{nk;j'} = \sum_{j \in S_{ij'}} q_{nk;j}, \ d_{nj'} = \sum_{j \in S_{ij'}} d_{nj}, \ p_{nk;j'} = q_{nk;j'}/d_{n;j'}$$

In which j' is the new index of the remnant state combinations after the elimination of $V_i$;

(74) Repeat (73) to deal with the case in which more than one cause variable is eliminated.

33. The medium according to claim 31, wherein further including the following steps:

(5) For a group of cause variables $V_i$, $i' \in S_{IXn}$, in the implicit representation mode, give the corresponding relationship $r_n = r_n + r_{Xn}$, while in the explicit representation mode, $r_n$ is renewed as $r_n = r_n + r_{Xn}$, in which the right side $r_n$ is before the renewing;

(6) If the implicit representation mode has more than one group, they can be indexed by g and every group relationship can be denoted as $r_{Xng}$; then the calculation equation in above (5) becomes $$r_n = r_n + \sum_h r_{Xng}.$$

34. The medium according to claim 33, further including:
(10) According to the specific cases of every consequence variable $X_n$, the representations above for all the consequence variables compose the original DUCG;
(11) The evidence E in concern with the original DUCG is received during the online application and is expressed as $$E = E^* \prod_h E_h,$$

where $E_h$ is the evidence indicating the state of the {B,X} type variable, E* represents the other evidence; if $E_h$ is a fuzzy state evidence, i.e. the state of the variable $V_h$ in the original DUCG is known in a state probability distribution, or if $E_h$ is a fuzzy continuous evidence, i.e. the specific value $e_h$ of the continuous variable $V_h$ is known in the fuzzy area of different fuzzy states of $V_h$, $V \in \{B,X\}$, then add $E_h$ as a virtual evidence variable into the original DUCG and represent the causality between $V_h$ and $E_h$ according to the explicit mode so that $E_h$ becomes the consequence variable of the cause variable $V_h$; after finishing these steps, the original DUCG becomes the E conditional original DUCG.

35. The medium according to claim 34, wherein, the said step (11) including: adding $E_h$ as a virtual evidence variable into the original DUCG, and further including the following steps: Suppose $m_{hj}=m_{hj}(e_h)$ is the membership of $E_h$ belonging to the fuzzy state j, or $m_{hj}$ is the probability of $X_{hj}$ indicated by the fuzzy state evidence $E_h$, i.e., $m_{hj}=\Pr\{V_{hj}|E_h\}$, $j \in S_{Eh}$, $S_{Eh}$ is the index set of state j in which $m_{hj} \neq 0$ and includes at least two different indexes, while satisfying $$\sum_{j \in S_{Eh}} m_{hj} = 1:$$

(101) As the virtual consequence variable of $V_h$, $E_h$ has only one inevitable state, has only one direct cause variable $V_h$, and is not the cause variable of any other variable;
(102) The virtual functional variable from $V_{hj}$ to $E_h$ is $F_{E;h}$ and its specific value $F_{E;hj}$ is the virtual random event that $V_{hj}$ causes $E_h$; the functional intensity parameter $f_{E;hj}$ of $F_{E;hj}$ may be given by domain engineers;
(103) If the domain engineers cannot give $f_{E;hj}$, it can be calculated from $$f_{E;hj} = \frac{m_{hj} v_{hk}}{m_{hk} v_{hj}} f_{E;hk},$$

where $j \neq k$, $j \in S_{Eh}$, $k \in S_{Eh}$, $v_{hj} \equiv \Pr\{V_{hj}\}$, $v_{hk} \equiv \Pr\{V_{hk}\}$ Given $f_{E;hk} > 0$, $f_{E;hj}$ can be calculated.

36. The medium according to claim 35, wherein, further including the following steps to simplify the E conditional original DUCG: suppose $V_i$ is the direct cause variable of $X_n$, $V \in \{B,X,G,D\}$, then (111) According to E, determine whether or not the condition $C_{n;i}$ of the conditional functional variable $F_{n;i}$ is valid: ① if yes, change the conditional functional variable as the functional variable; ② if not, eliminate this conditional functional variable; ③ if cannot determine whether or not $C_{n;i}$ is valid, keep the conditional functional variable until $C_{n;i}$ can be determined;
(112) According to E, if $V_{ih}$ is not the cause of any state of $X_n$, when E shows that $V_{ih}$ is true, eliminate the functional or conditional functional variable $F_{n;i}$ that is from $V_i$ to $X_n$;
(113) According to E, if $X_{nk}$ cannot be caused by any state of $V_i$, when E shows that $X_{nk}$ is true, eliminate the functional or conditional functional variable from $V_i$ to $X_n$;
(114) In the explicit mode of representation, if the X or G type variable without any cause or input appears, eliminate this variable along with the F type variables starting from this variable;
(115) If there is any group of isolated variables without any logic connection to the variables related to E, eliminate this group variables;
(116) If E shows that $X_{nk}$ is true, while $X_{nk}$ is not the cause of any other variable and $X_n$ has no connection with the other variables related to E, denote the index set of the index n of such $X_n$ as $S_{Enk}$; When $V_i$ and its logic connection variables $F_{n;i}$ have no logic connection with the variables related to E except the variables indexed in $S_{Enk}$, eliminate $X_n$, $V_i$ and the functional or conditional functional variables $F_{n;i}$ along with all other variables logically connected with $V_i$;
(117) If E shows that $X_{nk}$ appears earlier than $V_{ij}$, so that for sure $V_{ij}$ is not the cause of $X_{nk}$, eliminate the functional or conditional functional variables that are in the causality chains from $V_i$ to $X_n$ but are not related to the influence of other variables to $X_n$;
(118) Upon demand, the above steps can be in any order and can be repeated.

37. The medium according to claim 36, wherein, further including the following steps to transform the DUCG with implicit or hybrid representation mode conditioned on E as all in the explicit mode, i.e. EDUCG:
(123) For the consequence variable $X_n$ in the implicit or hybrid mode, for every group of $S_{IXn}$ type cause variables, introduce a virtual logic gate variable $G_i$, in which the cause variables of $S_{IXn}$ are the input variables of $G_i$, and the number of the states of $G_i$ and the input rows of the truth value table of $G_i$ equal to the number of the state combinations of the cause variables in $S_{IXn}$, while each of the state combination of the input variables is an input row of the truth value table of $G_i$ and also a state of the virtual logic gate;
(124) Introduce the virtual functional variable $F_{n;i}$, in which $G_i$ is the input variable and $X_n$, is the output variable, so that $G_i$ becomes the direct cause variable of $X_n$;
(125) In the CPT of the cause variables in $S_{IXn}$, $a_{nk;ij} \equiv p_{nk;j}$; the relationship of $F_{n;i}$ is: $r_{ni} = r_{Xn}$;
(126) When there is only one input variable in $G_i$, such $G_i$, can be ignored, i.e. the virtual functional variable takes the input variable of $G_i$ as its input variable directly;
(127) When the groups of the $S_{IXn}$ type variables are more than one group, repeat the above steps for every groups.

38. The medium according to claim 36, wherein, further including the following steps to transform the DUCG conditioned on E in the explicit representation mode or in the more than one group implicit representation mode as the IDUCG in which all representations are in the implicit representation mode with only one group direct cause variables:

(131) If $C_{n;i}$ is valid, change the conditional functional variable as the functional variable; If $C_{n;i}$ is invalid, eliminate the conditional functional variable;

(132) For any representation of the uncertain causality between the consequence variable $X_n$ and its direct cause variables, if it is in the hybrid or more than one group implicit representation mode, transform the representation mode for $X_n$ to the explicit mode;

(133) After the above steps, take the state combinations of the {B,X} type cause variables of the consequence variable $X_n$ as the conditions indexed by j, calculate the conditional probability of $X_{nk}\Pr\{X_{nk}|j\}$ according to the explicit mode, where the connections between the {B,X} type cause variables and $X_n$ may be or may not be through logic gates; in the calculation, all contributions from different types of direct cause variables should be considered, i.e. when the direct cause variables are {X,B,G} types, $$\Pr\{X_{nk}|j\} = \sum_i f_{nk;ih};$$

when the direct cause variables are {X,B,G,D} types, $$\Pr\{X_{nk}|j\} = \sum_i f_{nk;ih} + f_{nk;D};$$

(134) The case of $a_{nk;ih}=1$ can be understood as that $X_{nk}$ is true for sure, i.e. when the input variable i is in its state h, all the states, except k, of $X_n$ cannot be true; if this applies, when $a_{nk;ih}=1$, $\Pr\{X_{nk}|j\}=1$, meanwhile $\Pr\{X_{nk'}|j\}=0$, where $k \neq k'$;

(135) If $a_{nk;ih}=1$, $k \in S_m$, $S_m$ is the index set of such states of $X_n$ that $a_{nk;ih}=1$ and the number of such states is m, then $\Pr\{X_{nk}|j\}=1/m$ and $\Pr\{X_{nk'}|j\}=0$, where $k' \notin S_m$;

(136) If such calculated $$\sum_k \Pr\{X_{nk}|j\} < 1, \quad \text{let } \Pr\{X_{n\eta}|j\} = 1 - \sum_{k \neq \eta} \Pr\{X_{nk}|j\},$$

where $\eta$ indexes the default state of $X_n$;

(137) If there is no default state $\eta$ in said step (136), the normalization method is used as follows:

$$\Pr\{X_{nk}|j\} = \Pr\{X_{nk}|j\} \Big/ \sum_k \Pr\{X_{nk}|j\},$$

the $\Pr\{X_{nk}|j\}$ on the right side are the values before the normalization;

(138) After satisfying the normalization, $\Pr\{X_{nk}|j\}$ becomes the conditional probability $P_{nk;nj}$ in the standard implicit representation mode;

(139) Connect the {X,B} type direct cause variables of $X_n$, through or not through logic gates with $X_n$ according to the implicit representation mode, the DUCG conditioned on E is transformed as the IDUCG.

39. The medium according to claim 36, wherein, further including the following steps:

(144) outspread the evidence events $E_h$, included in E, which determine the states of the {B,X} type variables, and the events $H_{kj}$ in concern, and in the process of outspread, break the logic cycles;

(145) based on the outspreaded logic expressions of $E_h$ and $H_{kj}$, further outspread $$\prod_h E_h \text{ and } H_{kj} \prod_h E_h;$$

(146) calculate the state probability and the rank probability of the concerned event $H_{kj}$ conditioned on E according to the following equations:

The state probability:

$$h_{kj}^s = \frac{\Pr\{H_{kj}E\}}{\Pr\{E\}};$$

The rank probability:

$$h_{kj}^r = \frac{h_{kj}^s}{\sum_{H_{kj} \in S} h_{kj}^s} = \frac{\Pr\{H_{kj}E\}}{\sum_{H_{kj} \in S} \Pr\{H_{kj}E\}}$$

Where S is the set of all the events in concern.

40. The medium according to claim 39, wherein, the said step (145) including:

(151) Express the evidence set $$\prod_h E_h$$

indicating the states or the {B,X} type variables as E'E", in which $$E' = \prod_i E_i'$$

is the evidence set composed of the evidence events indicating the abnormal states of variables, and $$E'' = \prod_{i'} E_{i'}''$$

is the evidence set composed of the evidence events indicating the normal states of variables;

(152) Outspread $$E' = \prod_i E_i'$$

and determine the possible solution set S conditioned on E, where every possible solution $H_{kj}$ is an event in concern for the problem to be solved;

And further the said step (146) including:
(153) Calculate two types of the state probability and rank probability of $H_{kj}$ conditioned on E:
The state probability with incomplete information:

$$h'_{kj} = \frac{Pr\{H_{kj}E'\}}{Pr\{E'\}};$$

The state probability with complete information:

$$h^s_{kj} = h'_{kj}\frac{Pr\{E''|H_{kj}E'\}}{Pr\{E''|E'\}} = \frac{h'_{kj}Pr\{E''|H_{kj}E'\}}{\sum_j h'_{kj}Pr\{E''|H_{kj}E'\}};$$

The rank probability with incomplete information:

$$h'_{kj} = \frac{h'_{kj}}{\sum_{H_{kj}\in S} h'_{kj}} = \frac{Pr\{H_{kj}E'\}}{\sum_{H_{kj}\in S} Pr\{H_{kj}E'\}};$$

The rank probability with complete information:

$$h^r_{kj} = \frac{h'_{kj}Pr\{E''|H_{kj}E'\}}{\sum_{H_{kj}\in S} h'_{kj}Pr\{E''|H_{kj}E'\}}$$

In which, if $H_{kj}E'$ is null, $Pr\{E''|H_{kj}E'\} \equiv 0$.

41. The medium according to claim 38, wherein, further including the following steps:
(140) use the BN method to calculate the state probability distribution of the variables in concern conditioned on E.

42. The medium according to claim 40, wherein, further including the following steps to outspread E, E', $H_{kj}E$ or $H_{ki}E'$, and to outspread the evidence $E_h$, indicating the states of the {B,X} type variables and the X type variables included in $H_{kj}$, and breaks the logic cycles during the outspread:
(171) When $E_h$ indicates that $X_n$ is in its state k, then $E_h = X_{nk}$; if $E_h$ is the virtual consequence variable of $X_n$, $$E_h = \sum_k F_{E;nk} X_{nk};$$

when $E_h$ indicates that $B_i$ is in its state j, then $E_h = B_{ij}$; if $E_h$ is the virtual consequence variable of $B_i$, $$E_h = \sum_j F_{E;ij} B_{ij};$$

(172) Outspread $X_{nk}$ according to $$X_{nk} = \sum_i F_{nk;i} V_i,$$

where $V_i$ are the direct cause variables of $X_n$, $i \in S_{EXn}$, $V \in \{X, B, G, D\}$;

(173) When $V_i$ is a logic gate, the input variables of $V_i$ are outspreaded according to the truth value table of this logic gate; if the input variables are logic gates again, outspread these input variables in the same way;

(174) Consider every non-F type variable in the logic expression outspreaded from (172) and (173): ① If it is such an X type variable that has not appeared in the causality chain, repeat the logic outspread process described in (172) and (173); ② If it is a {B,D} type variable or such an X type variable that has appeared in the causality chain, no further outspread is needed;

(175) In the said step (174), ② the X type variable that has appeared in the causality chain is called the repeated variable; in the dynamical case, the repeated variable is the same variable but is in the near earlier moment; the probability distribution of this variable is known according to the computation or the observed evidence in the earlier moment; in the static case, the repeated variable as cause is treated as null, i.e. ① if the repeated variable as cause is connected to the consequence variable by only an F type variable without any logic gate, this F type variable is eliminated, meanwhile the relationship corresponding to this F type variable is eliminated from $r_n$; ② f the repeated variable as cause is connected with the consequence variable by being an input variable of a logic gate in which the repeated variable is logically combined with other input variables, this repeated variable is eliminated from the input variables of the logic gate.

43. The medium according to claim 42, wherein, the said step (175) ② including the following steps to eliminate an input variable of a logic gate is involved: suppose the variable to be eliminated from the logic gate is $V_i$, then,
(181) When the logic gate is a virtual logic gate, eliminate the direct cause variable $V_i$ in the corresponding implicit mode first, reconstruct the conditional probability table and then transform the new implicit mode case to a new virtual logic gate and a new virtual functional variable; correspondingly, the new virtual functional variable may be introduced;
(182) When the logic gate is not a virtual logic gate, make the logic gate as the most simplified logic gate first; based on the most simplified logic gate, calculate the logic expression in every input row in the truth value table by treating any state of $V_i$ as null, eliminate the input row along with the corresponding logic gate state when this row is calculated as null; the functional or conditional functional events with this logic gate state as their input events are also eliminated;
(183) If all the input variables of a non-virtual logic gate are eliminated, or all the input rows of the truth value table are eliminated, this logic gate becomes null;
(184) Repeat the above steps to treat the case when more than one input variables are eliminated.

44. The medium according to claim 42, wherein further including the following steps to outspread E, E' $H_{kj}E$ or $H_{kj}E'$:
(191) to simplify DUCG and to outspread the X type variables for breaking logic cycles, it may change the input variables and the truth value table of the logic gate in EDUCG; after the change, make the expression in the truth value table of the logic gate as the exclusive expression; then, the logic gate is outspreaded according to the exclusive expressions of the input rows in the truth value table;
(192) The result of the AND operation of different initiating events is null "0";

(193) If the logical outspread to the default state $X_{n1}$ of $X_n$ is necessary, while the direct cause variables of $X_{n1}$ are not represented, outspread $X_{n1}$ according to $$X_{n1} = \prod_{k \neq \eta} \overline{X}_{nk};$$

(194) If $X_{nk}$, $k \neq \eta$, does not have input or the input is null, $X_{nk}=0$;

(195) When the condition $C_{n;i}$ of the conditional functional variable $F_{n;i}$ becomes invalid during the outspread, $F_{n;i}$ is eliminated.

45. The medium according to claim 40, wherein, the said step (152) further including the following steps to find the possible solution set S:

(201) Outspread $$E' = \prod_i E'_i$$

so as to main me sum-of-product type logic expression composed of only the {B,D,F} type events, where "product" indicates the logic AND, "sum" indicates the logic OR, and a group of events ANDed together is an "item";

(202) After Eliminating the {F,D} type events and other inevitable events in all items, further simplify the outspreaded expression by logically absorbing or combining the physically same items;

(203) After finishing the above steps, every item in the final outspreaded expression is composed of only the B type events and every item is a possible solution event;

all these items compose the possible solution set S conditioned on E, in which the item with same B type variables is denoted as $H_k$, and the item with same B type variables but in different states is denoted as $H_{kj}$. $H_{kj}$ is a possible solution.

46. The medium according to claim 40, wherein, further including the following steps to extend the method to include the dynamical case involving more than one time point, that is, transform the case that the process system dynamically changes according to time as the static cases at sequential discrete time points, and perform the computation for each time point; then, combine all the static computation results at different time points together so as to correspond the dynamical change of the process system:

(211) Classify the time as discrete time points $t_1, t_2, \ldots t_n$; for each time point $t_i$, collect the static evidence $E(t_i)$ at that time point; find all the possible solutions $H_{kj}$ conditioned on $E(t_i)$, these possible solutions compose the static possible solution set $S(t_i)$ at time $t_i$; wherein: treat $E(t_i)$ as E, ① Construct the $E(t_i)$ conditional original DUCG; ② Simplify the $E(t_i)$ conditional original DUCG; ③ transform the simplified DUCG as EDUCG; ④ Outspread $$E(t_i) = \prod_k E_k(t_i),$$

then obtain me possible solution set $S_i$ at time $t_i$;

(212) Calculate $$S(t_n) = \prod_{i=1}^n S_i,$$

$S(t_n)$ is called the dynamical possible solution at time $t_n$;

(213) Eliminate the other possible solutions included in EDUCG but not included in $S(t_n)$, further simplify the EDUCG;

(214) Based on the above simplified EDUCG, calculate the static state probabilities with incomplete and complete information $h_{kj}^{s'}(t_i)$ and $h_{kj}^{s}(t_i)$ respectively, the static rank probabilities with incomplete and complete information $h_{kj}^{r'}(t_i)$ and $h_{kj}^{r}(t_i)$ respectively, of $H_{kj}$ in $S(t_n)$, as well as the unconditional probability $h_{kj}(t_0)=\Pr\{H_{kj}\}$;

(215) Calculate the dynamical state and rank probabilities with incomplete and complete information of $H_{kj}$ included in $S(t_n)$ as follows:

① The dynamical state probabilities with incomplete and complete information:

$$h_{kj}^{s'}(t) = \frac{\prod_{i=1}^n h_{kj}^{s'}(t_i) / (h_{kj}(t_0))^{n-1}}{\sum_j \prod_{i=1}^n h_{kj}^{s'}(t_i) / (h_{kj}(t_0))^{n-1}}$$

$$h_{kj}^{s}(t) = \frac{\prod_{i=1}^n h_{kj}^{s}(t_i) / (h_{kj}(t_0))^{n-1}}{\sum_j \prod_{i=1}^n h_{kj}^{s}(t_i) / (h_{kj}(t_0))^{n-1}}$$

In which, when $h_{kj}(t_0)=0$, $h_{kj}^{s'}(t_i)/(h_{kj}(t_0))^{n-1}=0$ and $h_{kj}^{s}(t_i)/(h_{kj}(t_0))^{n-1}=0$;

② The dynamical rank probabilities with incomplete and complete information:

$$h_{kj}^{r'}(t) = \frac{\prod_{i=1}^n h_{kj}^{r'}(t_i) / (h_{kj}(t_0))^{n-1}}{\sum_{H_{kj} \in S(t_n)} \prod_{i=1}^n h_{kj}^{r'}(t_i) / (h_{kj}(t_0))^{n-1}}$$

$$h_{kj}^{r}(t) = \frac{\prod_{i=1}^n h_{kj}^{r}(t_i) / (h_{kj}(t_0))^{n-1}}{\sum_{H_{kj} \in S(t_n)} \prod_{i=1}^n h_{kj}^{r}(t_i) / (h_{kj}(t_0))^{n-1}}$$

In which, when $h_{kj}(t_0)=0$, $h_{kj}^{r'}(t_i)/(h_{kj}(t_0))^{n-1}0$ and $h_{kj}^{r}(t_i)/(h_{kj}(t_0))^{n-1}=0$.

47. A non-transitory computer-readable medium containing executable instructions that, when executed by a machine, cause the machine to implement a method for constructing an intelligent system for processing the uncertain causality information, the method includes: representing the causalities among the things in the explicit representation mode, specifically including the following steps:

(1) Establish a representation system about the various cause variables $V_i$ and consequence variables $X_n$ in concern with the problem to be solved, wherein: ① Let V represent two type variables B and X, i.e. $V \in \{B,X\}$, in which B is the basic variable that is only the cause variable and X is the consequence variable that can be also the cause variable of the other consequence variables; ② No matter the states of the variable $V_i$ or $X_n$ are discrete or not, represent them all as the discrete or fuzzy discrete states, so as to be dealt with by using the same manner, that is, represent the different states of $V_i$ and $X_n$ as $V_{ij}$ and $X_{nk}$ respectively, where i and n index variables while j and k index the discrete or fuzzy discrete states of the variables; ③ When $V_i$ or $X_n$ is continuous, the membership of an arbitrary value $e_i$ of $V_i$ or $e_n$ of $X_n$, belonging to $V_{ij}$ or $X_{nk}$ respectively, is $m_{ij}(e_i)$ or $m_{nk}(e_n)$ respectively, and they satisfy $$\sum_j m_{ij}(e_i) = 1 \text{ and } \sum_j m_{ij}(e_i) = 1;$$

④ $V_{ij}$ and $X_{nk}$ are treated as events, i.e., $V_{ij}$ represents the event that $V_i$ is in its state j and $X_{nk}$ represents the event that $X_n$ is in its state k; meanwhile, if $j \neq j$ and $k \neq k'$, $V_{ij}$ is exclusive with $V_{ij'}$ and $X_{nk}$ is exclusive with $X_{nk'}$; ⑤ If $i \neq i'$, $B_{ij}$ and $B_{ij'}$ are independent events, and their occurrence probabilities $b_{ij}$ satisfies $$\sum_j b_{ij} \leq 1;$$

(2) For the consequence variable $X_n$, determine its direct cause variables $V_i$, $i \in S_{EXn}$, $S_{EXn}$ is the index set of the {B,X} type direct variables of $X_n$ in the explicit representation mode;

(3) The conditional probability table (CPT) is used to represent the causality between the consequence variable $X_n$ and its direct cause variables $V_i$, $I \in S_{IXn}$, wherein:
① When no cause variable will be eliminated, CPT is composed of only the conditional probabilities $p_{nk;ij}$, where $p_{nk;ij} = \Pr\{X_{nk}|j\}$ and j indexes the state combination of the cause variables $V_i$, $i \in S_{IXn}$, ② When part or even all cause variables may be eliminated, CPT is composed of three parameters: $p_{nk;ij}$, $q_{nk;ij}$ and $d_{n;j}$, satisfying $p_{nk;ij} = q_{nk;ij}/d_{n;j}$, so that CPT can be reconstructed when some of its cause variables are eliminated, where $q_{nk;ij}$ and $q_{n;nj}$ are the sample number and occurrence number of $X_{nk}$ respectively, conditioned on the state combination indexed by j of the cause variables.

48. The medium according to claim 47, wherein the said step (3) including the following steps:
(231) In the implicit representation mode, the cause variables $V_i$, $i \in S_{IXn}$, can be separated as several groups, every group uses the implicit representation mode to represent the uncertain causality to $X_n$;
(232) Give the relationship $r_{Xn}$ between every group of direct cause variables to the consequence variable $X_n$;
(233) If some cause variables in the group are eliminated for any reason, the CPT of this group can be reconstructed as follows: Suppose the variable to be eliminated is $V_i$, before the elimination, there are several subgroups of the state combinations of the input variables indexed by j'; in subgroup j', the states of all the variables are same except the states of $V_i$; denote the index set of the state combination j in subgroup j' as $S_{ij'}$, then $$q_{nk;j'} = \sum_{j \in S_{ij'}} q_{nk;j}, \quad d_{nj'} = \sum_{j | S_{ij'}} d_{nj}, \quad p_{nk;j'} = q_{nk;j'}/d_{n;j'}$$

In which j' is the new index of the remnant state combinations after the elimination of $V_i$;
(234) Repeat (233) to deal with the case in which more than one cause variable is eliminated.

49. The medium according to claim 47, wherein the method further includes:
representing the causalities among the things in the explicit representation mode, specifically including the following steps:
(4) The functional variable $F_{n;i}$ is used to represent the causality between $V_i$, $i \in S_{EXn}$, and $X_n$. $V_i$ is the input or cause variable of $F_{n;i}$ and $X_n$ is the output or consequence variable of $F_{n;i}$ wherein: ① The causality uncertainty between $V_i$ and $X_n$ is represented by the occurrence probability $f_{nk;ij}$ of the specific value $F_{nk;ij}$ of $F_{n;i}$. $F_{nk;ij}$ is a random event representing the uncertain functional mechanism of $V_{ij}$ causing $X_{nk}$. $f_{nk;ij}$ is the probability contribution of $V_{ij}$ to $X_{nk}$; ② $f_{nk;ij} = (r_{n;i}/r_n)a_{nk;ij}$, where $r_{n;i}$ is called the relationship between $V_i$ and $X_n$, $r_n$ is the normalization factor and $$r_n = \sum_i r_{n;i},$$

$a_{nk;ij}$ is the probability of the event that $V_{ij}$ causes $X_{nk}$ regardless of any other cause variables and $a_{nk;ij}$ and $r_n$ can be the function of time; ③ $a_{nk}$ satisfies $$\sum_k a_{nk;ij} \leq 1; \quad ④ \Pr\{X_{nk}\} = \sum_{i,j} f_{nk;ij} \Pr\{V_{ij}\}.$$

50. The medium according to claim 49, wherein the functional variable $F_{n;i}$ in the explicit representation mode can be the conditional functional variable, the conditional functional variable is used to represent the functional relation between the cause variable $V_i$ and the consequence variable $X_n$ conditioned on $C_{n;i}$, wherein:
(1) $C_{n;i}$ has only two states: true or false, and its state can be found according to the observed information or the computation results;
(2) When $C_{n;i}$ is true, the conditional functional variable becomes the functional variable;
(3) When $C_{n;i}$ is false, the conditional functional variable is eliminated.

* * * * *